US012431628B2

(12) United States Patent
Eubanks et al.

(10) Patent No.: US 12,431,628 B2
(45) Date of Patent: Sep. 30, 2025

(54) ULTRA-WIDEBAND, LOW-DISTORTION, OMNI-DIRECTIONAL, AND PLACEMENT-INSENSITIVE ANTENNAS

(71) Applicant: Massive Light, LLC, Richardson, TX (US)

(72) Inventors: Travis Eubanks, San Antonio, TX (US); Brad David Moore, Boerne, TX (US); Jacob McDonald, Richardson, TX (US); Bernd Strassner, Albuquerque, NM (US)

(73) Assignee: Massive Light, LLC, Richardson, TX (US)

( * ) Notice: Subject to any disclaimer, the term of this patent is extended or adjusted under 35 U.S.C. 154(b) by 133 days.

(21) Appl. No.: 18/499,900

(22) Filed: Nov. 1, 2023

(65) Prior Publication Data

US 2024/0213684 A1 Jun. 27, 2024

Related U.S. Application Data

(60) Provisional application No. 63/535,241, filed on Aug. 29, 2023, provisional application No. 63/452,645, (Continued)

(51) Int. Cl.
*H01Q 13/02* (2006.01)
*H01Q 1/38* (2006.01)

(52) U.S. Cl.
CPC ............... *H01Q 13/02* (2013.01); *H01Q 1/38* (2013.01)

(58) Field of Classification Search
CPC ................................ H01Q 13/02; H01Q 1/38
See application file for complete search history.

(56) References Cited

U.S. PATENT DOCUMENTS 2,368,663 A 2/1945 Kandoian
2,454,766 A 11/1948 Brillouin
(Continued)

FOREIGN PATENT DOCUMENTS

EP 1523064 A1 4/2005

OTHER PUBLICATIONS

Song e al., "Multiband Multiple Ring Monopole Antennas," IEEE Transactions on Antennas and Propagation, vol. 51, No. 4, Apr. 2003, 8 pages.
(Continued)

*Primary Examiner* — Seung H Lee

(57) ABSTRACT

The disclosed principles provide novel antennas and corresponding methods of manufacturing thereof. In one aspect, an antenna according to the disclosed principles have a dielectric unit. The dielectric unit may be azimuthally uniform, radially symmetric, or symmetric. The dielectric unit may include a first conducting surface, a second conducting surface, and a non-conducting aperture. The first conducting surface may be located on a first radially interior surface of the dielectric unit and have both convex and concave surfaces. The second conducting surface, oblique to an axis of radial symmetry, may extend radially outward from the axis of radial symmetry. The non-conducting aperture may be located on the radial exterior of the dielectric unit. The first conducting surface and the second conducting surface may define a dielectric volume extending radially toward and terminating in the non-conducting aperture.

21 Claims, 66 Drawing Sheets

Related U.S. Application Data filed on Mar. 16, 2023, provisional application No. 63/421,508, filed on Nov. 1, 2022.

(56) References Cited

U.S. PATENT DOCUMENTS

| | | | | |
|---|---|---|---|---|
| 5,140,334 A | | 8/1992 | Snyder et al. | |
| 7,170,461 B2 | | 1/2007 | Patsche | |
| 7,180,458 B2 | * | 2/2007 | Hoshi | H01Q 9/28 343/773 |
| 7,864,127 B2 | | 1/2011 | Patsche | |
| 8,928,546 B1 | * | 1/2015 | Eubanks | H01Q 13/02 343/773 |
| 11,749,896 B1 | * | 9/2023 | Eubanks | H04B 1/40 343/702 |
| 2002/0126061 A1 | | 9/2002 | Griessbaum et al. | |
| 2005/0057431 A1 | | 3/2005 | Brown et al. | |
| 2005/0140557 A1 | * | 6/2005 | Kuroda | H01Q 19/09 343/773 |
| 2014/0285388 A1 | | 9/2014 | Peng | |

OTHER PUBLICATIONS

Papas et al., "Radiation from Wide-Angle Conical Antennas Fed by a Coaxial Line," Proceedings of the I.R.E., Jan. 1951, 3 pages.

Duhamel et al., "Broadband Logarithlviically Periodic Antenna Structures," IRE International Convention Record, New York, NY, 1957, 10 pages.

Taylor, "A Broadband Omnidirectional Antenna," Proceedings of IEEE Antennas and Propagation Society International Symposium and URSI National Radio Science Meeting, Jun. 1994, Seattle, WA, 4 pages.

Schantz, "Planar Elliptical Element Ultra-Wideband Dipole Antennas," IEEE Antennas and Propagation Society International Symposium, Jun. 2002, San Antonio, TX, 4 pages.

Liang, "Antenna Study and Design for Ultra Wideband Communication Applications," Thesis, University of London, Department of Philosophy, Jul. 2006, 202 pages.

Jeong et al., "A Conical-Cylindrical Monopole Antenna," Journal Of The Korea Electromagnetic Engineering Society, vol. 7, No. 3, Sep. 2007, 9 pages.

Wu et al., "Pulse Preserving Capabilities of Printed Circular Disk Monopole Antennas With Different Grounds for the Specified Input Signal Forms," IEEE Transactions on Antennas and Propagation, vol. 55, No. 10, Oct. 2007, 8 pages.

Keshmiri et al., "Design of a UWB Antenna with Stabilized Radiation Pattern," IEEE Antennas and Propagation Society International Symposium, Jul. 2008, San Diego, CA, 4 pages.

Ghosh et al., "Design of a Wide-Angle Biconical Antenna for Wideband Communications," Progress In Electromagnetics Research B, vol. 16, Jan. 2009, 17 pages.

Amert et al., "Miniaturization of the Biconical Antenna for Ultrawideband Applications," IEEE Transactions on Antennas and Propagation, vol. 57, No. 12, Dec. 2009, 8 pages.

Zeng et al., "A Modified Vivaldi Antenna for Improved Angular-Dependent Fidelity Property," Research Article, International Journal of Antennas and Propagation, vol. 2013, May 2013, 8 pages.

Fallahi et al., "Study of a Class of UWB CPW-Fed monopole antenna with fractal elements," IEEE Antennas and Wireless Propagation Letters, Jan. 2013, 6 pages.

Koohestani et al., "A Novel, Low-Profile, Vertically-Polarized UWB Antenna for WBAN," IEEE Transactions on Antennas and Propagation, vol. 62, No. 4, Apr. 2014, 7 pages.

Koohestani et al., "Fidelity Concepts Used in UWB Systems," IEEE International Symposium on Antennas and Propagation and USNC-URSI Radio Science Meeting, Jul. 2014, 2 pages.

Rao et al., "Analysis of Edge Terminated Wide Band Biconical Antenna," Aces Journal, vol. 30, No. 7, Jul. 2015, 6 pages.

Olvhammar et al., "A New Circularly Polarized Biconical Horn for Spacecraft TT C," Master's Thesis in Electrical Engineering Department of Electrical Engineering, Chalmers University of Technology, Gothenburg, Sweden 2018, 90 pages.

Bobreshov et al., "Biconical antenna with inhomogeneous dielectric lens for UWB applications," The Institute of Engineering and Technology, Aug. 2020, 3 pages.

Gaetano et al., "Compact Antenna for Optimized Platform Installations," IEEE International Symposium on Antennas and Propagation and USNC-URSI Radio Science Meeting, Singapore, Singapore, Dec. 2021, 2, pages.

Rostomyan et al., "A Balanced Impulse Radiating Omnidirectional Ultrawideband Stacked Biconical Antenna," IEEE Transactions on Antennas and Propagation, vol. 63, No. 1, Jan. 2015, 10, pages.

Taniguchi et al., "An Omnidirectional and Low-VSWR Antenna for the FCC-Approved UWB Frequency Band," IEEE Antennas and Propagation Society International Symposium, Columbus, OH, Jun. 2003, 4, pages.

Cicchetti et al., "Wideband and UWB Antennas for Wireless Applications: A Comprehensive Review," International Journal of Antennas and Propagation, vol. 2017, Feb. 2017, 46, pages.

Radio Corporation Of America, "Experimentally Determined Radiation Characteristics of Conical and Triangular Antennas," RCA Laboratories Division, Oct. 1952, 18, pages.

Paulsen et al., "Recent Investigations on the Volcano Smoke Antenna," IEEE Antennas and Propagation Society International Symposium, Jun. 2003, Columbus, OH, 4 pages.

Brocato et al., "FDTD Simulation Tools for UWB Antenna Analysis," Sandia National Laboratories, SAND2004-6577, Unlimited Release, Dec. 2004, 53 pages.

Schantz et al., "A Brief History Of UWB Antennas," IEEE Aerospace and Electronic Systems Magazine, vol. 19, No. 4, Apr. 2004, 5 pages.

International Search Report and Written Opinion of the International Searching Authority for International Application No. PCT/US24/20362 issued Jun. 26, 2024, 12 pages.

Hicks, "Experimental and Electromagnetic Modeling of Waveguide-Based Spatial Power Combining Systems," 2002, Retrieved from URL: https://repository.lib.ncsu.edu/server/api/core/bitstreams/458caba1-f287-4f08-8dae-7aad67aba7a0/content; Retrieved from Internet on May 23, 2024, 35 pages.

* cited by examiner

ULTRA-WIDEBAND, LOW-DISTORTION, OMNI-DIRECTIONAL, AND PLACEMENT-INSENSITIVE ANTENNAS

CROSS REFERENCE TO RELATED APPLICATIONS

This application claims priority to the following U.S. provisional patent applications: Ser. No. 63/421,508 filed Nov. 1, 2022, Ser. No. 63/452,645 filed Mar. 16, 2023, and Ser. No. 63/535,241 filed Aug. 29, 2023. Each of the foregoing is incorporated herein by reference.

TECHNICAL FIELD

This disclosure relates in general to wireless communications and more particularly to antenna technology.

BACKGROUND

As desired wireless data rates and bandwidths continue to grow, antenna performance often limits wireless system performance. Modern wireless systems commonly compensate for antenna limitations—such as distortion of wideband signals—by hopping between numerous narrow frequency bands within a larger bandwidth, with each frequency band (or channel) operating in a particular time window, rather than instantaneously transmitting and receiving across the entirety of a wide bandwidth.

Conical antennas, such as discones and bicones, have been used for omni-directional, wideband operation. Pattern stability over a wide bandwidth, however, remains a challenge because conical antenna size relative to wavelength varies substantially across a wide bandwidth. Wideband conical antenna radiation patterns thus scan over frequency, an undesirable feature in wireless communications—where an operator may desire to communicate point-to-point or broadcast—and signals intelligence applications—where an operator may desire to instantaneously observe signals that could originate from any direction.

Spherical or elliptical antennas have also been used for omni-directional, wideband operation, but with the same beam-scanning issues as conical antennas. Furthermore, to achieve wide bandwidth, spherical or elliptical antennas are often made "fatter," increasing the antenna's lateral dimensions. Accordingly, wideband spherical antenna dimensions exceed a half wavelength at higher frequencies, limiting use in multi-antenna configurations, such as antenna arrays. Large antenna sizes for wideband antennas, particularly those operating at low frequencies, also limit use of wide-bandwidth conical antennas in multi-antenna applications that improve wireless system performance.

Conical, spherical, and elliptical antennas remain heavy, costly, and difficult to fabricate and assemble for diverse wireless applications. These antennas are sensitive to fabrication tolerances and detuning issues near the antenna feed point due to high field strength in that region. Conical, spherical, and elliptical antennas often place a heavy, conducting cone, sphere, or ellipse over a ground plane, or over another cone, sphere, or ellipse. This approach rests a large, heavy radiating structure on a small feed pin and cannot operate in harsh environments.

Conical and spherical or elliptical antennas also require a ground plane of significant size to maintain match at lower operating frequencies; otherwise, antenna size becomes prohibitive at low frequency. Operation without a large ground plane causes placement sensitivity, in which the antenna placement, particularly above or near conducting objects excites undesirable modes of operation, distorts wideband signals, detunes the antenna, and causes instability and unpredictability in radiation patterns.

Wideband planar antennas, including planar formulations of conical and spherical antennas, incorporate the limitations described above. Moreover, planar antennas also lack the ruggedness needed to operate in diverse environments, such as unmanned aerial systems where deployment, shock, and vibration require ruggedized structures. Although easy to integrate with planar transceiver circuits, planar antennas must also interface with coaxial connectors in many applications, resulting in a connector-board interface susceptible to failure in harsh environments.

In many instances, UWB antennas that operate over wider bandwidth transition between modes undesirably across the bandwidth of operation, preventing use in wireless applications that require a stable phase center, low distortion, and controlled radiation patterns.

Due to the limitations summarized above, conventional UWB antennas fail to achieve wide instantancous bandwidth (IBW) and stable and controlled omni-directional patterns, as desired in modern wireless applications. For wireless communications and signals intelligence applications, operators employ multiple antennas to cover relevant bandwidths and remain unable to instantaneously receive or identify wideband signals.

Accordingly, there is a need for antennas operating over a wide instantaneous bandwidth (IBW), particularly antennas having both wide IBW and other features, such as ruggedness, low size and weight, placement-insensitivity, omni-directional radiation, and stable operation across frequency.

SUMMARY

According to one aspect of the invention, there is provided an antenna having a dielectric unit. The dielectric unit may be azimuthally uniform, radially symmetric, or symmetric. The dielectric unit may include a first conducting surface, a second conducting surface, and a non-conducting aperture. The first conducting surface may be located on a first radially interior surface of the dielectric unit and have both convex and concave surfaces. The second conducting surface, oblique to an axis of radial symmetry, may extend radially outward from the axis of radial symmetry. The non-conducting aperture may be located on the radial exterior of the dielectric unit. The first conducting surface and the second conducting surface may define a dielectric volume extending radially toward and terminating in the non-conducting aperture.

In certain embodiments, a dielectric unit may be configured to instantaneously transmit and receive wireless signals across a single instantaneous bandwidth of 10:1.

In certain embodiments, a dielectric unit may be configured to transmit and receive wireless signals across an efficiency bandwidth of 10:1.

In certain embodiments, a dielectric unit may be configured to transmit and receive wireless signals across a 10:1 bandwidth, wherein the 10:1 bandwidth comprises a plurality of instantaneous frequency bands, the bandwidth of each of the plurality of instantaneous frequency bands comprising a multiple of a lowest operating frequency.

In certain embodiments, a maximum radius of a dielectric unit does not exceed one-tenth of a lowest operating wavelength at which a return loss of an antenna having the dielectric unit meets or exceeds 6 dB.

In certain embodiments, a maximum height of a dielectric unit does not exceed one-sixth of a lowest operating wavelength at which a return loss of the antenna having the dielectric unit meets or exceeds 6 dB.

In certain embodiments, a first conducting surface and second conducting surface may be disposed on a dielectric volume to form a dielectric unit as a single unit without conducting volumes.

In certain embodiments, a dielectric unit may be configured to impede direct current flow between a first conducting surface and a second conducting surface.

In certain embodiments, the second conducting surface may be located on a second radially interior surface of the dielectric unit and have convex surfaces, concave surfaces, or both. In certain embodiments, a maximum radius of a second conducting surface exceeds a maximum radius of a first conducting surface. In certain embodiments, a maximum radius of a first conducting surface exceeds a maximum radius of a second conducting surface. In certain embodiments, a second conducting surface may be oblique to an axis of radial symmetry or an azimuthal plane.

In certain embodiments, an antenna may be coupled to a transmission line capable of transmitting signals to and receiving signals from the antenna. In certain embodiments, the transmission line may be azimuthally uniform or radially symmetric.

According to one aspect of the invention, there is provided an antenna having a dielectric unit. The dielectric unit may be azimuthally uniform, radially symmetric, or symmetric. The dielectric unit may include a first conducting surface, a second conducting surface, and a non-conducting aperture. The first conducting surface may be located on a first radially interior surface of the dielectric unit and have convex surfaces, concave surfaces, or both. The second conducting surface, oblique to an axis of radial symmetry, may extend radially outward from the axis of radial symmetry. The non-conducting aperture may be located on the radial exterior of the dielectric unit. The first conducting surface and the second conducting surface may define a dielectric volume extending radially toward and terminating in the non-conducting aperture.

In certain embodiments, the second conducting surface may be located on a second radially interior surface of the dielectric unit and have convex surfaces, concave surfaces, or both.

In certain embodiments, an antenna may be coupled to a ground plane defining a radiation horizon or azimuthal plane. In certain embodiments, a radiation horizon or azimuthal plane may be orthogonal to an axis of radial symmetry. In certain embodiments, a radiation horizon or azimuthal plane may be oblique to an axis of radial symmetry.

In certain embodiments, an antenna may be coupled to a transmission line capable of transmitting signals to and receiving signals from a dielectric unit.

In certain embodiments, a dielectric volume may have one or more dielectric surfaces. In certain embodiments, a dielectric volume may have a first dielectric surface on a first radially interior surface. In certain embodiments, a dielectric volume may have a second dielectric surface on a second radially interior surface. In certain embodiments, one or more conducting surfaces may be disposed on one or more dielectric surfaces of a dielectric volume to form a dielectric unit.

In certain embodiments, a dielectric unit or antenna may be configured to radiate a pattern having a beam substantially uniform in azimuth and including the radiation horizon. In certain embodiments, a dielectric unit or antenna may be configured to radiate a pattern having a beam substantially uniform in azimuth and including the radiation horizon over a 4:1, 6:1, or 8:1 pattern bandwidth. In certain embodiments, a dielectric unit or antenna may be configured to radiate a pattern having a conical beam substantially aligned with the axis of radial symmetry and a beam substantially uniform in azimuth and including the radiation horizon. In certain embodiments, a dielectric unit or antenna may be configured to radiate a pattern having a conical beam substantially aligned with the axis of radial symmetry and a beam substantially uniform in azimuth and including the radiation horizon over a 4:1 or 6:1 pattern bandwidth.

In certain embodiments, a symmetric dielectric unit or antenna may have a major radius defining the maximum radial dimension of the dielectric unit or antenna. In certain embodiments, a symmetric dielectric unit or antenna may have a minor radius defining the minimum radial dimension on a radially external surface of the dielectric unit or antenna.

In certain embodiments, an axial ratio of the major radius to the minor radius ranges from 1.25-2.5.

In certain embodiments, a dielectric unit or antenna may be configured to preferentially transmit and receive wireless signals in the direction of a minor radial axis. In certain embodiments, a dielectric unit or antenna may be configured to preferentially transmit and receive wireless signals in the direction of a major radial axis. In certain embodiments, a dielectric unit or antenna may be configured to preferentially transmit and receive wireless signals in a conical beam azimuthally aligned with the major radial axis.

In certain embodiments, an antenna or dielectric unit may be configured based on a signal type of a wireless signal transmitted or received by the dielectric unit or antenna. In certain embodiments, a position of a first conducting surface, second conducting surface, or non-conducting aperture may be based on a signal type of a wireless signal transmitted or received by a dielectric unit. In certain embodiments, a signal type may consist of white gaussian noise. In certain embodiments, a signal type may include a chirped spread spectrum signal. In certain embodiments, a signal type may include a direct-sequence spread spectrum signal. In certain embodiments, a signal type comprises a featureless spread spectrum signal.

According to one aspect of the invention, there is provided a system including an antenna, a transmit channel, and a receive channel. An antenna may be configured to transmit and receive wireless signals over one or more instantaneous bandwidths, each comprising up to 3.2 GHZ. The antenna may be configured to transmit and receive wireless signals over one or more instantaneous bandwidths, each comprising at least 3.2 GHz. The antenna may be configured to transmit and receive wireless signals over one or more instantaneous bandwidths, each comprising up to 6.4 GHz. The antenna may be configured to transmit and receive wireless signals over one or more instantancous bandwidths, each comprising at least 6.4 GHz.

A transmit channel may be coupled to an antenna and configured to instantaneously transmit a first signal in a transmit frequency band having an instantaneous bandwidth of at least 3.2 GHZ. A receive channel may be coupled to an antenna and configured to instantaneously receive a second signal in a receive frequency band having an instantaneous bandwidth of at least 3.2 GHz. A transmit channel may be coupled to an antenna and configured to instantaneously transmit a first signal in a transmit frequency band having an instantaneous bandwidth of up to 3.2 GHz. A receive channel may be coupled to an antenna and configured to instantaneously receive a second signal in a receive frequency band having an instantaneous bandwidth of up to 3.2 GHZ.

A transmit channel may be coupled to an antenna and configured to instantaneously transmit a first signal in a transmit frequency band having an instantaneous bandwidth of at least 6.4 GHz. A receive channel may be coupled to an antenna and configured to instantaneously receive a second signal in a receive frequency band having an instantaneous bandwidth of at least 6.4 GHz. A transmit channel may be coupled to an antenna and configured to instantaneously transmit a first signal in a transmit frequency band having an instantaneous bandwidth of up to 6.4 GHz. A receive channel may be coupled to an antenna and configured to instantaneously receive a second signal in a receive frequency band having an instantaneous bandwidth of up to 6.4 GHz.

In certain embodiments, a transmit frequency band may not overlap in frequency with a receive frequency band. In certain embodiments, a transmit channel and a receive channel may be isolated based on the transmit frequency band not overlapping the receive frequency band. In certain embodiments, a transmit frequency band may be higher in frequency than a receive frequency band. In certain embodiments, a transmit channel may be configured for RF upconversion of a first signal. In certain embodiments, a receive channel may be configured for direct-digital downconversion of a second signal. In certain embodiments, a receive frequency band may be higher in frequency than a transmit frequency band. In certain embodiments, a receive channel may be configured for RF downconversion of a second signal. In certain embodiments, a transmit channel may be configured for direct-digital upconversion of a first signal.

In certain embodiments, transmit and receive channels are configured for spread spectrum communication. In certain embodiments, a first signal may include a first spreading code, and a second signal may include a second spreading code. In certain embodiments, the transmit channel and receive channel may be isolated based on the first spreading code and second spreading code being different codes. In certain embodiments, the transmit channel and receive channel may be isolated based on the first spreading code and second spreading code being uncorrelated.

In certain embodiments, a transmit channel and receive channel may be configured for half-duplex communication.

According to one aspect of the invention, there is provided a method having one or more steps that include forming a dielectric unit. Steps for forming a dielectric unit may include disposing a first conducting surface on a first radially interior surface of a dielectric volume and disposing a second conducting surface on a second radially interior surface of the dielectric volume. In certain embodiments, a dielectric volume, first conducting surface, and second conducting surface form a dielectric unit without conducting volumes.

According to one aspect of the invention, there is provided a method having one or more steps that include forming a dielectric volume. In certain embodiments, a dielectric volume may have a first radially interior surface, a second radially interior surface, and a non-conducting aperture on the radial exterior of the dielectric volume. The first radially interior surface may have convex surfaces, concave surfaces, or both. The second radially interior surface, oblique to an axis of radial symmetry, may extend radially outward from the axis of radial symmetry. Additional steps may include disposing a first conducting surface on a first radially interior surface of the dielectric volume and disposing a second conducting surface on a second radially interior surface of the dielectric volume.

According to one aspect of the invention, there is provided a method having one or more steps that include forming an antenna. Steps for forming an antenna may include mating a first conducting surface of a first radiator to a first radially interior surface of a dielectric volume and mating a second conducting surface of a second radiator to a second radially interior surface of the dielectric volume. A first conducting surface and a second conducting surface may define a dielectric volume extending radially toward and terminating in a non-conducting aperture.

In certain embodiments, a first conducting surface may have convex surfaces, concave surfaces, or both. In certain embodiments, a second conducting surface may have convex surfaces, concave surfaces, or both. In certain embodiments, a second conducting surface oblique to an axis of radial symmetry may extend radially and longitudinally outward from the axis of radial symmetry.

In certain embodiments, a first radiator may be integrated into a conducting top hat. In certain embodiments, a second radiator may be integrated into a conducting ground plane.

In certain embodiments, a first radiator may be formed without conducting volumes. In certain embodiments, a first radiator may be formed by disposing a first conducting surface on a first dielectric base. In certain embodiments, a second radiator may be formed without conducting volumes. In certain embodiments, a second radiator may be formed by disposing a second conducting surface on a second dielectric base. In certain embodiments, a first dielectric base and dielectric volume may be composed of different dielectric materials. In certain embodiments, a second dielectric base and dielectric volume may be composed of different dielectric materials.

In certain embodiments, a top hat may be mated to a dielectric volume. In certain embodiments, a top hat may secure a first radiator to a dielectric volume. In certain embodiments, a dielectric volume may include one or more lips for mating to a top hat. In certain embodiments, a top hat may be mated to a lip of a dielectric volume. In certain embodiments, a dielectric volume may include an integrated rim for securing a first radiator. In certain embodiments, a maximum radius of a first radiator may exceed a minimum radius of an integrated rim. In certain embodiments, a top hat may be mated to an integrated rim of a dielectric volume. In certain embodiments, a first radiator may be inserted through an aperture of a dielectric volume. In certain embodiments, a maximum radius of a first radiator may exceed a maximum radius of an aperture of a dielectric volume.

In certain embodiments, a first radiator, second radiator, and dielectric volume may be assembled such that the dielectric volume extends longitudinally between and secures the first radiator and the second radiator, partially or completely. In certain embodiments, a dielectric volume may extend longitudinally past and secure a first radiator.

Embodiments herein further include corresponding system, apparatus and computer program products, and methods of making the same. Embodiments herein therefore generally include methods to fabricate and operate low-size-and-weight, ultra-wideband, low-distortion, omni-directional, and placement-insensitive antennas, as well as methods to improve wireless system performance based on these features.

Technical advantages of certain embodiments may include instantaneous transmission and reception of wideband wireless signals, consistent antenna operation across wide bandwidths and installation environments, low weight-and-size antennas, wide pattern bandwidth, and low-cost fabrication of ruggedized antennas. Other technical advantages will be readily apparent to a person of ordinary skill in the art (POSITA) from the descriptions and figures herein. While specific advantages have been described above, various embodiments may include all, some, or none of these advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
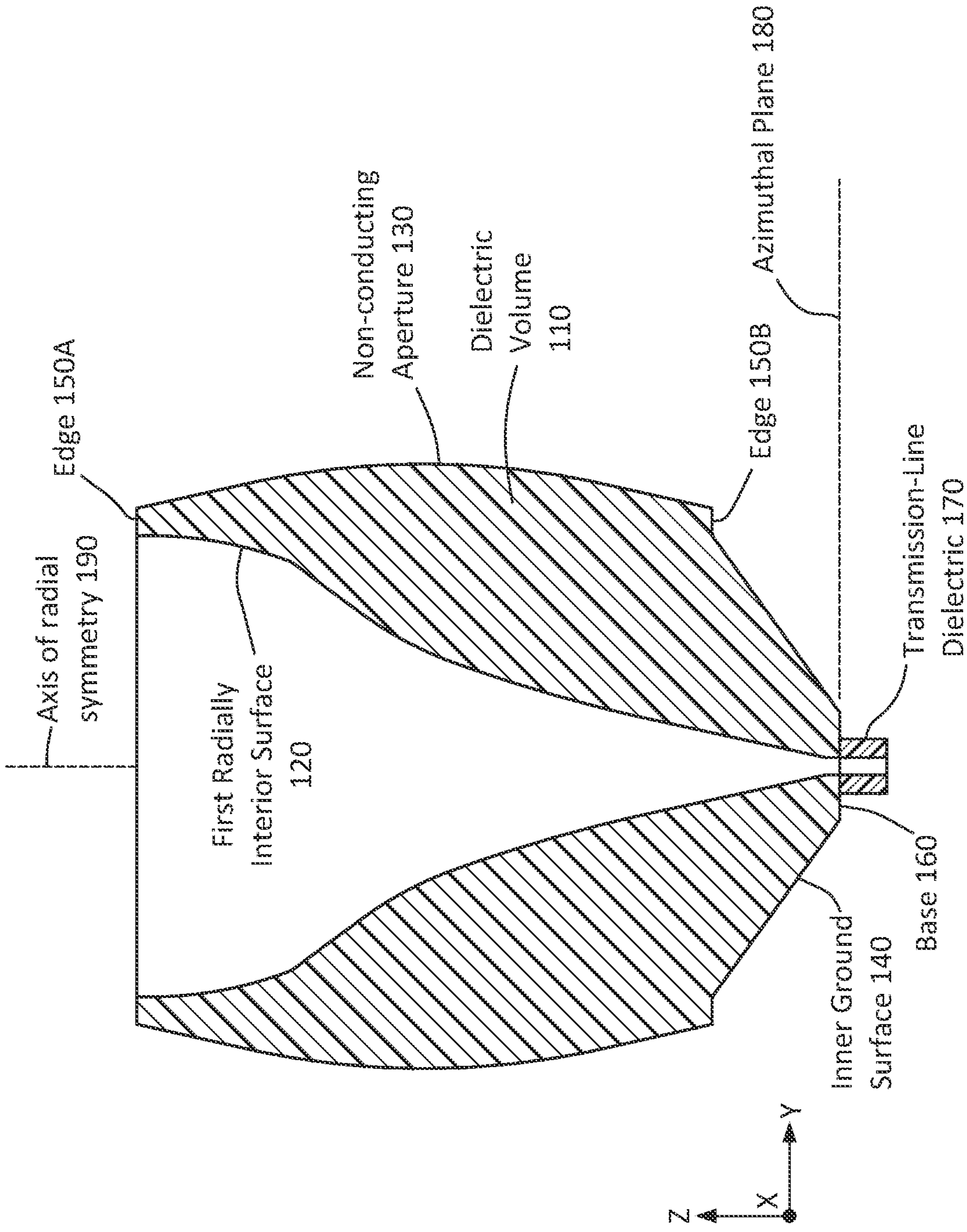
FIG. 1 is a diagram that illustrates the geometry and features of an example dielectric volume, according to certain embodiments.

As discussed above, there is a need for antennas capable of transmitting and receiving signals across a wide instantaneous bandwidth (IBW), the bandwidth at which the antenna can operate with acceptable distortion performance at an instant in time (or practically, over the time span corresponding to the time-domain signal transmitted over the IBW). To transmit or receive a signal instantaneously, an antenna must be capable of transmitting or receiving the signal across the signal's full bandwidth with high fidelity, without partitioning the signal into smaller bandwidths or hopping across frequency bands in different time windows. To acquire a large IBW, an antenna must transmit and receive over that bandwidth without substantially distorting the signal transmitted or received. Distortion may be caused by dispersion, reflections, and excitation of undesirable modes that draw signal energy away from the desired transmission channel.

Fidelity factor is a metric for assessing the fidelity, and also the distortion, of a transmitted or received signal. Antennas with a high fidelity factor over a frequency bandwidth (e.g., 2:1) may have an identical IBW (e.g., 2:1), but an antenna may have a large frequency bandwidth (e.g., 3:1) without being able to transmit and receive over that bandwidth instantaneously. For example, an antenna may be matched (e.g., to 50 ohm) over a 200-600 MHz frequency bandwidth, but only transmit or receive signals in 20 MHz channels because the antenna distorts signals with wider bandwidths. Lower fidelity (higher distortion) limits a receiver's ability to receive (acquire, synchronize, and track) a signal.

Antennas with greater transmission phase linearity (S21 phase linearity) maintain higher fidelities, and the difficulty of maintaining phase linearity increases with bandwidth. Similarly, smooth and slow-varying transmission magnitude is desirable to maintain high fidelity.[1] Excitation of multiple modes may cause phase non-linearities and discontinuities in transmission magnitude. Accordingly, embodiments disclosed herein seek to minimize transmission phase non-linearity and excitation of undesirable modes to obtain high fidelity.

[1] As dispersive effects and operation of undesirable modes that limit fidelity are typically more discernible in phase than magnitude, this disclosure focuses on transmission phase linearity as an indicator of high fidelity, but it will be understood that embodiments herein with high fidelity obtain both sufficiently linear transmission phase and slow-varying transmission magnitude to obtain the fidelities disclosed.

As used herein, the term "lowest operating frequency" refers to the lowest frequency at which an antenna return loss meets or exceeds 10 dB, unless indicated otherwise. In certain embodiments, the term "lowest operating frequency" may refer to the lowest frequency at which an antenna return loss meets or exceeds 6 dB, as indicated by wireless performance. In this disclosure, the variable fL is used as a normalized frequency variable that may or may not correspond to the lowest operating frequency for any particular embodiment. For example, fL is the lowest operating frequency for antenna 1300 (FIG. 13), antenna 1600 (FIG. 16), and antenna 1900 (FIG. 19), as indicated by the return loss performance of each antenna. The lowest operating frequency corresponds to a lowest operating wavelength, $\lambda=c/f$. Similarly, the term "highest operating frequency" refers to the highest frequency at which antenna efficiency bandwidth, IBW, and pattern bandwidth overlap. In many embodiments, highest operating frequency is 6 fL or 12 fL and limited by the efficiency or pattern bandwidth. A person of skill in the art will understand that alternative definitions (e.g., at 6 dB return loss or 10 dB return loss) of the lowest or highest operating frequency or lowest or highest operating wavelength merely require parameters defined based on the lowest or highest operating wavelength or lowest or highest operating frequency to be re-normalized accordingly.

Antenna embodiments herein include a dielectric volume. FIG. 1 illustrates the geometry and features of exemplary dielectric volume 110 in a sectional view. Dielectric volume 110 may have multiple surfaces, including first radially interior surface 120, non-conducting aperture 130, inner ground surface 140, edges 150A, 150B, and base 160. Dielectric volume 110 may mate to transmission-line dielectric 170.

To case reference to various physical features and wireless performance characteristics (particularly radiation patterns), FIG. 1 also illustrates an azimuthal plane 180, an axis of radial symmetry 190 located at the radial center of antenna 100, and an XYZ coordinate system. Throughout this disclosure, antenna performance characteristics (e.g., radiation patterns) and physical features are described with reference to a spherical ($\theta,\varphi,r$), cartesian (X,Y,Z), or cylindrical ($\rho,\varphi,Z$) coordinate system as appropriate. As used herein, longitudinal dimensions or distances refer to the Z-dimension and radial dimensions or distances refer to the $\rho$-, X-, or Y-dimension.

As shown in FIG. 1, dielectric volume 110 is azimuthally uniform (without variation in $\varphi$) such that taking a section in any elevation plane ($\theta$-r plane) yields the view in FIG. 1. Rotating the sectional view in FIG. 1 about axis of radial symmetry 190 yields a three-dimensional dielectric volume 110 having multiple surfaces, with each surface in a three-dimensional view corresponding to a curve in the sectional view of FIG. 1. Dielectric volume 110 may be radially symmetric or azimuthally uniform about axis of radial symmetry 190. Dielectric volume 110 terminates at its radial interior in a first radially interior surface 120. Dielectric volume 110 terminates at its radial exterior in a non-conducting aperture 130. Dielectric volume 110 terminates at its longitudinal maximum in one or more edges 150A. FIG. 1 illustrates one edge 150A at the longitudinal maximum of dielectric volume 110. Dielectric volume 110 terminates at its longitudinal minimum in a base 160. Dielectric volume 110 also has an inner ground surface 140, on its radial exterior, that extends from base 160 to one or more edges 150B or to non-conducting aperture 130. FIG. 1 illustrates one edge 150B between inner ground surface 140 and non-conducting aperture 130.

In certain embodiments, dielectric volume 110 has a maximum radius determined by the maximum radial dimension of non-conducting aperture 130. In certain embodiments, dielectric volume 110 has a maximum height determined as the longitudinal distance from base 160 to the longitudinal maximum of dielectric volume 110.

First radially interior surface 120, located on the radial interior of dielectric volume 110, may extend longitudinally from base 160 to the longitudinal maximum (edge 150A in FIG. 1) of dielectric volume 110. In certain embodiments, first radially interior surface 120 includes convex, concave, or both convex and concave surfaces. In certain embodiments, the volume to the radial interior of first radially interior surface 120 is a void (e.g., free space or air). As discussed further below, in certain embodiments conducting surfaces (e.g., a metal radiator) or dielectric structures (e.g., a dielectric base) may be inserted into the void. In certain embodiments, conducting surfaces may be mated to first radially interior surface 120 during fabrication of an antenna.

Non-conducting aperture 130, located on the radial exterior of dielectric volume 110, determines the radial maximum of dielectric volume 110. As shown in FIG. 1, non-conducting aperture 130 extends longitudinally between two edges 150A, 150B. In certain embodiments, non-conducting aperture 130 may extend longitudinally from inner ground surface 140 to one or more edges 150A at the longitudinal maximum of dielectric volume 110. Dielectric volume 110 terminates in free space at non-conducting aperture 130. In certain embodiments, non-conducting aperture 130 includes convex, concave, or both convex and concave surfaces.

As shown in FIG. 1, inner ground surface 140 extends radially outward from base 160 to one or more edges 150B. Inner ground surface 140 may extend radially outward from base 160 to non-conducting aperture 130 in certain embodiments. In certain embodiments, inner ground surface 140 may extend to the longitudinal minimum of dielectric volume 110. Although not shown in FIG. 1, in certain embodiments inner ground surface 140 may extend to the outer radius of transmission-line dielectric 170. In certain embodiments, inner ground surface 140 includes convex, concave, or both convex and concave surfaces.

Dielectric volume 110 may contain one or more edges 150A, 150B. As shown in FIG. 1, dielectric volume 110 contains one edge 150A at the longitudinal maximum of dielectric volume 110 and one edge 150B between inner ground surface 140 and non-conducting aperture 130. In certain embodiments, edges 150A, 150B may be included in dielectric volume 110 to accommodate fabrication tolerances or to provide flat surfaces (e.g., flats parallel to the XY-plane) for mating to other structures, as discussed further below. In certain embodiments dielectric volume 110 may not contain edge 150A or edge 150B.

As shown in FIG. 1, base 160 is located at the longitudinal minimum of dielectric volume 110. In certain embodiments base 160 may lie on azimuthal plane 180 or parallel to azimuthal plane 180. In certain embodiments, base 160 may extend to the radial maximum of transmission-line dielectric 170. As shown in FIG. 1, base 160 extends beyond the maximum radius of transmission-line dielectric 170, which may have the advantage of stabilizing dielectric volume 110 or providing a flat surface for mating to external structures (e.g., an external ground plane).

Transmission-line dielectric 170 may be any dielectric or composition of dielectrics in a transmission line coupled to dielectric volume 110. As shown in FIG. 1, transmission-line dielectric 170 is the insulating jacket separating inner and outer conductors in a coaxial transmission line. In certain embodiments, transmission-line dielectric 170 may be azimuthally uniform or radially symmetric.

As shown in FIG. 1, azimuthal plane 180 defines the radiation horizon (θ=90°). In certain embodiments, azimuthal plane 180 may also define the azimuthal plane (θ=90°, XY) corresponding to an external ground plane.

Axis of radial symmetry 190 defines the Z-axis around which dielectric volume 110 is azimuthally uniform or radially symmetric. An azimuthally uniform structure does not vary in azimuth (φ). Dielectric volume 110 is azimuthally uniform as shown in FIG. 1. In certain embodiments, dielectric volume 110 may be radially symmetric to achieve certain radiofrequency (RF) performance characteristics or to facilitate certain fabrication methods.

All structures shown in FIG. 1 (dielectric volume 110 and transmission-line dielectric 170) are composed of dielectric materials. In certain embodiments, a dielectric volume may be formed from one or more dielectric materials, including polycarbonate, polytetrafluoroethylene (PTFE), nylon, Polyethylene terephthalate glycol (PETG), polyetherimide (PEI), ABS, polyurethane foams, polyethylene foams, polystyrene foams, polymethacrylimide foams, ceramic-filled resin, or polymer-filled resin. Dielectric volume 110 may be translucent or transparent. Transmission-line dielectric 170 may be formed from any suitable dielectric material, or composition of materials, for transmission of RF energy to dielectric volume 110, including the materials described above.[2] For example, transmission-line dielectric 170 may be composed of Teflon or Ultem® materials commonly used in coaxial transmission lines.

[2] All antennas herein are matched to 50Ω transmission lines. A person of skill in the art will understand that antenna embodiments disclosed herein may be matched to impedances exceeding 50Ω without loss of performance.

As shown in FIG. 1, dielectric volume 110 is composed of a single, uniform dielectric material. In certain embodiments, a dielectric volume may include one or more voids that do not contain dielectric material. For example, certain volumes in a dielectric volume may be formed by additive manufacturing, with other volumes left as voids during the additive manufacturing process. In certain embodiments, the dielectric volume may contain one or more weep holes to evacuate or backfill one or more voids. In certain embodiments, one or more weep holes may be radially symmetric, azimuthally uniform, or symmetric. For example, to maintain structural integrity of the dielectric volume, a number N weep holes, each separated by 360/N degrees in azimuth, may aid in evacuating N separate voids. In certain embodiments, the inclusion of one or more voids in a dielectric volume does not affect the continuity of conducting surfaces in the dielectric volume. For example, a dielectric unit may contain one or more voids and weep holes that do not intersect first radially interior surface 120 inner ground surface 140, or any other surfaces that may form a base for a conducting surface.

In certain embodiments, a dielectric volume may be composed of multiple dielectric materials. For example, one or more voids may be backfilled with dielectric material. Including one or more voids in the dielectric volume may reduce weight, control the effective dielectric constant of the antenna, and inhibit or facilitate radiation in different modes. In certain embodiments, the effective dielectric constant may be calculated as a volume-weighted average of the one or more dielectric constants of materials in the dielectric volume. For example, a dielectric volume formed from a material with dielectric constant 2.1 and having air voids (dk=1) in 50% of its volume would have effective dielectric constant $dk_e=(0.5)(2.1)+(0.5)(1)=1.55$. In certain embodiments, one or more voids may be radially symmetric, azimuthally uniform, or symmetric, to facilitate certain features in the antenna radiation pattern, such as or azimuthally uniform beams or greater directivity in a particular direction.

In certain embodiments, the dielectric volume may be formed of a material having dielectric constant from 2.0 to 3.6. In certain embodiments, the dielectric unit may have an effective dielectric constant from 1.4 to 3.6. In certain embodiments for improved structural integrity, the dielectric unit may have an effective dielectric constant from 1.8 to 3.1.

In certain embodiments, the dielectric volume may be formed of a material having specific gravity from 1.02 to 1.38. In certain embodiments the dielectric volume may be formed of a plurality of materials, including a first material having specific gravity from 1.02 to 1.38 and a second material having specific gravity from 0.03 to 0.2.

In certain embodiments, a dielectric unit may be formed from dielectric volume 110. To form a dielectric unit, a first conducting surface may be disposed on first radially interior surface 120, and a second conducting surface may be disposed on inner ground surface 140. In certain embodiments the first conducting surface or second conducting surface may also be disposed on one or more edges 150A, 150B. A second conducting surface may also be disposed on base 160 to the radial exterior of transmission-line dielectric 170. In certain embodiments, forming a dielectric volume (and dielectric unit) as a single, integrated whole enables previously unattainable dielectric compositions and effective RF properties for achieving the wireless performance disclosed herein.

Dielectric volume 110 mates to transmission-line dielectric 170 in FIG. 1. In certain embodiments, transmission-line dielectric 170 couples RF energy to dielectric volume 110 (transmission to free space) or dielectric volume 110 couples RF energy to transmission-line 170 (reception from free space).

Dielectric volume 110 may be formed by additive manufacturing, machining, injection molding, or similar processes. For example, dielectric volume 110 may be formed from Ultem® materials in a fused-deposition modeling (FDM) process. As another example, dielectric volume 110 may be formed in a stereolithography (SLA) process from ABS. As yet another example, dielectric volume 110 may be formed by machining Teflon.

Surfaces of dielectric volume 110 may be epoxied, painted, or treated for various applications. In certain embodiments, non-conducting aperture 130 may be painted. For example, non-conducting aperture 130 may be painted white, light blue, gray, or a combination of colors to reduce the visual observability of the antenna on airborne or marine platforms. In certain embodiments, surfaces of dielectric volume 110 may be treated to reduce adhesion of water, dirt, or other substances that may impact structural integrity, lifetime, or wireless performance. In certain embodiments, surfaces of dielectric volume 110 may be treated to facilitate fabrication of an antenna. For example, first radially interior surface 120 may be sandblasted or chemically etched to promote adhesion of a first conducting surface to first radially interior surface 120.

Figure 2B:
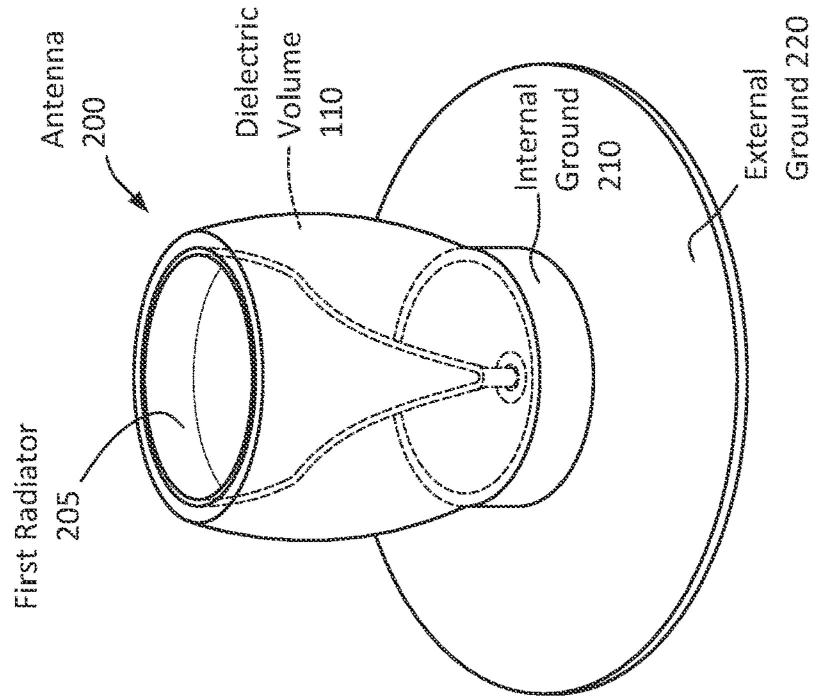
FIGS. 2A-2B are diagrams that illustrate the geometry and features of an example antenna, according to certain embodiments.
Figure 2A:
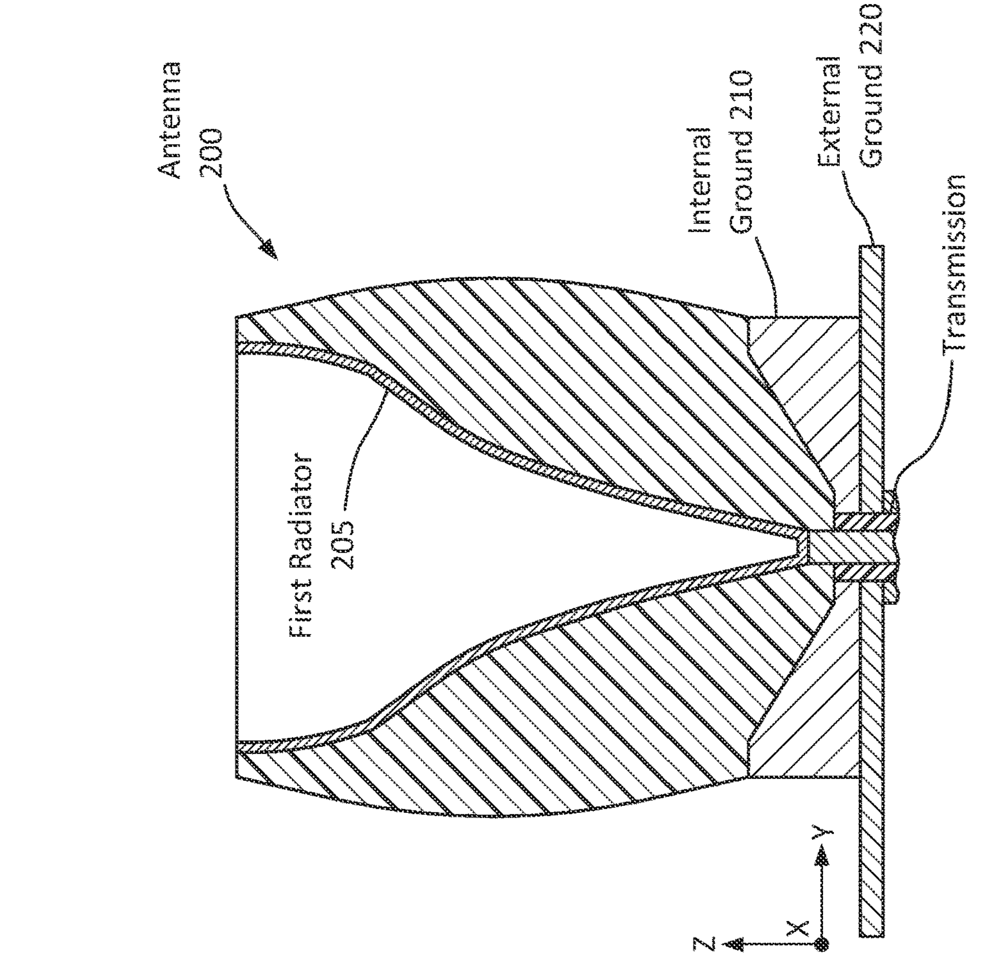

Collective FIG. 2 illustrates the geometry and features of antenna 200 in sectional (FIG. 2A) and perspective (FIG. 2B) views. FIG. 2A illustrates a section of antenna 200 in the ZY plane, but any section of FIG. 2B in an elevation plane (θ-r) yields the sectional view of FIG. 2A. As illustrated, antenna 200 has a dielectric volume (e.g., dielectric volume 110 as shown in FIG. 1), a first radiator 205, an inner ground 210, and an external ground 220. Antenna 200 may be coupled to transmission line 230 for the transmission and reception of RF/wireless signals.

As shown in FIGS. 2A-2B, the maximum radius of antenna 200 does not exceed $\lambda_L/12$ and the maximum height of antenna 200 does not exceed $\lambda_L/5$. In certain embodiments, maximum antenna height may be increased to shift the antenna's operating bandwidth to lower frequencies or to improve return loss at frequencies in the lower part of the antenna's operating bandwidth. In certain embodiments, reducing antenna height may improve transmission phase linearity across the antenna's operating bandwidth, reducing distortion and increasing fidelity of instantaneous wideband wireless signals. In certain embodiments, antenna radius may be adjusted to facilitate matching the antenna or to achieve antenna gain at desired frequencies.

As used to form antenna 200, dielectric volume 110 may be formed from any fabrication process, materials, or composition of materials described with respect to FIG. 1.

As shown in FIGS. 2A-2B, first radiator 205 is located on the radial interior of dielectric volume 110 and presents a conducting surface at first radially interior surface 120. First radiator 205 may extend longitudinally from base 160 to the longitudinal maximum (edge 150A in FIG. 1) of dielectric volume 110. In certain embodiments, first radiator 205 may extend from a center conductor of a transmission line (e.g., a pin extending from the transmission line) to the longitudinal maximum 150A of dielectric volume 110. First radiator 205 may be azimuthally uniform or radially symmetric. First radiator 205 may extend radially from an inner conductor of a transmission line to one or more edges 150A of dielectric volume 110. In certain embodiments, first radiator 205 may extend to the maximum radius of dielectric volume 110. In certain embodiments, first radiator 205 includes convex, concave, or both convex and concave surfaces.

In certain embodiments, the volume to the radial interior of first radiator 205 is a void (e.g., free space or air). In certain embodiments dielectric structures (e.g., a dielectric filler) may be inserted into the void to the radial interior of first radiator 205.

First radiator 205 may be formed by a machining, additive manufacturing, sintering, stamping, spraying, rolling, or deposition process, or from one or more similar processes. For example, first radiator 205 may be machined or additively manufactured from a conducting material (e.g., copper or aluminum) such that first radiator 205 fills the entire volume to the radial interior of first radially interior surface 120. As another example, first radiator 205 may be formed without conducting volume by depositing a first conductive surface on first radially interior surface 120. As yet another example, first radiator 205 may be formed without conducting volume by stamping a thin conductive sheet and adhering to first radially interior surface 120.

In certain embodiments, forming first radiator 205 without conducting volume may have the advantage of reducing the size and weight of antenna 200. As used herein, the term "without conducting volume" means that conductors in an antenna or dielectric unit-such as a first conducting surface or second conducting surface—are sufficiently thin that volume of the conductor has no substantial effect on RF performance (e.g., the conductor may be modeled or analyzed as a surface) or antenna weight. For example, a conducting surface may be without conducting volume if less than one-hundredth (1/100) of a highest operating wavelength. In certain embodiments, a conducting surface may be without conducting volume if less than one-fiftieth (1/50) of a highest operating wavelength. In certain embodiments, one or more conducting surfaces may have a thickness of at least 10 skin depths at a lowest operating frequency to minimize RF loss.

In certain embodiments, first radiator 205 may be formed with conducting volume to partially fill a void to the radial interior of first radially interior surface 120. For example, first radiator 205 may be formed by stamping a thick conductive sheet, or by additively manufacturing a conductive material to a certain thickness, and adhering to first radially interior surface 120. Forming a first radiator 205 to partially fill a void to the radial interior of first radially interior surface 120 may have the advantage of presenting conductive surfaces at the maximum longitudinal dimension of antenna 200 for mating or coupling to other structures. For example, first radiator 205 may be formed with sufficient radial thickness to facilitate conductively epoxying or otherwise coupling a conductive top hat to first radiator 205. In alternate embodiments, a conductive top hat may be coupled to first radiator 205 via one or more edges 150A. Coupling a metallic top hat to first radiator 205 may have the advantages of isolating any void radially interior to first radiator 205 from external environments and preventing current flow on the radial interior of first radiator 205.

In certain embodiments, first radiator 205 may be formed by disposing one or more conducting surfaces on a dielectric base. For example, first radiator 205 may be formed without conducting volume by electroless deposition of copper on a dielectric base. As another example, first radiator 205 may be formed by stamping one or more conducting sheets and mating the stamped sheet(s) to a dielectric base. Forming first radiator 205 by disposing conducting surfaces on a dielectric base may have one or more advantages, including reducing antenna size and weight; enhancing structural integrity of first radiator 205; presenting smooth conducting surfaces to our RF energy passing through a dielectric volume to reduce RF losses; and facilitating nonselective processes for presenting a conducting surface on first radially interior surface 120. For example, forming a first radiator 205 on a dielectric base may permit electroplating of all surfaces on the dielectric base without masking. A dielectric base in first radiator 205 may be composed of any dielectric material discussed with respect to dielectric volume 110 or any dielectric material compatible with mating, deposition, and adhesion of conducting surfaces on the dielectric base.

In certain embodiments, first radiator 205 may be mated to first radially interior surface 120 during fabrication of an antenna. For example, first radiator 205 may be machined from a conductive material and epoxied to first radially interior surface 120. As another example, first radiator 205 may be formed by electroless deposition of a conductor on a dielectric base, inserted into a void to the radial interior of first radially interior surface 120 to mate with first radially interior surface 120, and secured by a dielectric volume and a metallic or dielectric top hat. First radiator 205 may be formed directly on first radially interior surface 120. For example, first radiator 205 may be formed by spraying a conductive ink or dispersion onto first radially interior surface 120.

In certain embodiments, first radiator 205 may be electrically coupled to a transmission line. For example, first radiator 205 may be soldered, welded, or bonded to a pin extending from the center conductor of a transmission line. As another example, a pin extending from the center conductor of a coaxial connector may press fit into first radiator 205. Coupling first radiator 205 to a transmission line excites RF currents on first radiator 205 over a wide bandwidth.

In certain embodiments, first radiator 205 may be mated to or electrically coupled to a top hat. For example, first radiator 205 may be secured into dielectric volume 110 by a dielectric top hat fastened to dielectric volume 110. As another example, first radiator 205 may be conductively epoxied at its maximum longitudinal dimension to a conducting top hat that prevents current flow on the radial interior of first radiator 205.

Internal ground 210, as shown in FIGS. 2A-2B, is located on the radial exterior of dielectric volume 110 and presents a conducting surface at inner ground surface 140. Internal ground 210 may also present a conducting surface at one or more edges 150B between inner ground surface 140 and non-conducting aperture 130. In antenna 200, RF energy propagates between the first conductive surface presented by first radiator 205 and the second conductive surface presented by internal ground 210. RF energy propagates between these two conductive surfaces from a transmission line through dielectric volume 110 to non-conducting aperture 130 (transmission) and from non-conducting aperture 130 through dielectric volume 110 to a transmission line (reception). Internal ground 210 may extend longitudinally and radially from base 160 to one or more edges 150B or to non-conducting aperture 130. Internal ground 210 may be azimuthally uniform or radially symmetric. In certain embodiments, internal ground 210 may extend to the maximum radius of dielectric volume 110. In certain embodiments, internal ground 210 includes convex, concave, or both convex and concave surfaces.

Internal ground 210 may be formed by a machining, additive manufacturing, sintering, stamping, spraying, rolling, or deposition process, or from one or more similar processes. For example, internal ground 210 may be machined or additively manufactured from a conducting material (e.g., copper or aluminum) such that internal ground 210 fills the volume between inner ground surface 140 and an external ground. As another example, internal ground 210 may be formed without conducting volume by depositing a second conductive surface on inner ground surface 140. As yet another example, internal ground 210 may be formed without conducting volume by stamping a thin conductive sheet and adhering to inner ground surface 140. As yet another example, internal ground 210 may be integrally formed with an external ground (e.g., by machining or stamping as part of a larger ground structure) and mated to inner ground surface 140. In certain embodiments, forming internal ground 210 without conducting volume may have the advantage of reducing the size and weight of antenna 200. In certain embodiments, internal ground 210 may be formed with conducting volume to facilitate mating to dielectric volume 110, to facilitate mating to an external ground or external platform, or to enhance structural integrity of internal ground 210. For example, internal ground 210 may be formed with sufficient thickness to facilitate conductively epoxying, mechanically fastening, or otherwise coupling an external ground to internal ground 210. In certain embodiments, an external ground may be coupled to internal ground 210 via one or more edges 150B. Coupling an external ground to internal ground 210 may have the advantages of isolating antenna 200 from cabling and RF circuitry, increasing antenna 200 gain, and facilitating antenna 200 installation onto various platforms.

In certain embodiments, internal ground 210 may be formed by disposing one or more conducting surfaces on a dielectric base. For example, internal ground 210 may be formed without conducting volume by electroless deposition of copper on a dielectric base. As another example, internal ground 210 may be formed by stamping one or more conducting sheets and mating the stamped sheet(s) to a dielectric base. Forming internal ground 210 by disposing conducting surfaces on a dielectric base may have one or more advantages, including reducing antenna size and weight; enhancing structural integrity of internal ground 210; presenting smooth conducting surfaces to our RF energy passing through a dielectric volume to reduce RF losses; and facilitating nonselective processes for presenting a conducting surface on inner ground surface 140. For example, forming internal ground 210 on a dielectric base may permit electroplating of all surfaces on the dielectric base without masking. A dielectric base in internal ground 210 may be composed of any dielectric material discussed with respect to dielectric volume 110, first radiator 205, or any dielectric material compatible with mating, deposition, and adhesion of conducting surfaces on the dielectric base.

In certain embodiments, internal ground 210 may be mated to inner ground surface 140 during fabrication of an antenna. For example, internal ground 210 may be machined from a conductive material and epoxied to inner ground surface 140. As another example, internal ground 210 may be formed by electroless deposition of a conductor on a dielectric base, epoxied to inner ground surface 140, and secured by a dielectric volume and an external ground. Internal ground 210 may be formed directly on inner ground surface 140. For example, internal ground 210 may be formed by spraying a conductive ink or dispersion onto inner ground surface 140.

In certain embodiments, internal ground 210 may be electrically coupled to a transmission line. For example, internal ground 210 may be soldered, welded, or bonded to an outer or ground conductor of a transmission line. As another example, an outer conductor of a coaxial connector (e.g., a flanged connector) may be fastened into internal ground 210. Coupling internal ground 210 to a transmission line excites RF currents on internal ground 210 over a wide bandwidth.

In certain embodiments, internal ground 210 may increase the height of antenna 200. As shown in FIG. 2A, for example, internal ground 210 extends past the longitudinal minimum of dielectric volume 110. Extending internal ground 210 may have one or more advantages, including controlling gain values and directions at certain frequencies and facilitating insertion of fasteners into internal ground 210. In certain embodiments, internal ground 210 may not extend past the longitudinal minimum (e.g., internal ground 210 does not extend longitudinally past base 160), such that the height of antenna 200 is the same as the height of dielectric volume 110.

In certain embodiments, internal ground 210 may be mated to or electrically coupled to an external ground. For example, internal ground 210 may be secured by fastening to an external ground. As another example, internal ground 210 may be conductively epoxied an external ground. In certain embodiments, internal ground 210 may be integrally formed as part of a larger ground structure. For example, internal ground 210 and an external ground may be formed together by stamping a conductive sheet or internal ground 210 and an external ground may be machined from a single conducting volume (e.g., a block of aluminum).

External ground 220 may be any ground structure for mating or electrically coupling to antenna 200. In certain embodiments, external ground 220 may mate or electrically couple to internal ground 210. In certain embodiments, external ground 220 may be part of a larger platform. For example, external ground 220 may be a section of an aluminum skin on an aircraft. For radiation patterns disclosed herein, any external ground is coincident with the azimuthal plane (XY, $\theta=90°$)

As shown in FIG. 2A, external ground 220 is located at the longitudinal minimum of internal ground 210. In certain embodiments, external ground 220 may be located at the longitudinal maximum of an inner ground. For example, external ground 220 may be conductively epoxied to the longitudinal maximum of internal ground 210 (e.g., at one or more edges 150B between internal ground 210 and non-conducting aperture 130). In embodiments in which inner ground 210 has been formed without conducting volumes, external ground 220 may be conductively epoxied to a second conducting surface (and thus to inner ground 210) at one or more edges 150B adjacent to internal ground 210 or at base 160 adjacent to internal ground 210. In embodiments without one or more edges 150B adjacent to internal ground surface 140, external ground 220 may mate to internal ground 210. In certain embodiments, antenna 200 may not include inner ground 210, such that external ground 220 mates directly to inner ground surface 140.

In certain embodiments, external ground 220 may be electrically coupled to a transmission line. In certain embodiments, external ground 220 may be electrically coupled to a transmission line indirectly via internal ground 210. Both internal ground 210 and external ground 220 may be directly coupled to the outer or ground conductor of a transmission line in certain embodiments.

Transmission line 230 may be any suitable transmission line for transmission and reception of RF energy. An inner or signal conductor of transmission line 230 may be electrically coupled to first radiator 205. An outer or ground conductor of transmission line 230 may be electrically coupled to internal ground 210, external ground 220, or both. Transmission line 230 may include a transmission-line dielectric, such as transmission-line dielectric 170 of FIG. 1, that separates an inner or signal conductor from an outer or ground conductor of the transmission line. In certain embodiments, a transmission-line dielectric may mate to a base of a dielectric volume. In certain embodiments, transmission line 230 may be azimuthally uniform or radially symmetric. In certain embodiments, transmission line 230 may couple antenna 200 to a transceiver.

In certain embodiments, the dielectric of transmission line 230 may extend longitudinally past the longitudinal minimum of dielectric volume 110. For example, with reference to FIG. 1, transmission-line dielectric 170 may extend longitudinally past base 160, or past the longitudinal minimum of inner ground surface 140 in embodiments without base 160. Extending a transmission-line dielectric longitudinally may have the advantages of protecting a transmission-line center conductor (including a pin coupled to first radiator 205), securing dielectric volume 110, and securing the longitudinal location of transmission line 230 with respect to dielectric volume 110. Embodiments having a longitudinally extended transmission-line dielectric have little effect on RF performance and may obtain the wireless performance disclosed for antenna 200 herein.

FIG. 2B illustrates a perspective view of antenna 200. The view of FIG. 2B corresponds to the sectional view of FIG. 2A rotated about the axis of radial symmetry (the Z-axis at the center of antenna 200). As shown in FIG. 2B, antenna 200 includes first radiator 205, dielectric volume 110, and internal ground 210, and antenna 200 is coupled to external ground 220. Transmission line 230 is not shown in FIG. 2B. As shown in FIG. 2B, first radiator 205 is disposed on a first radially interior surface 120 of dielectric volume 110 to form an integrated dielectric unit. First radiator 205 may also be formed and mated to dielectric volume 110 according to any method described above with respect to FIG. 2A. Dielectric volume 110 in FIG. 2B mates to internal ground 210. For example, dielectric volume 110 may be fastened to internal ground 210 with mechanical fasteners, such as nylon screws, or adhered to internal ground 210 with epoxy. Internal ground 210 mates to external ground 220 in FIG. 2B. As described in FIG. 2A, external ground 220 may be a flat ground plane or part of an external platform. In certain embodiments, internal ground 210 may be mated directly to external structures—for example, a mast, a tower, a fabric (for body-worn applications), or similar mechanisms to secure the location of antenna 200—without external ground 220.

Antenna 200 may be fabricated according to a number of methods, including those methods for fabrication of subcomponents of antenna 200—first radiator 205, dielectric volume 110, internal ground 210—described above.

Antenna 200 may be formed from dielectric volume 110. In certain embodiments, first radiator 205, internal ground 210, or both may be disposed on surfaces of dielectric volume 110 to form an integrated dielectric unit. In certain embodiments, a dielectric volume and one or more conductive surfaces together form a dielectric unit without conducting volumes. As described above with respect to first radiator 205 and inner ground 210, a first conducting surface may be disposed on first radially interior surface 120 to form first radiator 205 (and may include any adjacent edges 150A), and a second conducting surface may be disposed on inner ground surface 210 (and may include any adjacent edges 150B). For example, FIG. 2 may illustrate first radiator 205 formed by disposing a first conductor on first radially interior surface 120 and inner ground 210 formed by machining a conductive volume and mating internal ground 210 to inner ground surface 140 and edge 150B. To form inner ground 210 without conducting volumes, inner ground 210 may instead be formed by disposing a second conductive surface on inner ground surface 140.

In certain embodiments, due to the thinness of conducting surfaces disposed on a dielectric volume, the dielectric unit has substantially the same dimensions and weight as the dielectric volume. Disposing conductive surfaces on a dielectric volume may substantially reduce the size, weight, and fabrication complexity of the antenna. Conducting surfaces may be thin, lightweight, and integrated with the dielectric volume into a single dielectric unit configured for wireless transmission and reception.

In certain embodiments, forming a dielectric volume (and dielectric unit) as a single, integrated whole enables substantial size and weight reduction. In FIGS. 2A-2B, antenna 200 height is just under $0.19\lambda_L$, radius under $0.08\lambda_L$, and the maximum height of inner ground 210 is $0.03\lambda_L$. In certain embodiments, the dielectric unit may weigh from 2.4 to 3.6 $kg/m^3$ times the lowest operating wavelength (in m) cubed. A POSITA will understand that antenna size and weight generally scales with wavelength cubed. A POSITA will further understand that dielectric unit weight may be calculated by determining the dielectric volume based on lowest operating wavelength and maximum antenna dimensions of antenna 200, then multiplying by specific gravity values disclosed herein. Similar calculations may be performed for other embodiments disclosed herein, based on dimensions described and illustrated herein, to obtain corresponding volumes and weights.

In certain embodiments, antenna 200 may be formed to include one or more conductive volumes. For example, as shown in FIG. 2B, antenna 200 may include an inner ground 210 machined from a block of aluminum. Including one or more conductive volumes in antenna 200 may provide certain advantages, such as providing mating structures for fasteners or facilitating electrical coupling to external structures (e.g., external ground 220 or transmission line 230).

In certain embodiments, antenna 200 may be formed to include conducting surfaces on one or more dielectric bases. For example, first radiator 205 and internal ground 210 may be formed by disposing first and second conducting surfaces, respectively, onto dielectric bases. Including one or more dielectric bases in antenna 200 may provide certain advantages, such as reducing antenna weight, facilitating nonselective processes for disposing conductive surfaces in antenna 200, and presenting smooth conductive surfaces to RF energy to reduce RF losses.

In certain embodiments, dielectric volume 110, first radiator 205, and internal ground 210 may be assembled into antenna 200. In certain embodiments, first radiator 205 or internal ground 210 may be disposed on a surface of a dielectric volume to form an integrated dielectric unit. In certain embodiments, first radiator 205, internal ground 210, or both may be mated to dielectric volume 110. For example, first radiator 205 or internal ground 210 may be mated to a dielectric volume with fasteners, adhesion, bonding, press fit, interference fit, or similar methods. In certain embodiments, first radiator 205 may be secured to dielectric volume 110 via a top hat, not shown in FIGS. 2A-2B.

Antenna 200 may be configured for the transmission and reception of wireless signals in various frequency bands. In particular, antenna 200 may be configured for the instantaneous transmission and reception of wideband wireless signals with high fidelity. For example, antenna 200 may be configured to instantaneously transmit and receive wireless signals, with a fidelity of 90% or greater, over a bandwidth of up to 6:1 (an instantaneous bandwidth). Antenna 200 may also be configured to instantaneously transmit and receive wireless signals, with a fidelity of 75% or greater, over a bandwidth of up to 8:1 (an instantaneous bandwidth). As shown in FIG. 2, antenna 200 may be further configured to transmit and receive omni-directional radiation patterns across a wide frequency band, up to a 6:1 bandwidth (a pattern bandwidth). Antenna 200 may also be configured to transmit and receive a conical beam across a wide frequency band, up to a 6:1 bandwidth (a pattern bandwidth). In certain embodiments, the pattern bandwidths described in this paragraph correspond to the instantaneous bandwidths described in this paragraph. Antenna 200 may be configured to maintain a return loss of 10 dB or greater over the pattern bandwidths and instantaneous bandwidths described in this paragraph. In certain embodiments, antenna 200 may be configured to maintain a return loss of 6 dB or greater over the pattern bandwidths and instantaneous bandwidths described in this paragraph.

Many of the structures, components, configurations, techniques, parameters, principles, and methods disclosed with reference to FIGS. 1-2 may be used in other embodiments described herein. For example, embodiments disclosed for FIGS. 1 and 2A-2B may also be used for antenna 500 (FIGS. 5A-5B) and antenna 800 (FIG. 8A), which share a common topology with antenna 200 but have different dimensions for achieving different wireless performance metrics. Embodiments disclosed for FIGS. 1 and 2A-2B may also be used for antenna 1000 (FIGS. 10A-10B), antenna 1300 (FIGS. 13A-13C), antenna 1600 (FIGS. 16A-16C), antenna 1900 (FIGS. 19A-19C), antenna 2400 (FIG. 24), and antenna 2700 (FIGS. 27A-27B) where compatible with the respective antenna topology.

Collective FIGS. 3-4 summarize wireless performance of antenna 200—including radiation patterns over a 6:1 bandwidth (1-6 fL) and return loss and time-domain performance over a 12:1 bandwidth (1-12 fL).

Figure 3A:
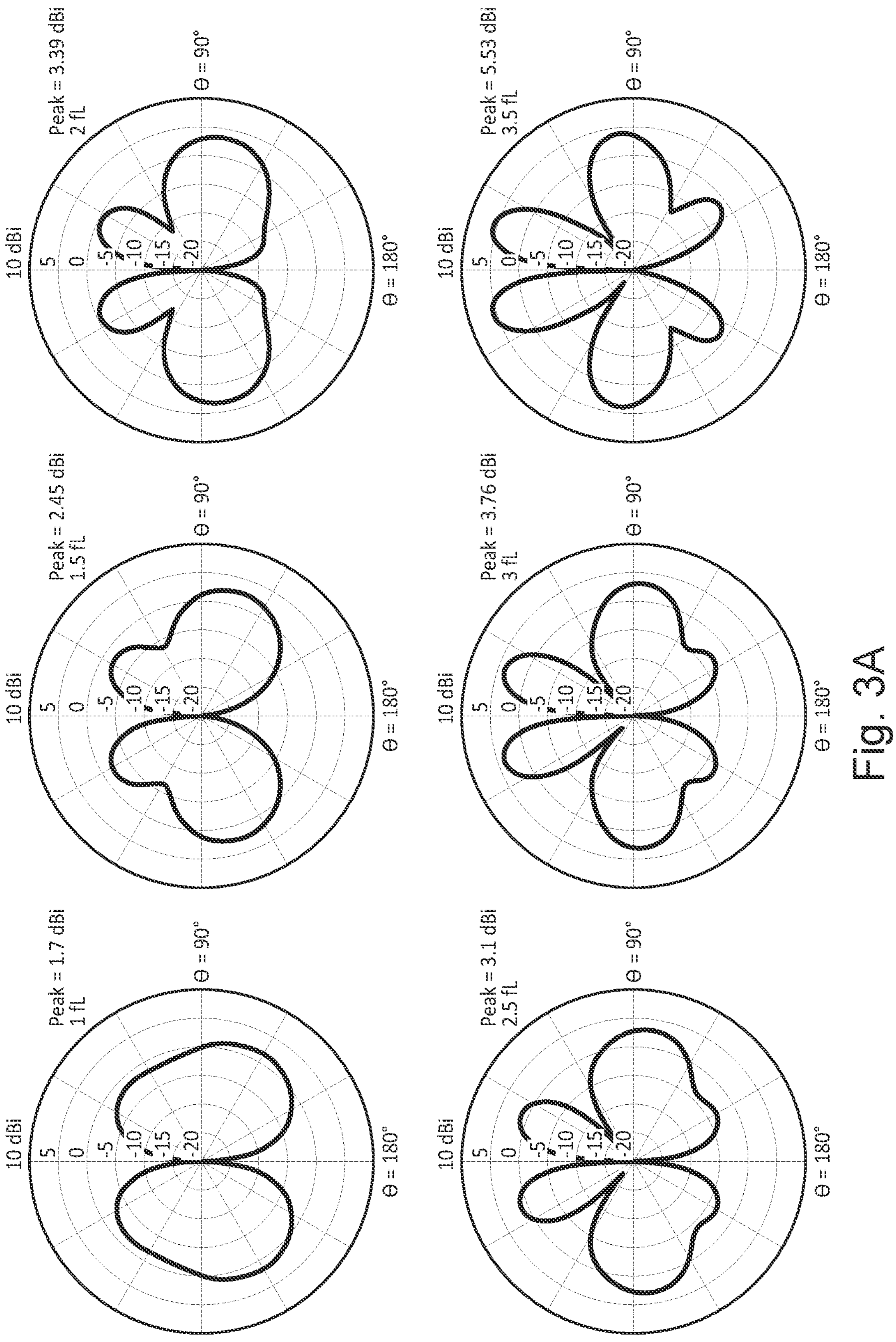
FIGS. 3A-3F are diagrams that illustrate the wireless performance of an example antenna in radiation patterns, according to certain embodiments.
Figure 3B:
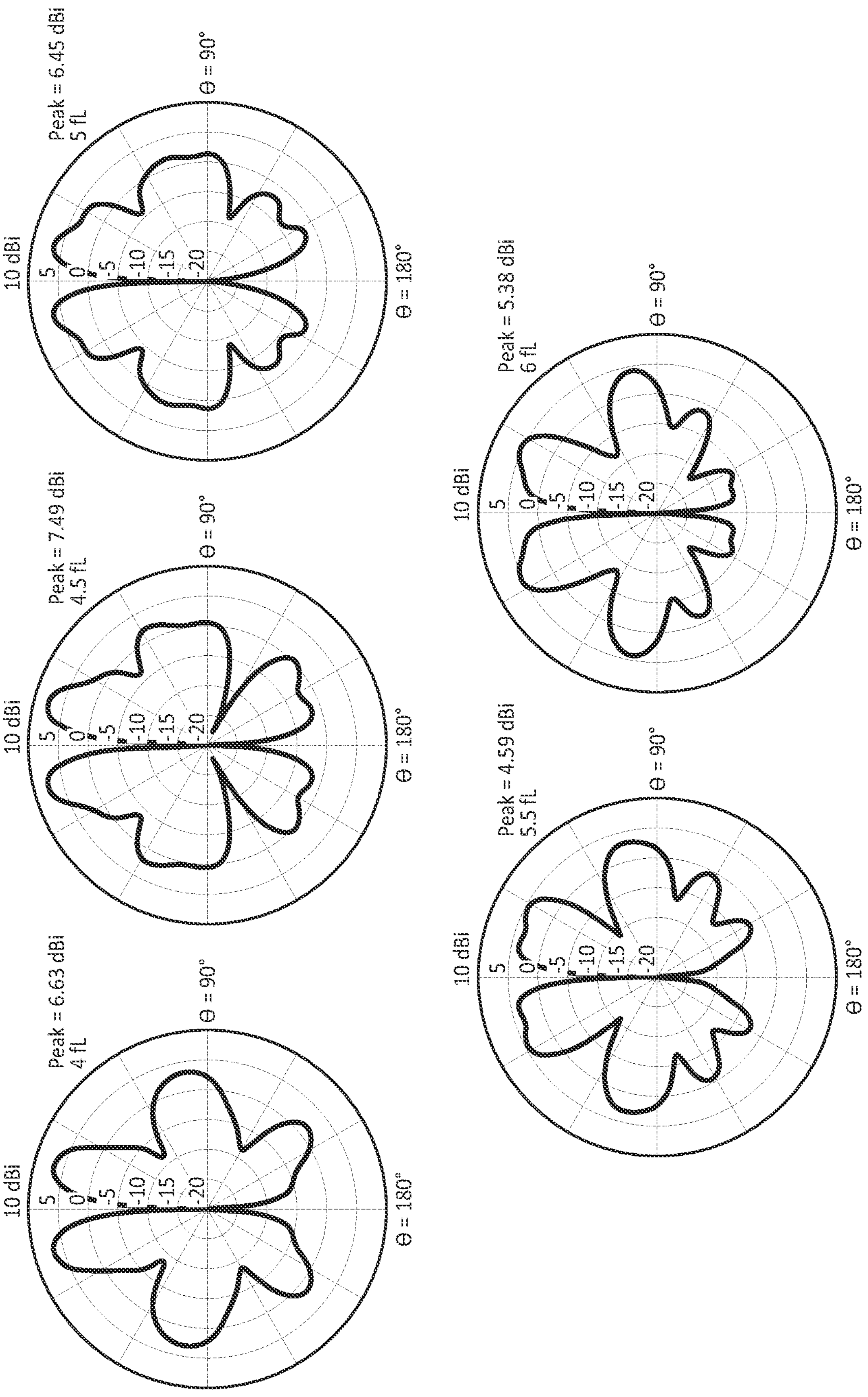
Figure 3C:
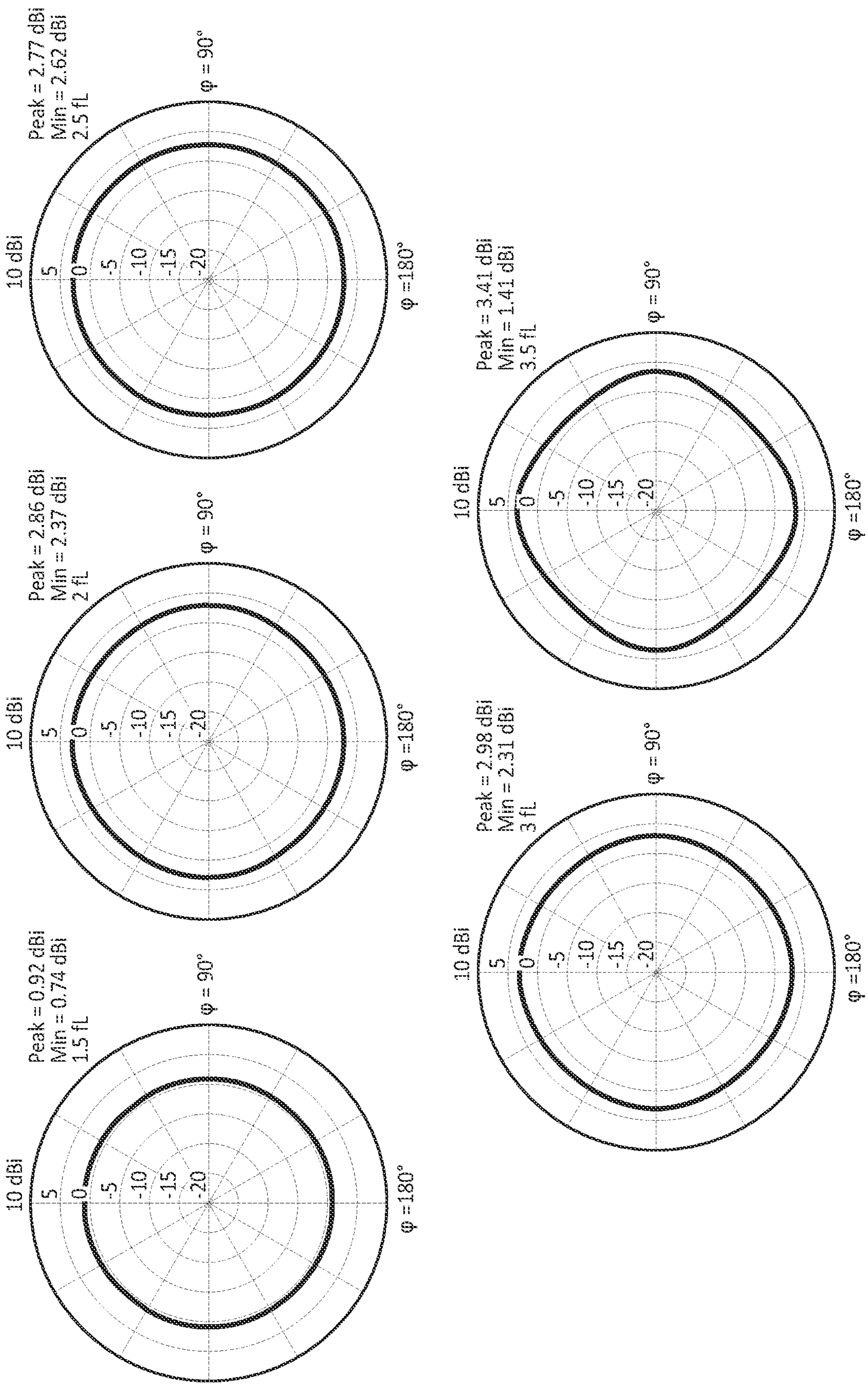
Figure 3D:
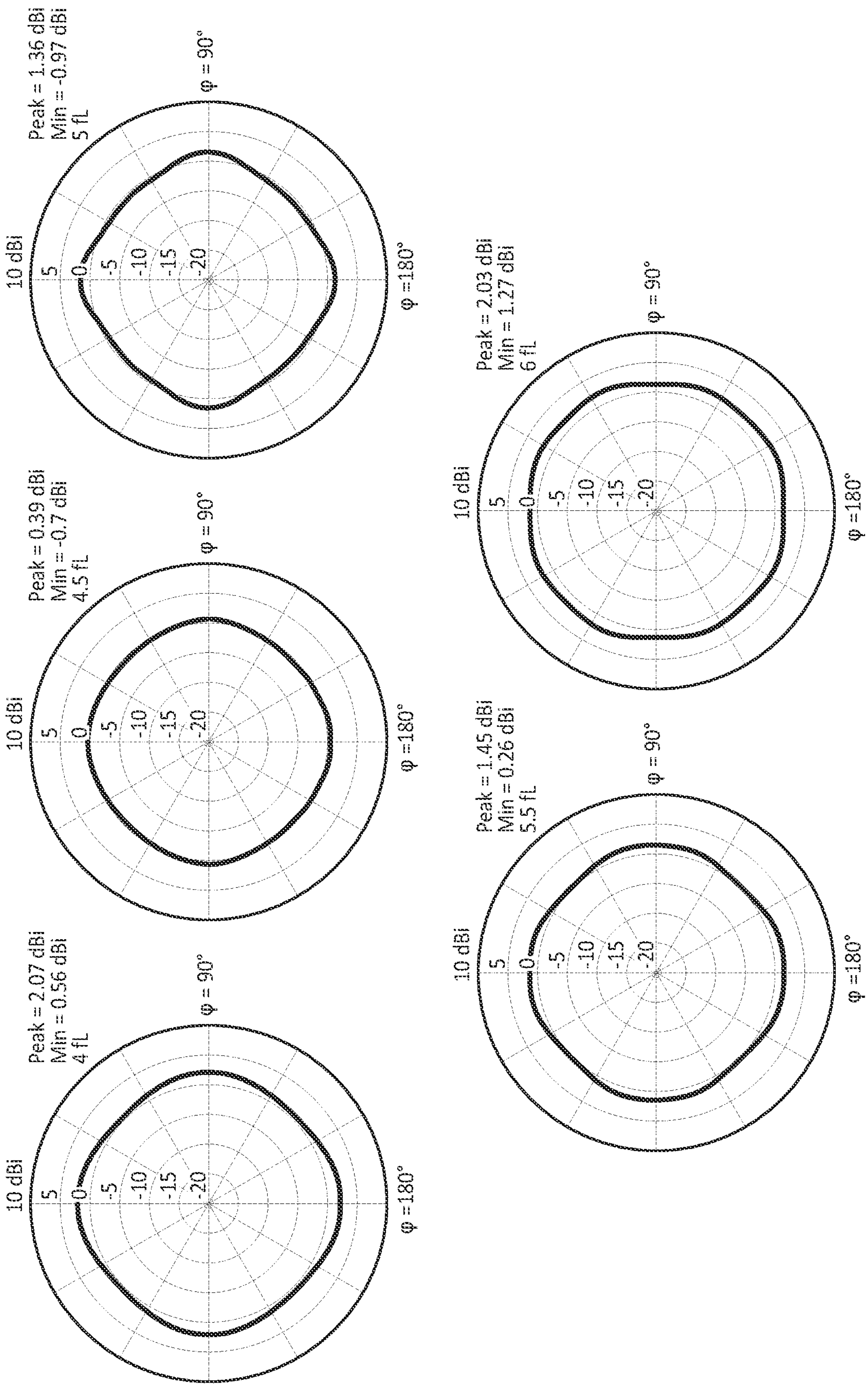
Figure 3E:
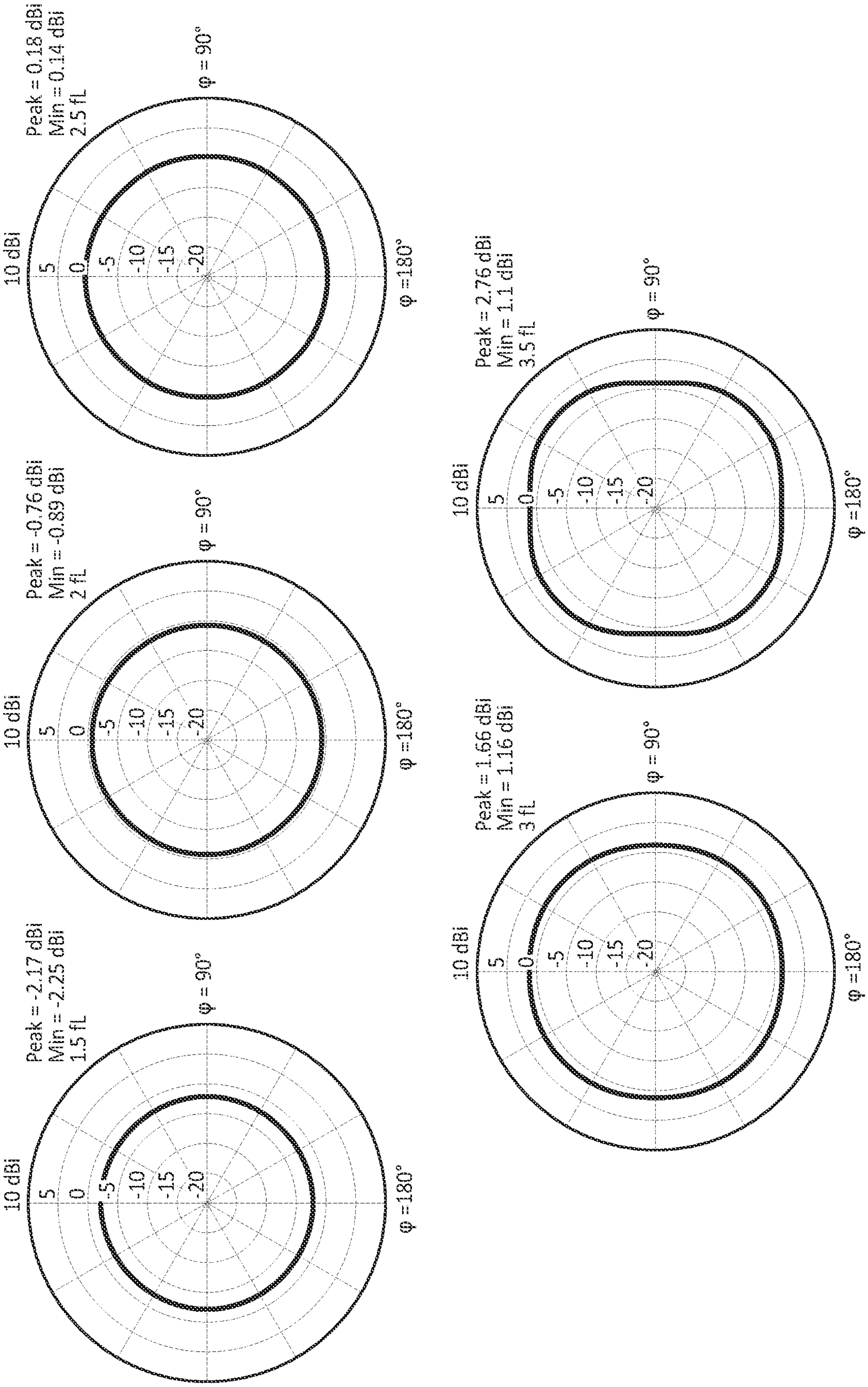
Figure 3F:
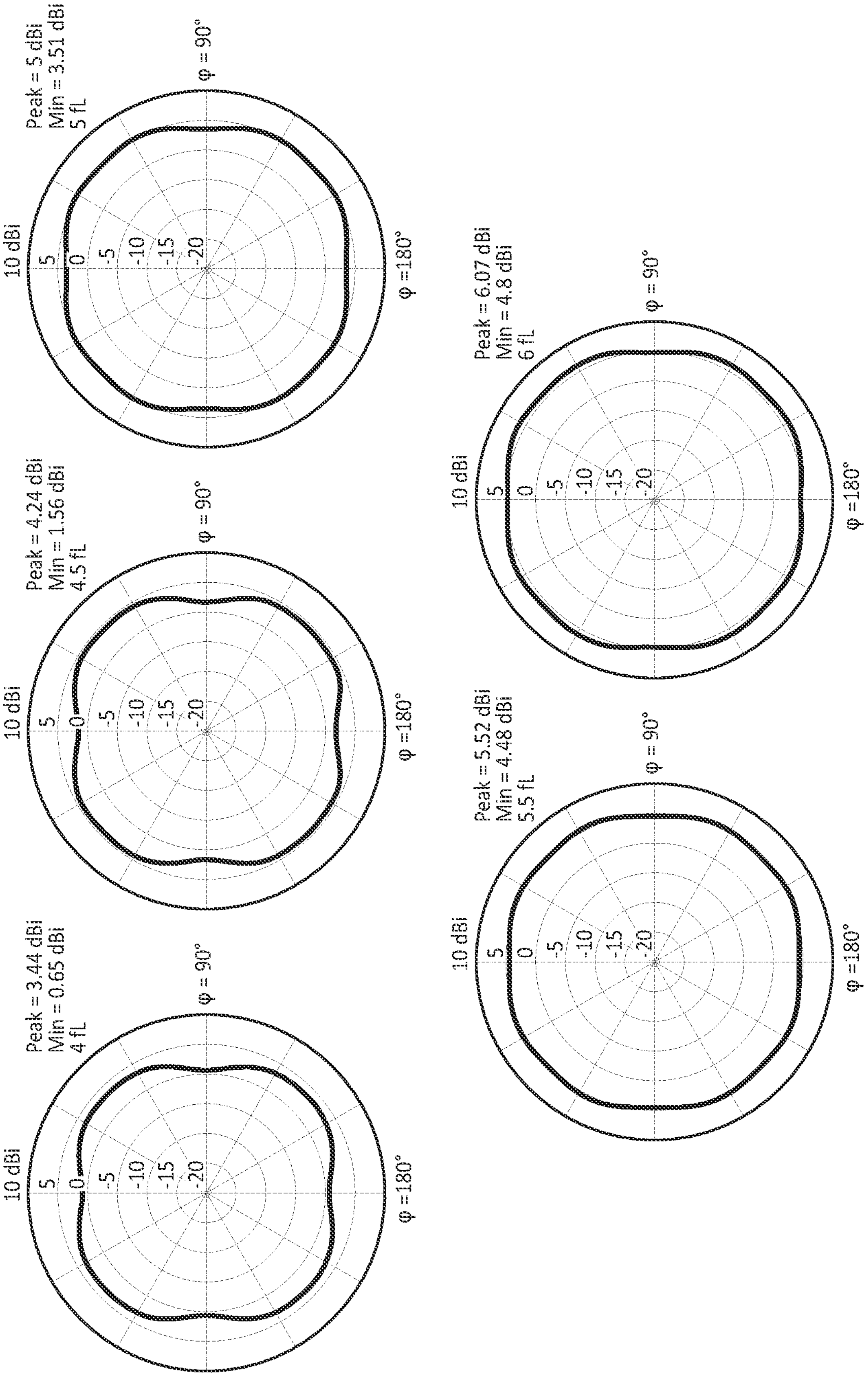

Collective FIG. 3 illustrates radiation patterns in principal cut planes for antenna 200 at various frequencies.[3] FIGS. 3A-3B illustrate antenna 200 radiation patterns maintaining two modes, over a 6:1 pattern bandwidth, one radiating a beam having substantially uniform gain in azimuth that includes the radiation horizon[4] (a "horizon beam") and the other radiating a conical beam near an elevation angle (θ) of 30° from the axis of radial symmetry. Although not shown in FIGS. 3A-3B, antenna 200 maintains a horizon beam and a conical beam over a 12:1 pattern bandwidth (from 1-12 fL). FIGS. 3C-3D illustrate radiation patterns in the azimuth plane (XY, θ=90°) from 1.5-6 fL. Azimuth plane gain at 1 fL ranges from −0.11 dBi to 0 dBi. Although FIGS. 3C-3D illustrate patterns from only 1.5-6 fL, antenna 200 azimuth plane patterns are substantially uniform over a 12:1 pattern bandwidth (from 1-12 fL), with a maximum variation of ±1.2 dB at 5 fL. FIGS. 3E-3F illustrate radiation patterns from 1.5-6 fL at elevation angle θ=30° from the axis of radial symmetry. Gain in the θ=30° cut plane at 1 fL is uniform at −3 dBi. Although FIGS. 3E-3F illustrate patterns from only 1.5-6 fL, antenna 200 maintains a conical beam up to 12 fL.

[3] The performance shown in FIGS. 3-4 is for antenna 200 with a ground plane having the same radius ($\leq\lambda_L/12$) as the dielectric volume.

[4] A person of skill in the art will understand that an antenna radiating a beam including the horizon may mean that the horizon falls with the 3-dB elevation beamwidth of the beam or that the horizon falls between the nulls (local minima) defining the beam's width in elevation, as illustrated by the radiation patterns being described (e.g., the patterns illustrated in FIGS. 3A-3B).

Figure 4A:
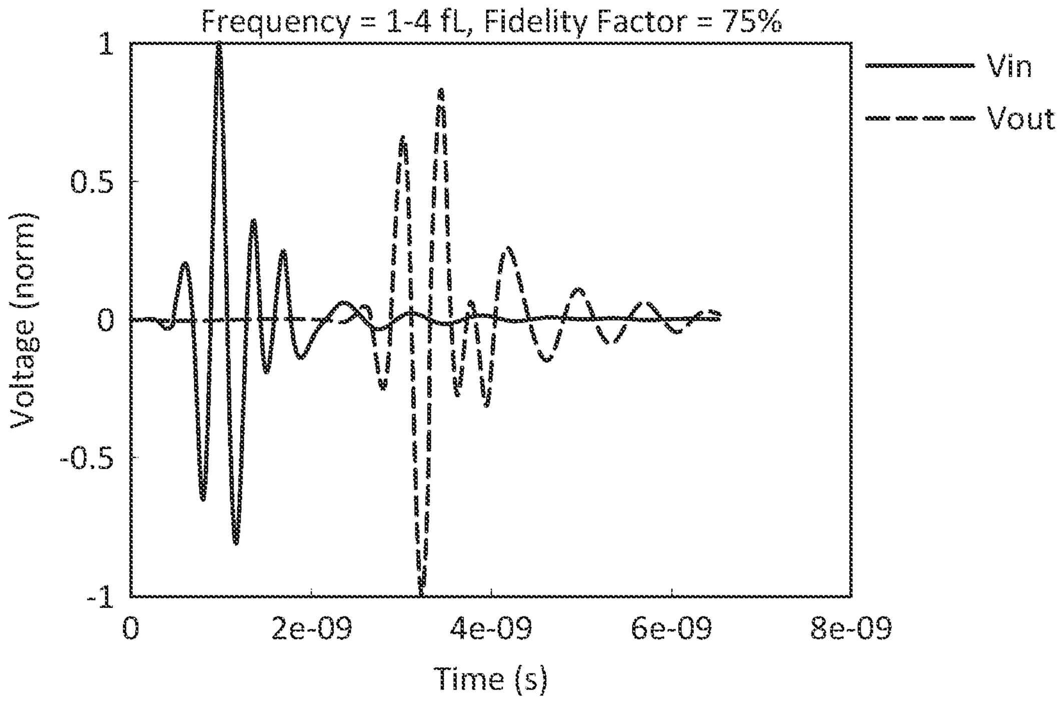
FIGS. 4A-4D are diagrams that illustrate the wireless performance of an example antenna in return loss and time-domain performance, according to certain embodiments.
Figure 4B:
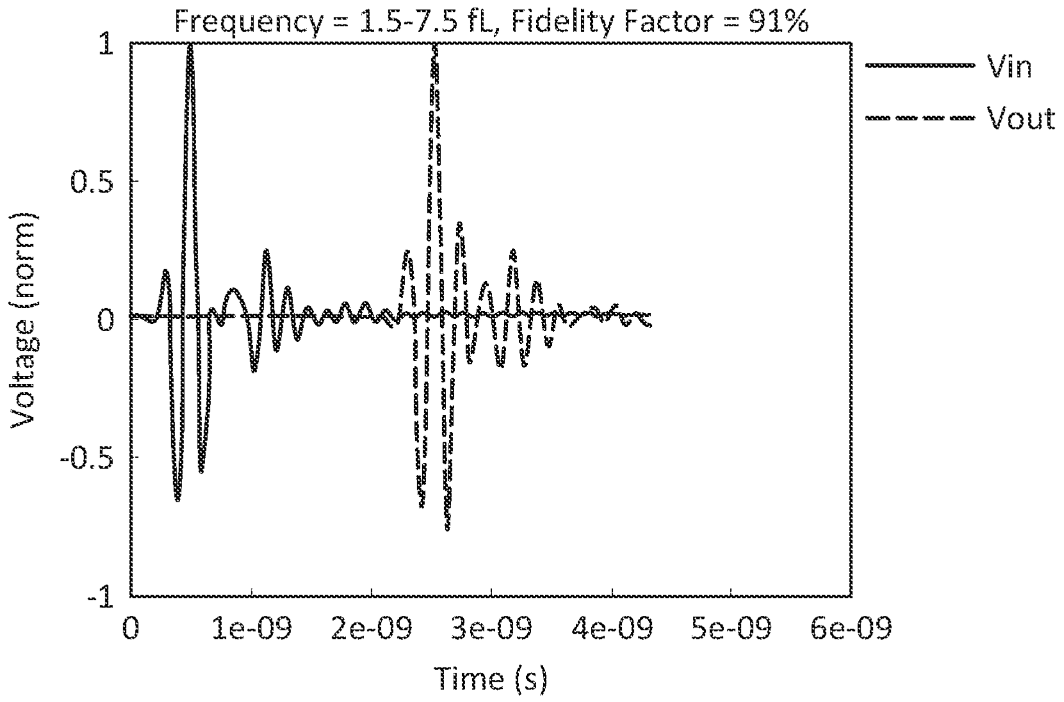

FIGS. 4A-4B illustrate example time-domain responses of antenna 200. FIG. 4A illustrates the time-domain response of antenna 200 for a wireless signal covering 1-4 fL and transmitted and received in the horizon beam (θ=90°). $V_{in}$ illustrates the input signal at a transmitting antenna 200 and $V_{out}$ illustrates the output signal at a receiving antenna 200. As shown in FIG. 4A, cross-correlating the input signal $V_{in}$ and the output signal $V_{out}$, and normalizing to the total signal energy, yields a fidelity of 75%.

As shown in FIGS. 4A-4B and similar time-domain responses disclosed herein, fidelity factor is calculated as the maximum normalized cross-correlation between the input signal (transmit signal $S_t$ corresponding to $V_{in}$ in FIGS. 4A-4B) and the output signal (receive signal $S_r$ corresponding to $V_{out}$ in FIGS. 4A-4B) for a signal transmitted and received in a 2-port model (from a transmit antenna to a receive antenna):

$$F = \max_{\tau} \frac{\int_{-\infty}^{\infty} S_t(t) S_r(t-\tau) dt}{\sqrt{\int_{-\infty}^{\infty} |S_t(t)|^2 dt \cdot \int_{-\infty}^{\infty} |S_r(t)|^2 dt}}$$

Table 1 compiles fidelity, in the horizon beam of antenna 200, for wireless signals across different IBWs. Although not shown in Table 1, antenna 200 fidelity for 1.5 fL bands (e.g. 1.5-3 fL, 3-4.5 fL, 4.5-6 fL) exceeds 85%. Antenna 200 is capable of instantaneously transmitting or receiving wireless signals across an IBW of up to 8:1 (from 1.5-12 fL) with a fidelity exceeding 75%. Antenna 200 is also capable of instantaneously transmitting or receiving wireless signals across an IBW of up to 10.5 fL (from 1.5-12 fL) with a fidelity exceeding 75%. As shown in Table 1, antenna 200 is also capable of instantaneously transmitting or receiving wireless signals across a bandwidth of up to 12:1 by instantaneously transmitting or receiving signals in one or more instantaneous frequency bands, each instantaneous frequency band having an IBW of at least the lowest operating frequency.

TABLE 1

Antenna 200 Fidelity in a Horizon Beam (θ = 90°)

| Frequency Band | Fidelity Factor |
|---|---|
| 1-2 fL | 98% |
| 1-3 fL | 78% |
| 1-4 fL | 75% |
| 1-6 fL | 64% |
| 1.5-9 fL | 90% |
| 1.5-12 fL | 79% |
| 2-3 fL | 96% |
| 2-4 fL | 89% |
| 2-6 fL | 68% |
| 3-4 fL | 96% |
| 3-6 fL | 84% |
| 4-5 fL | 96% |
| 4-6 fL | 92% |
| 5-6 fL | 97% |
| 6-7 fL | 99% |
| 6-8 fL | 99% |
| 6-9 fL | 97% |
| 6-12 fL | 84% |
| 7-8 fL | 100% |
| 8-9 fL | 95% |
| 8-10 fL | 94% |
| 9-10 fL | 96% |
| 9-12 fL | 90% |
| 10-11 fL | 98% |
| 10-12 fL | 86% |
| 11-12 fL | 94% |

FIG. 4B illustrates the time-domain response of antenna 200 for a wireless signal covering 1.5-7.5 fL and transmitted and received in the conical beam (θ=30°). $V_{in}$ illustrates the input signal at a transmitting antenna 200 and $V_{out}$ illustrates the output signal at a receiving antenna 200. As shown in FIG. 4B, cross-correlating the input signal $V_{in}$ and the output signal $V_{out}$, and normalizing to the total signal energy, yields a fidelity of 91%. Table 2 compiles fidelity, in the conical beam of antenna 200, of signals across various IBWs. Although not shown in Table 2, antenna 200 fidelity for 1 fL bands (e.g., 6-7, 7-8, 8-9, 9-10, 10-11, and 11-12 fL) exceeds 90%. Antenna 200 is capable of instantaneously transmitting or receiving wireless signals across an IBW of up to 8:1 (from 1.5-12 fL) at a fidelity exceeding 75%. Antenna 200 is also capable of instantaneously transmitting or receiving wireless signals across an IBW of up to 10.5 fL (from 1.5-12 fL) at a fidelity exceeding 75%. Antenna 200 is also capable of instantaneously transmitting or receiving wireless signals across a bandwidth of up to 12:1 by instantaneously transmitting or receiving signals in one or more instantaneous frequency bands, each instantaneous frequency band having an IBW of at least the lowest operating frequency.

TABLE 2

Antenna 200 Fidelity, in a Conical Beam (θ = 30°)

| Frequency Band | Fidelity Factor |
|---|---|
| 1-2 fL | 98% |
| 1-4 fL | 98% |
| 1-6 fL | 91% |
| 1.5-6 fL | 93% |
| 1.5-7.5 fL | 91% |
| 1.5-9 fL | 90% |
| 1.5-12 fL | 79% |
| 2-3 fL | 98% |
| 2-4 fL | 96% |
| 2-6 fL | 92% |
| 3-4 fL | 97% |
| 3-6 fL | 95% |
| 4-5 fL | 96% |
| 4-6 fL | 98% |
| 5-6 fL | 95% |
| 6-8 fL | 92% |
| 6-9 fL | 86% |
| 6-12 fL | 75% |
| 8-10 fL | 86% |
| 9-12 fL | 90% |
| 10-12 fL | 94% |

Fidelities in this disclosure were calculated with a Gaussian excitation—a Gaussian envelope multiplied by a sinusoidal carrier at center frequency fc—having a center frequency at the center of the modeled bandwidth and a 20 dB cutoff frequency located at the edges of the modeled bandwidth. Similar fidelities may be obtained for other signal types. For example, the fidelities of Tables 1-2 may also be obtained for a direct-sequence spread spectrum signal. As another example, the fidelities of Tables 1-2 may also be obtained for a signal having flat power spectral density over the signal bandwidth, such as a white gaussian signal. To avoid confusion, the term "Gaussian excitation" refers to the Gaussian magnitude envelope applied to a sinusoidal carrier. while the term "gaussian signal" refers to a signal with the probabilistic characteristics of gaussian noise.

Antenna 200 has substantially similar pattern and fidelity characteristics as those described for FIGS. 3-4, even without an outer ground plane. A $\lambda_L/12$ radius ground decreases the lowest operating frequency that meets or exceeds return loss, but has little effect on fidelity, patterns, or IBWs. Accordingly, placing antenna 200, or variants thereof, over larger external ground planes may extend the lowest operating frequency while maintaining pattern and fidelity performance substantially similar to that described herein.

Figure 4C:
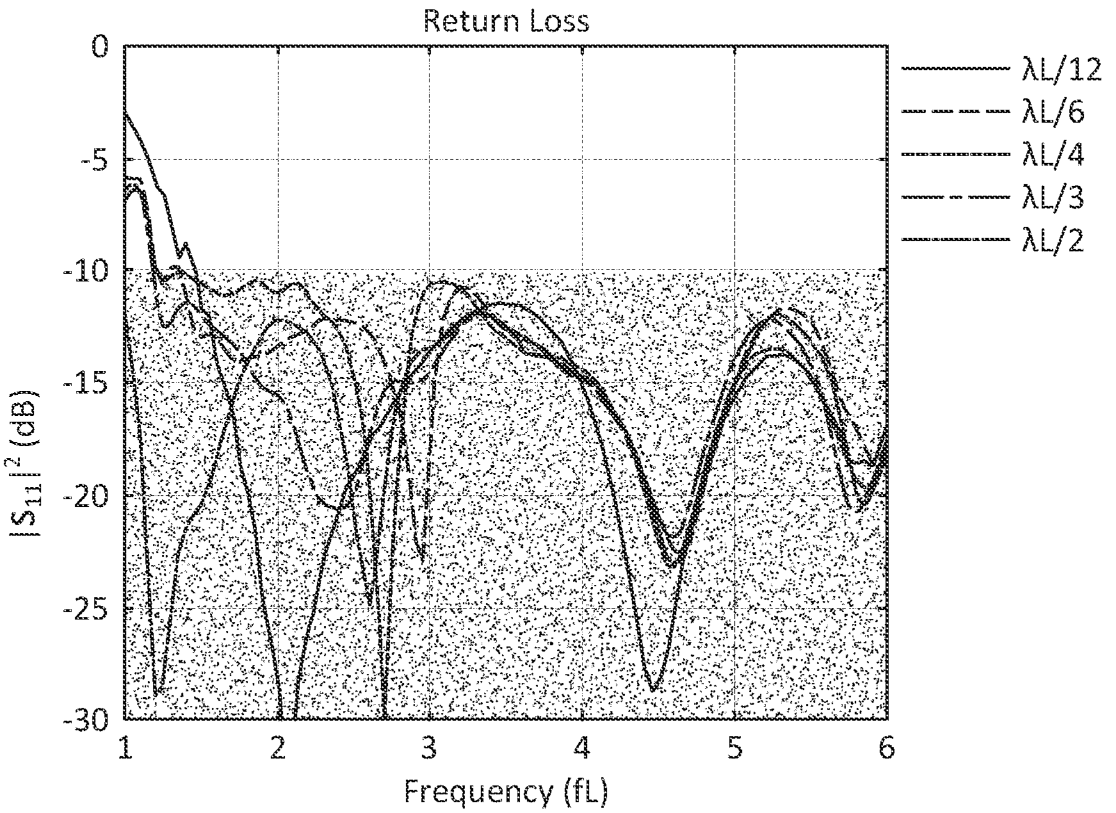
Figure 4D:
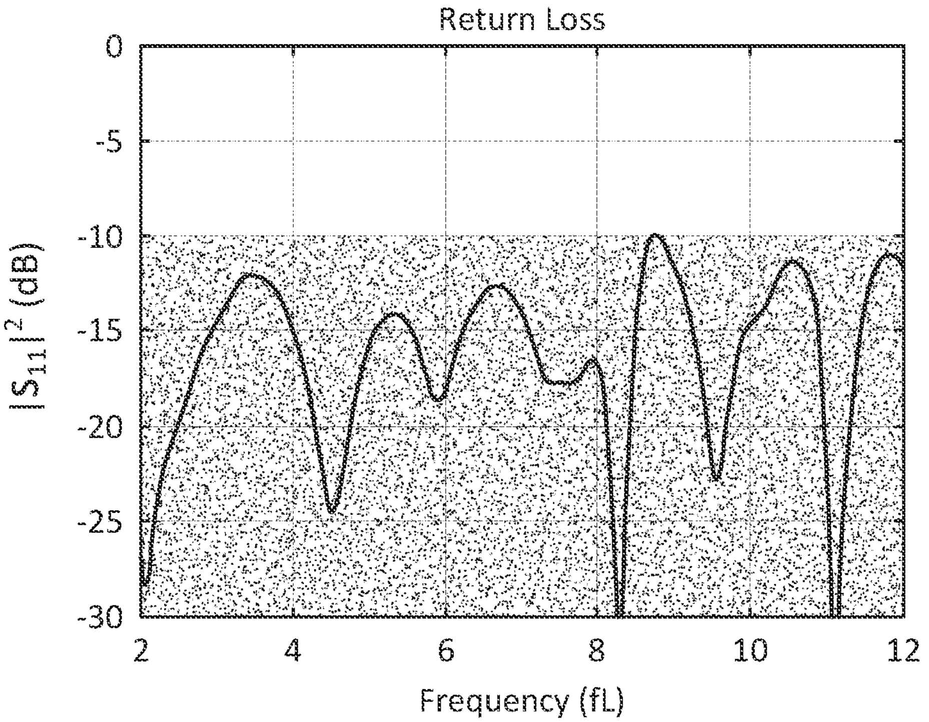

For example, as shown in FIGS. 4C-4D, antenna 200 return loss exceeds 10 dB across a 12:1.45 efficiency bandwidth, regardless of the size of the ground plane antenna 200 is placed over. As used herein, the term "ground plane" refers to external ground 220 (or its equivalent in various embodiments) unless expressly stated otherwise. FIG. 4C plots return loss of antenna 200 placed over ground planes of various sizes (ranging from ground plane radius of $\lambda_L/12$ to ground plane radius of $\lambda_L/2$). For ground planes with radius $\lambda_L/6$ or greater, return loss is substantially 10 dB or greater across at least a 10:1 bandwidth (1.2-12 fL). For ground planes with radius $\lambda_L/6$ or greater, return loss is substantially 6 dB or greater across at least a 12:1 bandwidth (1-12 fL). As illustrated in FIG. 4C, ground plane size does not substantively affect return loss performance above 2 fL (i.e., return loss above 2 fL remains greater than 10 dB for all ground sizes). As shown in FIG. 4D, which illustrates return loss from 2-12 fL for a ground plane size of $\lambda_L/12$, antenna 200 maintains a return loss exceeding 10 dB up to 12 fL.

Accordingly, antenna 200 is placement insensitive above 1.5 fL to a 10 dB return loss threshold and placement insensitive above 1 fL to a 6 dB return loss threshold. The ground plane size has no effect on return loss above a 10 dB threshold at frequencies above 2 fL, and return loss exceeds 10 dB at frequencies above 1.5 fL regardless of ground plane size.

Antenna 200 may be configured to obtain desirable wireless performance, including small antenna size, wide efficiency bandwidth (a bandwidth over which return loss substantially meets or exceeds a metric, such as 6 dB or 10 dB), wide instantaneous bandwidth (IBW, a bandwidth over which fidelity meets or exceeds a metric, such as 90%), and wide pattern bandwidth (a bandwidth over which radiation patterns meet or exceed a metric, such as maintaining a certain gain threshold, a conical beam, or a horizon beam). For example, antenna 200 topology facilitates determining the positions, profiles, dimensions, and interactions of first radiator 205, internal ground 210, and non-conducting aperture 130 to maximize efficiency bandwidth, IBW, pattern bandwidth, and the overlap between efficiency bandwidth, IBW, and pattern bandwidth. Other antenna embodiments disclosed herein similarly facilitate determining positions, profiles, dimensions, and interactions of antenna features to obtain wide IBW, efficiency, and pattern performance.

Figure 5B:
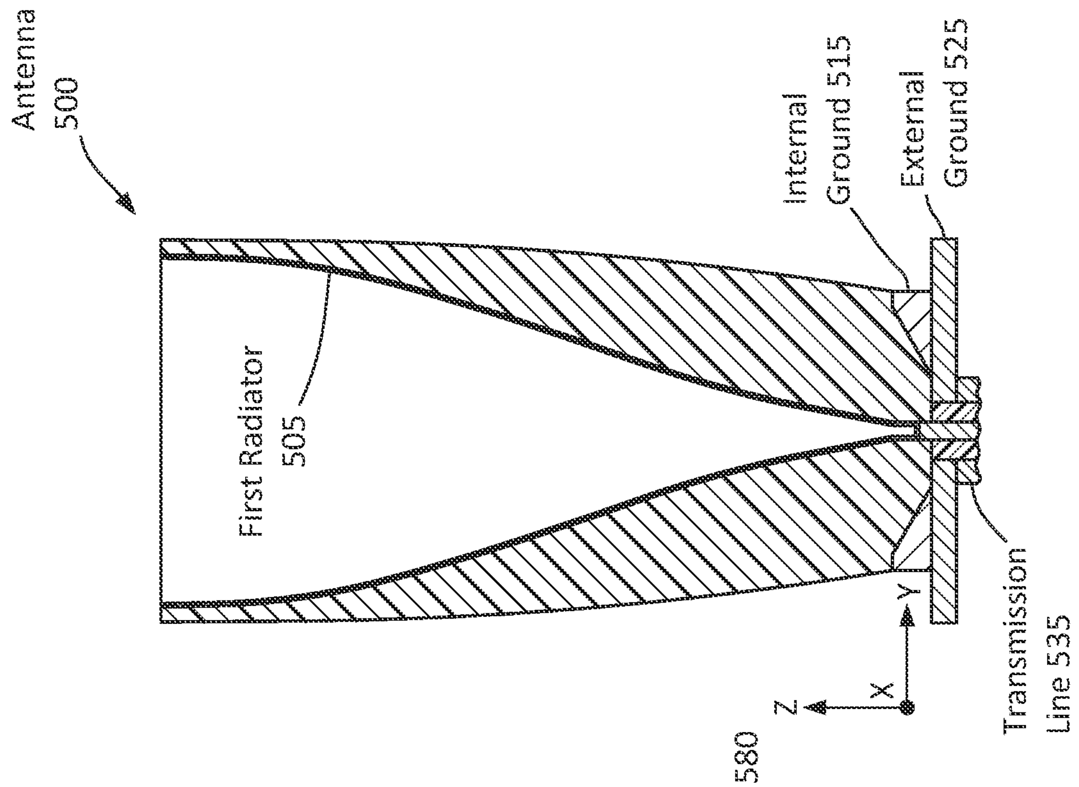
FIGS. 5A-5B are diagrams that illustrate the geometry and features of an example antenna, according to certain embodiments.
Figure 5A:
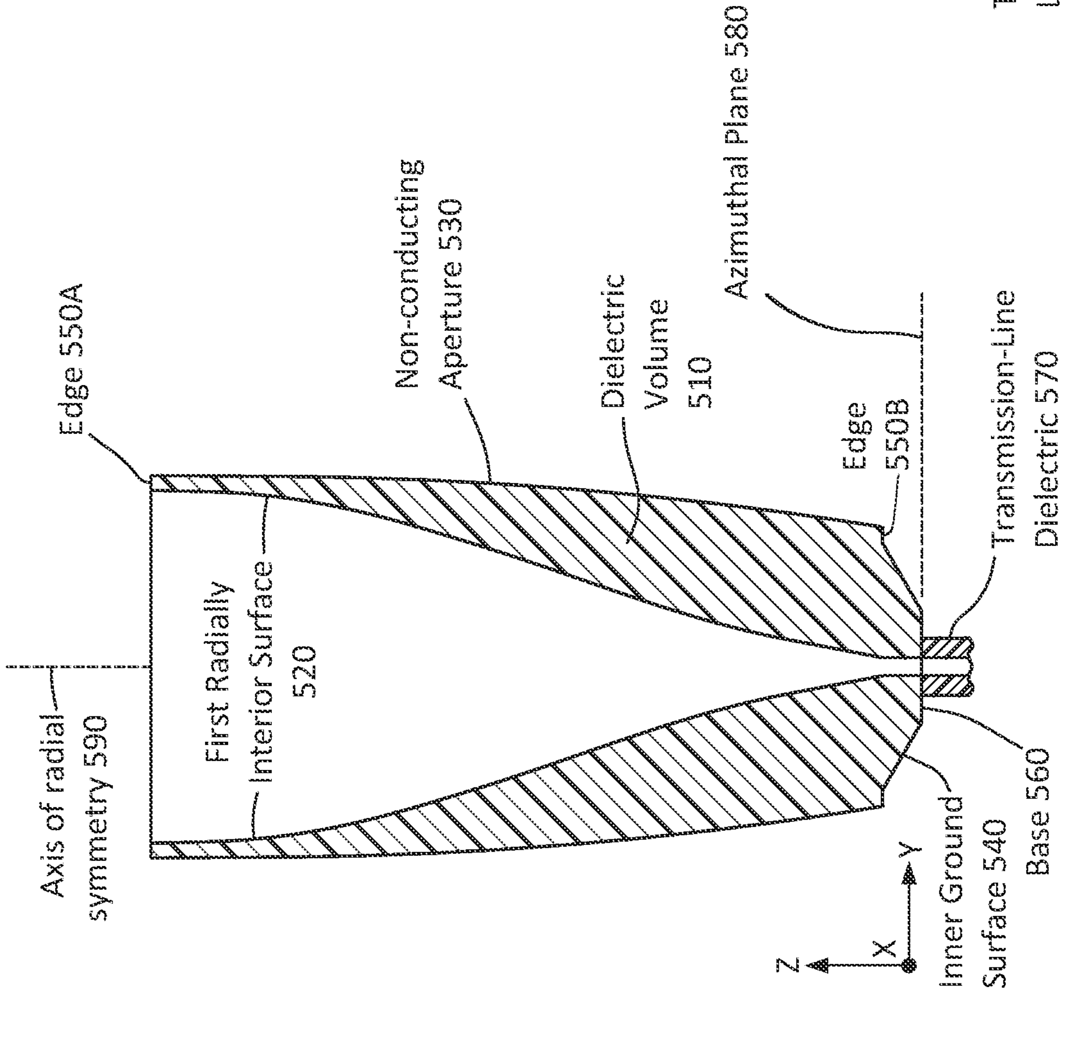

Collective FIG. 5 illustrates the geometry and features of antenna 500 in two sectional views. The view of FIG. 5A does not include any conducting surfaces or volumes. Antenna 500 has the same topology as antenna 200, but with different physical dimensions than antenna 200, and in particular, smaller radial dimensions to enable wideband beam scanning in an antenna array.

Antenna 500 may be formed from dielectric volume 510. As shown in FIG. 5A, dielectric volume 510 may have multiple surfaces, including first radially interior surface 520, non-conducting aperture 530, inner ground surface 540, edges 550A, 550B, and base 560. Dielectric volume 510 may mate to transmission-line dielectric 570. To case reference to various physical features and wireless performance characteristics (particularly radiation patterns), FIG. 5A also illustrates an azimuthal plane 580, an axis of radial symmetry 590 located at the radial center of antenna 500, and an XYZ coordinate system.

As shown in FIG. 5A, dielectric volume 510 is azimuthally uniform (without variation in φ) such that taking a section in any elevation plane (θ-r plane) yields the view in FIG. 5A. Rotating the sectional views in FIGS. 5A-5B about axis of radial symmetry 590 yields a three-dimensional dielectric volume 510 having multiple surfaces, with each surface in a three-dimensional view corresponding to a curve in the sectional views of FIGS. 5A-5B. Dielectric volume 510 may be radially symmetric or azimuthally uniform about axis of radial symmetry 590. Dielectric volume 510 terminates at its radial interior in a first radially interior surface 520. Dielectric volume 510 terminates at its radial exterior in a non-conducting aperture 530. Dielectric volume 510 terminates at its longitudinal maximum in one or more edges 550A. FIG. 5A illustrates one edge 550A at the longitudinal maximum of dielectric volume 510. Dielectric volume 510 terminates at its longitudinal minimum in a base 560. Dielectric volume 510 also has an inner ground surface 540, on its radial exterior, that extends from base 560 to one or more edges 550B or to non-conducting aperture 530.

In certain embodiments, dielectric volume 510 has a maximum radius determined by the maximum radial dimension of non-conducting aperture 530. In certain embodiments, dielectric volume 510 has a maximum height determined as the longitudinal distance from base 560 to the longitudinal maximum of dielectric volume 510. As shown in FIG. 5A, the maximum radius of dielectric volume 510 does not exceed $\lambda_L/20$, and dielectric volume 510 height does not exceed $\lambda_L/5$.

First radially interior surface 520 may have the same or similar configurations, features, interfaces, parameters, or functions on a dielectric volume as first radially interior surface 120. Non-conducting aperture 530 may have the same or similar configurations, features, interfaces, parameters, or functions on a dielectric volume as non-conducting aperture 130. Inner ground surface 540 may have the same or similar configurations, features, interfaces, parameters, or functions on a dielectric volume as inner ground surface 140. One or more edges 550A, 550B may have the same or similar configurations, features, interfaces, parameters, or functions on a dielectric volume as edges 150A, 150B. Transmission-line dielectric 570 may have the same or similar configurations, features, interfaces, parameters, or functions as transmission-line dielectric 170. Note that the size and dimensions of first radially interior surface 520, non-conducting aperture 530, inner ground surface 540, one or more edges 550A, 550B, and base 560 correspond to antenna 500 as shown in FIG. 5, rather than antenna 200.

Azimuthal plane 580 defines the radiation horizon (θ=90°). In certain embodiments, azimuthal plane 580 may also define the azimuthal plane (θ=90°, XY) corresponding to an external ground plane. Axis of radial symmetry 590 defines the Z-axis around which dielectric volume 510 (and antenna 500) is azimuthally uniform or radially symmetric.

Dielectric volume 510 may be formed from any fabrication process, materials, or composition of materials described with respect to other dielectric volumes disclosed herein, compatible with the topology of dielectric volume 510 shown in FIG. 5.

FIG. 5B illustrates a sectional view of antenna 500, including conducting surfaces and volumes. As shown in FIG. 5, antenna 500 is azimuthally uniform. A perspective view of antenna 500 corresponding to the sectional view of FIG. 5B may be generated by rotating the sectional view of FIG. 5B around axis of radial symmetry 590.

First radiator 505 may have the same or similar structure, components, elements, configurations, features, interfaces, parameters, or functions in an antenna as first radiator 205, except that the size and dimensions of first radiator 505 correspond to antenna 500 rather than antenna 200. First radiator 505 may be formed according to the same or similar methods, operations, steps, parameters, and principles, and of the same or similar material(s), as first radiator 205.

Internal ground 515 may have the same or similar structure, components, elements, configurations, features, interfaces, parameters, or functions in an antenna as internal ground 210, except that the size and dimensions of internal ground 515 correspond to antenna 500 rather than antenna 200. As shown in FIG. 5B, internal ground 515 does not extend past the longitudinal minimum of dielectric volume 510, such that the height of antenna 500 is identical to the height of dielectric volume 510. Internal ground 515 may be formed according to the same or similar methods, operations, steps, parameters, and principles, and of the same or similar material(s), as internal ground 210.

External ground 525 may have the same or similar structure, components, elements, configurations, features, interfaces, parameters, or functions in an antenna as external ground 220. Transmission line 535 may have the same or similar structure, components, elements, configurations, features, interfaces, parameters, or functions as transmission line 230.

Collective FIGS. 6-7 summarize performance of antenna 500[5]—including radiation pattern, return loss, and time-domain performance—over a 12:1 bandwidth (1-12 fL).

[5] The performance shown in FIGS. 6-7 is for antenna 500 with a ground plane having the same radius ($\leq\lambda_L/20$) as the dielectric volume.

Figure 6B:
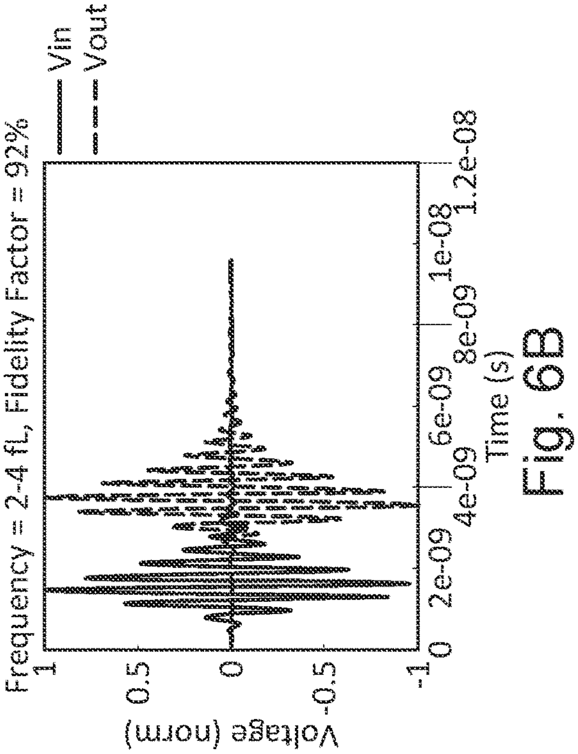
FIGS. 6A-6C are diagrams that illustrate the wireless performance of an example antenna in return loss and time-domain performance, according to certain embodiments.
Figure 6C:
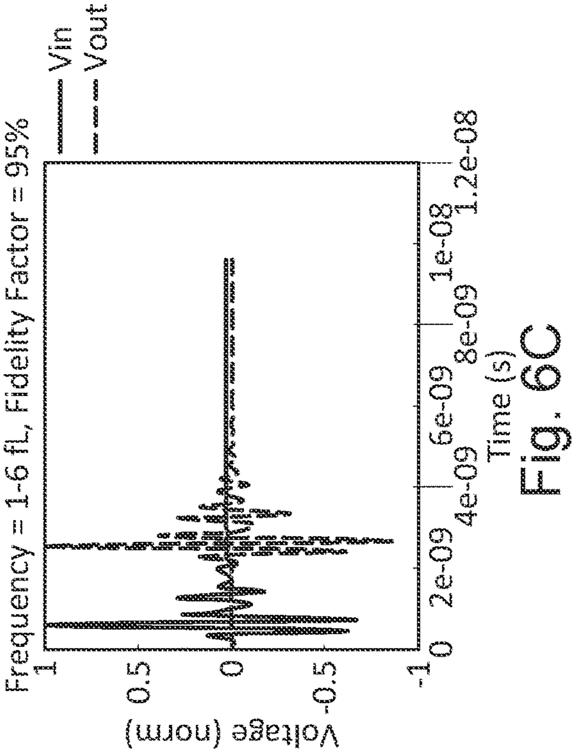
Figure 6A:
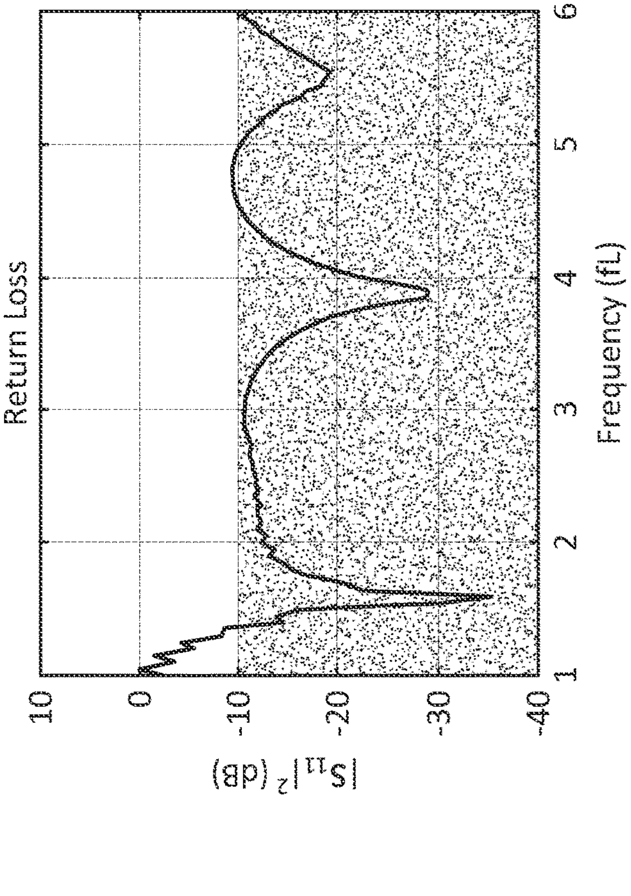
Figure 7A:
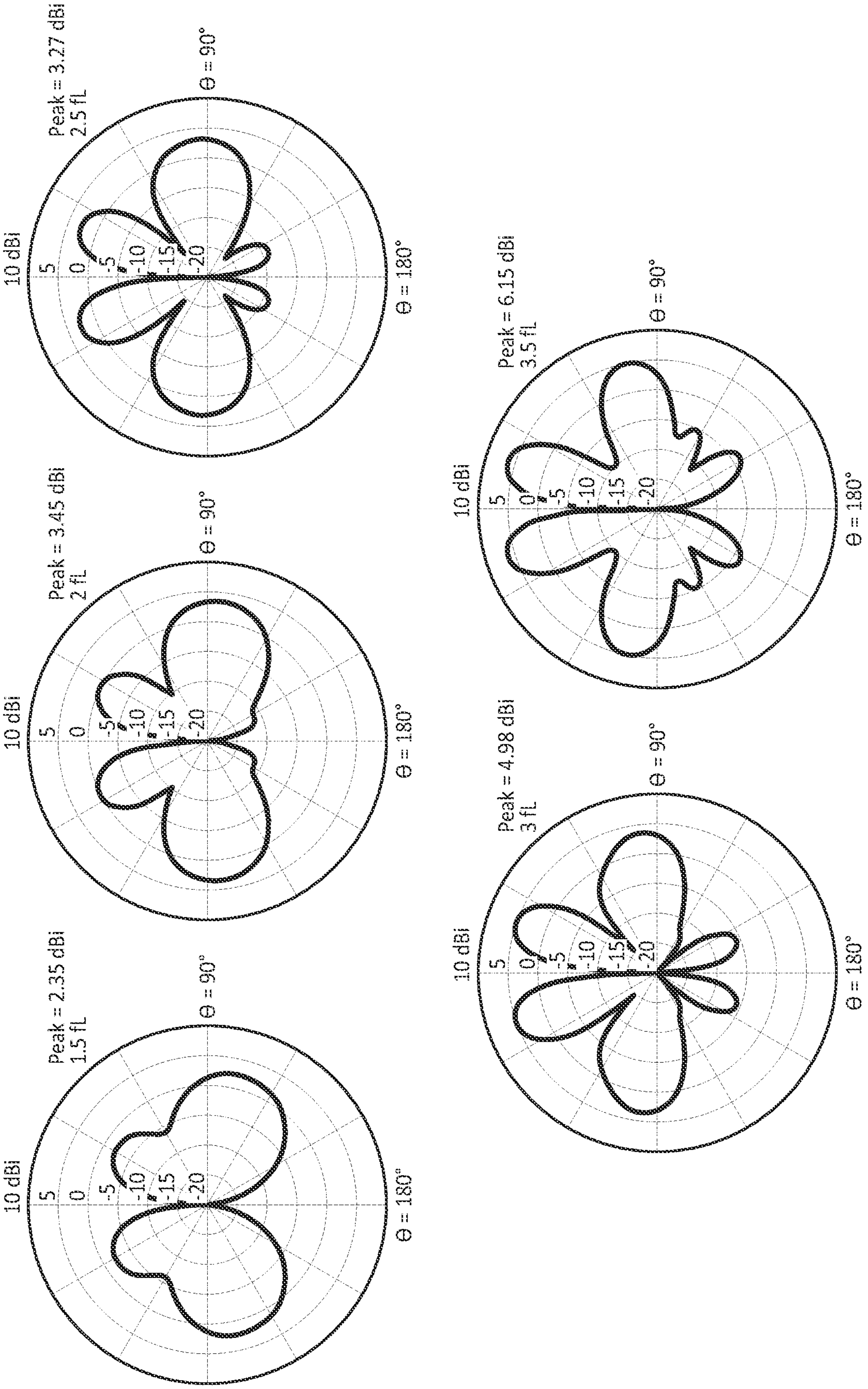
FIGS. 7A-7F are diagrams that illustrate the wireless performance of an example antenna in radiation patterns, according to certain embodiments.
Figure 7B:
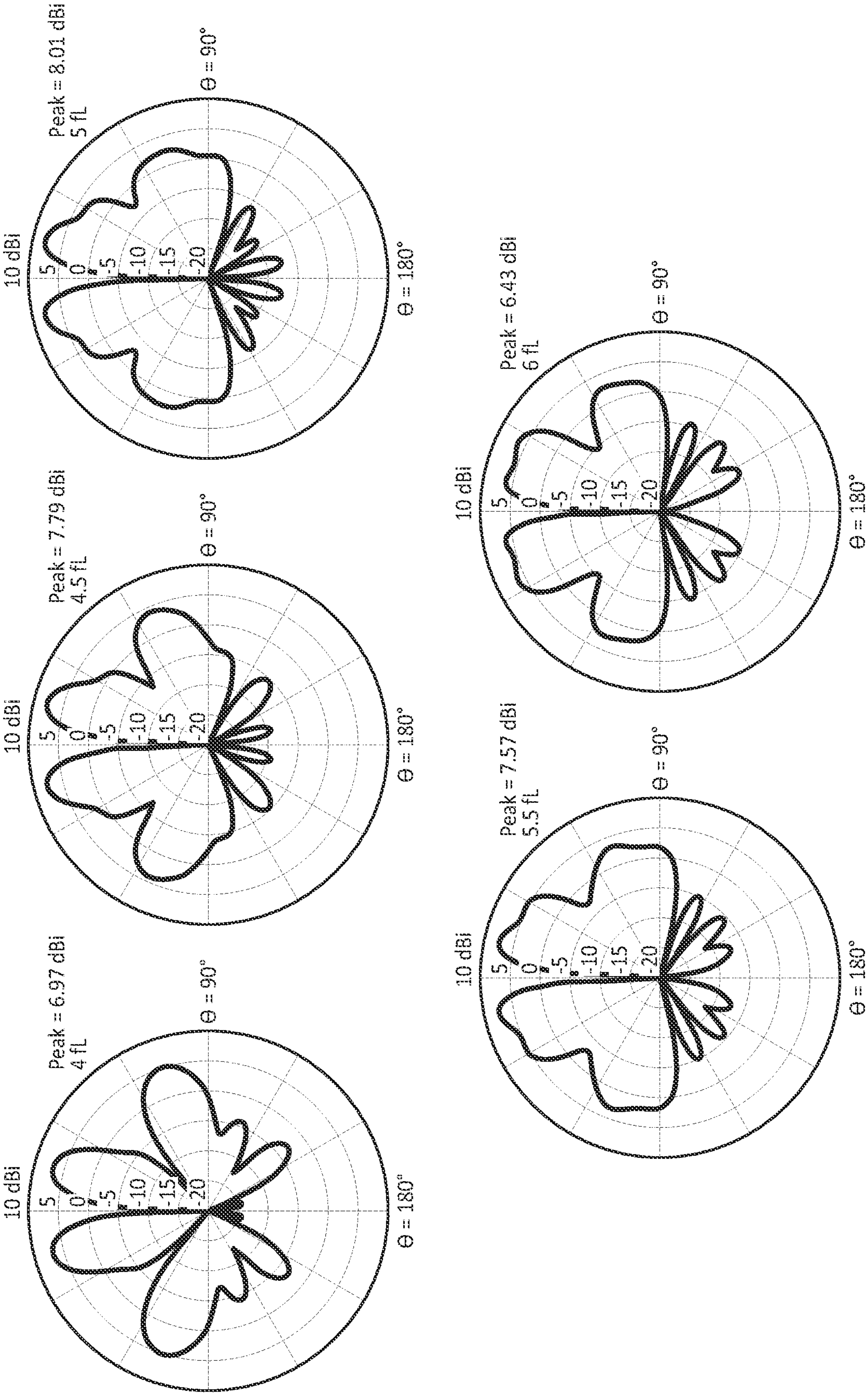
Figure 7C:
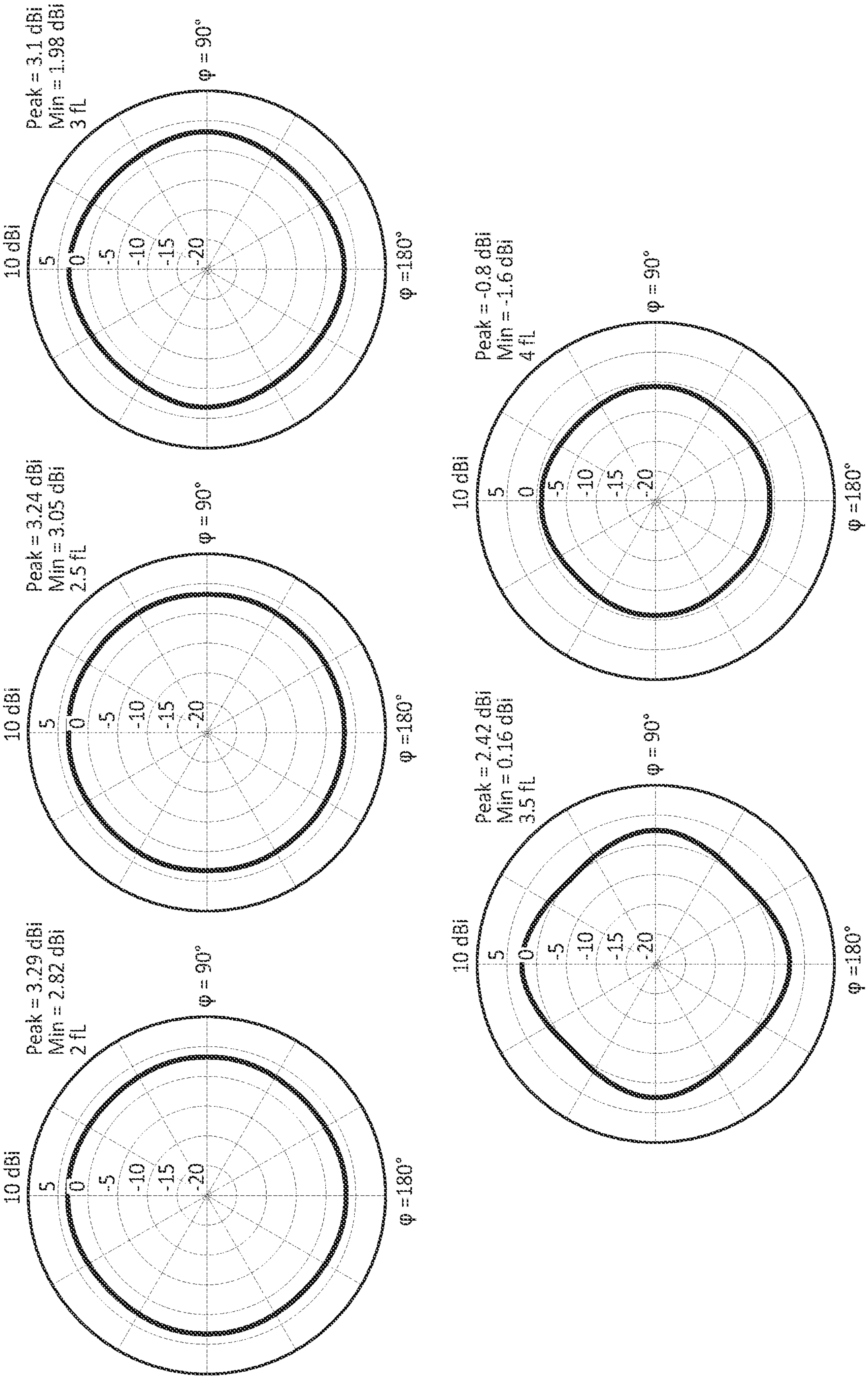
Figure 7D:
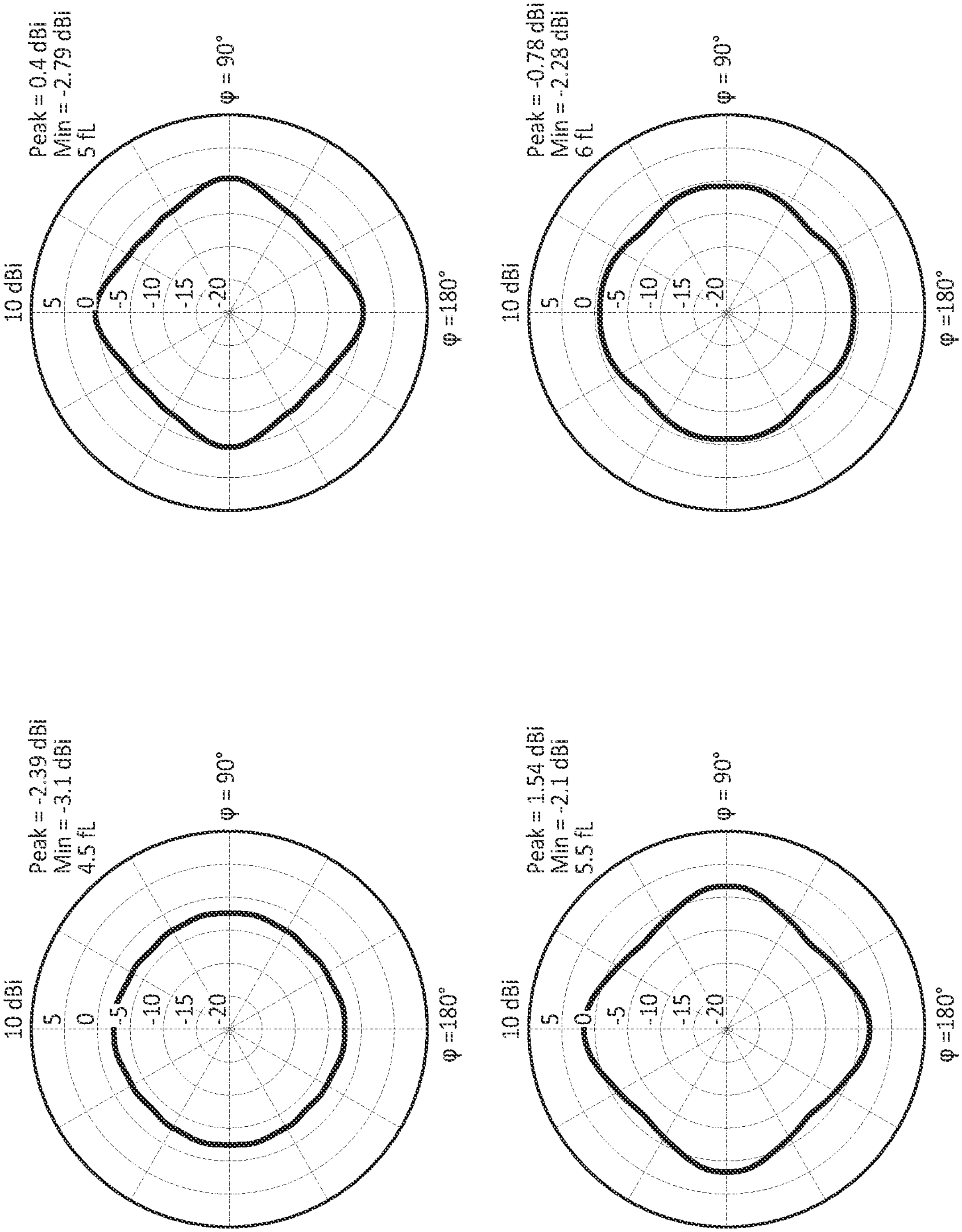
Figure 7E:
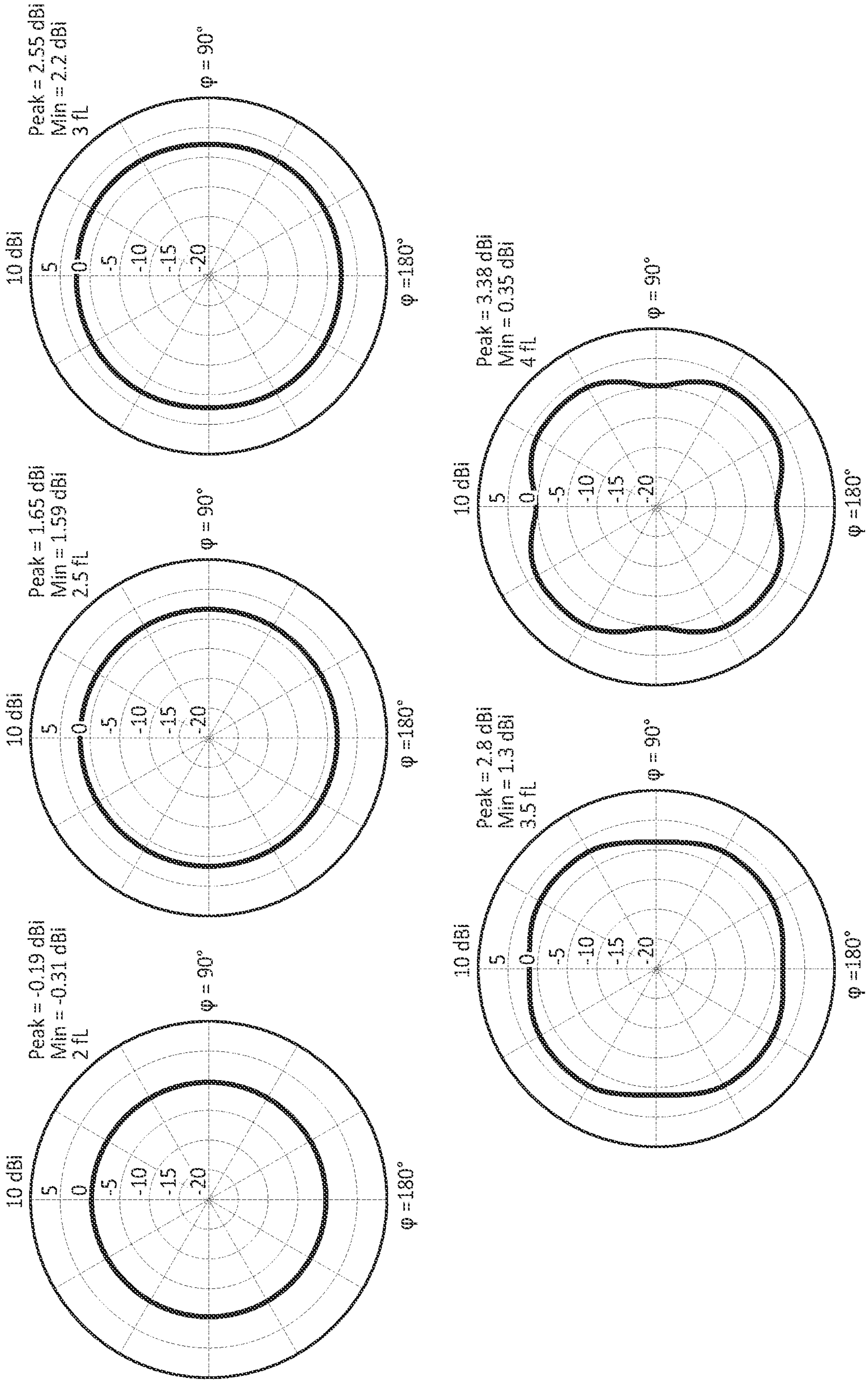
Figure 7F:
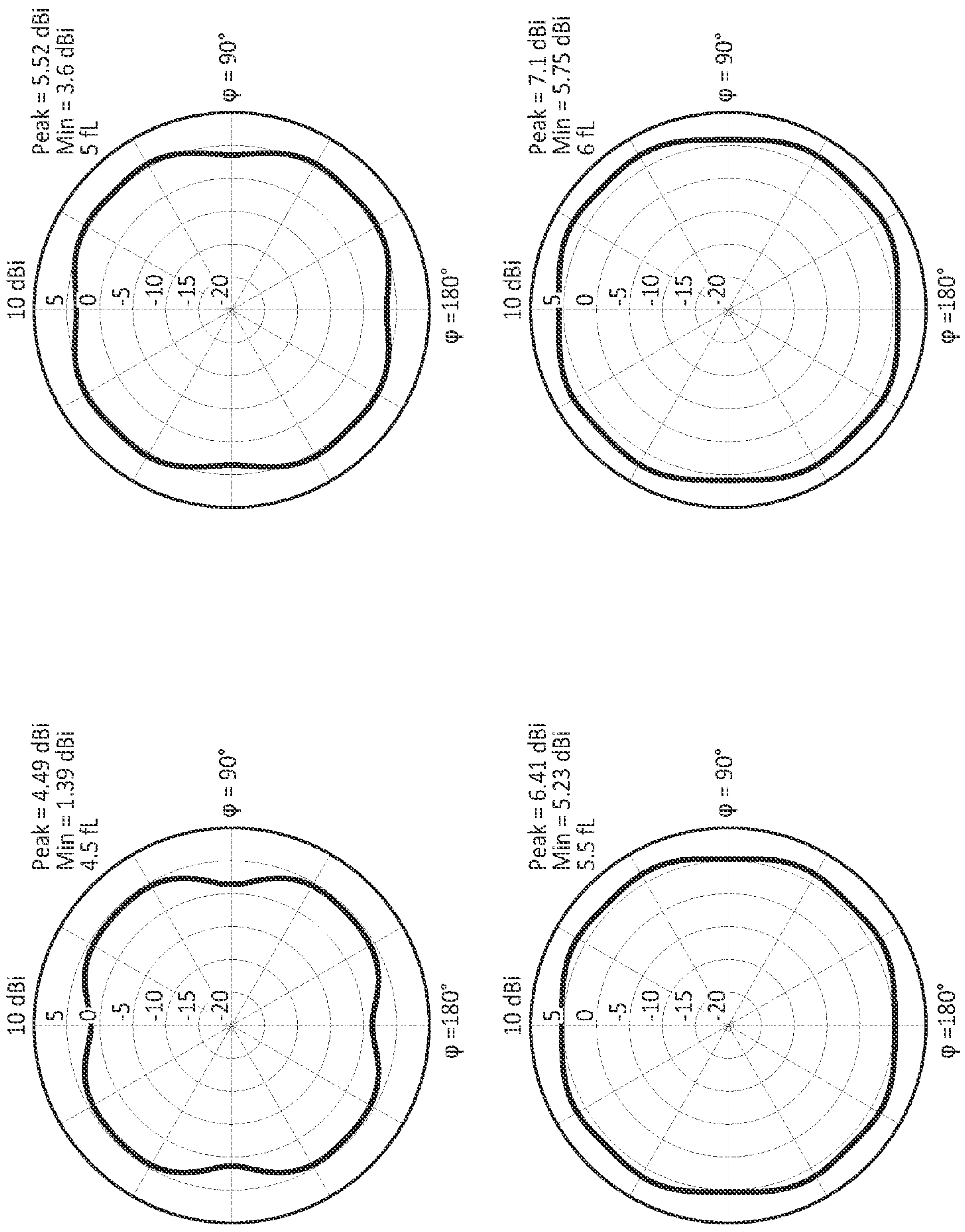

FIGS. 6A-6C illustrate return loss and exemplary time-domain responses of antenna 500. Antenna 500 return loss in FIG. 6A is substantially 10 dB or greater across a 1.33-6 fL efficiency bandwidth and 6 dB or greater across a 1.25-6 fL efficiency bandwidth. A person of skill in the art will understand that small adjustments may be made to return loss by modifying antenna 500 geometry (e.g., adjusting the profile of non-conducting aperture 530, first radially interior surface 520, or edges 550A, 550B) without substantially affecting antenna 500 radiation-pattern or time-domain performance.

FIG. 6B illustrates an exemplary time-domain response of antenna 500, in a horizon beam (θ=90°), when transmitting or receiving a wireless signal with IBW of 2-4 fL. Table 3 compiles fidelity, in the horizon beam of antenna 500, for wireless signals across different IBWs. Although not shown in Table 3, antenna 500 fidelity for 1.5 fL bands (e.g. 1.5-3 fL, 3-4.5 fL, 4.5-6 fL) exceeds 85% and antenna 500 fidelity for 2.5 fL bands (e.g. 1-3.5 fL, 3.5-6 fL) exceeds 75%. The antenna is capable of instantaneously transmitting or receiving wireless signals across an IBW of at least up to 3.5:1 (from 1-3.5 fL) in a horizon beam. The antenna is also capable of instantaneously transmitting or receiving wireless signals across an IBW of up to 2.5 fL in various bands in a horizon beam. Antenna 500 is also capable of instantaneously transmitting or receiving wireless signals across a bandwidth of up to 6:1 by instantaneously transmitting or receiving signals in one or more instantaneous frequency bands, each instantaneous frequency band having an IBW of at least the lowest operating frequency.

TABLE 3

Antenna 500 Fidelity in a Horizon Beam (θ = 90°)

| Frequency Band | Fidelity Factor |
|---|---|
| 1-2 fL | 97% |
| 1-3 fL | 83% |
| 1-6 fL | 61% |
| 2-3 fL | 97% |
| 2-4 fL | 92% |
| 2-6 fL | 63% |
| 3-4 fL | 92% |
| 3-6 fL | 73% |
| 4-5 fL | 95% |
| 4-6 fL | 82% |
| 5-6 fL | 95% |

FIG. 6C illustrates an exemplary time-domain response of antenna 500, in a conical beam (θ=30°), when transmitting or receiving a wireless signal with IBW of 1-6 fL. Table 4 compiles fidelity, in the conical beam of antenna 500, for wireless signals across different IBWs. Although not shown in Table 4, antenna 500 fidelity for 1.5 fL bands (e.g., 1.5-3 fL, 3-4.5 fL, 4.5-6 fL) exceeds 95%. Antenna 500 is capable of instantaneously transmitting or receiving wireless signals across an IBW of up to 8:1 (from 1.5-12 fL) in a conical beam. Antenna 500 is also capable of instantaneously transmitting or receiving wireless signals across an IBW of up to 10.5 fL (from 1.5-12 fL) in a conical beam. Antenna 500 is also capable of instantaneously transmitting or receiving wireless signals across a bandwidth of up to 12:1 by instantaneously transmitting or receiving signals in one or more instantaneous frequency bands, each instantaneous frequency band having an IBW of at least the lowest operating frequency.

TABLE 4

Antenna 500 Fidelity in Conical Beam (θ = 30°)

| Frequency Band | Fidelity Factor |
|---|---|
| 1-2 fL | 98% |
| 1-4 fL | 93% |
| 1-6 fL | 95% |
| 1.5-7.5 fL | 96% |
| 1.5-9 fL | 96% |
| 1.5-12 fL | 82% |
| 2-3 fL | 97% |
| 2-4 fL | 95% |
| 2-6 fL | 99% |
| 3-4 fL | 98% |
| 3-6 fL | 95% |
| 4-5 fL | 96% |
| 4-6 fL | 99% |
| 5-6 fL | 99% |

Collective FIG. 7 illustrates radiation patterns in principal cut planes for antenna 500 at various frequencies. FIGS. 7A-7B illustrate antenna 500 radiation patterns maintaining two modes, one radiating a beam having substantially uniform gain in azimuth that includes the radiation horizon (a "horizon beam") and the other radiating a conical beam near an elevation angle (θ) of 30° from the axis of radial symmetry. Antenna 500 maintains a horizon beam and a conical beam over a 6:1 pattern bandwidth (from 1-6 fL). FIGS. 7C-7D illustrate radiation patterns in the azimuth plane (XY, θ=90°) from 2-6 fL. Azimuth plane gain at 1 fL is substantially uniform at −6 to −6.2 dBi and azimuth plane gain at 1.5 fL is substantially uniform at 1.0-1.2 dBi. Although FIGS. 7C-7D illustrate patterns from only 2-6 fL, antenna 500 azimuth plane patterns are substantially uniform over a 6:1 pattern bandwidth (from 1-6 fL), with a maximum variation of ±1.8 dB at 5.5 fL. FIGS. 7E-7F illustrate radiation patterns from 2-6 fL at elevation angle θ=30° from the axis of radial symmetry. Gain in the θ=30° cut plane at 1 fL is uniform at −8.8 dBi and substantially uniform at 1.5 fL at −2.1 to −2.2 dBi. As seen in FIGS. 7A-7B and 7E-7F, antenna 500 maintains a conical beam from 1-6 fL.

Antenna 500 has substantially similar pattern and fidelity characteristics as those described for collective FIGS. 6-7 and Tables 3-4, even without an outer ground plane, given the minimal ground extension from a $\lambda_L/20$ ground radius. A $\lambda_L/20$ radius ground decreases the lowest operating frequency that meets or exceeds 10 dB and 6 dB return loss, but has little effect on fidelity, patterns, or IBWs. Accordingly, placing antenna 500, or variants thereof, over larger external ground planes may extend the lowest operating frequency while maintaining pattern and fidelity performance substantially similar to that described herein.

In certain embodiments, antenna 500 may be an antenna element in an antenna array with beam-scanning capabilities across a 5:1 bandwidth. The maximum radius of $\lambda_L/20$ permits a half-wavelength spacing between antenna elements up to 5 fL. Multiple dielectric volumes 510 may be formed as a single, integrated dielectric-array unit in certain embodiments, with an antenna array formed by disposing conducting surfaces on and mating transmission lines to the dielectric-array unit. A dielectric-array unit may be formed according to the same or similar methods, operations, steps, parameters, and principles as any dielectric unit described herein. Individual dielectric units integrated in a dielectric-array unit may have the same or similar structure, components, elements, configurations, features, interfaces, parameters, or functions in an antenna array as any dielectric unit described herein.

In certain embodiments, a first antenna and a second antenna may be separated by a distance that does not exceed a half-wavelength at a highest operating frequency. For example, a two antennas 500 operating across a 5:1 bandwidth may be separated by a half-wavelength at the highest operating frequency in that bandwidth. In certain embodiments, a highest operating frequency is determined by the radial dimensions of the first antenna and the second antenna.

In certain embodiments, the first antenna and the second antenna may be separated by a distance that exceeds a half-wavelength at a highest operating frequency. In certain embodiments, a highest operating frequency may be the frequency at which the array pattern for an array of antennas, scanned to a spatial sector, exhibits secondary lobes (such as grating lobes) with gain falling at least 10 dB below a primary lobe.

In certain embodiments, a first antenna and a second antenna configured to transmit or receive wireless signals in a spatial sector, and not transmit or receive wireless signals outside the spatial sector, based on time-delaying a signal received by the second antenna relative to a signal received by the first antenna. In certain embodiments, a first antenna and a second antenna may be configured to transmit or receive wireless signals in a 90-degree quadrant in azimuth. Alternatively or additionally, a first antenna and a second antenna may be configured to transmit or receive wireless signals in a 30-degree sector in elevation.

In certain embodiments, a signal transmitted or received by the first antenna and the second antenna may have an IBW of up to 4:1. Alternatively or additionally, a signal transmitted or received by the first antenna and the second antenna may have an IBW of up to 5:1, 6:1, or 8:1. The first antenna, second antenna, and their placement and orientation in space may be configured to instantaneously transmit or receive wireless signals over an IBW of up to 4:1, 5:1, 6:1, or 8:1.

In certain embodiments, the first antenna and the second antenna are each configured to radiate a pattern including the radiation horizon (i.e., the azimuthal plane) over up to a 5:1 or 6:1 pattern bandwidth. In certain embodiments, the first antenna and the second antenna are configured, separately or jointly, to radiate a pattern including a beam substantially uniform in azimuth.

In certain embodiments, the first antenna and second antenna may be configured to transmit or receive wireless signals in a spatial sector, and not transmit or receive wireless signals outside the spatial sector, based on phase-delaying a signal received by the second antenna relative to a signal received by the first antenna. In certain embodiments, the phase-delay may be a constant phase shift across the relevant bandwidth. In certain embodiments, a first antenna and a second antenna may be configured to transmit or receive wireless signals in a 90-degree quadrant in azimuth. Alternatively or additionally, a first antenna and a second antenna may be configured to transmit or receive wireless signals in a 30-degree sector in elevation.

In certain embodiments, the first antenna and second antenna may be configured to transmit or receive signals over an efficiency bandwidth of up to 6:1. Alternatively or additionally, the first antenna and second antenna may be configured to transmit or receive signals over an efficiency bandwidth of 12:1. In certain embodiments, the first antenna and second antenna may be configured to transmit or receive signals over an efficiency bandwidth of up to 6:1 or up to 12:1 independent of time-delay or phase-delay between the two antennas. In certain embodiments, the first antenna and second antenna may be configured to transmit or receive signals over an efficiency bandwidth of up to 6:1 or up to 12:1 independent of the spatial sector from which wireless signals are transmitted or received.

In certain embodiments, a dielectric unit included in antenna 500 may weigh from 0.8 to 1.4 $kg/m^3$ times the cube of the lowest operating wavelength at which antenna 500 return loss meets or exceeds 6 dB. In certain embodiments operating without an outer ground plane, a dielectric unit may weigh from 1.5 to 2.8 $kg/m^3$ times the cube of the lowest operating wavelength at which antenna 500 return loss meets or exceeds 6 dB. Dielectric unit weight may be calculated from antenna dimensions and the specific gravity of materials from which the dielectric unit was formed. In certain lightweight embodiments, the dielectric unit may weigh from 0.55 to 1.1 $kg/m^3$ times the cube of the lowest operating wavelength at which antenna 500 return loss meets or exceeds 6 dB. In certain lightweight embodiments without an outer ground plane, the dielectric unit may weigh from 1 to 2.1 $kg/m^3$ times the cube of the lowest operating wavelength at which antenna 500 return loss meets or exceeds 6 dB.

Figure 8B:
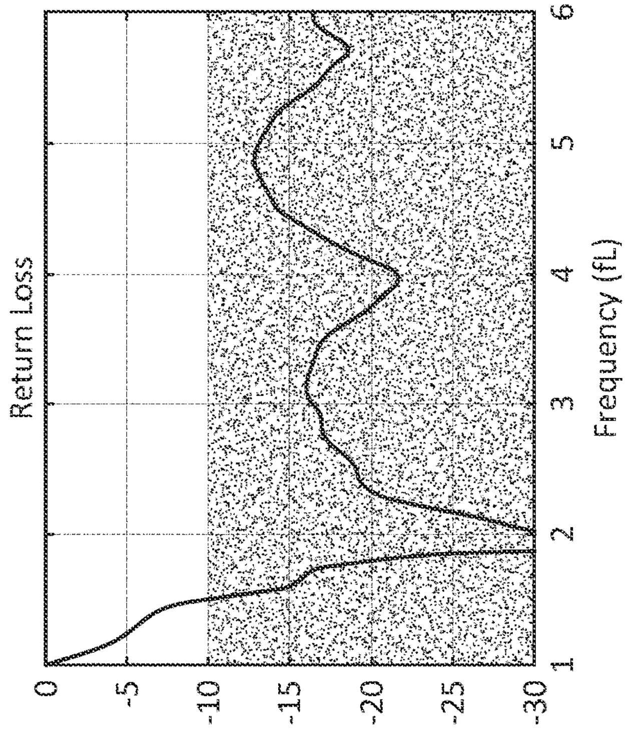
FIGS. 8A-8B are diagrams that illustrate the geometry and features of an example antenna and the wireless performance of antenna in return loss, according to certain embodiments.
Figure 8A:
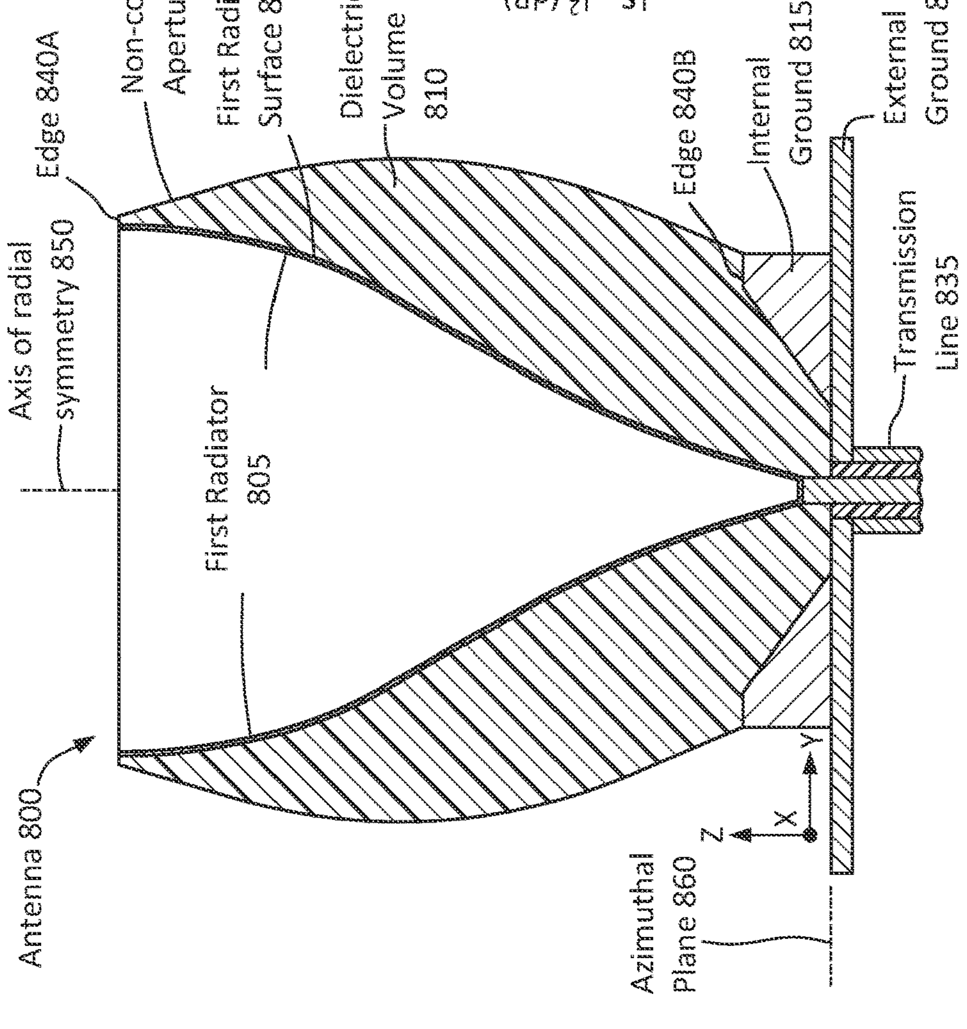
Figure 9A:
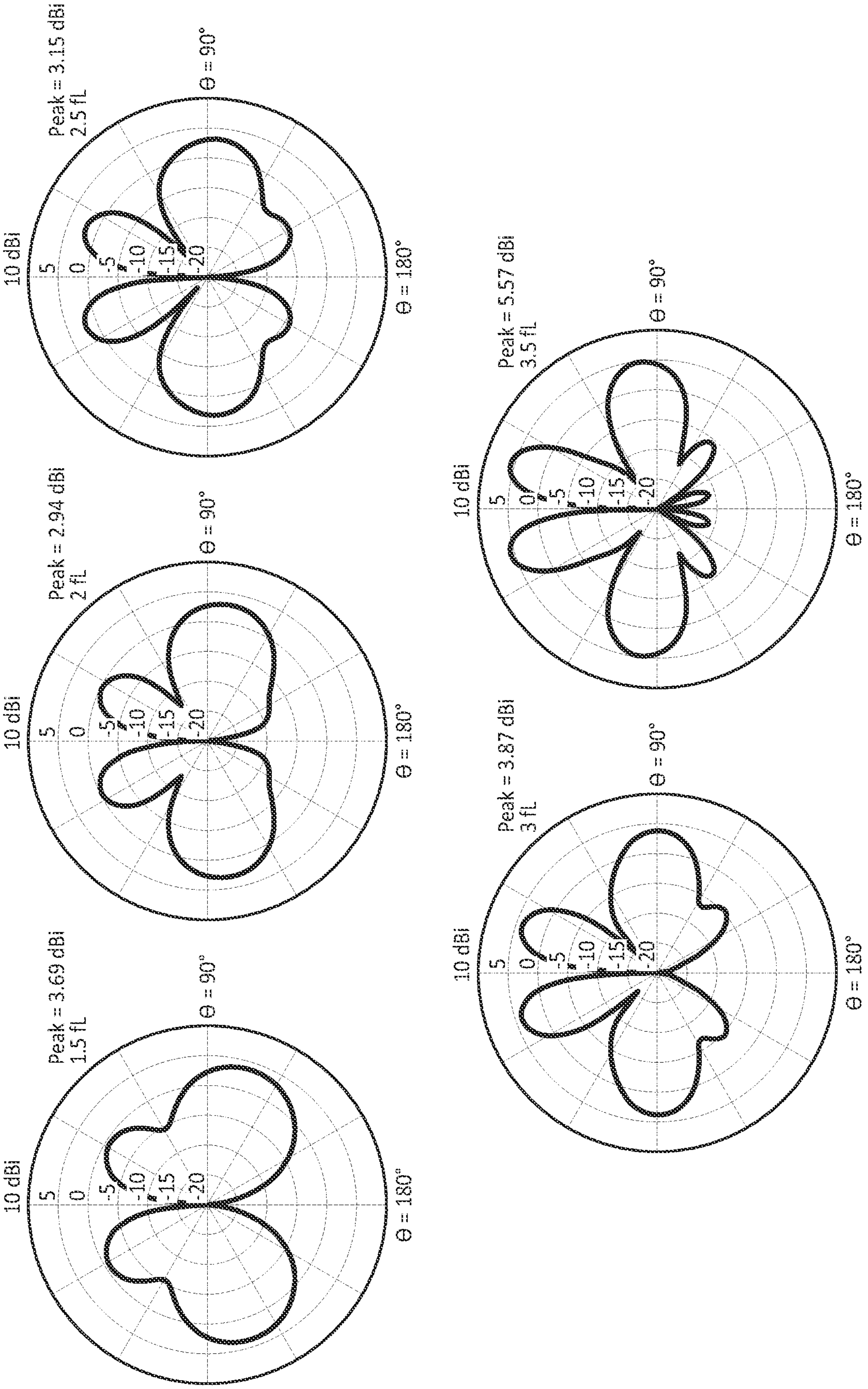
FIGS. 9A-9F are diagrams that illustrate the wireless performance of an example antenna in radiation patterns, according to certain embodiments.
Figure 9B:
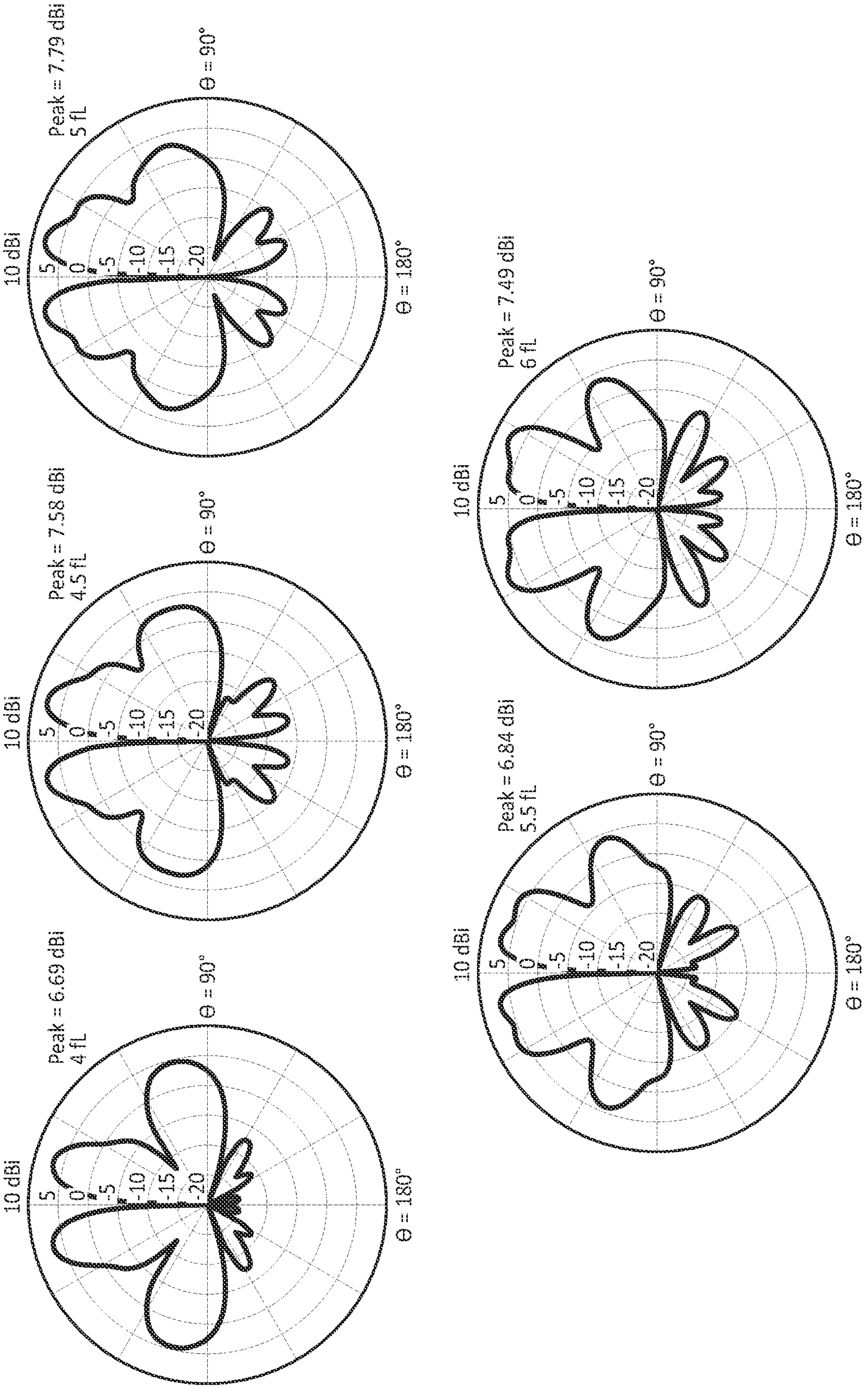
Figure 9C:
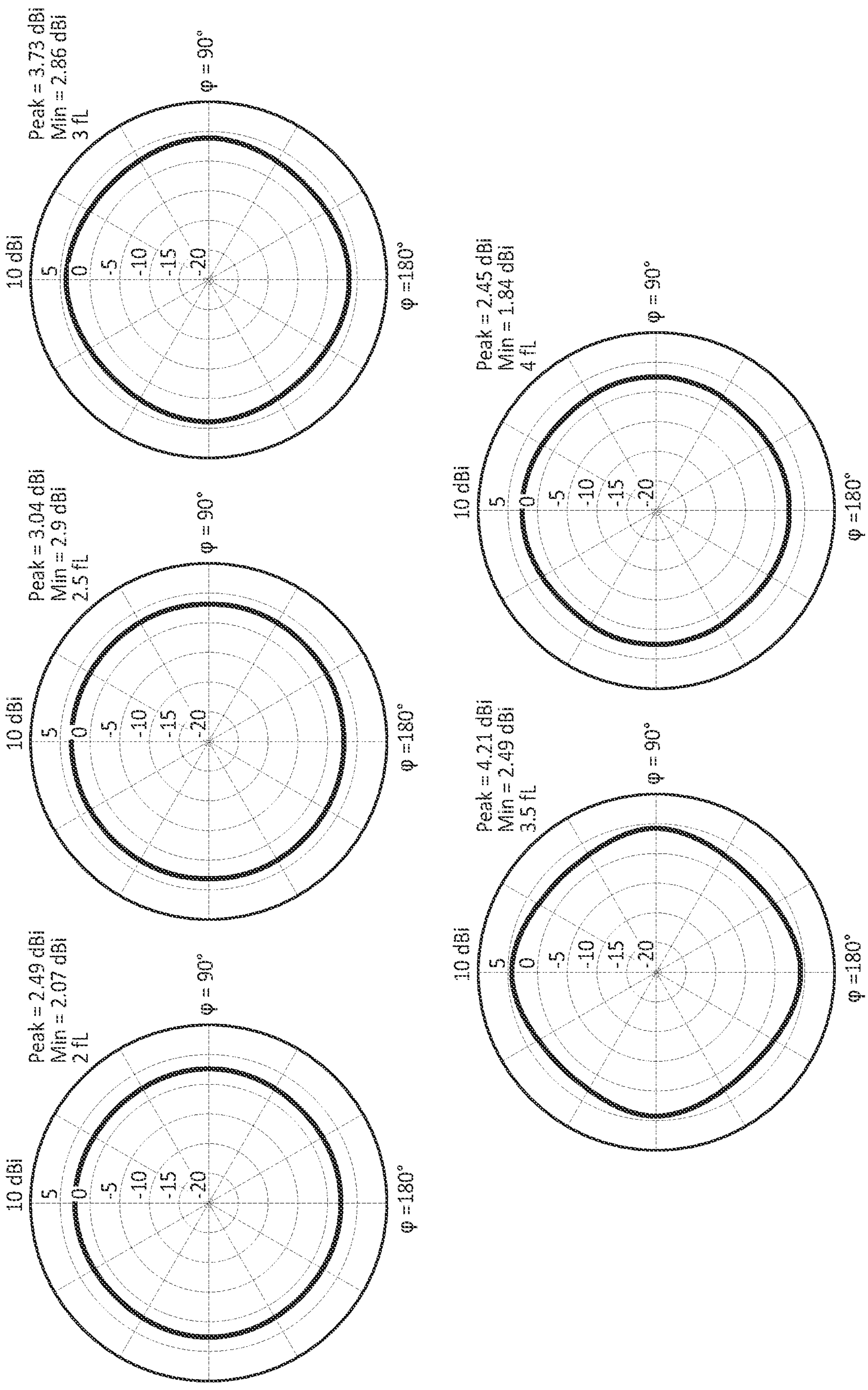
Figure 9D:
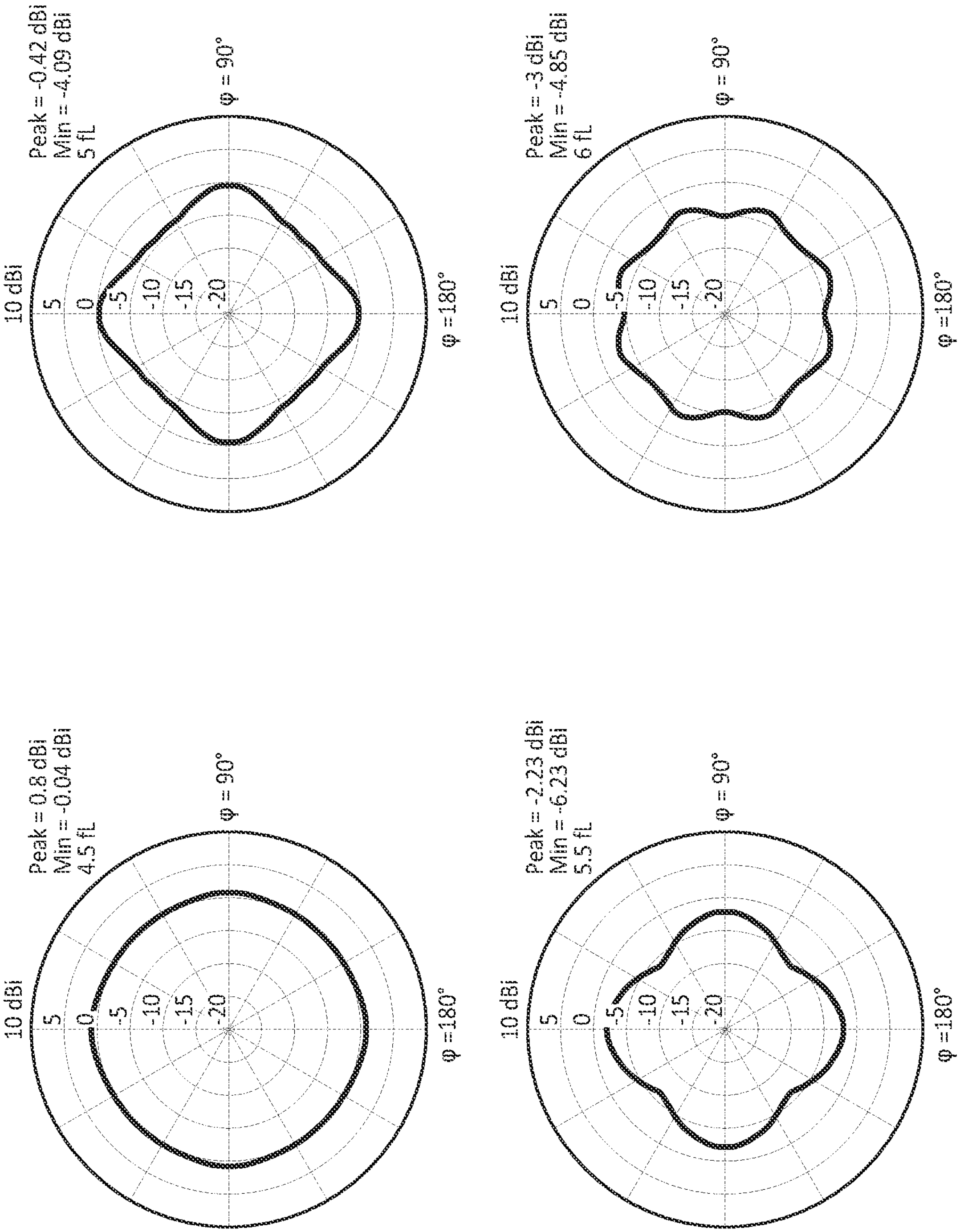
Figure 9E:
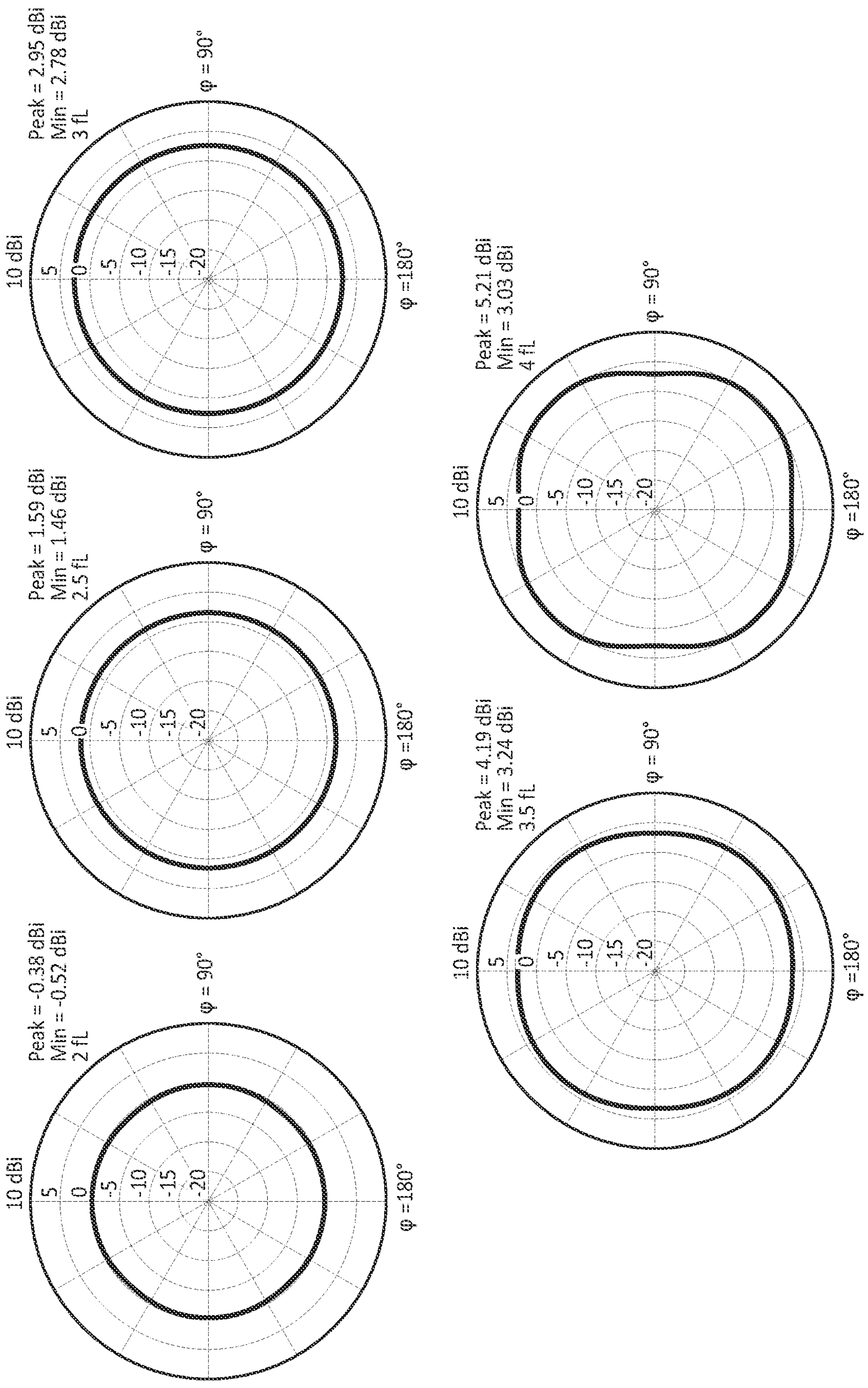
Figure 9F:
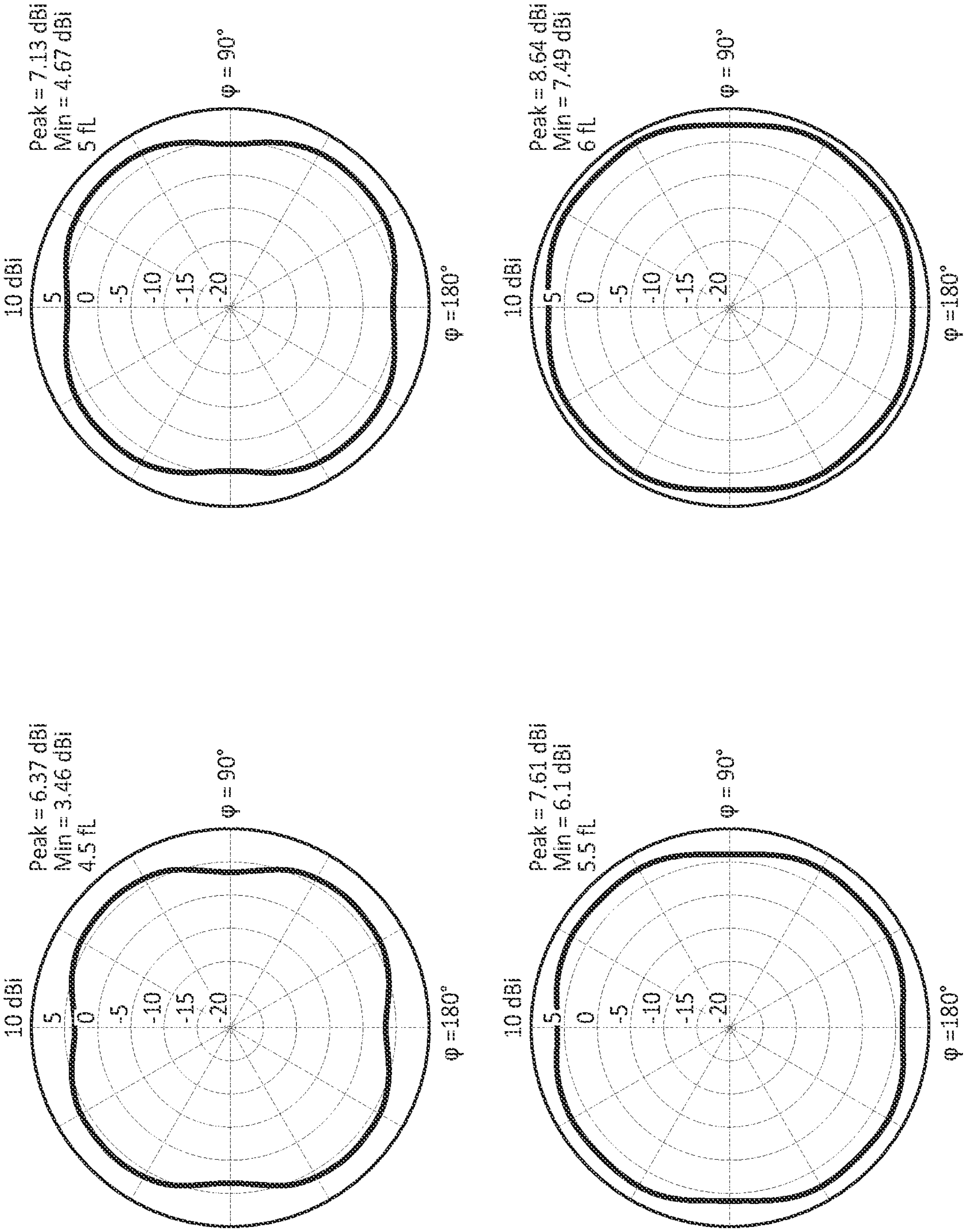

FIG. 8A illustrates the geometry and features of antenna 800 in a two-dimensional view. Antenna 800 has the same topology as antenna 200, but with different physical dimensions than antenna 200, and in particular, smaller longitudinal dimensions for low profile form factors. Antenna 800 reduces antenna height (<$\lambda_L$/6) relative to antenna K2 (<$\lambda_L$/5), keeping similar diameter (<$\lambda_L$/6). As discussed further below, reducing antenna height for antenna 800 results in greater beam scanning at higher frequencies (e.g., 4-6 fL), reducing on-horizon gain at those frequencies.

FIG. 8A illustrates a sectional view of antenna 800, including conducting surfaces and volumes. As shown in FIG. 8A, antenna 800 is azimuthally uniform. A perspective view of antenna 800 corresponding to the sectional view of FIG. 8A may be generated by rotating the sectional view of FIG. 8A around axis of radial symmetry 850.

Antenna 800 may be formed from dielectric volume 810. As shown in FIG. 8A, dielectric volume 810 may have multiple surfaces, including first radially interior surface 820, non-conducting aperture 830, an inner ground surface, one or more edges 840A, 840B, and a base. Antenna 800 may mate to transmission line 835. To case reference to various physical features and wireless performance characteristics (particularly radiation patterns), FIG. 8A also illustrates an axis of radial symmetry 850 located at the radial center of antenna 800, azimuthal plane 860, and an XYZ coordinate system.

As shown in FIG. 8A, dielectric volume 810 is azimuthally uniform (without variation in φ) such that taking a section in any elevation plane (θ-r plane) yields the view in FIG. 8A. Rotating the sectional view in FIG. 8A about axis of radial symmetry 850 yields a three-dimensional dielectric volume 810 having multiple surfaces, with each surface in a three-dimensional view corresponding to a curve in the sectional view of FIG. 8A. Dielectric volume 810 may be radially symmetric or azimuthally uniform about axis of radial symmetry 850. Dielectric volume 810 terminates at its radial interior in a first radially interior surface 820. Dielectric volume 810 terminates at its radial exterior in a non-conducting aperture 830. Dielectric volume 810 terminates at its longitudinal maximum in one or more edges 840A. FIG. 8A illustrates one edge 840A at the longitudinal maximum of dielectric volume 810. Dielectric volume 810 terminates at its longitudinal minimum in a base. Dielectric volume 810 also has an inner ground surface, on its radial exterior, that extends from the base to one or more edges 840B or to non-conducting aperture 830.

In certain embodiments, dielectric volume 810 has a maximum radius determined by the maximum radial dimension of non-conducting aperture 830. In certain embodiments, dielectric volume 810 has a maximum height determined as the longitudinal distance between the base at its longitudinal minimum and edge 840A at its longitudinal maximum. As shown in FIG. 8A, the maximum radius of dielectric volume 810 does not exceed $\lambda_L$/12, and dielectric volume 810 height does not exceed $\lambda_L$/6.

First radially interior surface 820 may have the same or similar configurations, features, interfaces, parameters, or functions on a dielectric volume as first radially interior surface 120. Non-conducting aperture 830 may have the same or similar configurations, features, interfaces, parameters, or functions on a dielectric volume as non-conducting aperture 130. An inner ground surface of dielectric 810 may have the same or similar configurations, features, interfaces, parameters, or functions on a dielectric volume as inner ground surface 140. One or more edges 840A, 840B may have the same or similar configurations, features, interfaces, parameters, or functions on a dielectric volume as edges 150A, 150B. Note that the size and dimensions of first radially interior surface 820, non-conducting aperture 830, one or more edges 840A, 840B, an inner ground surface and a base of dielectric volume 810 correspond to antenna 800 as shown in FIG. 8A, rather than antenna 200.

Axis of radial symmetry 850 defines the Z-axis around which dielectric volume 810 (and antenna 800) is azimuthally uniform or radially symmetric. Azimuthal plane 860 defines the radiation horizon (θ=90°). In certain embodiments, azimuthal plane 860 may also define the azimuthal plane (θ=90°, XY) corresponding to an external ground plane.

Dielectric volume 810 may be formed from any fabrication process, materials, or composition of materials described with respect to other dielectric volumes disclosed herein, compatible with the topology of dielectric volume 810 shown in FIG. 8A.

First radiator 805 may have the same or similar structure, components, elements, configurations, features, interfaces, parameters, or functions in an antenna as first radiator 205, except that the size and dimensions of first radiator 805 correspond to antenna 800 rather than antenna 200. First radiator 805 may be formed according to the same or similar methods, operations, steps, parameters, and principles, and of the same or similar material(s), as first radiator 205.

Internal ground 815 may have the same or similar structure, components, elements, configurations, features, interfaces, parameters, or functions in an antenna as internal ground 210, except that the size and dimensions of internal ground 815 correspond to antenna 800 rather than antenna 200. As shown in FIG. 8A, internal ground 815 does not extend past the longitudinal minimum of dielectric volume 810, such that the height of antenna 800 is identical to the height of dielectric volume 810. Internal ground 815 may be formed according to the same or similar methods, operations, steps, parameters, and principles, and of the same or similar material(s), as internal ground 210.

External ground 825 may have the same or similar structure, components, elements, configurations, features, interfaces, parameters, or functions in an antenna as external ground 220. Transmission line 835 may have the same or similar structure, components, elements, configurations, features, interfaces, parameters, or functions, and be formed of the same or similar material(s), as transmission line 230.

FIG. 8B and collective FIG. 9 illustrate performance of antenna 800[6]—including radiation pattern and return loss, and time-domain performance—over a 6:1 bandwidth (1-6 fL).[7]

[6] The performance shown in FIGS. 6-7 is for antenna 500 with a ground plane having the same radius (≤$\lambda_L$/20) as the dielectric volume.

[7] The performance shown in FIGS. 8B and 9 is for antenna 800 with a ground plane having the same radius (≤$\lambda_L$/12) as the dielectric volume.

FIG. 8B illustrates return loss of antenna 800. Antenna 800 return loss in FIG. 8B is 10 dB or greater across a 1.5-6 fL efficiency bandwidth and 6 dB or greater across a 1.33-6 fL efficiency bandwidth. Although not shown in FIG. 8B, antenna 800 maintains return loss exceeding 10 dB up to 12 fL (i.e., from 1.5 fL-12 fL). Although not shown in FIG. 8B, antenna 800 return loss substantially meets or exceeds 9 dB across a 1.5-12 fL efficiency bandwidth, regardless of the size of the ground plane antenna 800 is placed over. For all ground plane sizes, return loss is substantially 9 dB or greater across at least an 8:1 bandwidth (1.5-12 fL). Ground plane size does not substantively affect return loss performance above 2 fL (i.e., return loss above 2 fL remains substantially at 10 dB or greater for all ground sizes).

Antenna 800 is placement insensitive above 1.5 fL to a 9 dB return loss threshold. The ground plane size has no effect on return loss above a 9 dB threshold at frequencies above 2 fL, and return loss is substantially 10 dB or greater at frequencies above 1.5 fL regardless of ground plane size.

Collective FIG. 9 illustrates radiation patterns in principal cut planes for antenna 800 at various frequencies. FIGS. 9A-9B illustrate antenna 800 radiation patterns maintaining two modes, one radiating a beam having substantially uniform gain in azimuth that includes the radiation horizon (a "horizon beam") and the other radiating a conical beam near an elevation angle (θ) of 30° from the axis of radial symmetry. Although not shown in FIG. 9A-9B, antenna 800 maintains a horizon beam and a conical beam over at least a 4.5:1 pattern bandwidth (from 1-4.5 fL). FIGS. 9C-9D illustrate radiation patterns in the azimuth plane (XY, θ=90°) from 2-6 fL. Azimuth plane gain at 1.5 fL is substantially uniform at 1.8-2.1 dBi. Although Antenna 800 azimuth plane patterns are substantially uniform over a 4:1 pattern bandwidth (from 1.5-6 fL), with a maximum variation of ±2 dB at 5.5 fL. FIGS. 9E-9F illustrate radiation patterns from 2-6 fL at elevation angle θ=26° from the axis of radial symmetry. Gain in the θ=26° cut plane at 1 fL is uniform at −0.8 dBi and substantially uniform at 1.5 fL at −1.2 to −1.3 dBi. Antenna 800 maintains a conical beam from 1-6 fL.

Table 5 compiles fidelity, in the horizon beam of antenna 800, for wireless signals across different IBWs. Antenna 800 is capable of instantaneously transmitting or receiving wireless signals across an IBW of at least up to 4:1 (from 1-4 fL) in a horizon beam. Antenna 800 is also capable of instantaneously transmitting or receiving wireless signals across an IBW of up to 3 fL in various bands in a horizon beam. Antenna 800 is also capable of instantaneously transmitting or receiving wireless signals across a bandwidth of up to 6:1 by instantaneously transmitting or receiving signals in one or more instantaneous frequency bands, each instantaneous frequency band having an IBW of at least the lowest operating frequency.

TABLE 5

Antenna 800 Fidelity in a Horizon Beam (θ = 90°)

| Frequency Band | Fidelity Factor |
|---|---|
| 1-2 fL | 96% |
| 1-4 fL | 81% |
| 1-6 fL | 70% |
| 2-3 fL | 98% |
| 2-4 fL | 91% |
| 2-6 fL | 73% |
| 3-4 fL | 98% |
| 3-6 fL | 78% |
| 4-5 fL | 94% |
| 4-6 fL | 82% |
| 5-6 fL | 99% |

Table 6 compiles fidelity, in the conical beam of antenna 800, for wireless signals across different IBWs. Although not shown in Table 6, antenna 800 fidelity for 1 fL bands (e.g., 1-2 fL, 5-6 fL) exceeds 90%. Antenna 800 is capable of instantaneously transmitting or receiving wireless signals across an IBW of up to 5:1 (from 1.5-7.5 fL) in a conical beam. Antenna 800 is also capable of instantaneously transmitting or receiving wireless signals across an IBW of up to 6 fL (from 1.5-7.5 fL) in a conical beam. Antenna 800 is also capable of instantaneously transmitting or receiving wireless signals across a bandwidth of up to 12:1 by instantaneously transmitting or receiving signals in one or more instantaneous frequency bands, each instantaneous frequency band having an IBW of at least the lowest operating frequency.

TABLE 6

Antenna 800 Fidelity in Conical Beam (θ = 26°)

| Frequency Band | Fidelity Factor |
|---|---|
| 1-4 fL | 81% |
| 1-6 fL | 97% |
| 1.5-7.5 fL | 95% |
| 2-4 fL | 99% |
| 2-6 fL | 98% |

Antenna 800 has substantially similar pattern and fidelity characteristics as those described in Table 5-6 and FIG. 9, even without an outer ground plane. A $\lambda_L/12$ radius ground decreases the lowest operating frequency that meets or exceeds 10 dB and 6 dB return loss, but has little effect on fidelity, patterns, or IBWs. Accordingly, placing antenna 800, or variants thereof, over larger external ground planes may extend the lowest operating frequency while maintaining pattern and fidelity performance substantially similar to that described herein.

Figure 10B:
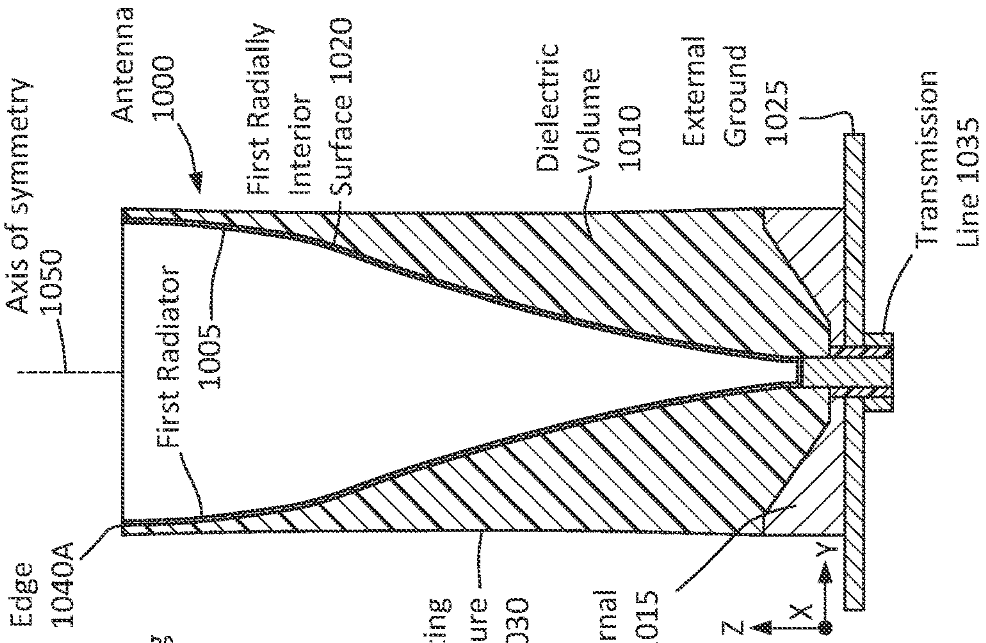
FIGS. 10A-10B are diagrams that illustrate the geometry and features of an example antenna, according to certain embodiments.
Figure 10A:
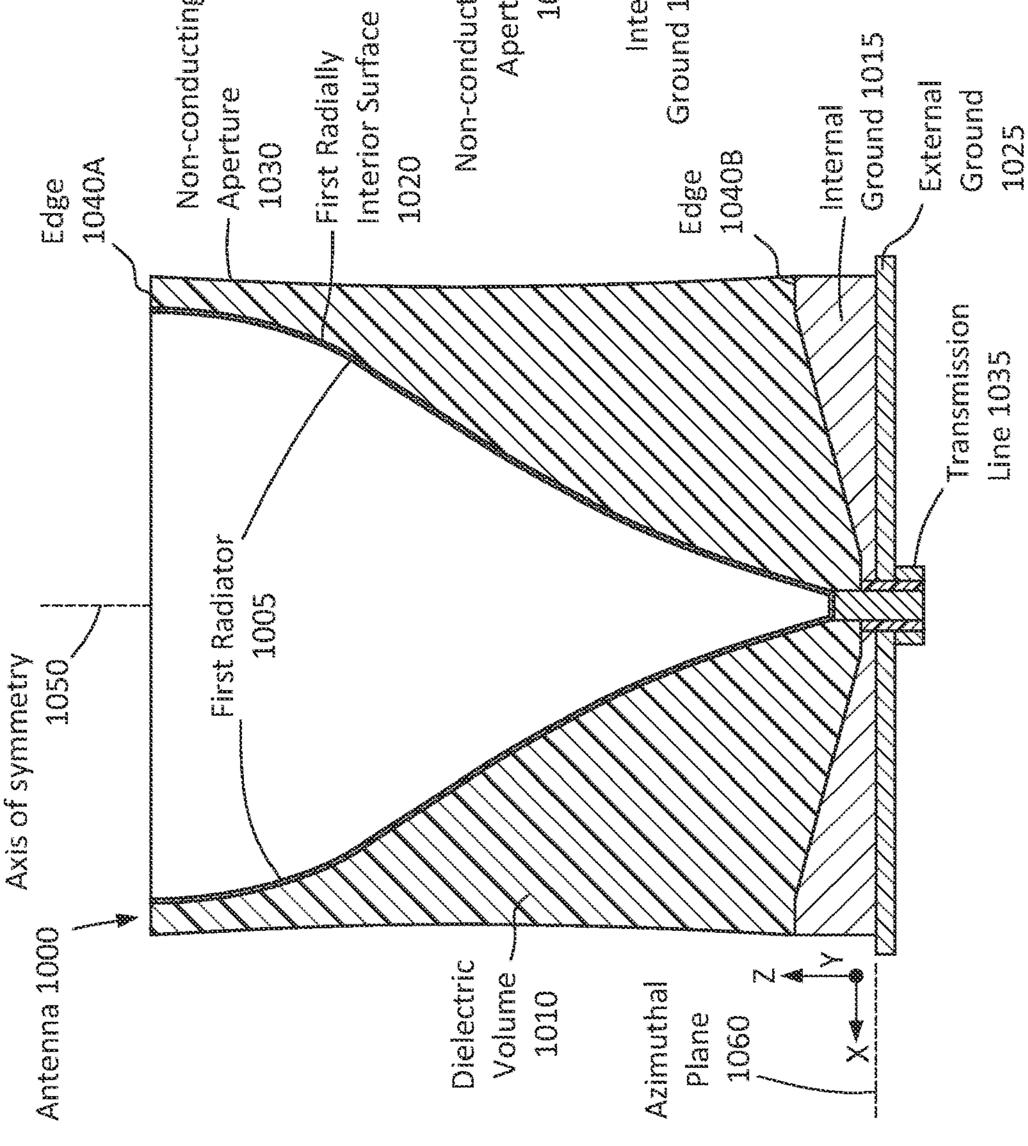

FIGS. 10A-10B illustrate the geometry and features of antenna 1000 in two perpendicular sectional views, each through the center of antenna 1000, including conducting surfaces and volumes. In certain embodiments, a dielectric volume (and any corresponding dielectric unit or antenna) may be scaled in one or more radial dimensions. In certain embodiments, scaling may improve directivity in the direction of a minor radial axis or plane (the axis or plane with a smaller scaling factor) or a major radial axis or plane (the axis or plane with a larger scaling factor). Greater directivity in particular directions may improve antenna performance in fixed point-to-point communications or other applications where transmitter or receiver location can be determined. Antenna 1000, shown in FIGS. 10A-10B, has a scaling factor sx=0.8 (i.e., the radial dimension of an azimuthally uniform dielectric volume has been reduced 20% in the X-dimension) and sy=0.4 (i.e., the radial dimension of an azimuthally uniform dielectric volume has been reduced 60% in the Y-dimension), such that the radius of antenna 1000 in the X-dimension is twice the radius of antenna 1000 in the Y-dimension. Accordingly, dielectric unit 1010 and antenna 1000 are not azimuthally uniform or radially symmetric, but are symmetric about the ZX and ZY planes containing the axis of symmetry.

Antenna 1000 may be formed from dielectric volume 1010. As shown in FIGS. 10A-10B, dielectric volume 1010 may have multiple surfaces, including first radially interior surface 1020, non-conducting aperture 1030, an inner ground surface, one or more edges 1040A, 1040B, and a base. Antenna 1000 may mate to transmission line 1035. To case reference to various physical features and wireless performance characteristics (particularly radiation patterns), FIGS. 10A-10B also illustrate an axis of symmetry 1050 located at the radial center of antenna 1000, azimuthal plane 1060, and an XYZ coordinate system.

As shown in FIGS. 10A-10B, dielectric volume 1010 is symmetric about axis of symmetry 1050. Dielectric volume 1010 is a three-dimensional dielectric volume having multiple surfaces, with each surface in a three-dimensional view corresponding to one or more curves in the sectional views of FIGS. 10A-10B. Dielectric volume 1010 terminates at its radial interior in a first radially interior surface 1020. Dielectric volume 1010 terminates at its radial exterior in a non-conducting aperture 1030. Dielectric volume 1010 terminates at its longitudinal maximum in one or more edges 1040A. FIGS. 10A-10B illustrate one edge 1040A at the longitudinal maximum of dielectric volume 1010. Dielectric volume 1010 terminates at its longitudinal minimum in a base. In certain embodiments, a base of dielectric volume 1010 may not be scaled. Not scaling a base of dielectric volume 1010 may facilitate interfacing with transmission line 1035. Dielectric volume 1010 also has an inner ground surface, on its radial exterior, that extends from the base to one or more edges 1040B or to non-conducting aperture 1030.

In certain embodiments, dielectric volume 1010 has a maximum radius determined by the maximum radial dimension of non-conducting aperture 1030 in a major radial plane. As shown in FIGS. 10A-10B, the maximum radius of dielectric volume 1010 lies in the ZX plane of FIG. 10A (i.e., the major radial plane of dielectric volume 1010). In certain embodiments, dielectric volume 1010 has a minor radius determined by the maximum radial dimension of non-conducting aperture 1030 in a minor radial plane (e.g., the ZY plane of FIG. 10B). In certain embodiments, dielectric volume 1010 has a maximum height determined as the longitudinal distance between the base at its longitudinal minimum and edge 1040A at its longitudinal maximum. As shown in FIG. 10A, the maximum (or major) radius of dielectric volume 1010 does not exceed $\lambda_L/12$. As shown in FIG. 10B, the minor radius of dielectric volume 1010 does not exceed $\lambda_L/24$. Dielectric volume 1010 height does not exceed $\lambda_L/5$.

First radially interior surface 1020 may have the same or similar configurations, features, interfaces, parameters, or functions on a dielectric volume as first radially interior surface 120, except that first radially interior surface 1020 is symmetric rather than azimuthally uniform or radially symmetric. Non-conducting aperture 1030 may have the same or similar configurations, features, interfaces, parameters, or functions on a dielectric volume as non-conducting aperture 130 except that non-conducting aperture 1030 is symmetric rather than azimuthally uniform or radially symmetric. An inner ground surface of dielectric 1010 may have the same or similar configurations, features, interfaces, parameters, or functions on a dielectric volume as inner ground surface 140 except that an inner ground surface of dielectric volume 1010 is symmetric rather than azimuthally uniform or radially symmetric. One or more edges 1040A, 1040B may have the same or similar configurations, features, interfaces, parameters, or functions on a dielectric volume as edges 150A, 150B, except that one or more edges 1040A, 1040B are symmetric rather than azimuthally uniform or radially symmetric. Note that the size and dimensions of first radially interior surface 1020, non-conducting aperture 1030, one or more edges 1040A, 1040B, an inner ground surface, and a base of dielectric volume 1010 correspond to antenna 1000 as shown in FIGS. 10A-10B, rather than antenna 200.

Axis of symmetry 1050 defines the Z-axis at the center of antenna 1000 around which dielectric volume 1010 (and antenna 1000) is symmetric. Azimuthal plane 1060 defines the radiation horizon (θ=90°). In certain embodiments, azimuthal plane 1060 may also define the azimuthal plane (θ=90°, XY) corresponding to an external ground plane.

Dielectric volume 1010 may be formed from any fabrication process, materials, or composition of materials described with respect to other dielectric volumes disclosed herein, compatible with the symmetric topology of dielectric volume 1010 shown in FIGS. 10A-10B.

First radiator 1005 may have the same or similar structure, components, elements, configurations, features, interfaces, parameters, or functions in an antenna as first radiator 205, except that the size and dimensions of first radiator 1005 correspond to antenna 1000 rather than antenna 200. First radiator 1005 may be formed according to the same or similar methods, operations, steps, parameters, and principles, and of the same or similar material(s), as first radiator 205.

Internal ground 1015 may have the same or similar structure, components, elements, configurations, features, interfaces, parameters, or functions, and be formed of the same or similar material(s), in an antenna as internal ground 210, except that the size and dimensions of internal ground 1015 correspond to antenna 1000 rather than antenna 200. As shown in FIGS. 10A-10B, internal ground 1015 extends past the longitudinal minimum of dielectric volume 1010 (as shown where internal ground 1015 interfaces with the dielectric of transmission line 1035), such that the height of antenna 1000 exceeds the height of dielectric volume 1010. In certain embodiments, internal ground 1015 may not extend longitudinally past the longitudinal minimum of dielectric volume 1010, such that the height of antenna 1000 and dielectric volume 1010 are identical. Internal ground 1015 may be formed according to the same or similar methods, operations, steps, parameters, and principles as internal ground 210.

External ground 1025 may have the same or similar structure, components, elements, configurations, features, interfaces, parameters, or functions in an antenna as external ground 220. Transmission line 1035 may have the same or similar structure, components, elements, configurations, features, interfaces, parameters, or functions as transmission line 230.

Collective FIGS. 11-12 summarize performance of antenna 1000—including radiation pattern, return loss, and time-domain performance—over a 6:1 bandwidth (1-6 fL).[8]

[8] The performance shown in FIGS. 11-12 is for antenna 1000 without an external ground plane. Coupling antenna 1000 to a ground plane exceeding the radial dimensions of antenna 1000 (in X or Y) may improve return loss at a lower frequencies and increase peak gain while maintaining low distortion performance.

Figure 11B:
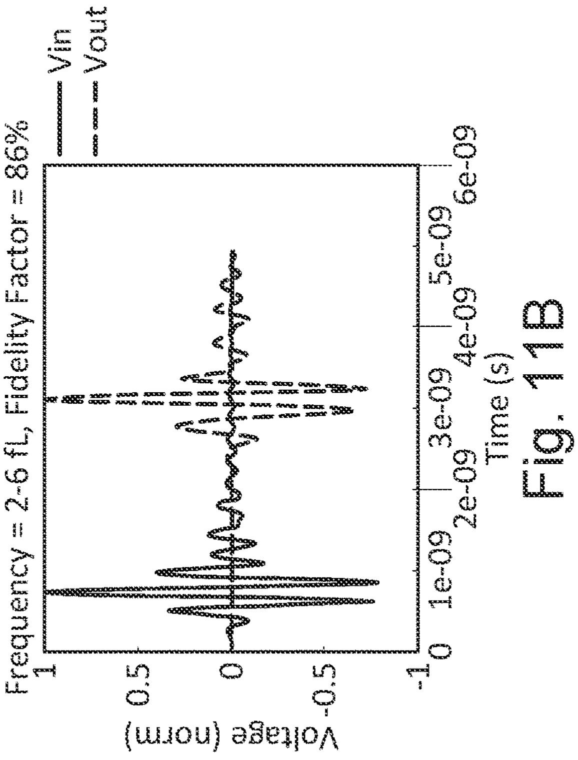
FIGS. 11A-11C are diagrams that illustrate the wireless performance of an example antenna in return loss and time-domain performance, according to certain embodiments.
Figure 11C:
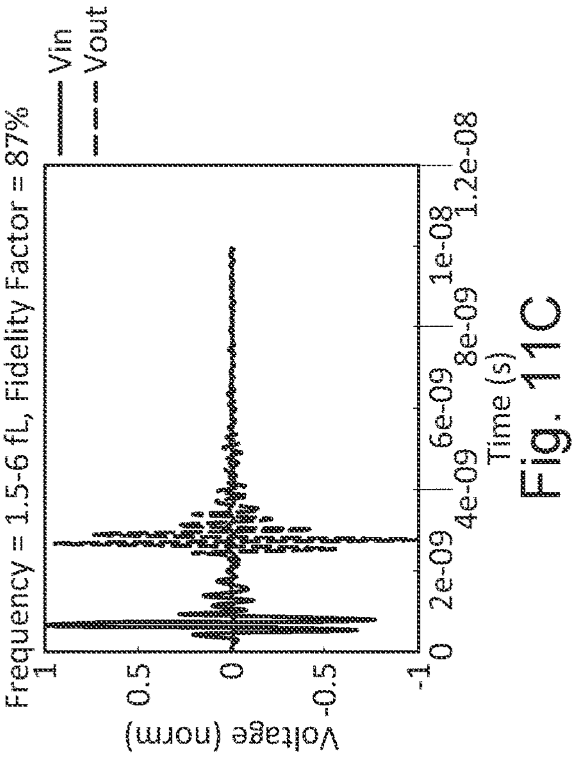
Figure 11A:
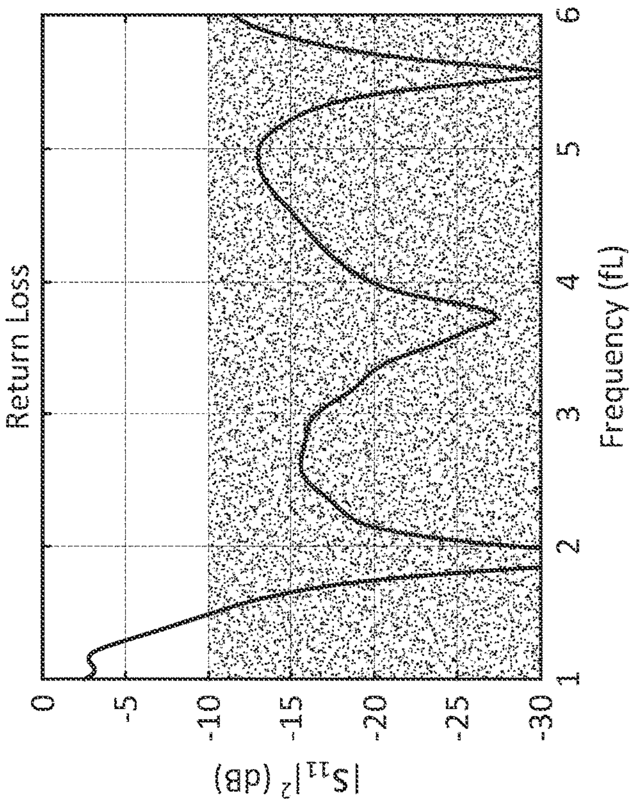
Figure 12A:
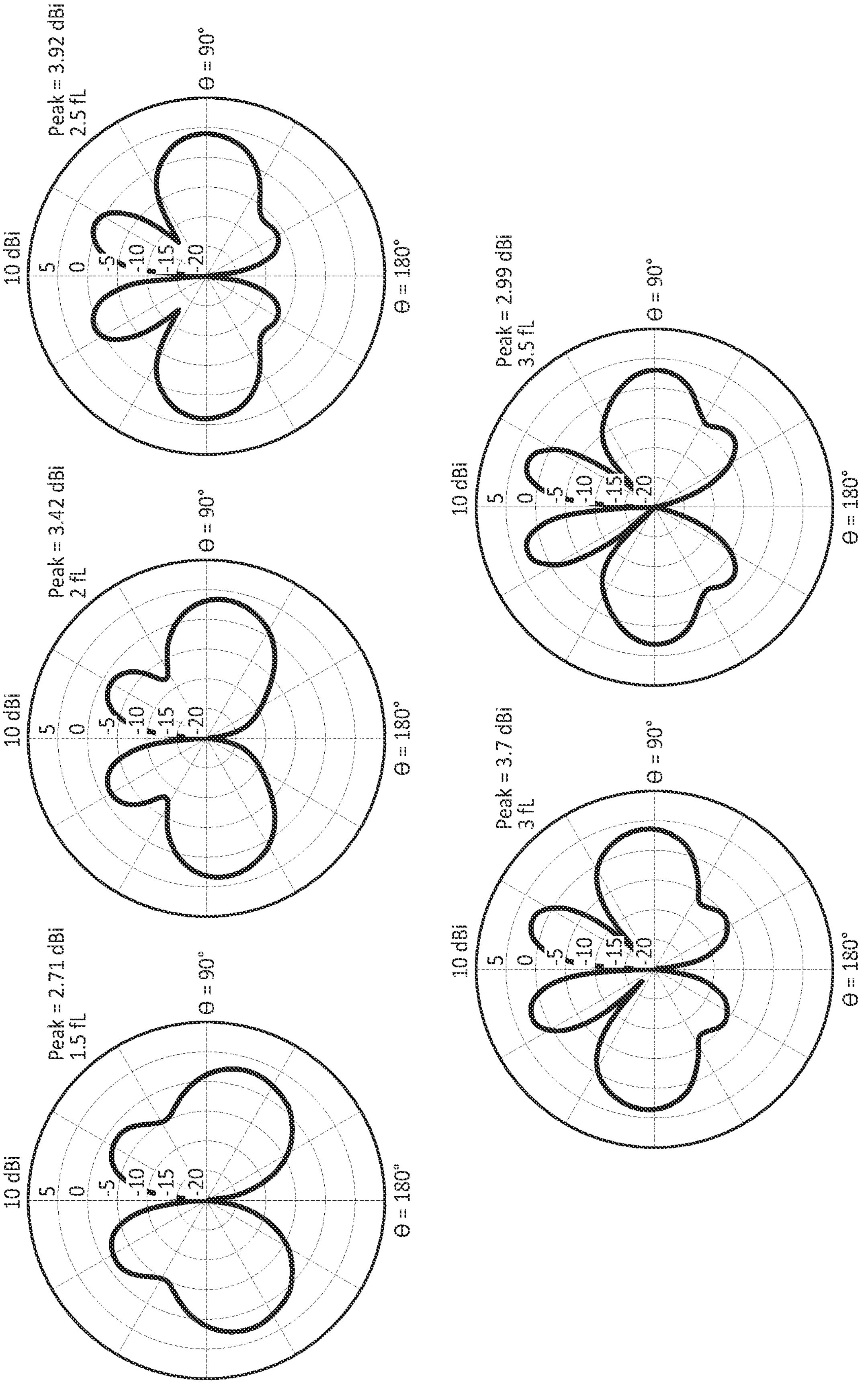
FIGS. 12A-12H are diagrams that illustrate the wireless performance of an example antenna in radiation patterns, according to certain embodiments.
Figure 12B:
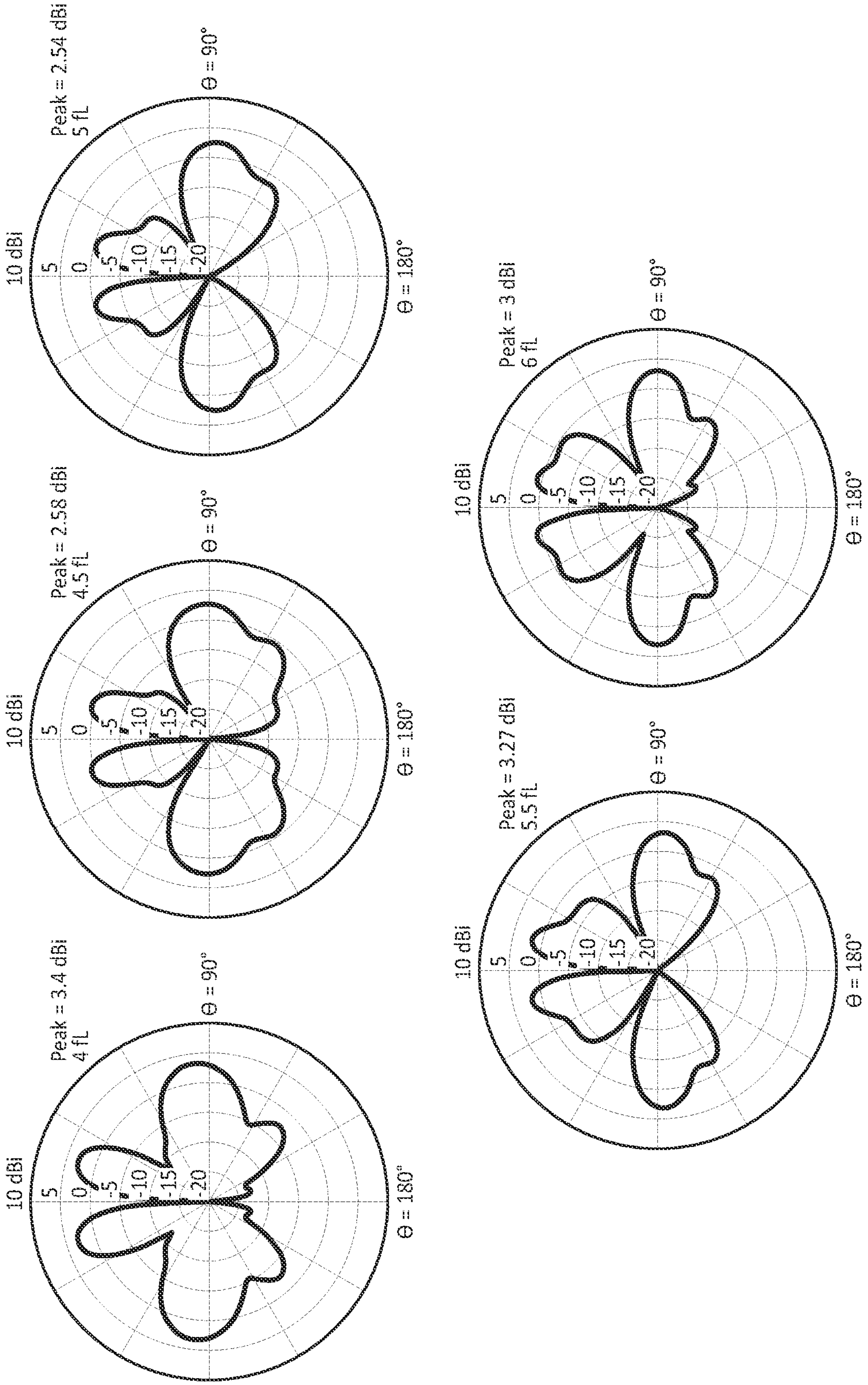
Figure 12C:
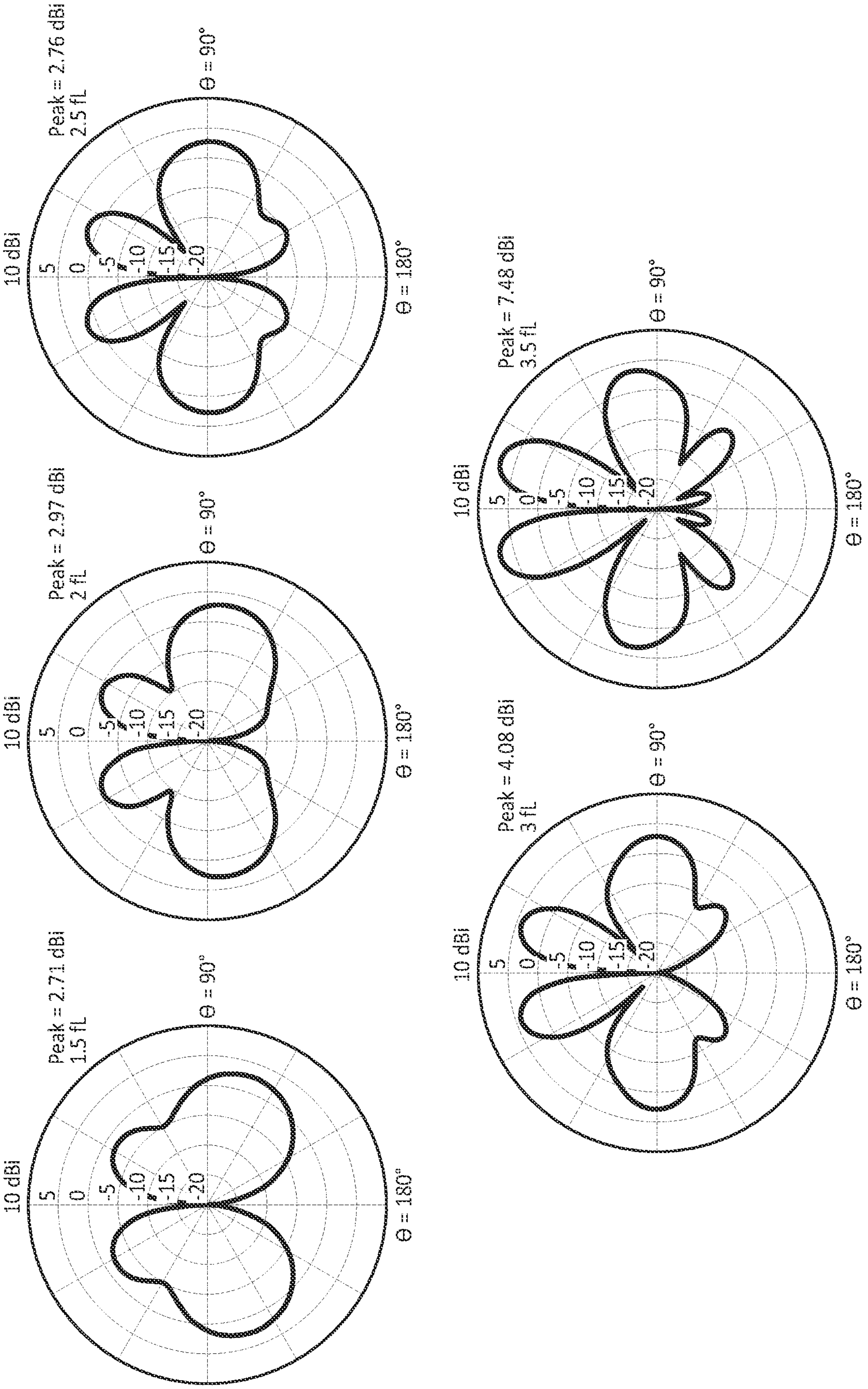
Figure 12D:
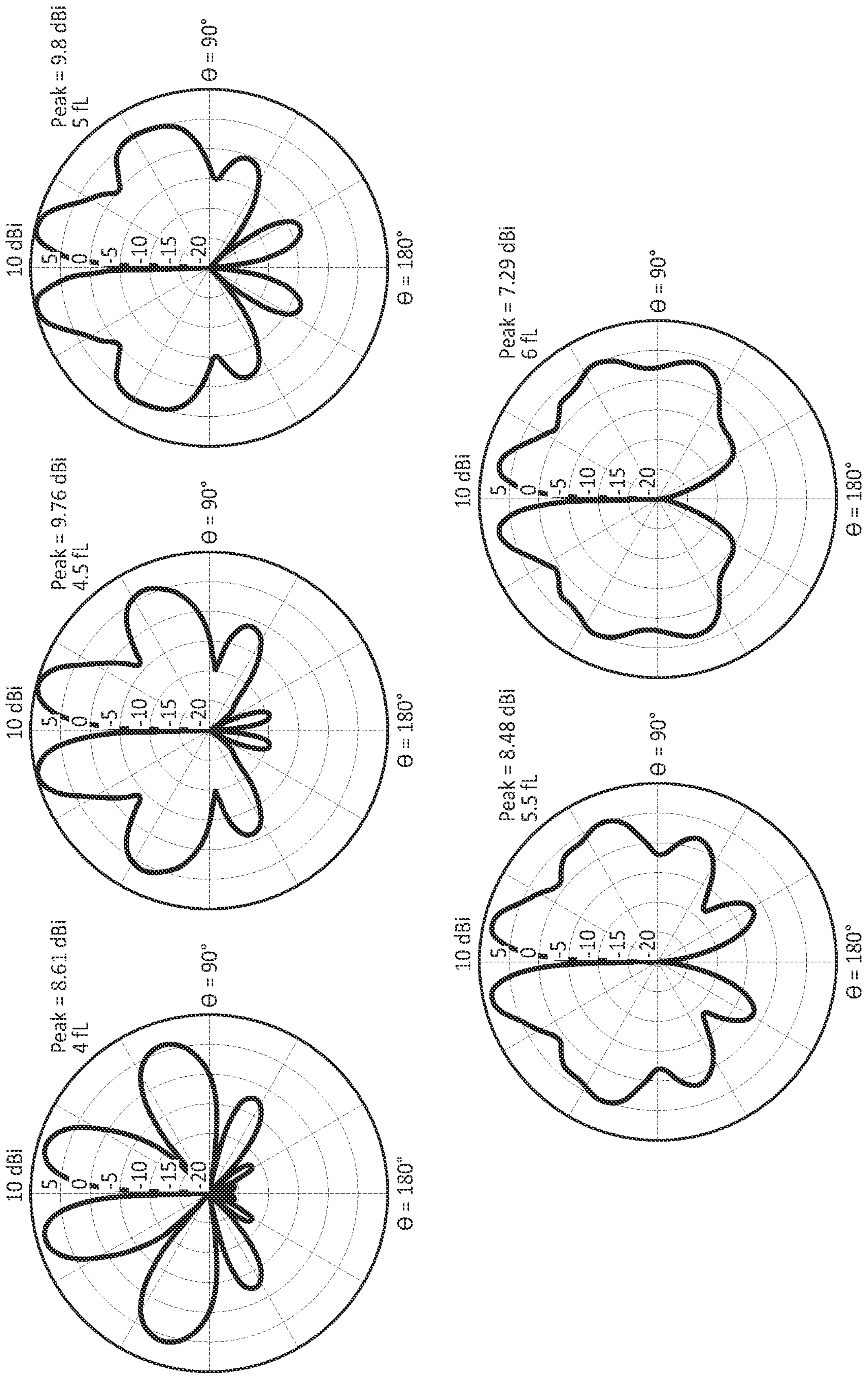
Figure 12E:
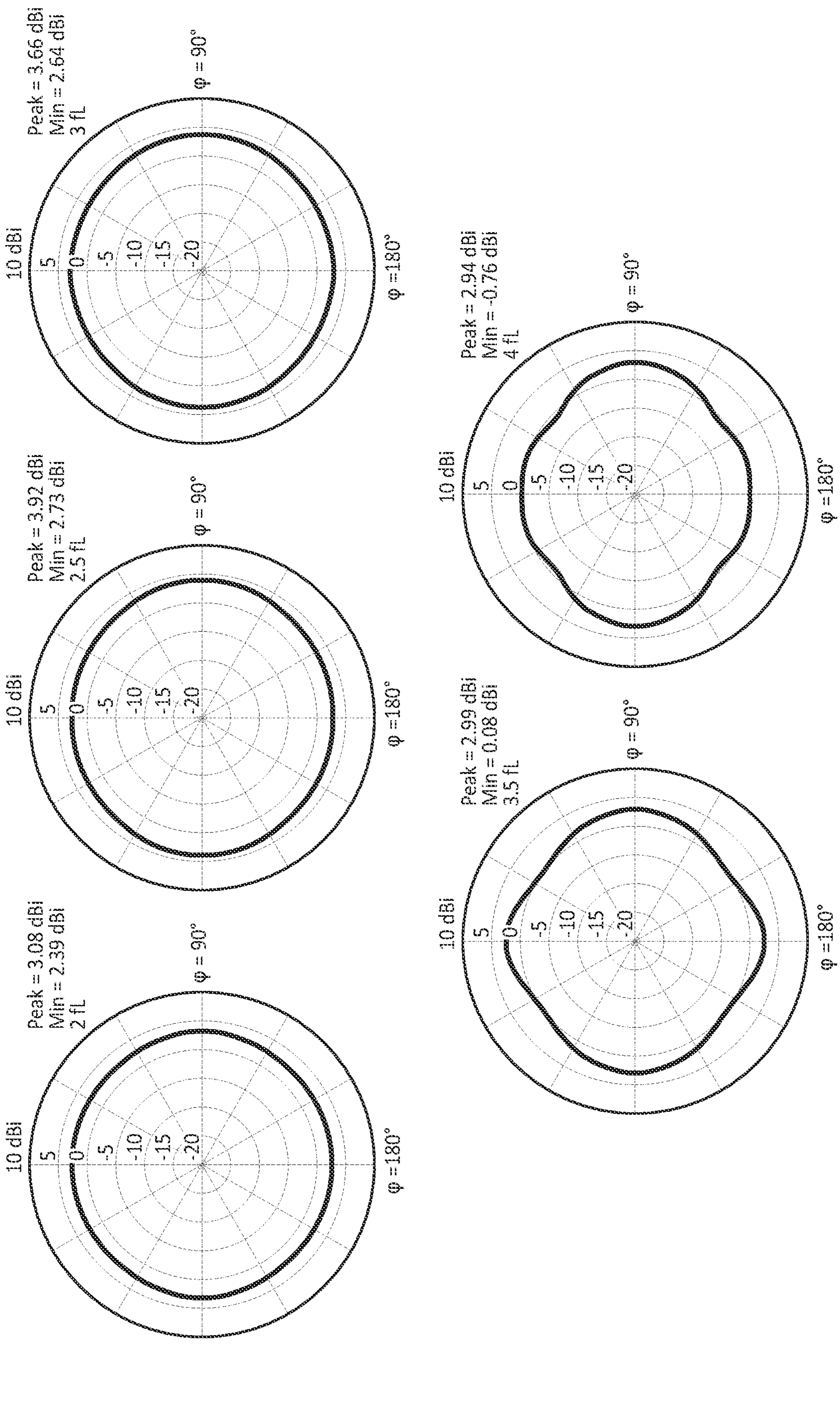
Figure 12F:
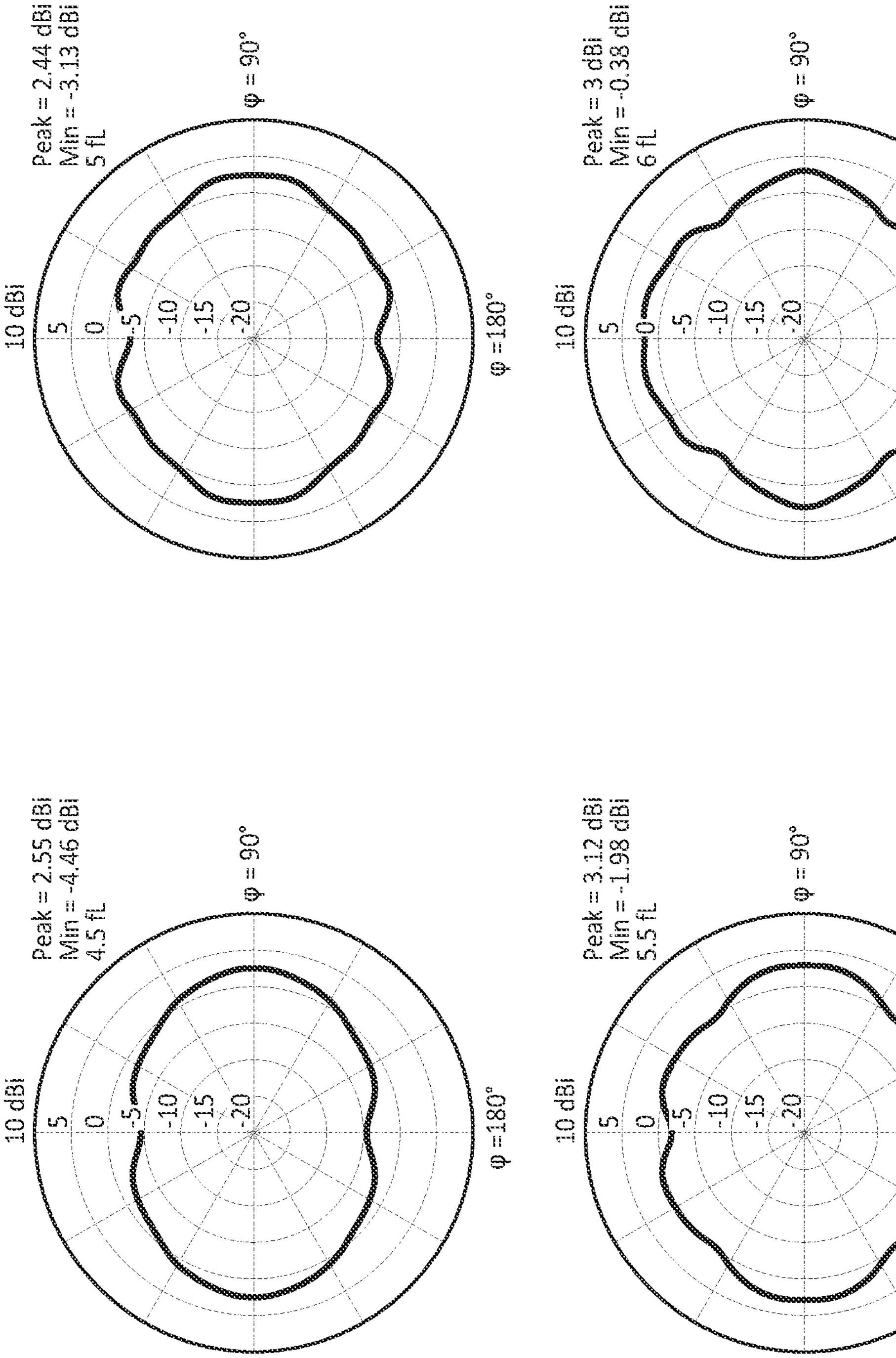
Figure 12G:
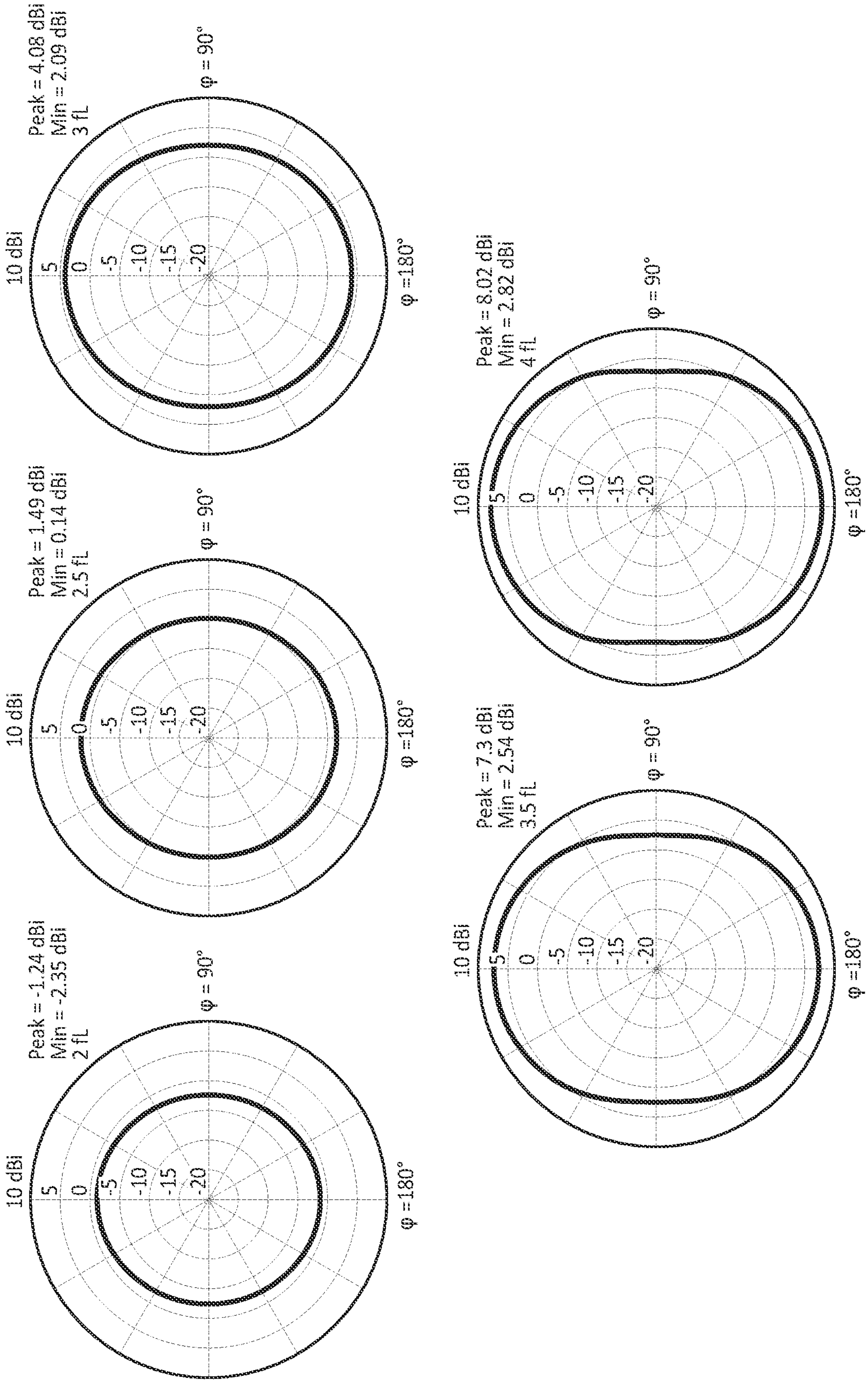
Figure 12H:
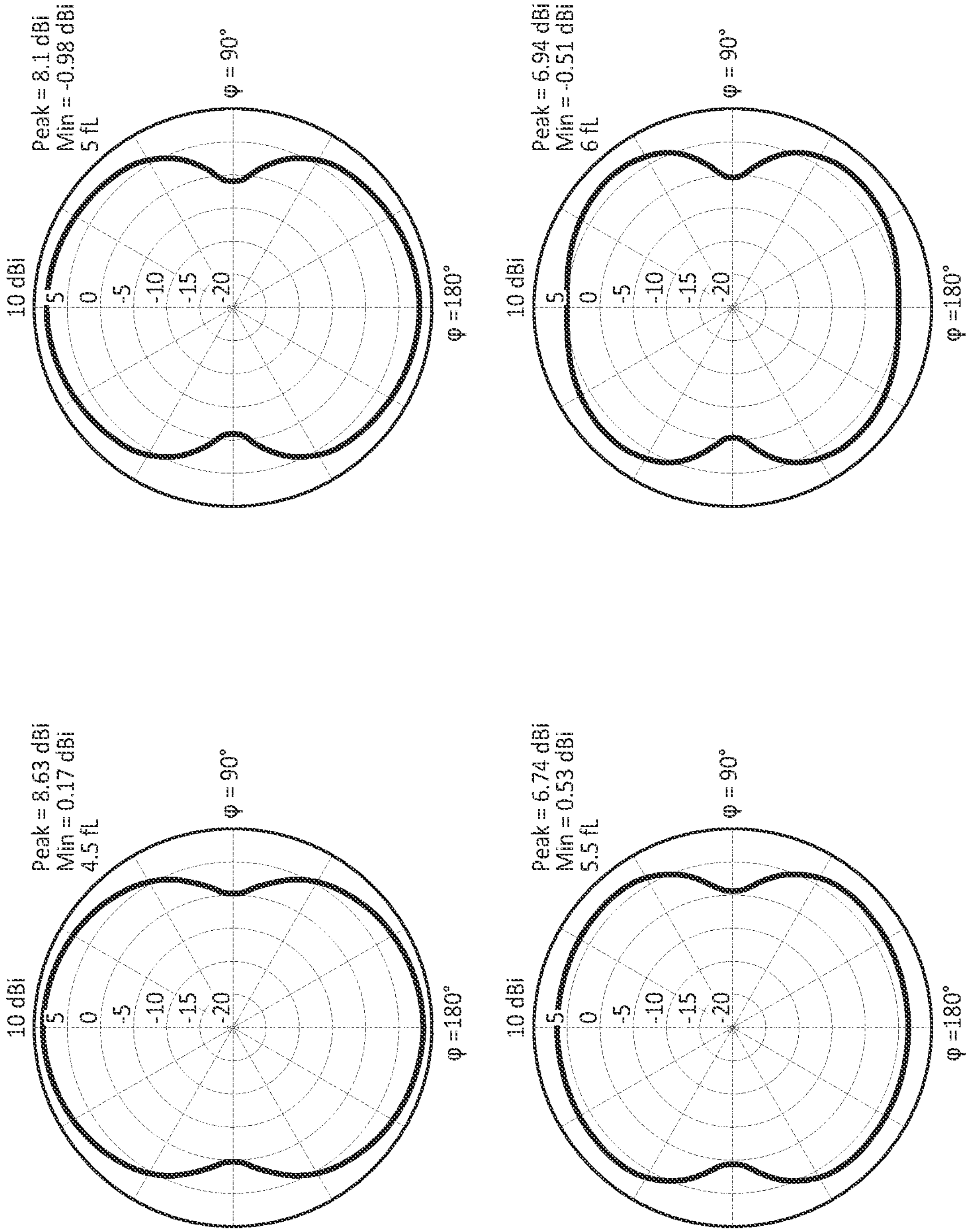

FIG. 11A illustrates return loss of antenna 1000. Antenna 1000 return loss in FIG. 11A is 10 dB or greater across a 1.5-6 fL efficiency bandwidth. Although not shown in FIG. 11A, antenna 1000 maintains return loss exceeding 10 dB up to 12 fL (i.e., from 1.5 fL-12 fL). Although not shown in FIG. 11A, antenna 1000 return loss exceeds 8 dB across a 1.5-12 fL efficiency bandwidth, regardless of the size of the ground plane antenna 1000 is placed over. For all ground plane sizes, return loss is 8 dB or greater across at least an 8:1 bandwidth (1.5-12 fL). Ground plane size does not substantively affect return loss performance above 2 fL (i.e., return loss above 2 lL remains substantially at 8 dB or greater for all ground sizes).

Antenna 1000 is placement insensitive above 1.5 fL to an 8 dB return loss threshold. The ground plane size has no substantial effect on return loss above 8 dB at frequencies above 2 fL, and return loss is substantially 8 dB or greater at frequencies above 1.5 fL regardless of ground plane size. In certain embodiments, ground plane shaping or edge or surface treatment (e.g., with metasurfaces or integrated filters) to remove surface waves or edge diffraction may achieve 10 dB return loss for antenna 1000 across a 6:1 bandwidth over any ground plane size.

FIGS. 11B-11C illustrate exemplary time-domain responses of antenna 1000. FIG. 11B illustrates the time-domain response of antenna 1000 for a wireless signal covering 2-6 fL and transmitted and received in a horizon beam (θ=90°). FIG. 11C illustrates the time-domain response of antenna 1000 for a wireless signal covering 1.5-6 fL and transmitted and received in a conical beam (θ=20°). Table 7 compiles fidelity, in the horizon beam of antenna 1000, for wireless signals across different IBWs. Table 7 compiles fidelity at both φ=0° and φ=90° azimuth angles due to the lack of azimuthal uniformity in antenna 1000's horizon beam. Fidelity at φ=90° is of most interest because gain is maximum at that angle, but antenna 1000 maintains good fidelity in the φ=0° direction as well. Antenna 1000 is capable of instantaneously transmitting or receiving wireless signals across an IBW of at least up to 6:1 (from 1-6 fL) in a horizon beam. Antenna 1000 is also capable of instantaneously transmitting or receiving wireless signals across an IBW of up to 5 fL in various bands in a horizon beam. Antenna 1000 is also capable of instantaneously transmitting or receiving wireless signals across a bandwidth of up to 6:1 by instantaneously transmitting or receiving signals in one or more instantaneous frequency bands, each instantaneous frequency band having an IBW of at least the lowest operating frequency.

TABLE 7

Antenna 1000 Fidelity in a Horizon Beam (θ = 90°)

| Frequency Band | Fidelity Factor (φ = 0°) | Fidelity Factor (φ = 90°) |
|---|---|---|
| 1-2 fL | 99% | 98% |
| 1-4 fL | 82% | 85% |
| 1-6 fL | 73% | 80% |
| 1.5-6 fL | 79% | 85% |
| 2-3 fL | 97% | 98% |
| 2-4 fL | 94% | 95% |
| 2-6 fL | 83% | 86% |
| 3-4 fL | 99% | 94% |
| 3-6 fL | 87% | 91% |
| 4-5 fL | 100% | 99% |
| 4-6 fL | 91% | 96% |
| 5-6 fL | 99% | 99% |

Table 8 compiles fidelity, in the conical beam of antenna 1000, for wireless signals across different IBWs. Although not shown in Table 8, antenna 1000 fidelity for 1 fL bands (e.g. 1-2 fL, 5-6 fL) and 1.5 fL bands (e.g., 1.5-3 fL) exceeds 90%. Antenna 1000 is capable of instantaneously transmitting or receiving wireless signals across an IBW of up to 6:1 (from 1-6 fL) in a conical beam. Antenna 1000 is also capable of instantaneously transmitting or receiving wireless signals across an IBW of up to 5 fL (from 1-6 fL) in a conical beam. Antenna 1000 is also capable of instantaneously transmitting or receiving wireless signals across a bandwidth of up to 6:1 by instantaneously transmitting or receiving signals in one or more instantaneous frequency bands, each instantaneous frequency band having an IBW of at least the lowest operating frequency.

TABLE 8

Antenna 1000 Fidelity in Conical Beam (θ = 20°, φ = 90°)

| Frequency Band | Fidelity Factor (φ = 0°) |
|---|---|
| 1-4 fL | 86% |
| 1-6 fL | 89% |
| 1.5-6 fL | 87% |
| 2-4 fL | 80% |
| 2-6 fL | 86% |
| 3-6 fL | 94% |
| 4-6 fL | 96% |

Collective FIG. 12 illustrates radiation patterns in principal cut planes for antenna 1000 at various frequencies. FIGS. 12A-12B illustrate antenna 1000 radiation patterns in the ZY-plane (φ=90°). Antenna 1000 maintains two modes in the ZY-plane, over a 4:1 pattern bandwidth, one that includes the radiation horizon (a "horizon beam") and the other radiating a conical beam near an elevation angle (θ) of 20° from the axis of radial symmetry. The horizon beam of antenna 1000 is not uniform in azimuth (in contrast to other embodiments) due to the lack of radial symmetry in antenna 1000. FIGS. 12C-12D illustrate radiation patterns in the ZX-plane (φ=0°). As shown in FIGS. 12C-12D, antenna 1000 maintains a conical beam in the ZX-plane, over a 4:1 pattern bandwidth (1.5-6 fL) but maintains a horizon beam over a narrower band due to the lack of radial symmetry in antenna 1000. FIGS. 12E-12F illustrate radiation patterns from 2-6 fL on the horizon (at elevation angle θ=90° from the axis of radial symmetry). Antenna 1000 gain on the horizon at 1.5 fL is substantially uniform at 1.1-1.3 dBi. FIGS. 12G-12H illustrate radiation patterns from 2-6 fL in a conical beam (at elevation angle θ=20° from the axis of radial symmetry). Antenna 1000 gain in the conical beam (i.e., θ=20° cut plane) at 1.5 fL varies from −3.7 at φ=0° to −4.4 dBi at φ=90°.

Antenna 1000 has substantially similar pattern and fidelity characteristics as those described in FIGS. 11-12 and Tables 7-8 with an outer ground plane. Outer ground decreases the lowest operating frequency that meets or exceeds 10 dB and 6 dB return loss, but has little effect on fidelity, patterns, or IBWs. Accordingly, placing antenna 1000, or variants thereof, over larger external ground planes may extend the lowest operating frequency while maintaining pattern and fidelity performance substantially similar to that described herein.

Figure 13A:
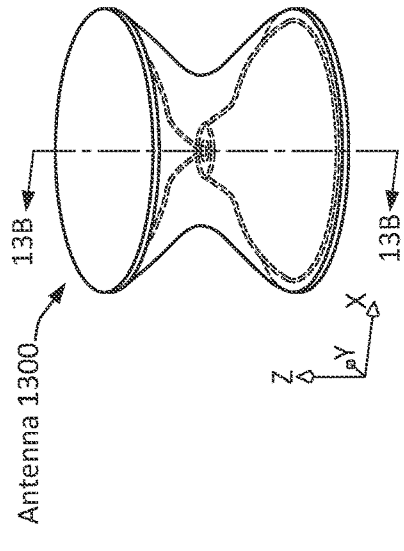
FIGS. 13A-13C are diagrams that illustrate the geometry and features of an example antenna, according to certain embodiments.
Figure 13B:
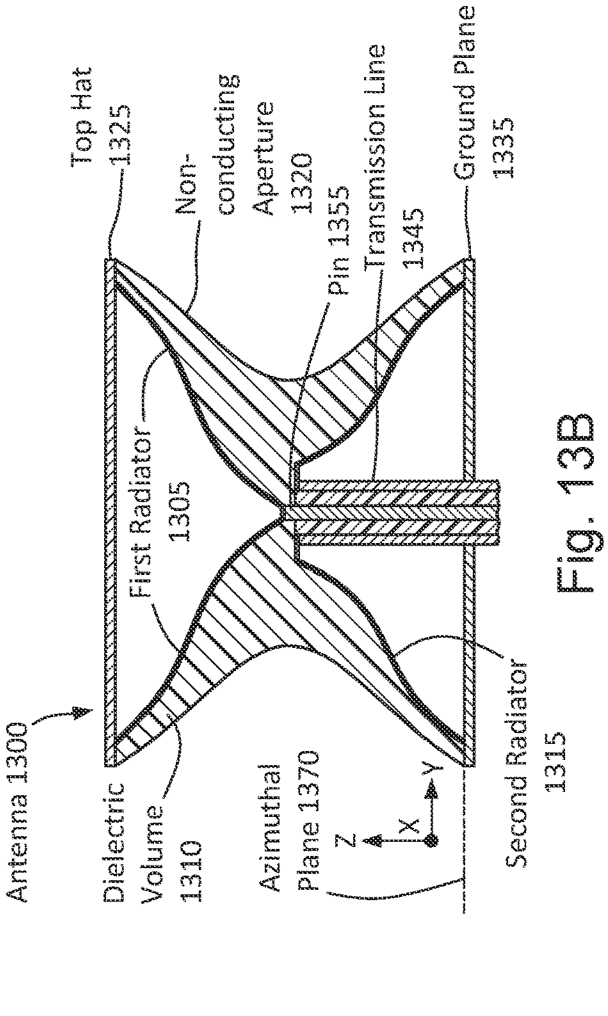
Figure 13C:
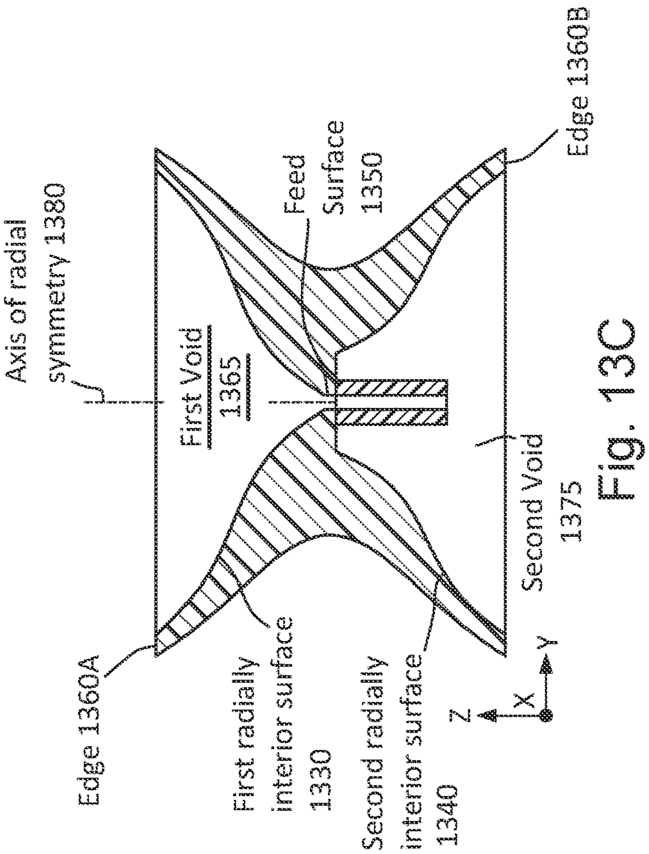
Figure 14A:
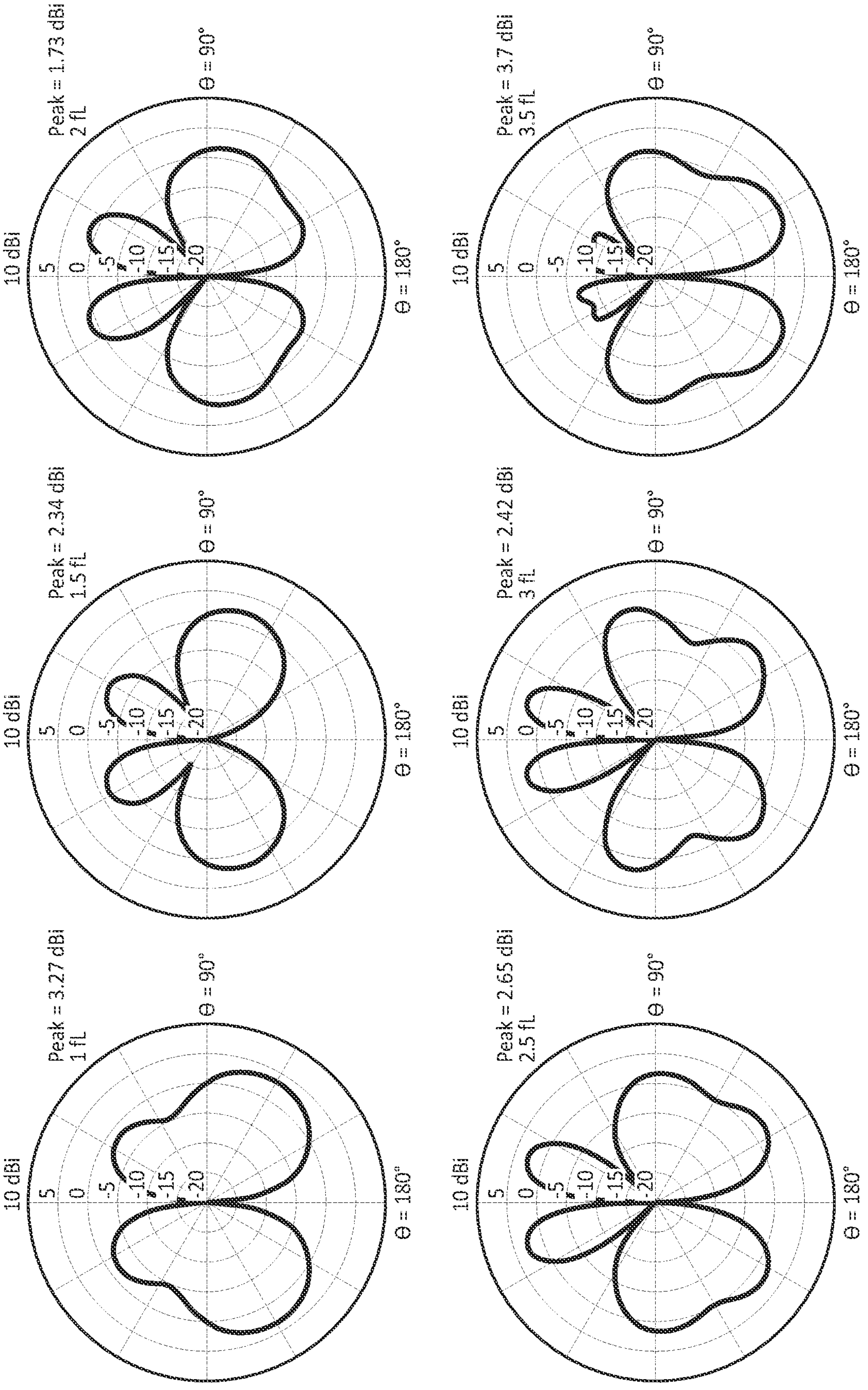
FIGS. 14A-14D are diagrams that illustrate the wireless performance of an example antenna in radiation patterns, according to certain embodiments.
Figure 14B:
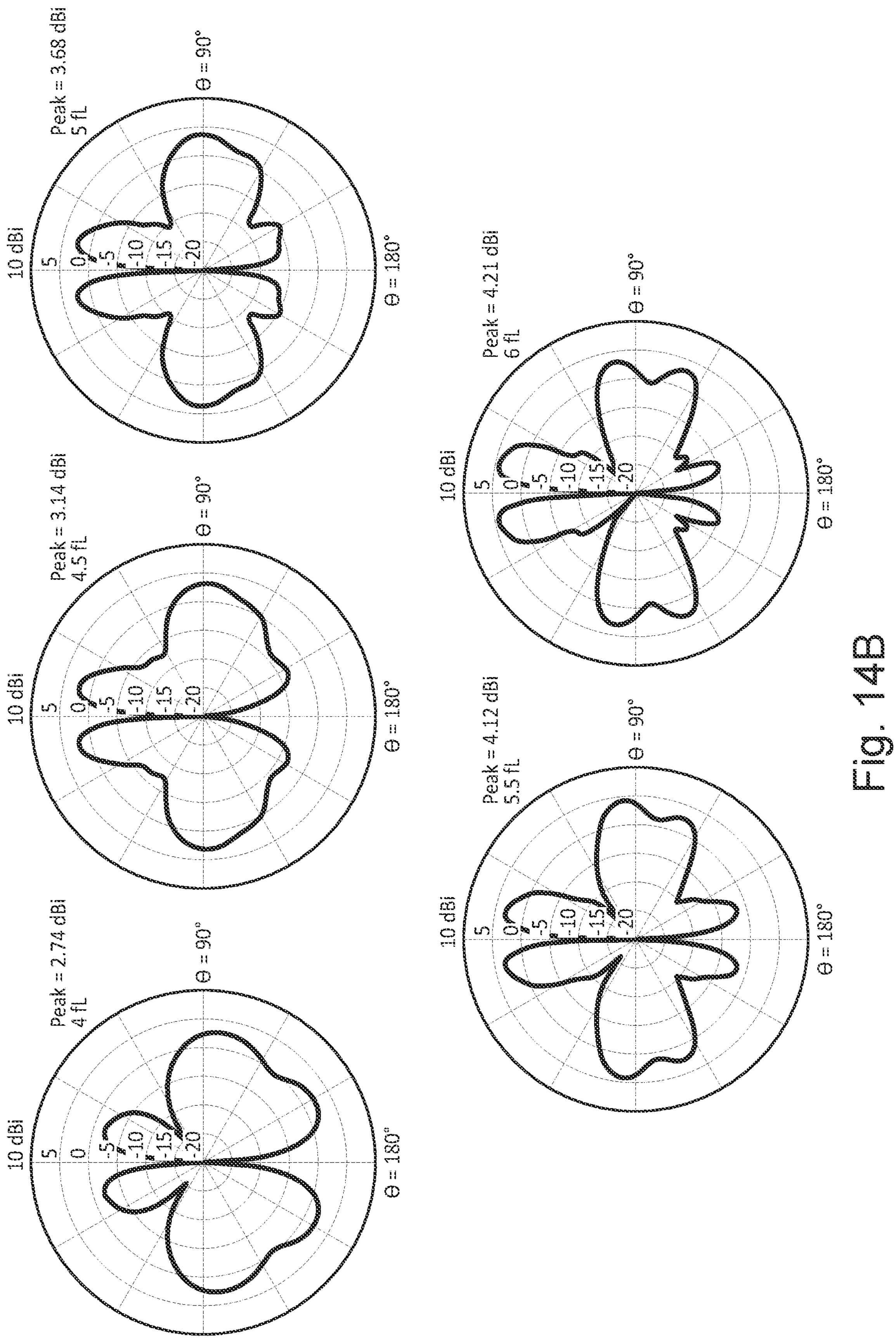
Figure 14C:
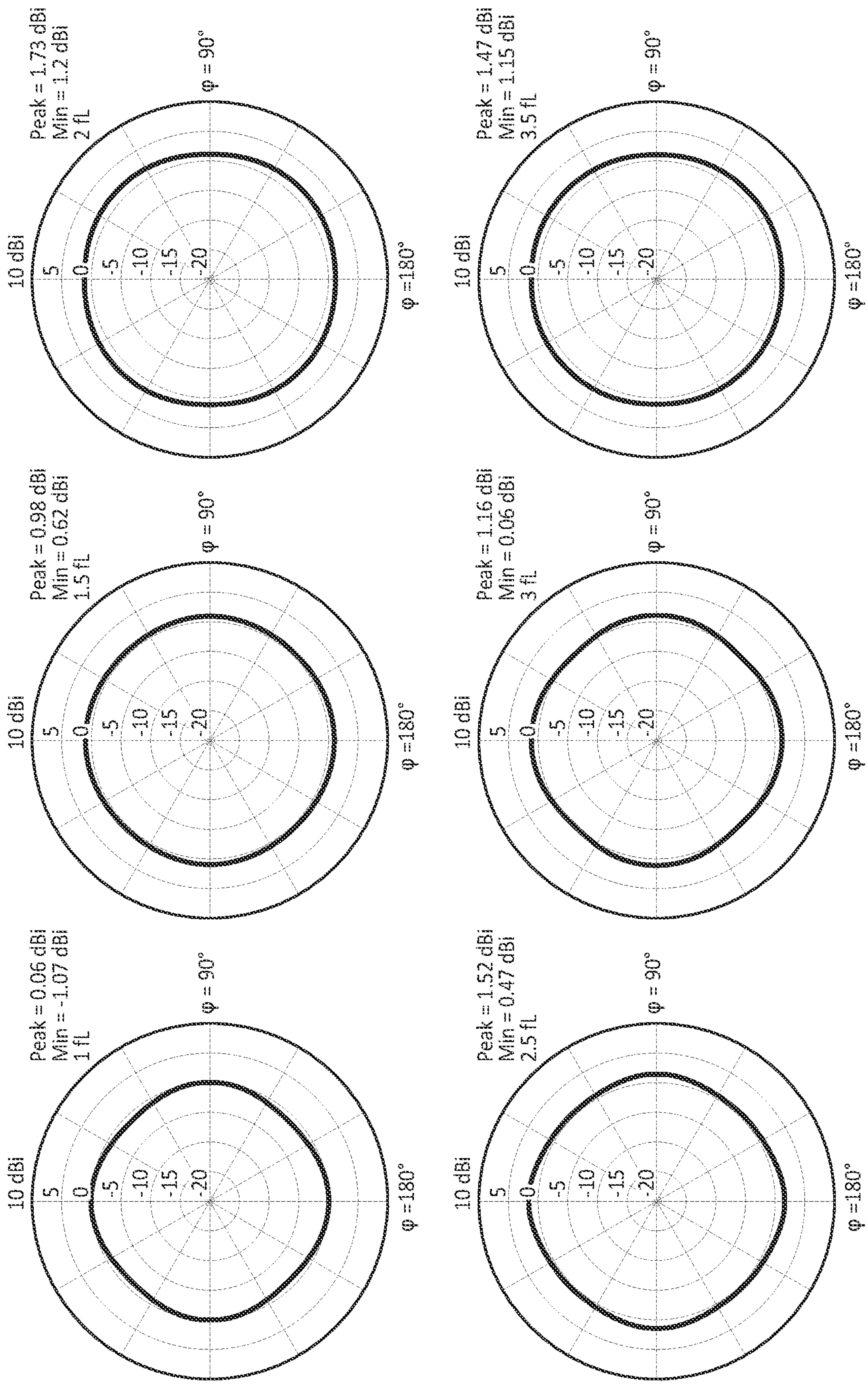
Figure 14D:
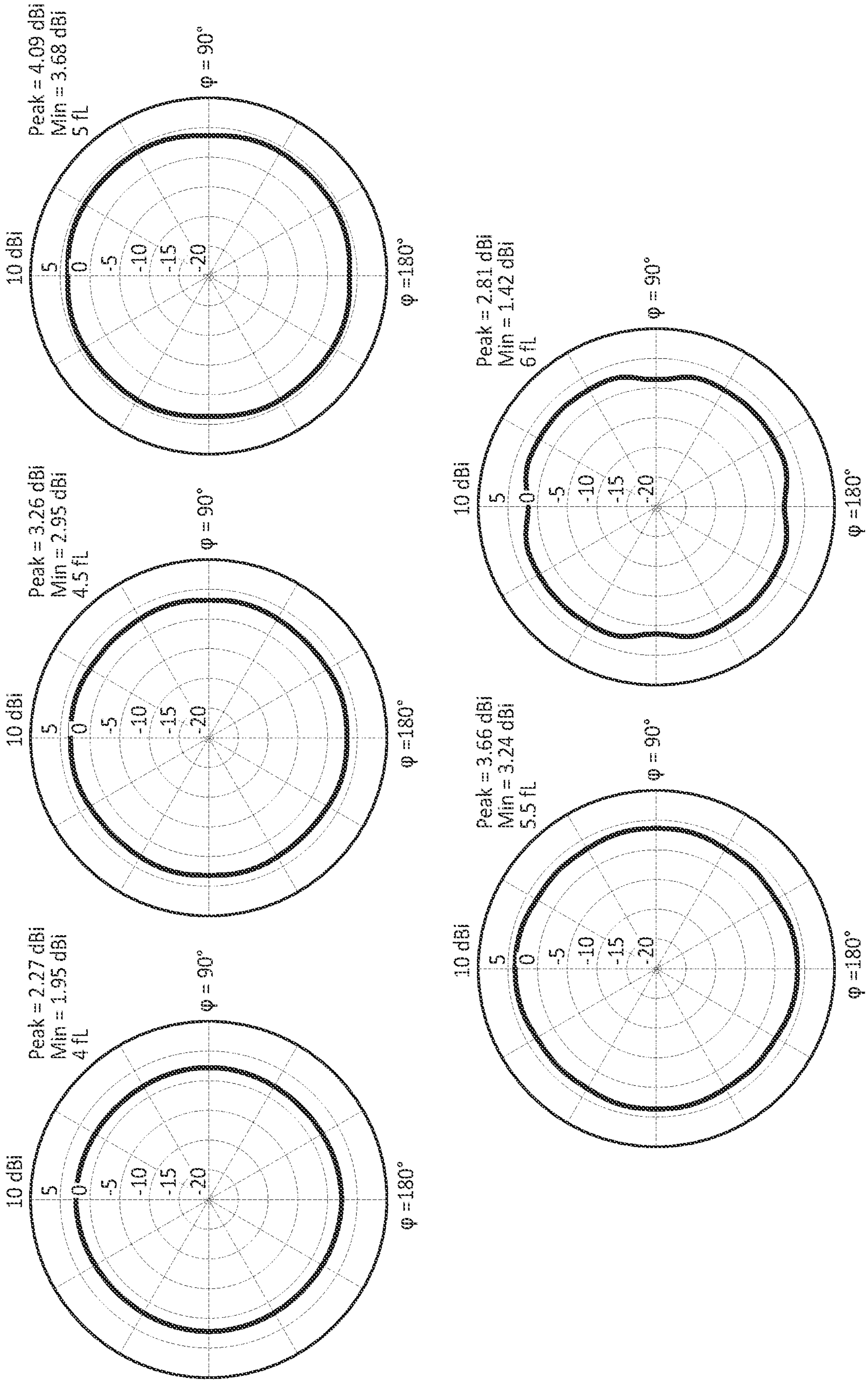

FIGS. 13A-13C illustrate the geometry and features of antenna 1300 in perspective and sectional views. The sectional views of FIGS. 13B-13C are taken through the center of antenna 1300 as shown in FIG. 13A. FIG. 13B is a sectional view of antenna 1300 that includes conducting surfaces and volumes of antenna 1300, and FIG. 13C is a view of the same section that does not include conducting surfaces and volumes. Although FIGS. 13B and 13C illustrate sections in a ZY plane, any elevation-plane section through the center of antenna 1300 (i.e., in any elevation plane θ-r) would yield the same views.

Dielectric volume 1310 may have multiple surfaces, including non-conducting aperture 1320, first radially interior surface 1330, second radially interior surface 1340, one or more feed surfaces 1350, and one or more edges 1360A, 1360B. Dielectric volume 1310 may mate to transmission line 1355. To case reference to various physical features and wireless performance characteristics (particularly radiation patterns), FIGS. 13B-13C also illustrates an azimuthal plane 1370, an axis of radial symmetry 1380 located at the radial center of dielectric volume 1310 (and antenna 1300), and an XYZ coordinate system.

As shown in FIG. 13, dielectric volume 1310 is azimuthally uniform (without variation in φ) such that taking a section in any elevation plane (θ-r plane) yields the view in FIGS. 13B-13C. Rotating the sectional views in FIGS. 13B-13C about axis of radial symmetry 1380 yields a three-dimensional dielectric volume 1310 having multiple surfaces, as shown in FIG. 13A, with each surface in a three-dimensional view corresponding to a curve in the sectional view of FIGS. 13B-13C. Dielectric volume 1310 may be radially symmetric or azimuthally uniform about axis of radial symmetry 1380. Dielectric volume 1310 terminates at its radial interior in a first radially interior surface 1330, second radially interior surface 1340, and one or more feed surfaces 1350. Dielectric volume 1310 terminates at its radial exterior in a non-conducting aperture 1320.

Dielectric volume 1310 terminates at its longitudinal maximum in one or more edges 1360A. FIG. 13 illustrates one edge 1360A at the longitudinal maximum of dielectric volume 1310. Dielectric volume 1310 also terminates at its longitudinal minimum in one or more edges 1360B.

In certain embodiments, dielectric volume 1310 has a maximum radius determined by the maximum radial (ρ) dimension of non-conducting aperture 1320. In certain embodiments, dielectric volume 1310 has a maximum height determined as the longitudinal (Z) distance between the longitudinal maximum (edge 1360A in FIG. 13C) and the longitudinal minimum of dielectric volume 1310 (edge 1360B in FIG. 13C).

As shown in FIG. 13, dielectric volume 1310 is composed of a single, uniform dielectric material. In certain embodiments, a dielectric volume may include one or more voids that do not contain dielectric material. For example, certain volumes in a dielectric volume may be formed by additive manufacturing, with other volumes left as voids during the additive manufacturing process. In certain embodiments, the dielectric volume may contain one or more weep holes to evacuate or backfill one or more voids. In certain embodiments, one or more weep holes may be radially symmetric, azimuthally uniform, or symmetric. For example, to maintain structural integrity of the dielectric volume, a number N weep holes, each separated by 360/N degrees in azimuth, may aid in evacuating N separate voids. In certain embodiments, the inclusion of one or more voids in a dielectric volume does not affect the continuity of conducting surfaces in the dielectric volume. For example, a dielectric unit may contain one or more voids and weep holes that do not intersect first radially interior surface 1330, second radially interior surface 1340, feed surfaces 1350, or any other surfaces that may form a base for a conducting surface.

In certain embodiments, a dielectric volume may be composed of multiple dielectric materials. For example, one or more voids may be backfilled with dielectric material. Including one or more voids in the dielectric volume may reduce weight, control the effective dielectric constant of the antenna, and inhibit or facilitate radiation in different modes. In certain embodiments, the effective dielectric constant may be calculated as a volume-weighted average of the one or more dielectric constants of materials in the dielectric volume. For example, a dielectric volume formed from a material with dielectric constant 2.1 and having air voids (dk=1) in 50% of its volume would have effective dielectric constant $dk_e=(0.5)(2.1)+(0.5)(1)=1.55$. In certain embodiments, one or more voids may be radially symmetric, azimuthally uniform, or symmetric, to facilitate certain features in the antenna radiation pattern, such as or azimuthally uniform beams or greater directivity in a particular direction.

In certain embodiments, the dielectric volume may be formed of one or more materials having dielectric constant from 1.03 to 3.6. In certain embodiments, the dielectric unit may have an effective dielectric constant from 1.4 to 3.6. In certain embodiments for improved structural integrity, the dielectric unit may have an effective dielectric constant from 1.8 to 3.1.

In certain embodiments, the dielectric volume may be formed of a material having specific gravity from 1.02 to 1.38. In certain embodiments the dielectric volume may be formed of a plurality of materials, including a first material having specific gravity from 1.02 to 1.38 and a second material having specific gravity from 0.03 to 0.2.

Non-conducting aperture 1320, located on the radial exterior of dielectric volume 1310, determines the radial maximum of dielectric volume 1310. As shown in FIGS. 13B-13C, non-conducting aperture 1320 extends longitudinally between two edges 1360A, 1360B. Dielectric volume 1310 terminates in free space at non-conducting aperture 1320. In certain embodiments, non-conducting aperture 1320 includes convex, concave, or both convex and concave surfaces. Although not shown in FIG. 13B, in certain embodiments the radial minimum of non-conducting aperture 1320 may exceed the radial maximum of first radiator 1305 or second radiator 1315.

First radially interior surface 1330, located on the radial interior of dielectric volume 1310, may extend longitudinally from one or more feed surfaces 1350 to the longitudinal maximum (e.g., edge 1360A in FIG. 13C) of dielectric volume 1310. In certain embodiments without edges 1360A, 1360B, first radially interior surface 1330 may extend radially from one or more feed surfaces 1350 to the radial maximum (e.g., the radial maximum of non-conducting aperture 1320 in FIG. 13B) of dielectric volume 1310. In certain embodiments, first radially interior surface 1330 includes convex, concave, or both convex and concave surfaces. In certain embodiments, the volume to the radial interior of first radially interior surface 1330 is a void (e.g., free space or air). As discussed further below, in certain embodiments conducting surfaces (e.g., a metal radiator) or dielectric structures (e.g., a dielectric base) may be inserted into the void. In certain embodiments, conducting surfaces may be mated to first radially interior surface 1330 during fabrication of antenna 1300.

Second radially interior surface 1340, located on the radial interior of dielectric volume 1310, may extend longitudinally from one or more feed surfaces 1350 to the longitudinal minimum of dielectric volume 1310. In certain embodiments without edges 1360A, 1360B, second radially interior surface 1340 may extend radially from one or more feed surfaces 1350 to the radial maximum (e.g., the radial maximum of non-conducting aperture 1320 in FIG. 13B) of dielectric volume 1310. In certain embodiments, second radially interior surface 1340 includes convex, concave, or both convex and concave surfaces. In certain embodiments, the volume to the radial interior of second radially interior surface 1340 is a void (e.g., free space or air). As discussed further below, in certain embodiments conducting surfaces (e.g., a metal radiator) or dielectric structures (e.g., a dielectric base) may be inserted into the void. In certain embodiments, conducting surfaces may be mated to second radially interior surface 1340 during fabrication of antenna 1300.

One or more feed surfaces 1350, located on the radial interior of dielectric volume 1310, may extend radially and longitudinally from the radial minimum of dielectric volume 1310 to first radially interior surface 1330, second radially interior surface 1340, or both. In certain embodiments, a feed surface 1350 may extend only longitudinally between first radially interior surface 1330 and second radially interior surface 1340. In certain embodiments, a feed surface 1350 may extend only radially between first radially interior surface 1330 and second radially interior surface 1340. In certain embodiments, one or more feed surfaces 1350 may mate to a transmission line. For example, as shown in FIG. 13C, one or more feed surfaces 1350 may mate to a coaxial connector or cable, such as a bulkhead, thread-in, or flanged coaxial connector or cable.

Dielectric volume 1310 may have one or more edges 1360A, 1360B. As shown in FIG. 13C, dielectric volume 1310 contains one edge 1360A at the longitudinal maximum of dielectric volume 1310 and one edge 1360B at the longitudinal minimum of dielectric volume 1310. In certain embodiments, edges 1360A, 1360B may be included in dielectric volume 1310 to accommodate fabrication tolerances or to provide flat surfaces (e.g., flats parallel to the XY-plane) for mating to other structures, as discussed further below. In certain embodiments dielectric volume 1310 may not contain edges 1360A, 1360B.

As shown in FIG. 13B, azimuthal plane 1370 defines the radiation horizon (θ=90°). In certain embodiments, azimuthal plane 1370 may also define the azimuthal plane (θ=90°, XY) corresponding to an external ground plane.

Axis of radial symmetry 1380 defines the Z-axis around which dielectric volume 1310 is azimuthally uniform or radially symmetric. An azimuthally uniform structure does not vary in azimuth (φ). Dielectric volume 1310 is azimuthally uniform as shown in FIG. 13. In certain embodiments, dielectric volume 1310 may be radially symmetric to achieve certain RF performance characteristics or to facilitate certain fabrication methods.

In certain embodiments, a dielectric unit may be formed from dielectric volume 1310. To form a dielectric unit, a first conducting surface may be disposed on first radially interior surface 1330, a second conducting surface may be disposed on second radially interior surface 1340, or both. Conducting surfaces may also be disposed on one or more feed surfaces 1350 as needed to provide electrical coupling to a transmission line. In certain embodiments the first conducting surface or second conducting surface may also be disposed on one or more edges 1360B. In certain embodiments, forming a dielectric volume (and dielectric unit) as a single, integrated whole enables previously unattainable dielectric compositions and effective RF properties for achieving the wireless performance disclosed herein.

Dielectric volume 1310 may be formed from any fabrication process, materials, or composition of materials described with respect to other dielectric volumes disclosed herein, compatible with the topology of dielectric volume 1310 shown in FIG. 13. Dielectric volume 1310 may be formed by additive manufacturing, machining, injection molding, or similar processes. For example, dielectric volume 1310 may be formed from Ultem® materials in a fused-deposition modeling (FDM) process. As another example, dielectric volume 1310 may be formed in a stereolithography (SLA) process from ABS. As yet another example, dielectric volume 1310 may be formed by machining Teflon.

Surfaces of dielectric volume 1310 may be epoxied, painted, or treated for various applications. In certain embodiments, non-conducting aperture 1320 may be painted. For example, non-conducting aperture 1320 may be painted white, light blue, gray, or a combination of colors to reduce the visual observability of the antenna on airborne or marine platforms. In certain embodiments, surfaces of dielectric volume 1310 may be treated to reduce adhesion of water, dirt, or other substances that may impact structural integrity, lifetime, or wireless performance. In certain embodiments, surfaces of dielectric volume 1310 may be treated to facilitate fabrication of an antenna. For example, first radially interior surface 1330 may be sandblasted or chemically etched to promote adhesion of a first conducting surface to first radially interior surface 1330.

In certain embodiments, dielectric volume 1310 (and any corresponding dielectric unit or antenna) may be scaled in one or more radial dimensions. In certain embodiments, scaling may improve directivity in the direction of a minor radial axis or plane (the axis or plane with a smaller scaling factor) or a major radial axis or plane (the axis or plane with a larger scaling factor). For example, antenna 1300 may have a scaling factor sx=0.8 (i.e., the radial dimension of an azimuthally uniform dielectric volume has been reduced 20% in the X-dimension) and sy=0.4 (i.e., the radial dimension of an azimuthally uniform dielectric volume has been reduced 60% in the Y-dimension), such that the radius of antenna 1300 in the X-dimension is twice the radius of antenna 1000 in the Y-dimension. In certain embodiments, antenna 1300 may be symmetric about the ZX and ZY planes containing an axis of symmetry.

FIG. 13B illustrates a sectional view of antenna 1300 including dielectric volume 1310. As illustrated, antenna 1300 also includes first radiator 1305, second radiator 1315, top hat 1325, ground plane 1335, first void 1365, and second void 1375. As shown in FIG. 13B, first radiator 1305, second radiator 1315, top hat 1325, and ground plane 1335 are conducting elements. Antenna 1300 may be electrically coupled via pin 1355 to transmission line 1345 for the transmission and reception of RF energy.

As shown in FIGS. 13A-13B, the maximum radius of antenna 1300 does not exceed $\lambda_L/6$ and the maximum height of antenna 200 does not exceed $\lambda_L/4$. In certain embodiments, maximum antenna height may be increased to shift the antenna's operating bandwidth to lower frequencies or to improve return loss at frequencies in the lower part of the antenna's operating bandwidth. In certain embodiments, reducing antenna height may improve transmission phase linearity across the antenna's operating bandwidth, reducing distortion and increasing fidelity of instantaneous wideband wireless signals. In certain embodiments, antenna radius may be adjusted to facilitate matching the antenna or to achieve antenna gain at desired frequencies.

First radiator 1305 is located on the radial interior of dielectric volume 1310 and presents a conducting surface at first radially interior surface 1330. First radiator 1305 may also present a conducting surface at one or more edges 1360A between first radially interior surface 1330 and non-conducting aperture 1320. First radiator 1305 may also present a conducting surface at a pin extending from a transmission line coupled to antenna 1300. First radiator 1305 may extend longitudinally from a feed surface 1350 to the longitudinal maximum (e.g., edge 1360A in FIG. 13C) of dielectric volume 1310. In certain embodiments, first radiator 1305 may extend from a center conductor of a transmission line (e.g., a pin extending from the transmission line) to the longitudinal maximum of dielectric volume 1310. First radiator 1305 may be azimuthally uniform or radially symmetric. In certain embodiments, first radiator 1305 may be symmetric. First radiator 1305 may extend radially from an inner conductor of a transmission line to one or more edges 1360A of dielectric volume 1310. In certain embodiments, first radiator 1305 may extend to the maximum radius of dielectric volume 1310 (e.g., to non-conducting aperture 1320 in FIG. 13B). In certain embodiments, first radiator 1305 may include convex, concave, or both convex and concave surfaces.

In certain embodiments, the volume to the radial interior of first radiator 1305 is a void (e.g., free space or air). In certain embodiments dielectric structures (e.g., a dielectric filler) may be inserted into the void to the radial interior of first radiator 1305.

First radiator 1305 may be formed by a machining, additive manufacturing, sintering, stamping, spraying, rolling, or deposition process, or from one or more similar processes. For example, first radiator 1305 may be machined or additively manufactured from a conducting material (e.g., copper or aluminum) such that first radiator 1305 fills the entire volume to the radial interior of first radially interior surface 1330. As another example, first radiator 1305 may be formed without conducting volume by depositing a first conductive surface on first radially interior surface 1330. As yet another example, first radiator 1305 may be formed without conducting volume by stamping a thin conductive sheet and adhering to first radially interior surface 1330. In certain embodiments, forming first radiator 1305 without conducting volume may have the advantage of reducing the size and weight of antenna 1300. In certain embodiments, first radiator 1305 may be formed with conducting volume to partially fill a void to the radial interior of first radially interior surface 1330. For example, first radiator 1305 may be formed by stamping a thick conductive sheet, or by machining or additively manufacturing a conductive material to a certain thickness, and adhering to first radially interior surface 1330. Forming a first radiator 1305 to partially fill a void to the radial interior of first radially interior surface 1330 may have the advantage of presenting conductive surfaces at the maximum longitudinal dimension of antenna 1300 for mating, fastening, or coupling to other structures. For example, first radiator 1305 may be formed with sufficient radial thickness to facilitate conductively epoxying or otherwise coupling a conductive top hat to first radiator 1305. In alternate embodiments, a conductive top hat may be coupled to first radiator 1305 via one or more edges 1360A. For example, a conductive surface may be disposed on edge 1360A to maintain connection with both first radiator 1305 and a top hat. Coupling a metallic top hat to first radiator 1305 may have the advantages of isolating any void radially interior to first radiator 1305 from external environments and preventing current flow on the radial interior of first radiator 1305.

In certain embodiments, first radiator 1305 may be formed by disposing one or more conducting surfaces on a dielectric base. For example, first radiator 1305 may be formed without conducting volume by electroless deposition of copper on a dielectric base. As another example, first radiator 1305 may be formed by stamping one or more conducting sheets and mating the stamped sheet(s) to a dielectric base. Forming first radiator 1305 by disposing conducting surfaces on a dielectric base may have one or more advantages, including reducing antenna size and weight; enhancing structural integrity of first radiator 1305; presenting smooth conducting surfaces to our RF energy passing through a dielectric volume to reduce RF losses; and facilitating nonselective processes for presenting a conducting surface on first radially interior surface 1330. For example, forming a first radiator 1305 on a dielectric base may permit conductive plating of all surfaces on the dielectric base without masking. A dielectric base in first radiator 1305 may be composed of any dielectric material discussed with respect to dielectric volume 1310 or any dielectric material compatible with mating, deposition, and adhesion of conducting surfaces on the dielectric base.

In certain embodiments, first radiator 1305 may be mated to first radially interior surface 1330 during fabrication of an antenna. For example, first radiator 1305 may be machined from a conductive material and epoxied to first radially interior surface 1330. As another example, first radiator 1305 may be formed by electroless deposition of a conductor on a dielectric base, inserted into a void to the radial interior of first radially interior surface 1330 to mate with first radially interior surface 1330, and secured by a dielectric volume and a metallic or dielectric top hat. First radiator 1305 may be formed directly on first radially interior surface 1330. For example, first radiator 1305 may be formed by spraying a conductive ink or dispersion onto first radially interior surface 1330.

In certain embodiments, first radiator 1305 may be electrically coupled to a transmission line. For example, first radiator 1305 may be soldered, welded, or bonded to a pin extending from the center conductor of a transmission line. As another example, a pin extending from the center conductor of a coaxial connector may press fit into first radiator 1305. Coupling first radiator 1305 to a transmission line excites RF currents on first radiator 1305 over a wide bandwidth.

In certain embodiments, first radiator 1305 may be mated to or electrically coupled to a top hat. For example, first radiator 1305 may be secured into dielectric volume 1310 by a dielectric top hat fastened to dielectric volume 1310. As another example, first radiator 1305 may be conductively epoxied at its maximum longitudinal dimension to a conducting top hat that prevents current flow on the radial interior of first radiator 1305.

In certain embodiments, the maximum radial dimension of first radiator 1305 may exceed the minimum radial dimension of non-conducting aperture 1320 (e.g., as shown in FIG. 13B). Reducing the minimum radial dimension of non-conducting aperture 1320 may thin dielectric volume 1310 and provide the advantage of reducing antenna 1300 weight or increasing the operating bandwidth of antenna 1300. In certain embodiments, the maximum radial dimension of non-conducting aperture 1320 may exceed the maximum radial dimension of first radiator 1305 and any edge 1360A on dielectric volume 1310. Increasing the thickness of dielectric volume 1310 may have the advantage of reducing the lowest operating frequency of antenna 1300, improving antenna 1300 return loss near the lowest operating frequency, or controlling radiation pattern gain or azimuthal uniformity at certain frequencies.

Second radiator 1315 is located on the radial interior of dielectric volume 1310 and presents a conducting surface at second radially interior surface 1340. Second radiator 1315 may also present a conducting surface at one or more edges 1360B between second radially interior surface 1340 and non-conducting aperture 1320. Second radiator 1315 may extend longitudinally and radially from one or more feed surfaces 1350 to one or more edges 1360B or to non-conducting aperture 1320. In certain embodiments, second radiator 1315 may extend from an outer conductor of a transmission line (e.g., a shield of a coaxial cable or connector) to the longitudinal minimum of dielectric volume 1310. Second radiator 1315 may be azimuthally uniform or radially symmetric. In certain embodiments, second radiator 1315 may be symmetric. Second radiator 1315 may extend radially from an outer conductor of a transmission line to one or more edges 1360B of dielectric volume 1310. In certain embodiments, second radiator 1315 may extend to the maximum radius of dielectric volume 1310. In certain embodiments, second radiator 1315 includes convex, concave, or both convex and concave surfaces. In certain embodiments, second radiator 1315 may have the same maximum radius as first radiator 1305. In certain embodiments, second radiator 1315 may have a maximum radius that is greater than or less than the maximum radius of first radiator 1305.

In certain embodiments, the volume to the radial interior of second radiator 1315 is a void (e.g., free space or air). In certain embodiments dielectric structures (e.g., a dielectric filler) may be inserted into the void to the radial interior of second radiator 1315.

Second radiator 1315 may be formed according to the same or similar methods, operations, steps, parameters, and principles as first radiator 1305, and may be assembled or integrated into antenna 1300 according to the same or similar methods, operations, steps, parameters, and principles as first radiator 1305.

In certain embodiments, second radiator 1315 may be electrically coupled to a transmission line. For example, second radiator 1315 may be soldered, welded, or bonded to an outer conductor of a transmission line. As another example, a conducting surface of second radiator 1315 may serve as the outer conductor of a transmission line (e.g., a conducting surface of second radiator 1315 may mate to a dielectric "candlestick" extending from a coaxial connector). Coupling second radiator 1315 to a transmission line excites RF currents on second radiator 1315 over a wide bandwidth.

In certain embodiments, second radiator 1315 may be mated to or electrically coupled to a ground plane. For example, second radiator 1315 may be secured into dielectric volume 1310 by a ground plane fastened to dielectric volume 1310. As another example, second radiator 1315 may be conductively epoxied at its minimum longitudinal dimension to a conducting ground plane that prevents current flow on the radial interior of second radiator 1315.

In antenna 1300, RF energy propagates between the first conductive surface presented by first radiator 1305 and the second conductive surface presented by second radiator 1315. RF energy propagates between these two conductive surfaces from a transmission line through dielectric volume 1310 to non-conducting aperture 1320 (transmission) and from non-conducting aperture 1320 through dielectric volume 1310 to a transmission line (reception).

In certain embodiments, the maximum radial dimension of second radiator 1315 may exceed the minimum radial dimension of non-conducting aperture 1320 (e.g., as shown in FIG. 13B). In certain embodiments, the maximum radial dimension of non-conducting aperture 1320 may exceed the maximum radial dimension of second radiator 1315 and any edge 1360B on dielectric volume 1310.

Top hat 1325, as shown in FIG. 13B, is a conductive surface located at the longitudinal maximum of antenna 1300. Top hat 1325 may extend from axis of radial symmetry 1380 to the radial maximum of dielectric volume 1310. In certain embodiments, top hat 1325 may extend past the longitudinal maximum of dielectric volume 1310. In certain embodiments, top hat 1325 may be sufficiently thin that the height of antenna 1300 is near identical to the height of dielectric volume 13. For example, the height of both antenna 1300 containing top hat 1325 and dielectric volume 1310 may not exceed $0.22\lambda_L$. Top hat 1325 may be electrically coupled to first radiator 1305 and to any conductive surface disposed on edge 1360A at the longitudinal maximum of dielectric surface 1310. In certain embodiments, top hat 1325 may be a dielectric, rather than conductive, material.

Top hat 1325 may isolate first radiator 1305 and any void to the radial interior of first radiator 1305 from external environments. In certain embodiments, top hat 1325 may secure first radiator 1305. For example, top hat 1325 may be fastened, epoxied, screwed, or bolted to dielectric volume 1310, preventing first radiator 1305 from moving longitudinally or radially. In certain embodiments, top hat 1325 may be secured to dielectric volume 1310. In certain embodiments, top hat 1325 may be secured to first radiator 1305. For example, top hat 1325 may be fastened to first radiator 1305, a machined copper volume, with one or more conductive screws or bolts.

In certain embodiments, top hat 1325 may be integrated with first radiator 1305. For example, top hat 1325 and first radiator 1305 may be machined from a single block of conducting material. In certain embodiments, top hat 1325 may be part of a larger platform onto which antenna 1300 is installed. For example, top hat 1325 may be a conducting surface of a tower or mast that antenna 1300 is installed onto.

Ground plane 1335, as shown in FIG. 13B, is a conductive surface located at the longitudinal minimum of antenna 1300. Ground plane 1335 may extend from axis of radial symmetry 1380 to the radial maximum of dielectric volume 1310. In certain embodiments, ground plane 1335 may extend past the longitudinal maximum of dielectric volume 1310. Ground plane 1335 may be electrically coupled to second radiator 1315 and to any conductive surface disposed on edge 1360B at the longitudinal minimum of dielectric surface 1310.

Ground plane 1335 may isolate second radiator 1315 and any void to the radial interior of second radiator 1315 from external environments. In certain embodiments, ground plane 1335 may secure second radiator 1315. For example, ground plane 1335 may be fastened, epoxied, screwed, or bolted to dielectric volume 1310, preventing second radiator 1315 from moving longitudinally or radially. In certain embodiments, ground plane 1335 may be secured to dielectric volume 1310. In certain embodiments, ground plane 1335 may be secured to second radiator 1315. For example, ground plane 1335 may be fastened to second radiator 1315, a machined copper volume, with one or more conductive screws or bolts.

In certain embodiments, ground plane 1335 may be integrated with second radiator 1315. For example, ground plane 1335 and second radiator 1315 may be stamped from a single sheet of conducting material. In certain embodiments, ground plane 1335 may be part of a larger platform onto which antenna 1300 is installed. For example, ground plane 1335 may be the conducting roof of a vehicle.

Transmission line 1345 may be any suitable transmission line for transmission and reception of RF energy. An inner or signal conductor of transmission line 1345 may be electrically coupled to first radiator 1305. An outer or ground conductor of transmission line 1345 may be electrically coupled to second radiator 1315, ground plane 1335, or both. For example, the outer conductor of a coaxial cable may be soldered to second radiator 1315 at a feed surface 1350 and also be soldered to ground plane 1335 at the longitudinal minimum of antenna 1300. As another example, second radiator 1315 and ground plane 1335 may have been formed as a single conducting sheet or volume, such that coupling transmission line 1345 to second radiator 1315 also couples to ground plane 1335. Transmission line 1345 may include a transmission-line dielectric that separates an inner or signal conductor from an outer or ground conductor of the transmission line. In certain embodiments, a transmission-line dielectric may mate to one or more feed surfaces 1350 of a dielectric volume. In certain embodiments, transmission line 1345 may be azimuthally uniform or radially symmetric. In certain embodiments, transmission line 1345 may couple antenna 1300 to a transceiver. In certain embodiments, transmission line 1345 may extend longitudinally through ground plane 1335. For example, transmission line 1345 may extend through ground plane 1335 to connect to a transceiver that ground plane 1335 shields from antenna 1300 or that is physically remote from antenna 1300.

Pin 1355, centered on axis of radial symmetry 1380, may extend longitudinally from transmission line 1345 to first radiator 1305. In certain embodiments, a radial exterior of pin 1355 may mate to one or more feed surfaces 1350. In certain embodiments, pin 1355 electrically couples first radiator 1305 to transmission line 1345. First radiator 1305 may be soldered, welded, or bonded to pin 1355. As another example, pin 1355 may press fit into first radiator 1305. In certain embodiments, pin 1355 may extend longitudinally into or through first radiator 1305. For example, pin 1355 may extend longitudinally through first radiator 1305 and be soldered to the radial interior of first radiator 1305 such that the solder joint is accessible in a void to the radial interior of first radiator 1305. Coupling first radiator 1305 to transmission line 1345 via pin 1355 excites RF currents on first radiator 1305 over a wide bandwidth.

First void 1365, as shown in FIG. 13C, fills the volume to the radial interior of first radially interior surface 1330. In certain embodiments, first radiator 1305 may be inserted into first void 1365 to present a conducting surface at first radially interior surface 1330. For example, first radiator 1305 may be machined from a conducting volume, inserted into first void 1365, and epoxied to first radially interior surface 1330.

In certain embodiments, first void 1365 may be filled, partially or entirely, with dielectric material. For example, first radiator 1305 may be disposed onto first radially interior surface 1330, and first void 1365 to the radial interior of first radiator 1305 may be filled with dielectric to protect or isolate the radial interior of first radiator 1305 from external environments. In certain embodiments, first radiator 1305 may fill first void 1365 partially or entirely. For example, first radiator 1305 may be stamped from a thick sheet of conducting material such that first radiator 1305 partially fills first void 1365. In certain embodiments in which first radiator 1305 is formed without conducting volumes, first radiator 1305 may not fill first void 1365.

Second void 1375, as shown in FIG. 13C, fills the volume to the radial interior of second radially interior surface 1340. In certain embodiments, second radiator 1315 may be inserted into second void 1375 to present a conducting surface at second radially interior surface 1340. In certain embodiments, second radiator 1315 may also present a conducting surface at the radial maximum of transmission line 1345. In certain embodiments, second radiator 1315 also presents a conducting surface at one or more feed surfaces 1350. For example, second radiator 1315 may be machined from a conducting volume, inserted into second void 1375, and epoxied to second radially interior surface 1340.

In certain embodiments, second void 1375 may be filled, partially or entirely, with dielectric material. For example, second radiator 1315 may be disposed onto second radially interior surface 1340 and mated to transmission line 1345, and second void 1375 to the radial interior of second radiator 1315 may be filled with dielectric to protect or isolate transmission line 1345 or the radial interior of second radiator 1315 from external environments. In certain embodiments, second radiator 1315 may fill second void 1375 partially or entirely. For example, second radiator 1315 may be stamped from a thick sheet of conducting material such that second radiator 1315 partially fills second void 1375. In certain embodiments in which second radiator 1315 is formed without conducting volumes, second radiator 1315 may not fill second void 1375. In certain embodiments, transmission line 1345 may partially fill second void 1375.

Antenna 1300 may be formed according to any methods, operations, steps, parameters, and principles for forming antenna 200, antenna 500, antenna 800, or antenna 1000 that are compatible with the topology of antenna 1300 as shown in FIG. 13. Antenna 1300 may be formed according to any methods, operations, steps, parameters, and principles compatible with the structure, components, elements, configurations, features, interfaces, or parameters of first radiator 1305, dielectric volume 1310, second radiator 1315, top hat 1325, and ground plane 1335. Antenna 1300 may be formed of the same or similar materials as other antennas described herein.

In certain embodiments, antenna 1300 may be formed without conducting volumes. For example, first radiator 1305 may be formed by disposing a first conducting surface on a first dielectric base and second radiator 1315 may be formed by disposing a second conducting surface on a second dielectric base, such that antenna 1300 assembled from first radiator 1305, second radiator 1315, and dielectric volume 1310 has no conducting volumes. As another example, first radiator 1305 may be formed by disposing a first conducting surface on a first dielectric base and second radiator 1315 may be stamped from a thin conducting sheet, such that antenna 1300 assembled from first radiator 1305, second radiator 1315, and dielectric volume 1310 has no conducting volumes.

In certain embodiments, antenna 1300 may be formed from a dielectric unit without conducting volumes. For example, antenna 1300 may be formed by electroless deposition of copper on first radially interior surface 1330, second radially interior surface 1340, and one or more edges 1360A, 1360B to form a dielectric unit. In certain embodiments, one or more surfaces of dielectric volume 1310 may be masked or treated to control the location of conducting surfaces on a dielectric unit. For example, non-conducting aperture 1320 and one or more feed surfaces may be partially or completely masked such that masked surfaces remain non-conducting after disposing conducting surfaces on dielectric volume 1310.

In certain embodiments, antenna 1300 may not have top hat 1325 or ground plane 1335. In certain embodiments, antenna 1300 may be formed from integrating first radiator 1305 and top hat 1325 or from integrating second radiator 1315 and ground plane 1335. For example, second radiator 1315 and ground plane 1335 may be machined from a single conducting volume and mated to a dielectric unit that includes dielectric volume 1310 and first radiator 1305 electrolessly deposited on first radially interior surface 1330. As another example, first radiator 1305 and top hat 1325 may be stamped from a single sheet of conducting material and epoxied onto first radially interior surface 1330 and one or more edges 1360A, 1360B of dielectric volume 1310.

In contrast to antenna 200, antenna 500, antenna 800, and antenna 1000, all of which are not symmetric in the Z-dimension, antenna 1300 may be described as having near longitudinal symmetry. Antenna 1300 is not entirely symmetric in the Z-dimension due to one or more feed surfaces 1350 that render dielectric volume 1310 asymmetric. But antenna 1300 has certain symmetric or near-symmetric features in the Z-dimension, such as non-conducting aperture 1320, top hat 1325 vis-à-vis ground plain 1335, and first radiator 1305 vis-à-vis second radiator 1315. Near longitudinal symmetry in antenna 1300 may have the advantage of increasing gain and azimuthal uniformity in radiation patterns near the horizon ($\theta=90°$).

Figure 15:
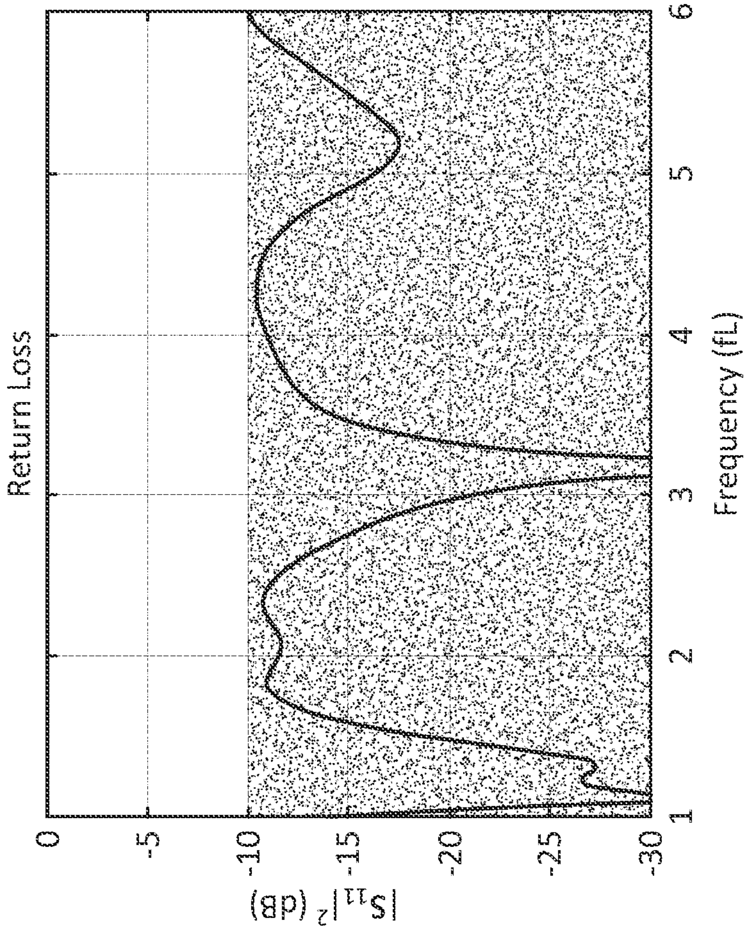
FIG. 15 is a diagram that illustrates the wireless performance of an example antenna in return loss performance, according to certain embodiments.

Collective FIG. 14 and FIG. 15 summarize wireless performance of antenna 1300[9]—including radiation pattern and return loss performance—over a 6:1 bandwidth.

[9] The performance shown in FIGS. 14-15 is for antenna 1300 with a ground plane having the same maximum radius as a second radiation 1315. Coupling antenna 1300 to a ground plane exceeding the radius of antenna 1300 may improve return loss at lower frequencies and increase peak fain while maintaining low distortion performance.

Collective FIG. 14 illustrates radiation patterns of antenna 1300 in elevation (ZY or ZX) and azimuth (XY) planes. As shown in the elevation cuts of FIGS. 14A-14B, antenna 1300 maintains a horizon beam including the radiation horizon (θ=90°) over a frequency band of 1-6 fL. In certain embodiments, antenna 1300 may transmit and receive a beam including the horizon across a pattern bandwidth of 6:1. FIGS. 14C-14D illustrate radiation patterns of antenna 1300 in the azimuth plane (XY, θ=90°) from 1-6 fL. Antenna 1300 azimuth plane patterns are substantially uniform in azimuth over a 6:1 pattern bandwidth (from 1-6 fL), with a maximum variation of ±0.7 dB at 6 fL.

Antenna 1300 return loss in FIG. 15 exceeds 10 dB across a 6:1 efficiency bandwidth (1-6 fL). Although not shown in FIG. 15, antenna 1300 return loss exceeds 5 dB across a 6:1 efficiency bandwidth, regardless of the size of the external ground plane antenna 1300 is placed over. Ground plane size does not substantively affect return loss performance above 2 fL (i.e., return loss above 2 fL remains substantially 10 dB or greater for all ground sizes). Accordingly, antenna 1300 is placement insensitive above 2 fL to a 10 dB return loss threshold. In certain embodiments, ground plane shaping or edge or surface treatment (e.g., with metasurfaces or integrated filters) to remove surface waves or edge diffraction may achieve 10 dB return loss for antenna 1300 across a 6:1 bandwidth over any ground plane size.

As shown in Table 9, the fidelity of wireless signals transmitted or received by antenna 1300 in the frequency band of 1-6 fL exceeds 90%. In certain embodiments, antenna 1300 may instantaneously transmit and receive wireless signals across a single instantaneous bandwidth of up to 6:1. In certain embodiments, antenna 1300 may transmit and receive wireless signals across a 6:1 bandwidth, wherein the 6:1 bandwidth comprises a plurality of instantaneous frequency bands, each instantaneous frequency band having a bandwidth that meets or exceeds a lowest operating frequency.

TABLE 9

Antenna 1300 Fidelity in a Horizon Beam (θ = 90°)

| Frequency Band | Fidelity Factor |
|---|---|
| 1-2 fL | 96% |
| 1-3 fL | 92% |
| 1-4 fL | 94% |
| 1-5 fL | 91% |
| 1-6 fL | 92% |
| 2-3 fL | 98% |
| 2-4 fL | 94% |
| 2-5 fL | 92% |
| 2-6 fL | 91% |
| 3-4 fL | 98% |
| 3-5 fL | 96% |
| 3-6 fL | 94% |
| 4-5 fL | 99% |
| 4-6 fL | 94% |
| 5-6 fL | 99% |

Antenna 1300 may be configured to obtain desirable wireless performance—such as that illustrated in Table 9 and FIGS. 14-15—including small antenna size, wide efficiency bandwidth (a bandwidth over which return loss meets or exceeds a metric, such as 6 dB or 10 dB), wide instantaneous bandwidth (IBW), and wide pattern bandwidth (a bandwidth over which radiation patterns meet or exceed a metric, such as maintaining a certain gain threshold, a conical beam, or a horizon beam). For example, antenna 1300 topology facilitates determining the positions, profiles, dimensions, and interactions of first radiator 1305, second radiator 1315, and non-conducting aperture 1320 to maximize efficiency bandwidth, IBW, pattern bandwidth, and the overlap between efficiency bandwidth, IBW, and pattern bandwidth. Similar antenna embodiments disclosed herein also facilitate determining positions, profiles, dimensions, and interactions of antenna features to obtain wide IBW, efficiency, and pattern performance.

Figure 16A:
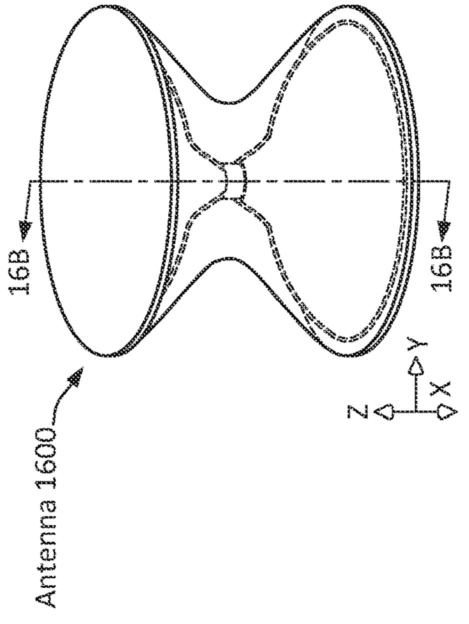
FIGS. 16A-16C are diagrams that illustrate the geometry and features of an example antenna, according to certain embodiments.
Figure 16B:
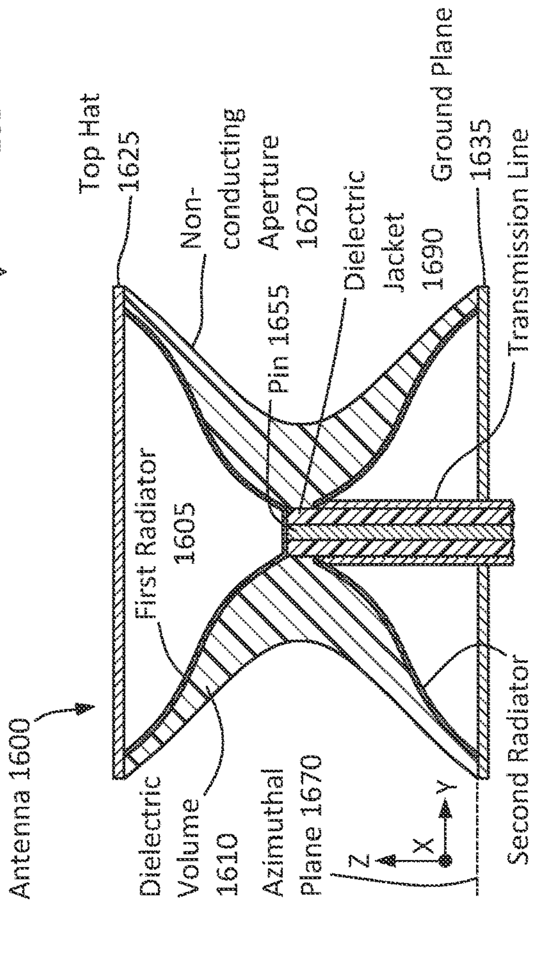
Figure 16C:
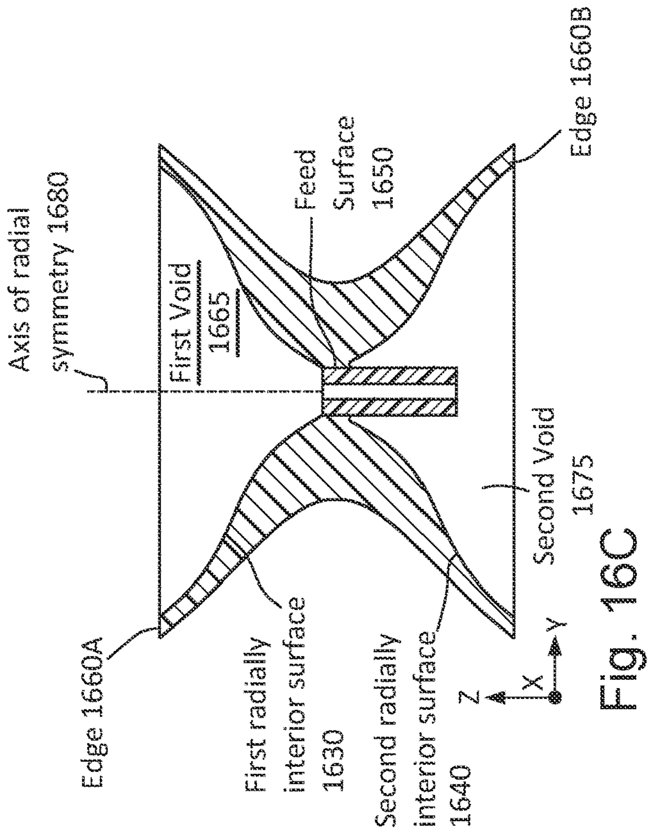
Figure 17A:
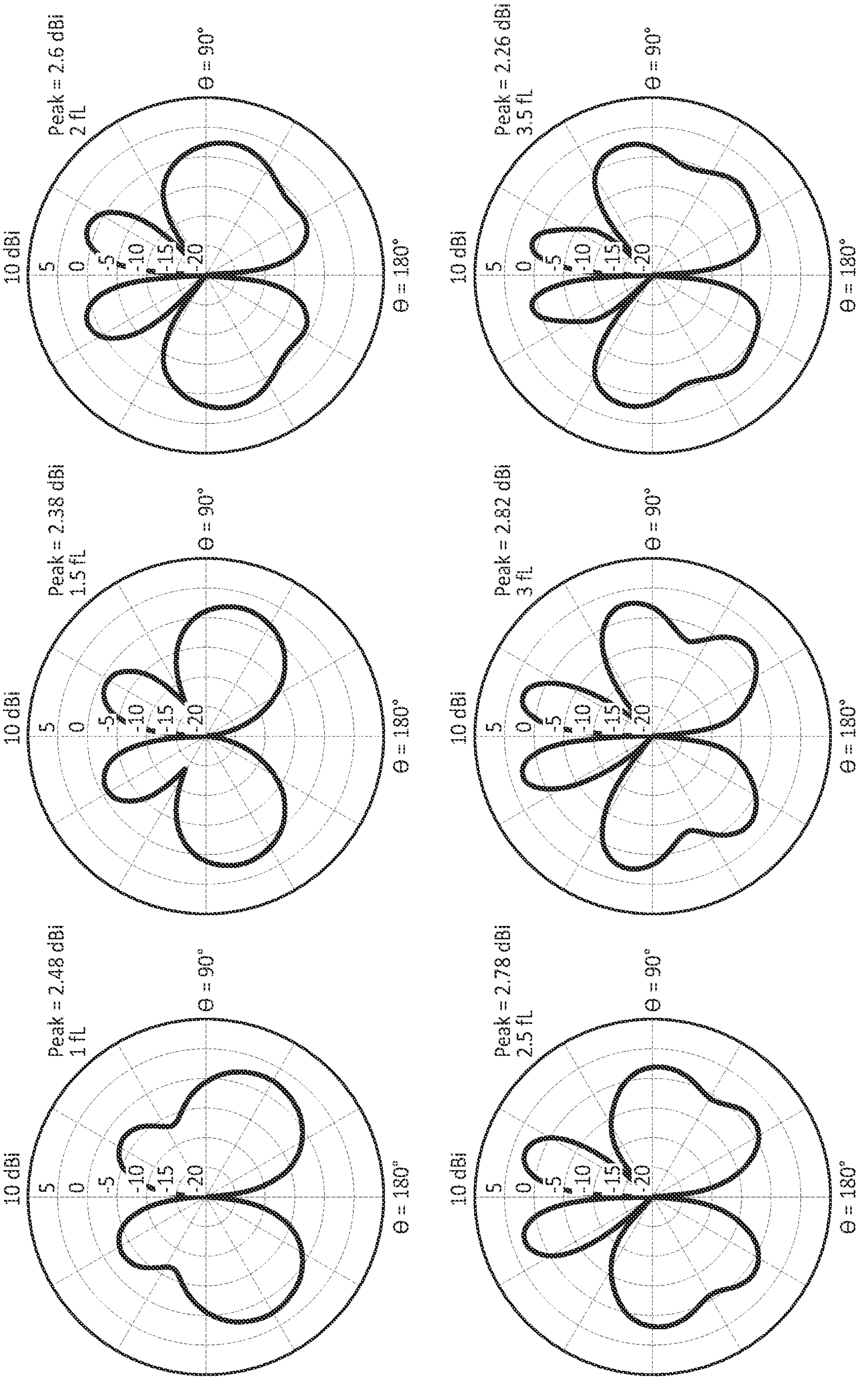
FIGS. 17A-17D are diagrams that illustrate the wireless performance of an example antenna in radiation patterns, according to certain embodiments.
Figure 17B:
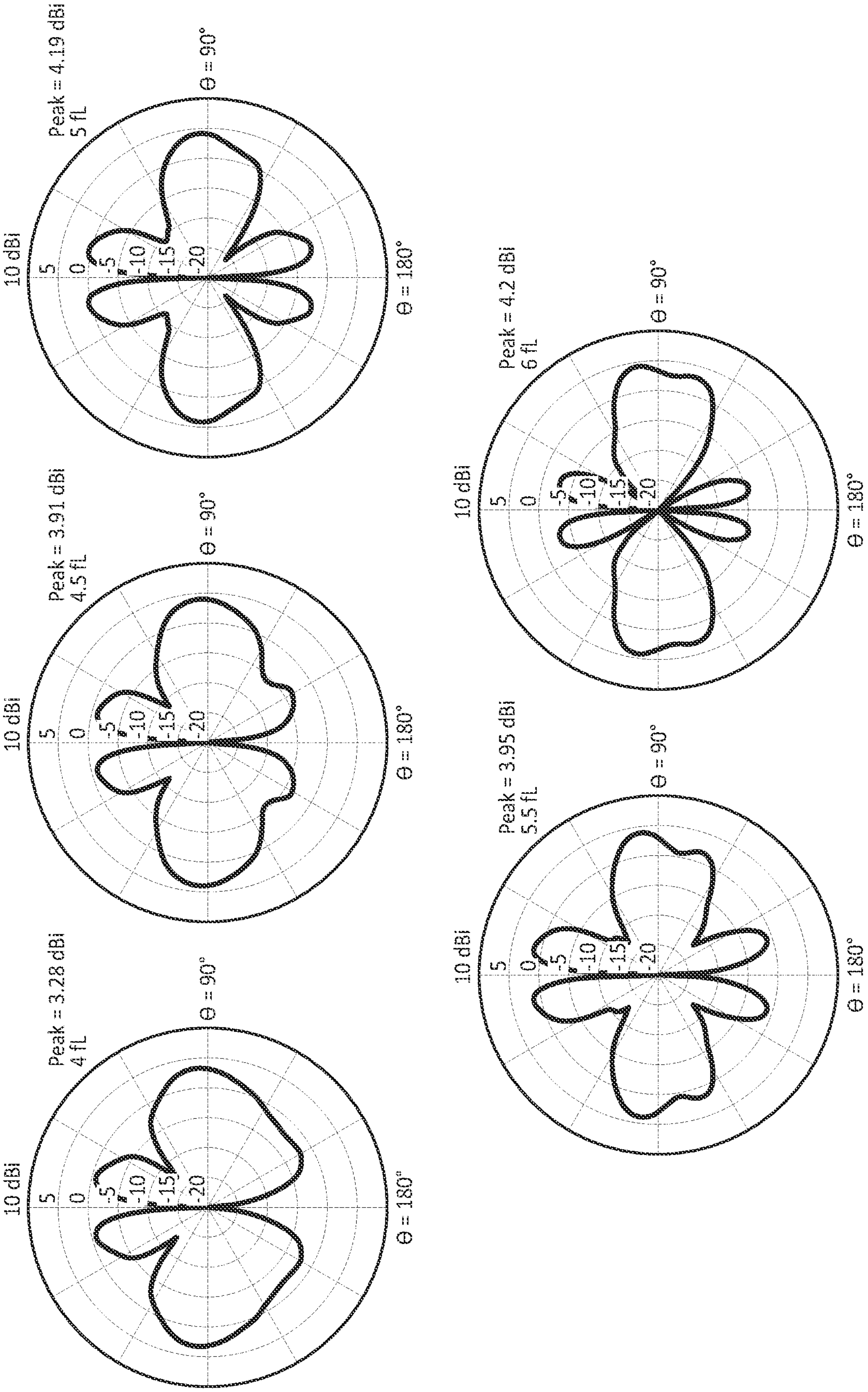
Figure 17C:
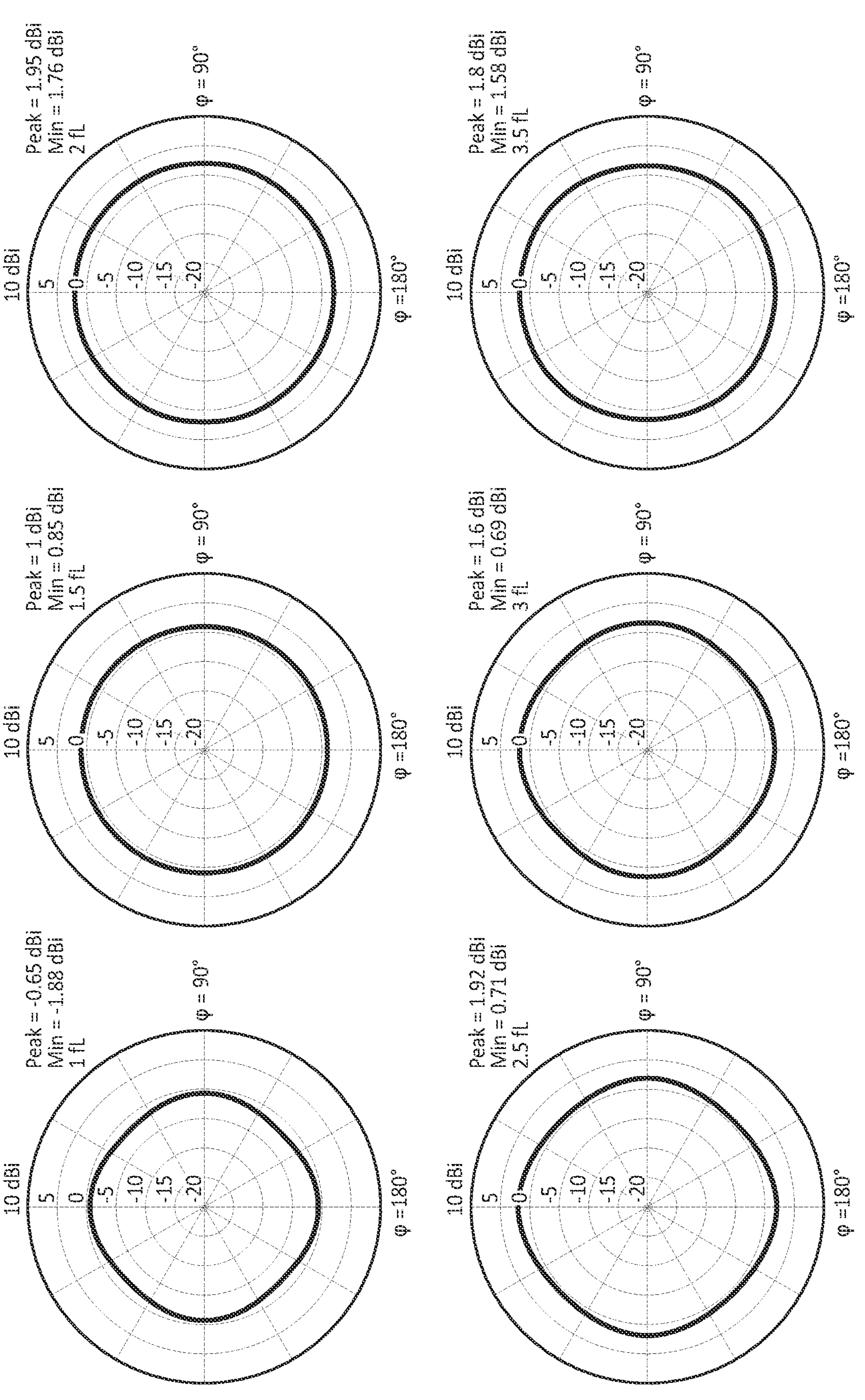
Figure 17D:
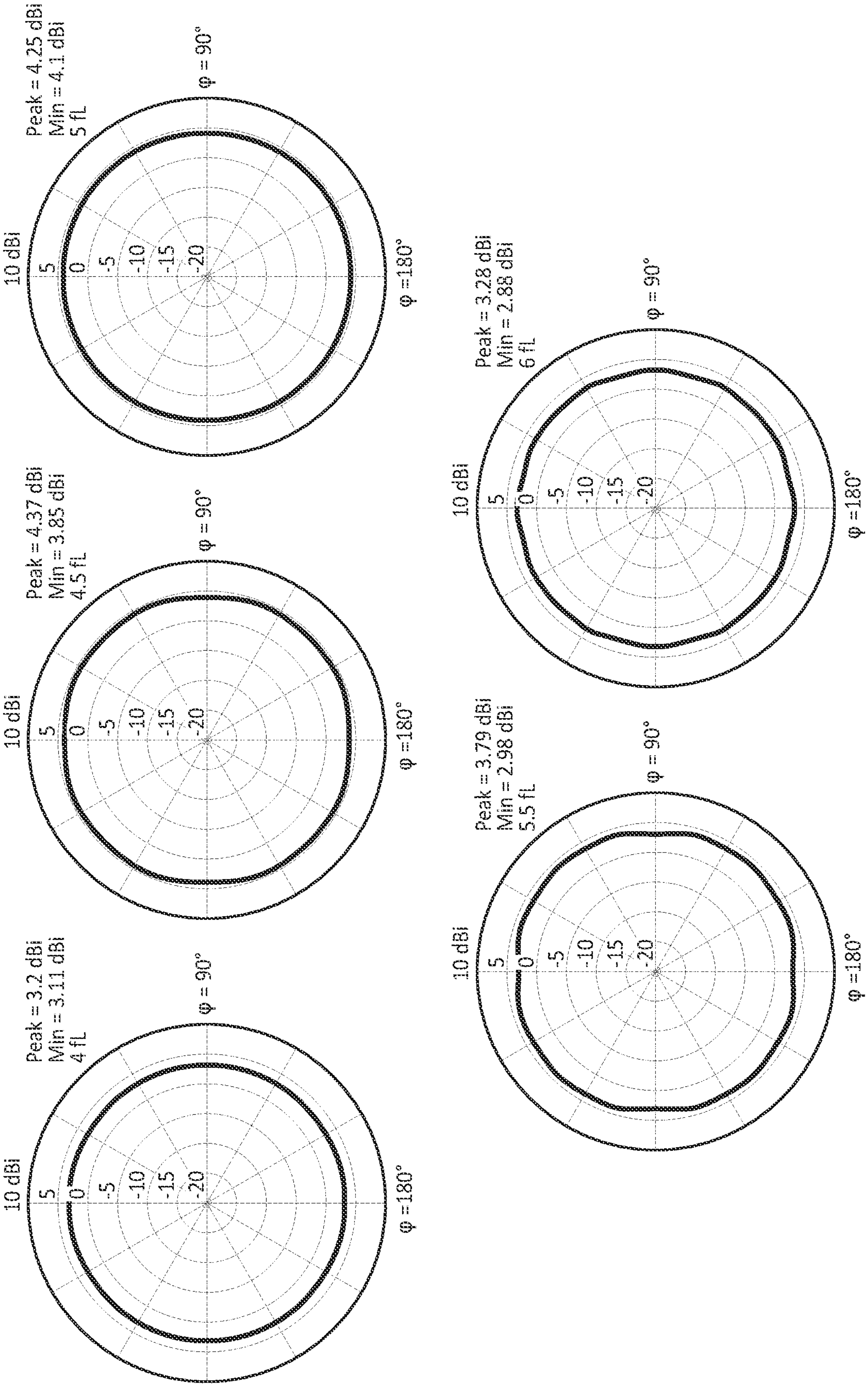

Collective FIG. 16 illustrates the geometry and features of antenna 1600 in perspective and sectional views. The sectional views of FIGS. 16B-16C are taken through the center of antenna 1600, as shown in FIG. 16A. FIG. 16B is a sectional view of antenna 1600 that includes conducting surfaces and volumes of antenna 1600, and FIG. 16C is a view of the same section that does not include conducting surfaces and volumes. Although FIGS. 16B and 16C illustrate sections in a ZY plane, any elevation-plane section through the center of antenna 1600 (i.e., in any elevation plane θ-r) would yield the same views.

Dielectric volume 1610 may have multiple surfaces, including non-conducting aperture 1620, first radially interior surface 1630, second radially interior surface 1640, one or more feed surfaces 1650, and one or more edges 1660A, 1660B. Dielectric volume 1610 may mate to transmission line 1645. To case reference to various physical features and wireless performance characteristics (particularly radiation patterns), FIGS. 16B-16C also illustrates an azimuthal plane 1670, an axis of radial symmetry 1680 located at the radial center of dielectric volume 1610 (and antenna 1600), and an XYZ coordinate system.

As shown in FIG. 16, dielectric volume 1610 is azimuthally uniform (without variation in φ) such that taking a section in any elevation plane (θ-r plane) yields the view in FIGS. 16B-16C. Rotating the sectional views in FIGS. 16B-16C about axis of radial symmetry 1680 yields a three-dimensional dielectric volume 1610 having multiple surfaces, with each surface in a three-dimensional view corresponding to a curve in the sectional view of FIGS. 16B-16C. Dielectric volume 1610 may be radially symmetric or azimuthally uniform about axis of radial symmetry 1680. Dielectric volume 1610 terminates at its radial interior in first radially interior surface 1630, second radially interior surface 1640, and one or more feed surfaces 1650. Dielectric volume 1610 terminates at its radial exterior in non-conducting aperture 1620. Dielectric volume 1610 terminates at its longitudinal maximum in one or more edges 1660A. FIG. 16C illustrates one edge 1660A at the longitudinal maximum of dielectric volume 1610. Dielectric volume 1610 also terminates at its longitudinal minimum in one or more edges 1660B.

In certain embodiments, dielectric volume 1610 has a maximum radius determined by the maximum radial (ρ) dimension of non-conducting aperture 1620. In certain embodiments, dielectric volume 1610 has a maximum height determined as the longitudinal (Z) distance between the longitudinal maximum (edge 1660A in FIG. 16C) and the longitudinal minimum of dielectric volume 1610 (edge 1660B in FIG. 16C).

Dielectric volume 1610 may have the same or similar structure, components, elements, configurations, features, interfaces, parameters, or functions in an antenna as dielectric volume 1310, compatible with the topology illustrated in FIG. 16. Dielectric volume 1610 may be formed according to the same or similar processes, methods, operations, steps, parameters, and principles as dielectric volume 110 or dielectric volume 1310. Dielectric volume 1610 may be formed from the same or similar materials or composition of materials as dielectric volume 110 or dielectric volume 1310.

Non-conducting aperture 1620, located on the radial exterior of dielectric volume 1610, determines the radial maximum of dielectric volume 1610. As shown in FIGS. 16B-16C, non-conducting aperture 1620 extends longitudinally between two edges 1660A, 1660B. Dielectric volume 1610 terminates in free space at non-conducting aperture 1620. In certain embodiments, non-conducting aperture 1620 includes convex, concave, or both convex and concave surfaces. Although not shown in FIG. 16, in certain embodiments the radial minimum of non-conducting aperture 1620 may exceed the radial maximum of first radiator 1605 or second radiator 1615.

First radially interior surface 1630, located on the radial interior of dielectric volume 1610, may extend longitudinally from one or more feed surfaces 1650 to the longitudinal maximum (e.g., edge 1660A in FIG. 16C) of dielectric volume 1610. In certain embodiments without edges 1660A, first radially interior surface 1630 may extend radially from one or more feed surfaces 1650 to the radial maximum (e.g., the radial maximum of non-conducting aperture 1620 in FIG. 16B) of dielectric volume 1610. In certain embodiments, first radially interior surface 1630 includes convex, concave, or both convex and concave surfaces. In certain embodiments, conducting surfaces may be mated to first radially interior surface 1630 during fabrication of antenna 1600.

Second radially interior surface 1640, located on the radial interior of dielectric volume 1610, may extend longitudinally from one or more feed surfaces 1650 to the longitudinal minimum of dielectric volume 1610. In certain embodiments without edges 1660B, second radially interior surface 1640 may extend radially from one or more feed surfaces 1650 to the radial maximum (e.g., the radial maximum of non-conducting aperture 1620 in FIG. 16B) of dielectric volume 1610. In certain embodiments, second radially interior surface 1640 includes convex, concave, or both convex and concave surfaces. In certain embodiments, conducting surfaces may be mated to second radially interior surface 1640 during fabrication of antenna 1600.

One or more feed surfaces 1650, located on the radial interior of dielectric volume 1610, may extend radially and longitudinally from the radial minimum of dielectric volume 1610 to first radially interior surface 1630, second radially interior surface 1640, or both. As shown in FIG. 16C, one feed surface extends longitudinally and one feed surface extends radially. In certain embodiments, dielectric volume 1610 may have one feed surface 1650 extending longitudinally between first radially interior surface 1630 and second radially interior surface 1640. In certain embodiments, one or more feed surfaces 1650 may mate to a transmission line. For example, as shown in FIG. 16C, one or more feed surfaces 1650 may mate to a coaxial connector or cable, such as a bulkhead, thread-in, or flanged coaxial connector or cable.

Dielectric volume 1610 may have one or more edges 1660A, 1660B. As shown in FIG. 16C, dielectric volume 1610 contains one edge 1660A at the longitudinal maximum of dielectric volume 1610 and one edge 1660B at the longitudinal minimum of dielectric volume 1610. In certain embodiments, edges 1660A, 1660B may be included in dielectric volume 1610 to accommodate fabrication tolerances or to provide flat surfaces (e.g., flats parallel to the XY-plane) for mating to other structures, as discussed further below. In certain embodiments dielectric volume 1610 may not contain edges 1660A, 1660B.

As shown in FIG. 16B, azimuthal plane 1670 defines the radiation horizon (θ=90°). In certain embodiments, azimuthal plane 180 may also define the azimuthal plane (θ=90°, XY) corresponding to an external ground plane.

Axis of radial symmetry 1680 defines the Z-axis around which dielectric volume 1610 is azimuthally uniform or radially symmetric. An azimuthally uniform structure does not vary in azimuth (φ). Dielectric volume 1610 is azimuthally uniform as shown in FIG. 16. In certain embodiments, dielectric volume 1610 may be radially symmetric to achieve certain RF performance characteristics or to facilitate certain fabrication methods.

In certain embodiments, a dielectric unit may be formed from dielectric volume 1610. To form a dielectric unit, a first conducting surface may be disposed on first radially interior surface 1630, a second conducting surface may be disposed on second radially interior surface 1640, or both. Conducting surfaces may also be disposed on one or more feed surfaces 1650 as needed to provide electrical coupling to a transmission line. In certain embodiments the first conducting surface or second conducting surface may also be disposed on one or more edges 1660A, 1660B.

In certain embodiments, dielectric volume 1610 (and any corresponding dielectric unit or antenna) may be scaled in one or more radial dimensions. In certain embodiments, scaling may improve directivity in the direction of a minor radial axis or plane (the axis or plane with a smaller scaling factor) or a major radial axis or plane (the axis or plane with a larger scaling factor). In certain embodiments, antenna 1600 may be symmetric about the ZX and ZY planes containing an axis of symmetry.

FIG. 16B illustrates a sectional view of antenna 1600 including dielectric volume 1610. As illustrated, antenna 1600 may also include first radiator 1605, second radiator 1615, top hat 1625, ground plane 1635, first void 1665, second void 1675, and dielectric jacket 1690. As shown in FIG. 16B, first radiator 1605, second radiator 1615, top hat 1625, and ground plane 1635 are conducting elements. Antenna 1600 may be electrically coupled via pin 1655 to transmission line 1645 for the transmission and reception of RF energy. As shown in FIG. 16, the maximum radius of antenna 1600 does not exceed $\lambda_L/6$ and the maximum height of antenna 200 does not exceed $\lambda_L/4$. Antenna 1600 has a topology similar to antenna 1300, except that in antenna 1600, a dielectric jacket 1690 radially surrounds pin 1655, first radiator 1605 presents a conducting surface at the longitudinal maximum of dielectric jacket 1690, and first radiator 1605 and second radiator 1615 are longitudinally symmetric or near symmetric (i.e., the radially exterior surfaces of first radiator 1605 and second radiator 1615 present mirrored structures to RF excitation by transmission line 1645).

First radiator 1605 is located on the radial interior of dielectric volume 1610 and presents a conducting surface at first radially interior surface 1630. First radiator 1605 may also present a conducting surface at one or more edges 1660A between first radially interior surface 1630 and non-conducting aperture 1620. First radiator 1605 may also present a conducting surface at a pin and dielectric jacket extending from a transmission line coupled to antenna 1600.

First radiator 1605 may extend longitudinally from a feed surface 1650 to the longitudinal maximum (e.g., edge 1660A in FIG. 16C) of dielectric volume 1610. In certain embodiments, first radiator 1605 may extend from an inner conductor of a transmission line (e.g., a pin extending from the transmission line) to the longitudinal maximum of dielectric volume 1610. First radiator 1605 may be azimuthally uniform or radially symmetric. In certain embodiments, first radiator 1605 may be symmetric. First radiator 1605 may extend radially from an inner conductor of a transmission line to one or more edges 1660A of dielectric volume 1610. In certain embodiments, first radiator 1605 may extend to the maximum radius of dielectric volume 1610 (e.g., to non-conducting aperture 1620 in FIG. 16B). In certain embodiments, first radiator 1605 may include convex, concave, or both convex and concave surfaces.

In certain embodiments, the volume to the radial interior of first radiator 1605 is a void (e.g., free space or air). In certain embodiments dielectric structures (e.g., a dielectric filler) may be inserted into the void to the radial interior of first radiator 1605.

First radiator 1605 may be formed according to the same or similar methods, operations, steps, parameters, and principles as first radiator 1305, compatible with the antenna 1600 topology illustrated in FIG. 16. In certain embodiments, first radiator 1605 may be formed from or composed of one or more conducting components. For example, first radiator 1605 may be formed from a conductive sheet or washer (for soldering to an inner conductor of a transmission line) and a deposition of a first conducting surface on first radially interior surface 1630.

In certain embodiments, first radiator 1605 may be mated to first radially interior surface 1630 during fabrication of an antenna. For example, first radiator 1605 may be machined from a conductive material and epoxied to first radially interior surface 1630. As another example, first radiator 1605 may be formed by electroless deposition of a conductor on a dielectric base, inserted into a void to the radial interior of first radially interior surface 1630 to mate with first radially interior surface 1630, and secured by a dielectric volume and a metallic or dielectric top hat. First radiator 1605 may be formed directly on first radially interior surface 1630. For example, first radiator 1605 may be formed by spraying a conductive ink or dispersion onto first radially interior surface 1630.

In certain embodiments, first radiator 1605 may be electrically coupled to a transmission line. For example, first radiator 1605 may be soldered, welded, or bonded to a pin extending from the center conductor of a transmission line. As another example, a pin extending from the center conductor of a coaxial connector may press fit into first radiator 1605.

In certain embodiments, first radiator 1605 may be mated to or electrically coupled to a top hat. For example, first radiator 1605 may be secured into dielectric volume 1610 by a dielectric top hat fastened to dielectric volume 1610. As another example, first radiator 1605 may be conductively epoxied at its maximum longitudinal dimension to a conducting top hat that prevents current flow on the radial interior of first radiator 1605.

In certain embodiments, the maximum radial dimension of first radiator 1605 may exceed the minimum radial dimension of non-conducting aperture 1620 (e.g., as shown in FIG. 16B). Reducing the minimum radial dimension of non-conducting aperture 1620 may thin dielectric volume 1610 and provide the advantage of reducing antenna 1600 weight or increasing the operating bandwidth of antenna 1600. In certain embodiments, the maximum radial dimension of non-conducting aperture 1620 may exceed the maximum radial dimension of first radiator 1605 and any edge 1660A on dielectric volume 1610. Increasing the thickness of dielectric volume 1610 may have the advantage of reducing the lowest operating frequency of antenna 1600, improving antenna 1600 return loss near the lowest operating frequency, or controlling radiation pattern gain or azimuthal uniformity at certain frequencies.

Second radiator 1615 is located on the radial interior of dielectric volume 1610 and presents a conducting surface at second radially interior surface 1640. Second radiator 1615 may also present a conducting surface at one or more edges 1660B between second radially interior surface 1640 and non-conducting aperture 1620. Second radiator 1615 may extend longitudinally and radially from one or more feed surfaces 1650 to one or more edges 1660B or to non-conducting aperture 1620. In certain embodiments, second radiator 1615 may extend from an outer conductor of a transmission line (e.g., a shield of a coaxial cable or connector) to the longitudinal minimum of dielectric volume 1610. Second radiator 1615 may be azimuthally uniform or radially symmetric. In certain embodiments, second radiator 1615 may be symmetric. Second radiator 1615 may extend radially from an outer conductor of a transmission line to one or more edges 1660B of dielectric volume 1610. In certain embodiments, second radiator 1615 may extend to the maximum radius of dielectric volume 1610. In certain embodiments, second radiator 1615 includes convex, concave, or both convex and concave surfaces. In certain embodiments, second radiator 1615 may have the same maximum radius as first radiator 1605. In certain embodiments, second radiator 1615 may have a maximum radius that is greater than or less than the maximum radius of first radiator 1605.

In certain embodiments, the volume to the radial interior of second radiator 1615 is a void (e.g., free space or air). In certain embodiments dielectric structures (e.g., a dielectric filler) may be inserted into the void to the radial interior of second radiator 1615.

Second radiator 1615 may be formed according to the same or similar methods, operations, steps, parameters, and principles as first radiator 1605, and may be assembled or integrated into antenna 1600 according to the same or similar methods, operations, steps, parameters, and principles as first radiator 1605.

In certain embodiments, second radiator 1615 may be electrically coupled to a transmission line. For example, second radiator 1615 may be soldered, welded, or bonded to an outer conductor of a transmission line. As another example, a conducting surface of second radiator 1615 may serve as the outer conductor of a transmission line (e.g., a conducting surface of second radiator 1615 may mate to a dielectric "candlestick" extending from a coaxial connector). Coupling second radiator 1615 to a transmission line excites RF currents on second radiator 1615 over a wide bandwidth.

In certain embodiments, second radiator 1615 may be mated to or electrically coupled to a ground plane. For example, second radiator 1615 may be secured into dielectric volume 1610 by a ground plane fastened to dielectric volume 1610. As another example, second radiator 1615 may be conductively epoxied at its minimum longitudinal dimension to a conducting ground plane that prevents current flow on the radial interior of second radiator 1615.

In certain embodiments, the maximum radial dimension of second radiator 1615 may exceed the minimum radial dimension of non-conducting aperture 1620 (e.g., as shown in FIG. 16B). In certain embodiments, the maximum radial dimension of non-conducting aperture 1620 may exceed the maximum radial dimension of second radiator 1615 and any edge 1660B on dielectric volume 1610.

As seen by comparison of FIG. 13B and FIG. 16B, top hat 1625 in antenna 1600 has substantially the same structure and function as top hat 1325 in antenna 1300. Top hat 1625 may have the same or similar structure, components, elements, configurations, features, interfaces, parameters, or functions in an antenna as top hat 1325. Top hat 1625 may be formed according to the same or similar methods, operations, steps, parameters, and principles as top hat 1325.

As seen by comparison of FIG. 13B and FIG. 16B, ground plane 1635 in antenna 1600 has substantially the same structure and function as ground plane 1335 in antenna 1300. Ground plane 1635 may have the same or similar structure, components, elements, configurations, features, interfaces, parameters, or functions in an antenna as ground plane 1335. Ground plane 1635 may be formed according to the same or similar methods, operations, steps, parameters, and principles as ground plane 1335.

Transmission line 1645 may be any suitable transmission line for transmission and reception of RF energy. Transmission line 1645 may have the same or similar structure, components, elements, configurations, features, interfaces, parameters, or functions as transmission line 1345, except that transmission line 1645 interfaces to antenna 1600 in the manner illustrated in FIG. 16B. A dielectric jacket of transmission line 1645 may extend longitudinally past second radiator 1615 and terminate at first radiator 1605. In certain embodiments, a pin of transmission line 1645, longitudinally coextensive with a dielectric jacket, may extend longitudinally past second radiator 1615 and terminate at first radiator 1605.

Pin 1655, centered on axis of radial symmetry 1680, may extend longitudinally from transmission line 1645 to first radiator 1605. In certain embodiments, a radial exterior of pin 1655 may mate to a dielectric jacket of transmission line 1645. In certain embodiments, pin 1655 electrically couples first radiator 1605 to transmission line 1645. First radiator 1605 may be soldered, welded, or bonded to pin 1655. As another example, pin 1655 may press fit into first radiator 1605. In certain embodiments, pin 1655 may extend longitudinally past a dielectric jacket into or through first radiator 1605. For example, pin 1655 may extend longitudinally through first radiator 1605 and be soldered to the radial interior of first radiator 1605 such that the solder joint is accessible in a void to the radial interior of first radiator 1605.

First void 1665, as shown in FIG. 16C, fills the volume to the radial interior of first radially interior surface 1630. In certain embodiments, first radiator 1605 may be inserted into first void 1665 to present a conducting surface at first radially interior surface 1630 and at the longitudinal maximum of a feed surface 1650. For example, first radiator 1605 may be machined from a conducting volume, inserted into first void 1665, and epoxied to first radially interior surface 1630.

In certain embodiments, first void 1665 may be filled, partially or entirely, with dielectric material. For example, first radiator 1605 may be disposed onto first radially interior surface 1630, and first void 1665 to the radial interior of first radiator 1605 may be filled with dielectric to protect or isolate the radial interior of first radiator 1605 from external environments. In certain embodiments, first radiator 1605 may fill first void 1665 partially or entirely. For example, first radiator 1605 may be stamped from a thick sheet of conducting material such that first radiator 1605 partially fills first void 1665. In certain embodiments in which first radiator 1605 is formed without conducting volumes, first radiator 1605 may not fill first void 1665.

Second void 1675, as shown in FIG. 16C, fills the volume to the radial interior of second radially interior surface 1640. In certain embodiments, second radiator 1615 may be inserted into second void 1675 to present a conducting surface at second radially interior surface 1640. In certain embodiments, second radiator 1615 may also present a conducting surface at the radial maximum of transmission line 1645. In certain embodiments, second radiator 1615 may also present a conducting surface at one or more feed surfaces 1650. For example, second radiator 1615 may be machined from a conducting volume, inserted into second void 1675, and epoxied to second radially interior surface 1640.

In certain embodiments, second void 1675 may be filled, partially or entirely, with dielectric material. For example, second radiator 1615 may be disposed onto second radially interior surface 1640 and mated to transmission line 1645, and second void 1675 to the radial interior of second radiator 1615 may be filled with dielectric to protect or isolate transmission line 1645 or the radial interior of second radiator 1615 from external environments. In certain embodiments, second radiator 1615 may fill second void 1675 partially or entirely. For example, second radiator 1615 may be stamped from a thick sheet of conducting material such that second radiator 1615 partially fills second void 1675. In certain embodiments in which second radiator 1615 is formed without conducting volumes, second radiator 1615 may not fill second void 1675. In certain embodiments, transmission line 1645 may partially fill second void 1675.

Dielectric jacket 1690, as shown in FIG. 16B, extends longitudinally between the longitudinal maximum of second radially interior surface 1640 to the longitudinal minimum of first radially interior surface 1630. As shown in FIG. 16B, dielectric jacket 1690 mates to the radial exterior of pin 1655 and extends radially to the radial minimum of dielectric volume 1610. In certain embodiments, dielectric jacket 1690 may extend past the radial minimum of dielectric volume 1610. In certain embodiments, dielectric jacket 1690 may be a stand-alone component. For example, dielectric jacket 1690 may be a ring- or donut-shaped dielectric inserted between first radiator 1605 and second radiator 1615 during assembly of antenna 1600. In certain embodiments, dielectric jacket 1690 may be an extension of a dielectric in transmission line 1645. In certain embodiments, dielectric jacket may be integrated into dielectric volume 1610. For example, dielectric volume 1610 may be additively manufactured such that the radial minimum of dielectric volume 1610 extends to the radial maximum of pin 1655. In certain embodiments, dielectric jacket 1690 may be omitted from antenna 1600. Including dielectric jacket 1690 in antenna 1600 may have one or more advantages, including securing pin 1655, precisely controlling separation between first radiator 1605 and second radiator 1615, and improving power handling.

Antenna 1600 may be formed according to any methods, operations, steps, parameters, and principles for forming antenna 200, antenna 500, antenna 800, antenna 1000, or antenna 1300 that are compatible with the topology of antenna 1600 as shown in FIG. 16. Antenna 1600 may be formed according to any methods, operations, steps, parameters, and principles compatible with the structure, components, elements, configurations, features, interfaces, or parameters of first radiator 1605, dielectric volume 1610, second radiator 1615, top hat 1625, and ground plane 1635. Antenna 1600 may be formed of the same or similar materials as other antennas disclosed herein.

In certain embodiments, antenna 1600 may be formed without conducting volumes. For example, first radiator 1605 may be formed by disposing a first conducting surface on a first dielectric base and second radiator 1615 may be formed by disposing a second conducting surface on a second dielectric base, such that antenna 1600 assembled from first radiator 1605, second radiator 1615, and dielectric volume 1610 has no conducting volumes. As another example, first radiator 1605 may be stamped from a thin conducting sheet and second radiator 1615 may be formed by disposing a first conducting surface on a first dielectric base, such that antenna 1600 assembled from first radiator 1605, second radiator 1615, and dielectric volume 1610 has no conducting volumes.

In certain embodiments, antenna 1600 may be formed from a dielectric unit without conducting volumes. For example, antenna 1600 may be formed by electroless deposition of copper on first radially interior surface 1630, second radially interior surface 1640, and one or more edges 1660A, 1660B to form a dielectric unit. In certain embodiments, one or more surfaces of dielectric volume 1610 may be masked or treated to control the location of conducting surfaces on a dielectric unit. For example, non-conducting aperture 1620 and one or more feed surfaces may be partially or completely masked such that masked surfaces remain non-conducting after disposing conducting surfaces on dielectric volume 1610.

In certain embodiments, antenna 1600 may not have top hat 1625 or ground plane 1635. In certain embodiments, antenna 1600 may be formed from integrating first radiator 1605 and top hat 1625 or from integrating second radiator 1615 and ground plane 1635. For example, second radiator 1615 and ground plane 1635 may be machined from a single conducting volume and mated to a dielectric unit that includes dielectric volume 1610 and first radiator 1605 electrolessly deposited on first radially interior surface 1630. As another example, first radiator 1605 and top hat 1625 may be stamped from a single sheet of conducting material and epoxied onto first radially interior surface 1630 and one or more edges 1660A of dielectric volume 1610.

In contrast to antenna 200, antenna 500, antenna 800, and antenna 1000, all of which are not symmetric in the Z-dimension, antenna 1600 may be described as having longitudinal symmetry or near longitudinal symmetry, depending on the features of dielectric volume 1610. As shown in FIG. 16B, antenna 1600 is not entirely symmetric in the Z-dimension due to one feed surface 1650, extending radially, that renders dielectric volume 1610 asymmetric. But antenna 1600 has certain symmetric or near-symmetric features in the Z-dimension, such as non-conducting aperture 1620, top hat 1625 vis-à-vis ground plain 1635, and first radiator 1605 vis-à-vis second radiator 1615. In certain embodiments, dielectric volume 1610 may be longitudinally symmetric (i.e., symmetric about its longitudinal midpoint). For example, dielectric volume 1610 may have a single, longitudinal feed surface 1650 such that first void 1665 and second void 1675 mirror one another across the longitudinal midpoint of dielectric volume 1610. Antenna 1600 may be described as longitudinally symmetric in embodiments in which dielectric volume 1610 is longitudinally symmetric because first radiator 1605 and second radiator 1615 present identical (mirrored) structures to RF excitation by transmission line 1645. Longitudinal symmetry in antenna 1600 may have the advantage of increasing gain and azimuthal uniformity in radiation patterns near the horizon (θ=90°).

The topology of dielectric volume 1610 (and antenna 1600) may have one or more advantages over the topology of dielectric volume 1310 (and antenna 1300). For example, dielectric volume 1310 has a radial feed surface 1350—large relative to any radial feed surface 1650 of dielectric volume 1610—that may inhibit impedance matching antenna 1300. Reducing or removing any radial feed surface 1650 may facilitate impedance matching antenna 1600 and improving antenna 1600 symmetry. The topology of dielectric volume 1310 (and antenna 1300) may also have one or more advantages over the topology of dielectric volume 1610 (and antenna 1600). For example, in antenna 1600, first radiator 1605 includes a radial surface, mated to the longitudinal maximum of dielectric jacket 1690, that may increase capacitance at the coupling between transmission line 1645 and antenna 1600 and require additional steps in forming first radiator 1605. First radiator 1305 of antenna 1300, in contrast, tapers radially down to the maximum radius of pin 1355, reducing capacitance and simplifying steps in forming first radiator 1305.

Figure 18:
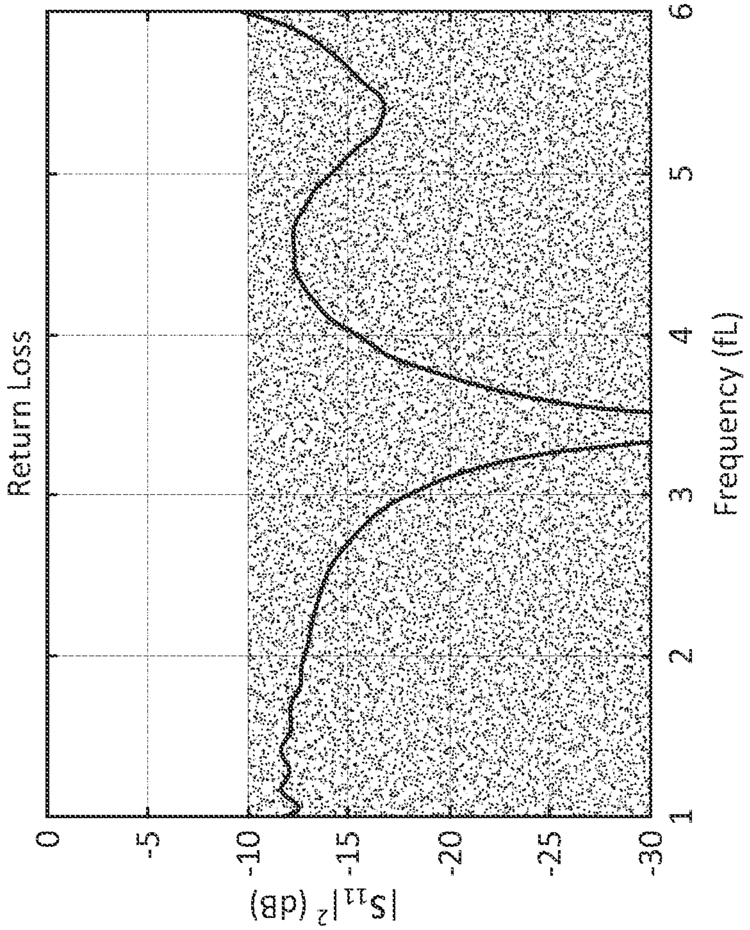
FIG. 18 is a diagram that illustrates the wireless performance of an example antenna in return loss, according to certain embodiments.

Collective FIG. 17 and FIG. 18 summarize wireless performance of antenna 1600[10] including radiation pattern and return loss performance—over a 6:1 bandwidth.

[10] The performance shown in collective FIG. 17 and FIG. 18 is for antenna 1600 with a ground plane having the same maximum radius as second radiator 1615. Coupling antenna 1600 to a ground plane exceeding the radius of antenna 1600 may improve return loss at lower frequencies and increase peak gain while maintaining low distortion performance.

Collective FIG. 17 illustrates radiation patterns of antenna 1600 in elevation (ZY or ZX) and azimuth (XY) planes. As shown in the elevation cuts of FIGS. 17A-17B, antenna 1600 maintains a horizon beam including the radiation horizon (θ=90°) over a frequency band of 1-6 fL. In certain embodiments, antenna 1600 may transmit and receive a beam including the horizon across a pattern bandwidth of 6:1. FIGS. 17C-17D illustrate radiation patterns of antenna 1600 in the azimuth plane (XY, θ=90°) from 1-6 fL. Antenna 1600 azimuth plane patterns are substantially uniform in azimuth over a 6:1 pattern bandwidth (from 1-6 fL), with a maximum variation of ±0.6 dB at 1 fL and 2.5 fL.

Antenna 1600 return loss in FIG. 18 exceeds 10 dB across a 6:1 efficiency bandwidth (1-6 fL). Although not shown in FIG. 18, antenna 1600 return loss exceeds 6 dB across a 6:1 efficiency bandwidth, regardless of the size of the external ground plane antenna 1600 is placed over. Ground plane size does not substantively affect return loss performance above 1.5 fL (i.e., return loss above 1.5 fL remains substantially 10 dB or greater for all ground sizes). Accordingly, antenna 1600 is placement insensitive above 1.5 fL, including from 1.5-6 fL, to a 10 dB return loss threshold, and antenna 1600 is placement insensitive from 1-6 fL to a 6 dB return loss threshold. In certain embodiments, ground plane shaping or edge or surface treatment (e.g., with metasurfaces or integrated filters) to remove surface waves or edge diffraction may achieve 10 dB return loss for antenna 1600 across a 6:1 bandwidth over any ground plane size.

As shown in Table 10, the fidelity of wireless signals transmitted or received by antenna 1600 in the frequency band of 1-6 fL exceeds 80%. In certain embodiments, antenna 1600 may instantaneously transmit and receive wireless signals across a single instantaneous bandwidth of up to 6:1. In certain embodiments, antenna 1600 may transmit and receive wireless signals across a 6:1 bandwidth, wherein the 6:1 bandwidth comprises a plurality of instantaneous frequency bands, each instantaneous frequency band having a bandwidth that meets or exceeds a lowest operating frequency.

TABLE 10

| Antenna 1600 Fidelity in a Horizon Beam (θ = 90°) | |
|---|---|
| Frequency Band | Fidelity Factor |
| 1-2 fL | 99% |
| 1-3 fL | 84% |
| 1-4 fL | 92% |
| 1-5 fL | 90% |
| 1-6 fL | 88% |
| 2-3 fL | 97% |
| 2-4 fL | 96% |
| 2-5 fL | 91% |
| 2-6 fL | 90% |
| 3-4 fL | 98% |
| 3-5 fL | 98% |
| 3-6 fL | 95% |
| 4-5 fL | 97% |
| 4-6 fL | 97% |
| 5-6 fL | 96% |

Figure 19A:
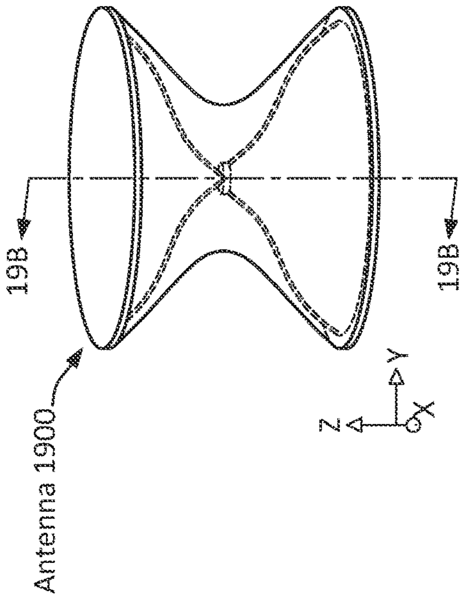
FIGS. 19A-19C are diagrams that illustrate the geometry and features of an example antenna, according to certain embodiments.
Figure 19B:
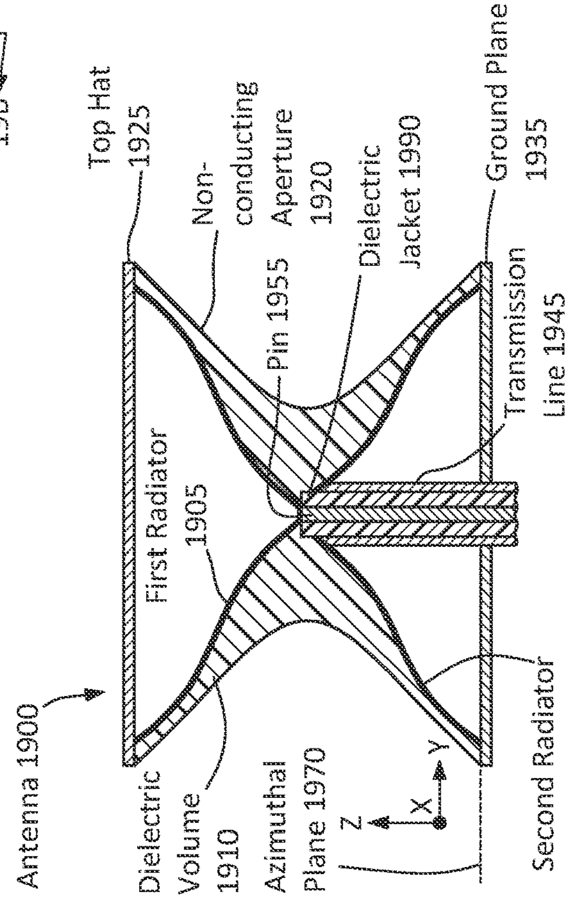
Figure 19C:
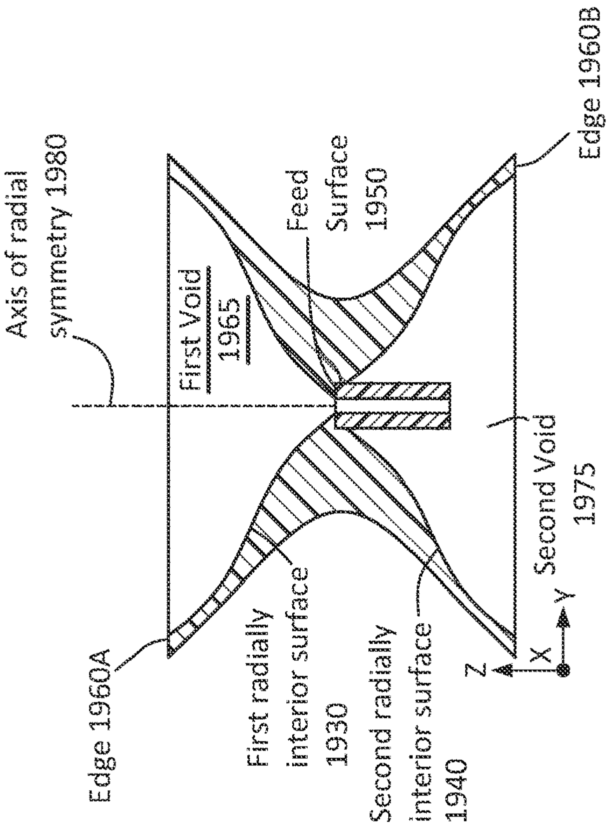
Figure 20A:
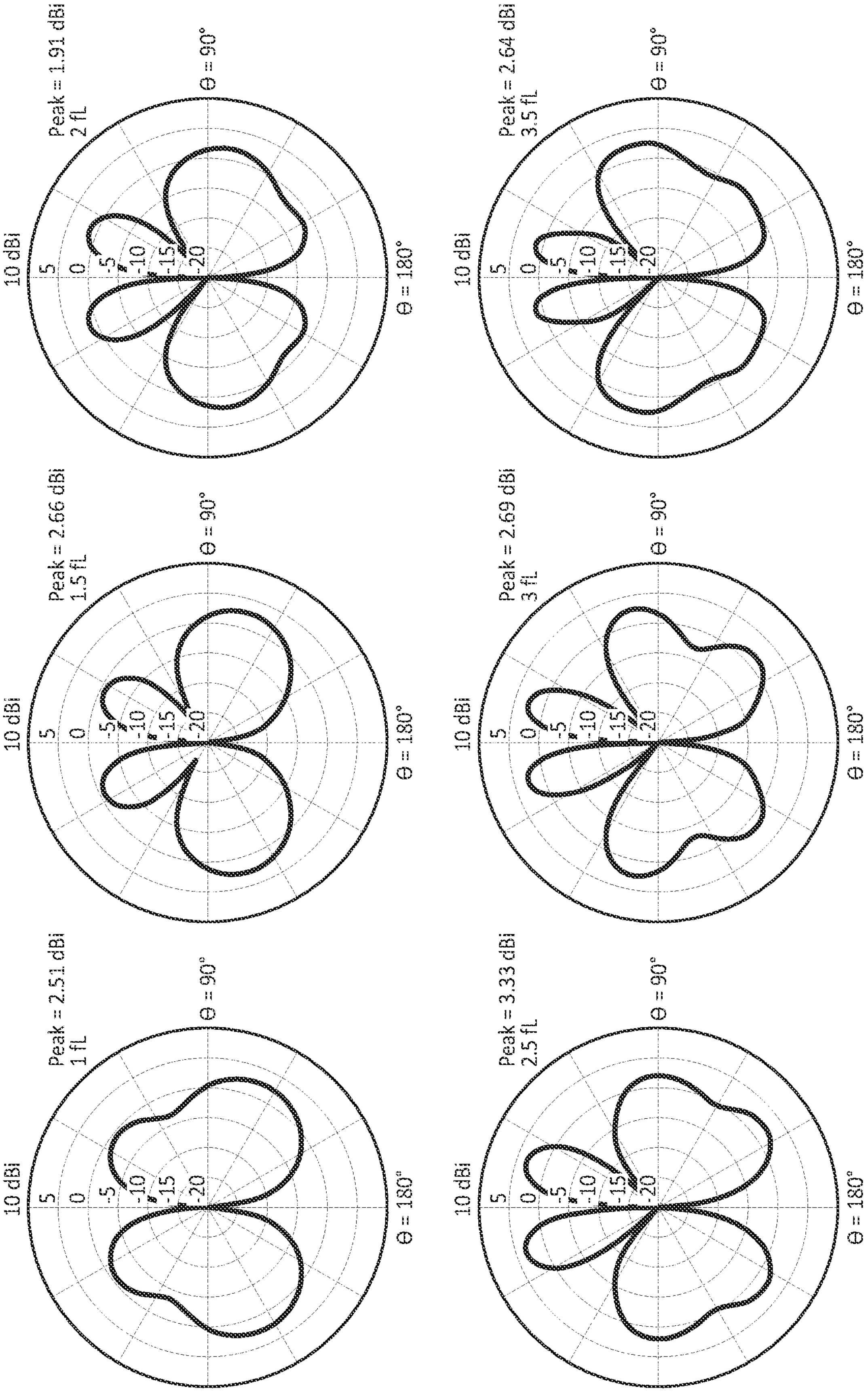
FIGS. 20A-20D are diagrams that illustrate the wireless performance of an example antenna in radiation patterns, according to certain embodiments.
Figure 20B:
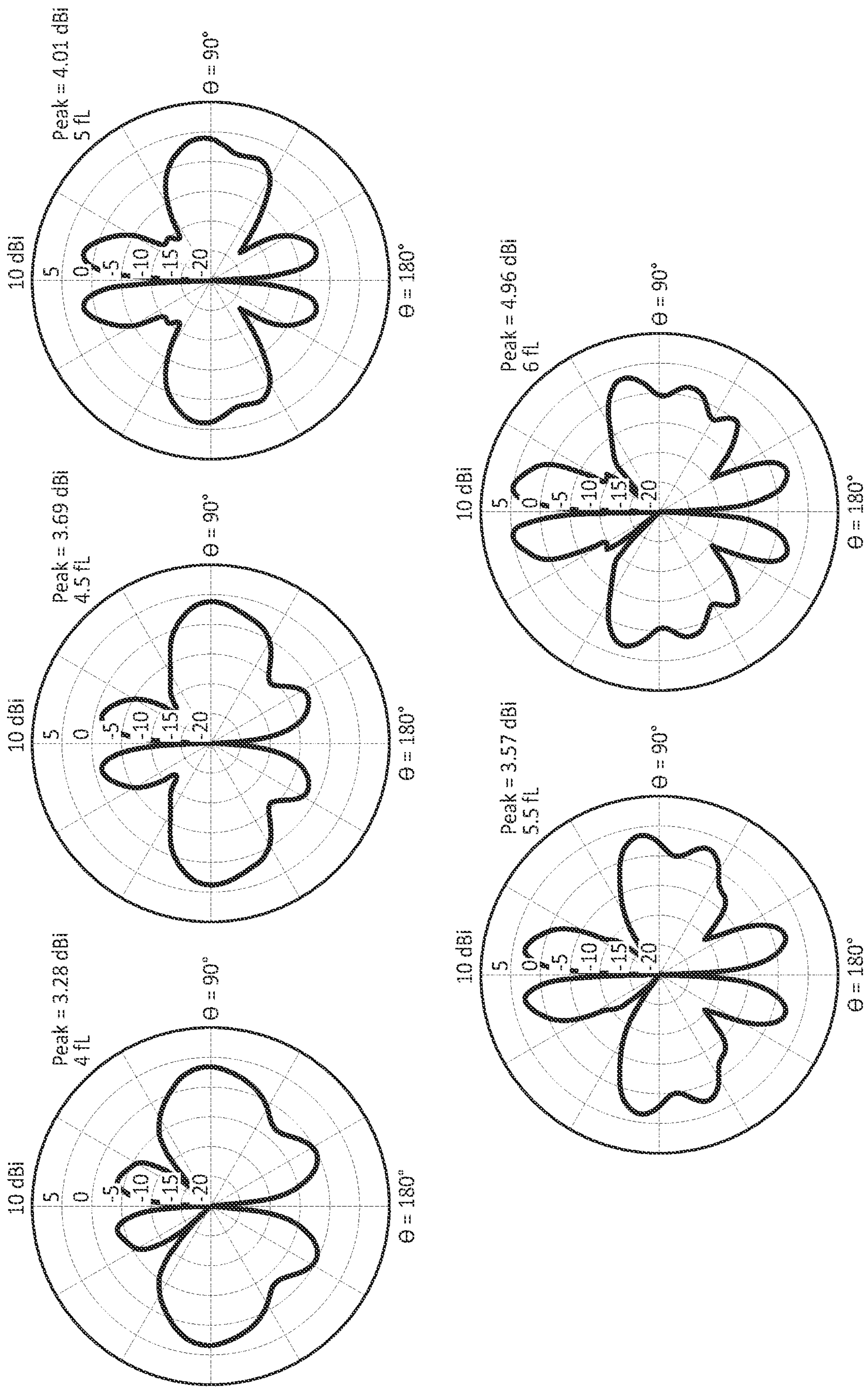
Figure 20C:
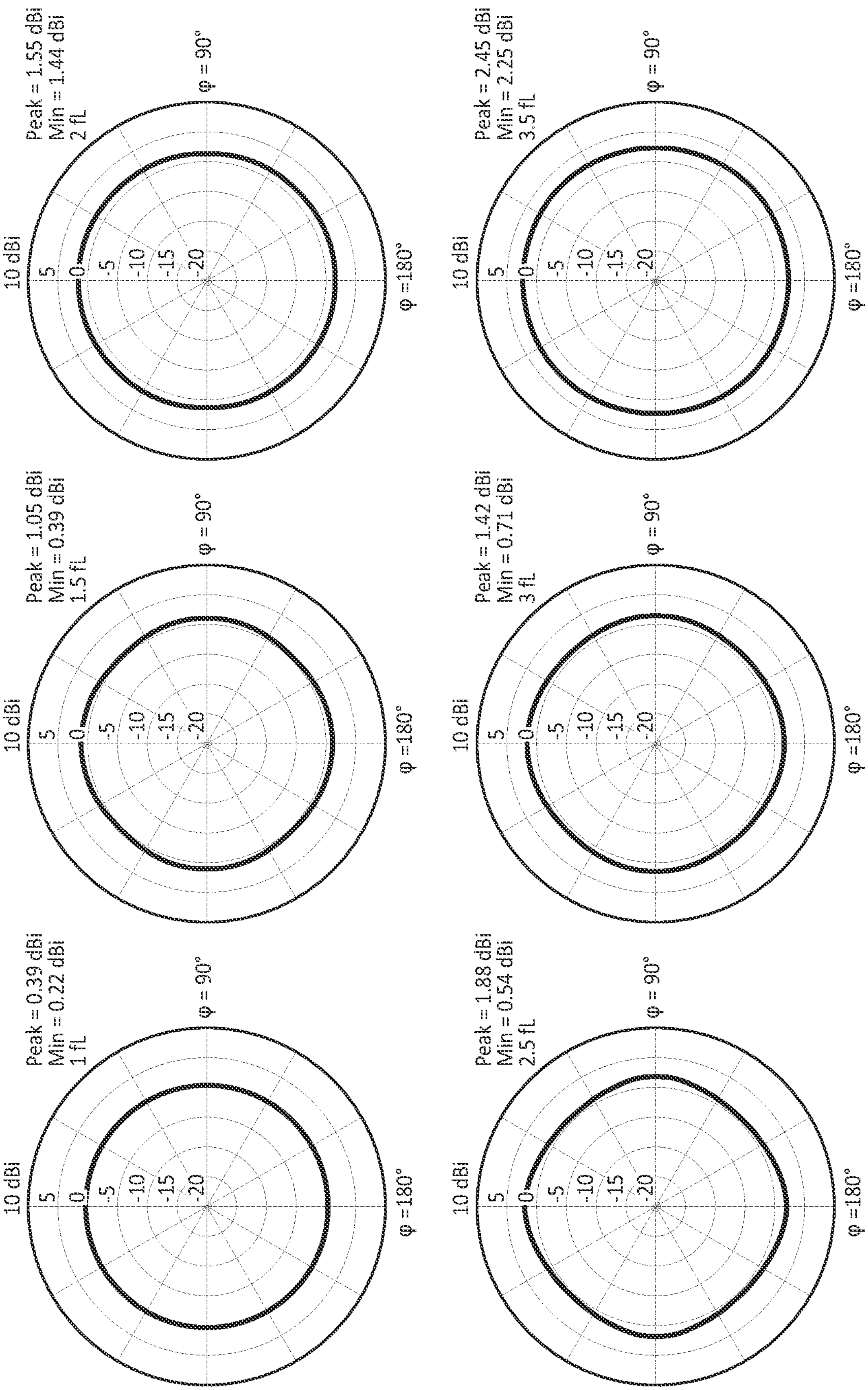
Figure 20D:
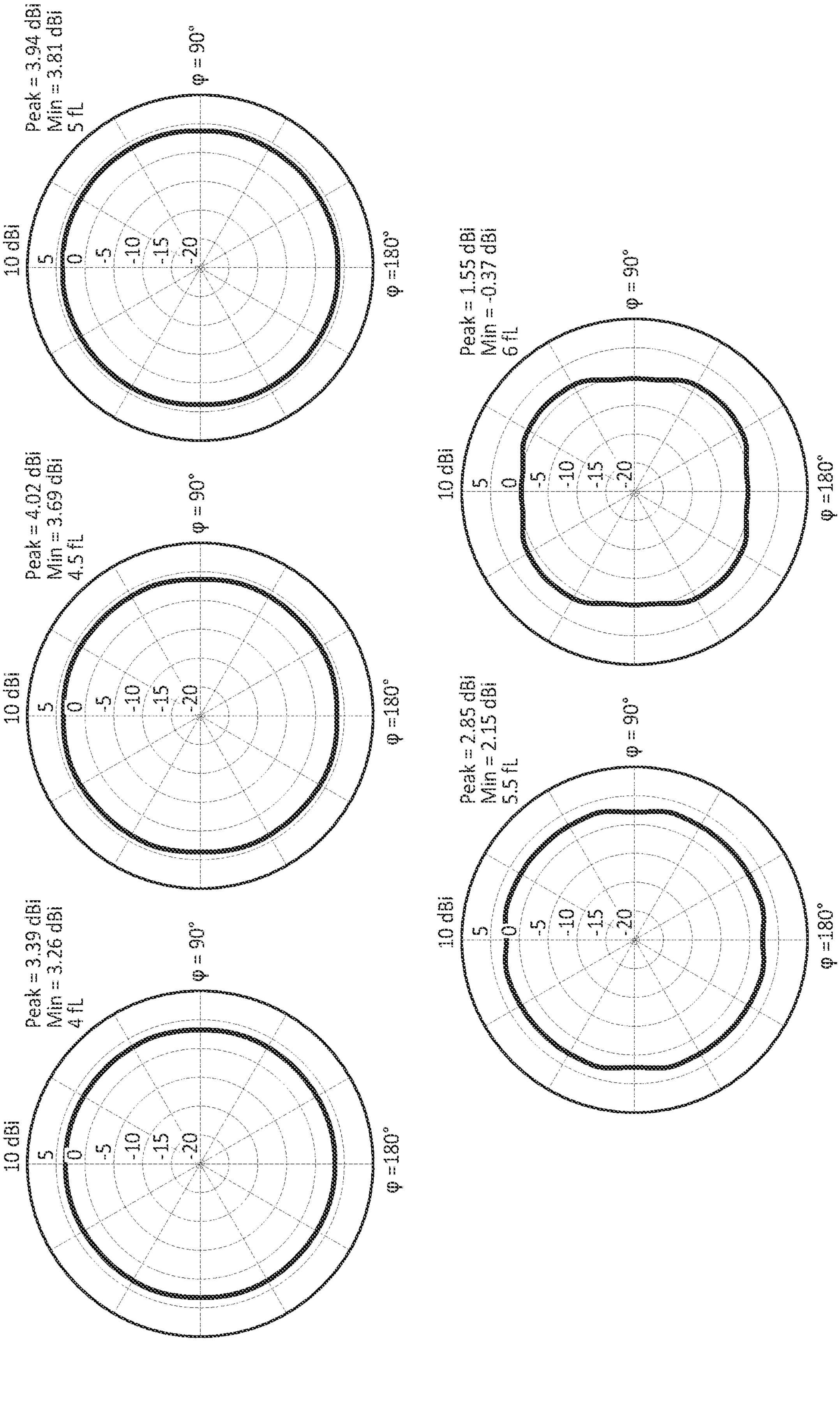

FIGS. 19A-19C illustrate the geometry and features of antenna 1900 in perspective and sectional views. The sectional views of FIGS. 19B-19C are taken through the center of antenna 1900, as shown in FIG. 19A. FIG. 19B is a sectional view of antenna 1900 that includes conducting surfaces and volumes of antenna 1900, and FIG. 19C is a view of the same section that does not include conducting surfaces and volumes. Although FIGS. 19B and 19C illustrate sections in a ZY plane, any elevation-plane section through the center of antenna 1900 (i.e., in any elevation plane θ-r) would yield the same views.

Dielectric volume 1910 may have multiple surfaces, including non-conducting aperture 1920, first radially interior surface 1930, second radially interior surface 1940, one or more feed surfaces 1950, and one or more edges 1960A, 1960B. Dielectric volume 1910 may mate to transmission line 1945. To ease reference to various physical features and wireless performance characteristics (particularly radiation patterns), FIG. 19B also illustrates an azimuthal plane 1970, an axis of radial symmetry 1980 located at the radial center of dielectric volume 1910 (and antenna 1900), and an XYZ coordinate system.

As shown in FIG. 19, dielectric volume 1910 is azimuthally uniform (without variation in φ) such that taking a section in any elevation plane (θ-r plane) yields the view in FIGS. 19B-19C. Rotating the sectional views in FIGS. 19B-19C about axis of radial symmetry 1980 yields a three-dimensional dielectric volume 1910 having multiple surfaces, with each surface in a three-dimensional view corresponding to a curve in the sectional view of FIGS. 19B-19C. Dielectric volume 1910 may be radially symmetric or azimuthally uniform about axis of radial symmetry 1980. Dielectric volume 1910 terminates at its radial interior in first radially interior surface 1930, second radially interior surface 1940, and one or more feed surfaces 1950. Dielectric volume 1910 terminates at its radial exterior in non-conducting aperture 1920. Dielectric volume 1910 terminates at its longitudinal maximum in one or more edges 1960A. FIG. 19C illustrates one edge 1960A at the longitudinal maximum of dielectric volume 1910. Dielectric volume 1910 also terminates at its longitudinal minimum in one or more edges 1960B.

In certain embodiments, dielectric volume 1910 has a maximum radius determined by the maximum radial (ρ) dimension of non-conducting aperture 1920. In certain embodiments, dielectric volume 1910 has a maximum height determined as the longitudinal (Z) distance between the longitudinal maximum (e.g., edge 1960A in FIG. 19C) and the longitudinal minimum of dielectric volume 1910 (e.g., edge 1960B in FIG. 19C).

Dielectric volume 1910 may have the same or similar structure, components, elements, configurations, features, interfaces, parameters, or functions in an antenna as dielectric volume 1310 or dielectric volume 1610, compatible with the topology illustrated in FIG. 19. Dielectric volume 1910 may be formed according to the same or similar processes, methods, operations, steps, parameters, and principles as dielectric volume 110, dielectric volume 1310, or dielectric volume 1610. Dielectric volume 1910 may be formed from the same or similar materials or composition of materials as dielectric volume 110, dielectric volume 1310, or dielectric 1610.

Non-conducting aperture 1920, located on the radial exterior of dielectric volume 1910, determines the radial maximum of dielectric volume 1910. As shown in FIGS. 19B-19C, non-conducting aperture 1920 extends longitudinally between two edges 1960A, 1960B. Dielectric volume 1910 terminates in free space at non-conducting aperture 1920. In certain embodiments, non-conducting aperture 1920 includes convex, concave, or both convex and concave surfaces. Although not shown in FIG. 19B, in certain embodiments the radial minimum of non-conducting aperture 1920 may exceed the radial maximum of first radiator 1905 or second radiator 1915.

First radially interior surface 1930, located on the radial interior of dielectric volume 1910, may extend longitudinally from one or more feed surfaces 1950 to the longitudinal maximum (e.g., edge 1960A in FIG. 19C) of dielectric volume 1910. In certain embodiments, first radially interior surface 1930 may extend radially from a radial minimum of dielectric volume 1910 to edge 1960A (or, in embodiments without edges 1960A, to non-conducting aperture 1920). In certain embodiments, first radially interior surface 1930 includes convex, concave, or both convex and concave surfaces. In certain embodiments, conducting surfaces may be mated to first radially interior surface 1930 during fabrication of antenna 1900.

Second radially interior surface 1940, located on the radial interior of dielectric volume 1910, may extend longitudinally from one or more feed surfaces 1950 to the longitudinal minimum of dielectric volume 1910 at one or more edges 1960B. In certain embodiments, second radially interior surface 1940 may extend radially from one or more feed surfaces 1950 to edge 1960B at the longitudinal minimum of dielectric volume 1910 (or, in embodiments without edges 1960B, to non-conducting aperture 1920). In certain embodiments, second radially interior surface 1940 includes convex, concave, or both convex and concave surfaces. In certain embodiments, conducting surfaces may be mated to second radially interior surface 1940 during fabrication of antenna 1900.

One or more feed surfaces 1950, located on the radial interior of dielectric volume 1910, may extend radially from the radial minimum of dielectric volume 1910 to the radial minimum of second radially interior surface 1940 and longitudinally from the radial minimum of first radially interior surface 1930 to the longitudinal maximum of second radially interior surface 1940. As shown in FIG. 19C, one feed surface extends longitudinally and one feed surface extends radially. In certain embodiments, one or more feed surfaces 1950 may mate to a transmission line. For example, as shown in FIG. 19C, one or more feed surfaces 1950 may mate to a coaxial connector or cable, such as a bulkhead, thread-in, or flanged coaxial connector or cable.

Dielectric volume 1910 may have one or more edges 1960A, 1960B. As shown in FIG. 19C, dielectric volume 1910 contains one edge 1960A at the longitudinal maximum of dielectric volume 1910 and one edge 1960B at the longitudinal minimum of dielectric volume 1910. In certain embodiments, edges 1960A, 1960B may be included in dielectric volume 1910 to accommodate fabrication tolerances or to provide flat surfaces (e.g., flats parallel to the XY-plane) for mating to other structures. In certain embodiments dielectric volume 1910 may not contain edges 1960A, 1960B.

As shown in FIG. 19B, azimuthal plane 1970 defines the radiation horizon (θ=90°). In certain embodiments, azimuthal plane 180 may also define the azimuthal plane (θ=90°, XY) corresponding to an external ground plane.

Axis of radial symmetry 1980 defines the Z-axis around which dielectric volume 1910 is azimuthally uniform or radially symmetric. An azimuthally uniform structure does not vary in azimuth (φ). Dielectric volume 1910 is azimuthally uniform as shown in FIG. 19. In certain embodiments, dielectric volume 1910 may be radially symmetric to achieve certain RF performance characteristics or to facilitate certain fabrication methods.

In certain embodiments, a dielectric unit may be formed from dielectric volume 1910. To form a dielectric unit, a first conducting surface may be disposed on first radially interior surface 1930, a second conducting surface may be disposed on second radially interior surface 1940, or both. In certain embodiments the first conducting surface or second conducting surface may also be disposed on one or more edges 1960A, 1960B.

In certain embodiments, dielectric volume 1910 (and any corresponding dielectric unit or antenna) may be scaled in one or more radial dimensions. In certain embodiments, scaling may improve directivity in the direction of a minor radial axis or plane (the axis or plane with a smaller scaling factor) or a major radial axis or plane (the axis or plane with a larger scaling factor). In certain embodiments, antenna 1900 may be symmetric about the ZX and ZY planes containing an axis of symmetry.

FIG. 19B illustrates a sectional view of antenna 1900 including dielectric volume 1910. As illustrated, antenna 1900 may also include first radiator 1905, second radiator 1915, top hat 1925, ground plane 1935, first void 1965, second void 1975, and dielectric jacket 1990. As shown in FIG. 19B, first radiator 1905, second radiator 1915, top hat 1925, and ground plane 1935 are conducting elements. Antenna 1900 may be electrically coupled via pin 1955 to transmission line 1945 for the transmission and reception of RF energy. As shown in FIG. 19, the maximum radius of antenna 1900 does not exceed $\lambda_L/6$ and the maximum height of antenna 200 does not exceed $\lambda_L/4$. Antenna 1900 has a topology similar to antenna 1600, except that in antenna 1900, dielectric volume 1910 extends radially inward to pin 1945 and first radiator 1905 does not present a conducting surface at the longitudinal maximum of dielectric jacket 1940.

First radiator 1905 is located on the radial interior of dielectric volume 1910 and presents a conducting surface at first radially interior surface 1930. First radiator 1905 may also present a conducting surface at one or more edges 1960A between first radially interior surface 1930 and non-conducting aperture 1920. First radiator 1905 may also present a conducting surface at a pin extending from a transmission line coupled to antenna 1900. First radiator 1905 may extend longitudinally from a feed surface 1950 to the longitudinal maximum (e.g., edge 1960A in FIG. 19C) of dielectric volume 1910. In certain embodiments, first radiator 1905 may extend from an inner conductor of a transmission line (e.g., a pin extending from the transmission line) to the longitudinal maximum of dielectric volume 1910. First radiator 1905 may be azimuthally uniform or radially symmetric. In certain embodiments, first radiator 1905 may be symmetric. First radiator 1905 may extend radially from an inner conductor of a transmission line to one or more edges 1960A of dielectric volume 1910. In certain embodiments, first radiator 1905 may extend to the maximum radius of dielectric volume 1910 (e.g., to non-conducting aperture 1920 in FIG. 19B). In certain embodiments, first radiator 1905 may include convex, concave, or both convex and concave surfaces.

In certain embodiments, the volume to the radial interior of first radiator 1905 is a void (e.g., free space or air). In certain embodiments dielectric structures (e.g., a dielectric filler) may be inserted into the void to the radial interior of first radiator 1905.

First radiator 1905 may be formed according to the same or similar methods, operations, steps, parameters, and principles as first radiator 1305 or first radiator 1605, compatible with the antenna 1900 topology illustrated in FIG. 19.

In certain embodiments, first radiator 1905 may be mated to first radially interior surface 1930 during fabrication of an antenna. For example, first radiator 1905 may be machined from a conductive material and epoxied to first radially interior surface 1930. As another example, first radiator 1905 may be formed by electroless deposition of a conductor on a dielectric base, inserted into a void to the radial interior of first radially interior surface 1930 to mate with first radially interior surface 1930, and secured by a dielectric volume and a metallic or dielectric top hat. First radiator 1905 may be formed directly on first radially interior surface 1930. For example, first radiator 1905 may be formed by spraying a conductive ink or dispersion onto first radially interior surface 1930.

In certain embodiments, first radiator 1905 may be electrically coupled to a transmission line. For example, first radiator 1905 may be soldered, welded, or bonded to a pin extending from the center conductor of a transmission line. As another example, a pin extending from the center conductor of a coaxial connector may press fit into first radiator 1905.

In certain embodiments, first radiator 1905 may be mated to or electrically coupled to a top hat. For example, first radiator 1905 may be secured into dielectric volume 1910 by a dielectric top hat fastened to dielectric volume 1910. As another example, first radiator 1905 may be conductively epoxied at its maximum longitudinal dimension to a conducting top hat that prevents current flow on the radial interior of first radiator 1905.

In certain embodiments, the maximum radial dimension of first radiator 1905 may exceed the minimum radial dimension of non-conducting aperture 1920 (e.g., as shown in FIG. 19B). Reducing the minimum radial dimension of non-conducting aperture 1920 may thin dielectric volume 1910 and provide the advantage of reducing antenna 1900 weight or increasing the operating bandwidth of antenna 1900. In certain embodiments, the minimum radial dimension of non-conducting aperture 1920 may exceed the maximum radial dimension of first radiator 1905. Increasing the thickness of dielectric volume 1910 may have the advantage of reducing the lowest operating frequency of antenna 1900, improving antenna 1900 return loss near the lowest operating frequency, or controlling radiation pattern gain or azimuthal uniformity at certain frequencies.

Second radiator 1915 is located on the radial interior of dielectric volume 1910 and presents a conducting surface at second radially interior surface 1940. Second radiator 1915 may also present a conducting surface at one or more edges 1960B between second radially interior surface 1940 and non-conducting aperture 1920. Second radiator 1915 may extend longitudinally and radially from one or more feed surfaces 1950 to one or more edges 1960B or to non-conducting aperture 1920. In certain embodiments, second radiator 1915 may extend from an outer conductor of a transmission line (e.g., a shield of a coaxial cable or connector) to the longitudinal minimum of dielectric volume 1910. Second radiator 1915 may be azimuthally uniform or radially symmetric. In certain embodiments, second radiator 1915 may be symmetric. Second radiator 1915 may extend radially from an outer conductor of a transmission line to one or more edges 1960B of dielectric volume 1910. In certain embodiments, second radiator 1915 may extend to the maximum radius of dielectric volume 1910. In certain embodiments, second radiator 1915 includes convex, concave, or both convex and concave surfaces. In certain embodiments, second radiator 1915 may have the same maximum radius as first radiator 1905. In certain embodiments, second radiator 1915 may have a maximum radius that is greater than or less than the maximum radius of first radiator 1905.

In certain embodiments, the volume to the radial interior of second radiator 1915 is a void (e.g., free space or air). In certain embodiments dielectric structures (e.g., a dielectric filler) may be inserted into the void to the radial interior of second radiator 1915.

Second radiator 1915 may be formed according to the same or similar methods, operations, steps, parameters, and principles as first radiator 1905, and may be assembled or integrated into antenna 1900 according to the same or similar methods, operations, steps, parameters, and principles as first radiator 1905.

In certain embodiments, second radiator 1915 may be electrically coupled to a transmission line. For example, second radiator 1915 may be soldered, welded, or bonded to an outer conductor of a transmission line. As another example, a conducting surface of second radiator 1915 may serve as the outer conductor of a transmission line (e.g., a conducting surface of second radiator 1915 may mate to a dielectric "candlestick" extending from a coaxial connector). Coupling second radiator 1915 to a transmission line excites RF currents on second radiator 1915 over a wide bandwidth.

In certain embodiments, second radiator 1915 may be mated to or electrically coupled to a ground plane. For example, second radiator 1915 may be secured into dielectric volume 1910 by a ground plane fastened to dielectric volume 1910. As another example, second radiator 1915 may be conductively epoxied at its minimum longitudinal dimension to a conducting ground plane that prevents current flow on the radial interior of second radiator 1915.

In certain embodiments, the maximum radial dimension of second radiator 1915 may exceed the minimum radial dimension of non-conducting aperture 1920 (e.g., as shown in FIG. 19B). In certain embodiments, the maximum radial dimension of non-conducting aperture 1920 may exceed the maximum radial dimension of second radiator 1915 and any edge 1960B on dielectric volume 1910.

As seen by comparison of FIG. 13B, FIG. 16B, and FIG. 19B, top hat 1925 in antenna 1900 has substantially the same structure and function as top hat 1325 in antenna 1300 and top hat 1625 in antenna 1600. Top hat 1925 may have the same or similar structure, components, elements, configurations, features, interfaces, parameters, or functions in an antenna as top hat 1325 or top hat 1625. Top hat 1925 may be formed according to the same or similar methods, operations, steps, parameters, and principles, or of the same or similar material(s), as top hat 1325 or top hat 1625.

As seen by comparison of FIG. 13B, FIG. 16B, and FIG. 19B, ground plane 1935 in antenna 1900 has substantially the same structure and function as ground plane 1335 in antenna 1300 or ground plane 1635 in antenna 1600. Ground plane 1935 may have the same or similar structure, components, elements, configurations, features, interfaces, parameters, or functions in an antenna as ground plane 1335 or ground plane 1635. Ground plane 1935 may be formed according to the same or similar methods, operations, steps, parameters, and principles as ground plane 1335 or ground plane 1635.

Transmission line 1945 may be any suitable transmission line for transmission and reception of RF energy. Transmission line 1945 may have the same or similar structure, components, elements, configurations, features, interfaces, parameters, or functions as transmission line 1345 or transmission line 1645, except that transmission line 1945 interfaces to antenna 1900 in the manner illustrated in FIG. 19B. A dielectric jacket of transmission line 1945 may extend longitudinally past second radiator 1915 and terminate at first radiator 1905. In certain embodiments, a pin of transmission line 1945, longitudinally coextensive with a dielectric jacket, may extend longitudinally past second radiator 1915 and terminate at first radiator 1905.

Pin 1955, centered on axis of radial symmetry 1980, may extend longitudinally from transmission line 1945 to first radiator 1905. In certain embodiments, a radial exterior of pin 1955 may mate to a dielectric jacket of transmission line 1945. In certain embodiments, pin 1955 electrically couples first radiator 1905 to transmission line 1945. First radiator 1905 may be soldered, welded, or bonded to pin 1955. As another example, pin 1955 may press fit into first radiator 1905. In certain embodiments, pin 1955 may extend longitudinally past a dielectric jacket into or through first radiator 1905. For example, pin 1955 may extend longitudinally through first radiator 1905 and be soldered to the radial interior of first radiator 1905 such that the solder joint is accessible in a void to the radial interior of first radiator 1905.

First void 1965, as shown in FIG. 19C, fills the volume to the radial interior of first radially interior surface 1930. In certain embodiments, first radiator 1905 may be inserted into first void 1965 to present a conducting surface at first radially interior surface 1930 and at pin 1955. For example, first radiator 1905 may be machined from a conducting volume, inserted into first void 1965, epoxied to first radially interior surface 1930, and soldered to pin 1955.

In certain embodiments, first void 1965 may be filled, partially or entirely, with dielectric material. For example, first radiator 1905 may be disposed onto first radially interior surface 1930, and first void 1965 to the radial interior of first radiator 1905 may be filled with dielectric to protect or isolate the radial interior of first radiator 1905 from external environments. In certain embodiments, first radiator 1905 may fill first void 1965 partially or entirely. For example, first radiator 1905 may be stamped from a thick sheet of conducting material such that first radiator 1905 partially fills first void 1965. In certain embodiments in which first radiator 1905 is formed without conducting volumes, first radiator 1905 may not fill first void 1965.

Second void 1975, as shown in FIG. 19C, fills the volume to the radial interior of second radially interior surface 1940. In certain embodiments, second radiator 1915 may be inserted into second void 1975 to present a conducting surface at second radially interior surface 1940. In certain embodiments, second radiator 1915 may also present a conducting surface at the radial maximum of transmission line 1945. In certain embodiments, second radiator 1915 may also present a conducting surface at one or more feed surfaces 1950. For example, second radiator 1915 may be machined from a conducting volume, inserted into second void 1975, and epoxied to second radially interior surface 1940.

In certain embodiments, second void 1975 may be filled, partially or entirely, with dielectric material. For example, second radiator 1915 may be disposed onto second radially interior surface 1940 and mated to transmission line 1945, and second void 1975 to the radial interior of second radiator 1915 may be filled with dielectric to protect or isolate transmission line 1945 or the radial interior of second radiator 1915 from external environments. In certain embodiments, second radiator 1915 may fill second void 1975 partially or entirely. For example, second radiator 1915 may be stamped from a thick sheet of conducting material such that second radiator 1915 partially fills second void 1975. In certain embodiments in which second radiator 1915 is formed without conducting volumes, second radiator 1915 may not fill second void 1975. In certain embodiments, transmission line 1945 may partially fill second void 1975.

Dielectric jacket 1990, as shown in FIG. 19B, extends longitudinally between the longitudinal maximum of second radially interior surface 1940 to the longitudinal minimum of first radially interior surface 1930. As shown in FIG. 19B, dielectric jacket 1990 mates to the radial exterior of pin 1955 and extends radially to the radial minimum of second radially interior surface 1940. In certain embodiments, dielectric jacket 1990 may be a stand-alone component. For example, dielectric jacket 1990 may be a ring- or donut-shaped dielectric inserted between first radiator 1905 and second radiator 1915 during assembly of antenna 1900. In certain embodiments, dielectric jacket 1990 may be an extension of a dielectric in transmission line 1945. In certain embodiments, dielectric jacket may be integrated into dielectric volume 1910. For example, dielectric volume 1910 may be additively manufactured such that the radial minimum of dielectric volume 1910 extends to the radial maximum of pin 1955. In certain embodiments, dielectric jacket 1990 may be omitted from antenna 1900. Including dielectric jacket 1990 in antenna 1900 may have one or more advantages, including securing pin 1955, precisely controlling separation between first radiator 1905 and second radiator 1915, reliably mating transmission line 1945 to dielectric volume 1910, and improving power handling.

Antenna 1900 may be formed according to any methods, operations, steps, parameters, and principles for forming antenna 200, antenna 500, antenna 800, antenna 1000, antenna 1300, or antenna 1600 that are compatible with the topology of antenna 1900 as shown in FIG. 19. Antenna 1900 may be formed according to any methods, operations, steps, parameters, and principles compatible with the structure, components, elements, configurations, features, interfaces, or parameters of first radiator 1905, dielectric volume 1910, second radiator 1915, top hat 1925, and ground plane 1935. Antenna 1900 may be formed of the same or similar material(s) as other antennas disclosed herein.

In certain embodiments, antenna 1900 may be formed without conducting volumes. For example, first radiator 1905 may be formed by disposing a first conducting surface on a first dielectric base and second radiator 1915 may be formed by disposing a second conducting surface on a second dielectric base, such that antenna 1900 assembled from first radiator 1905, second radiator 1915, and dielectric volume 1910 has no conducting volumes. As another example, first radiator 1905 may be stamped from a thin conducting sheet and second radiator 1915 may be formed by disposing a first conducting surface on a first dielectric base, such that antenna 1900 assembled from first radiator 1905, second radiator 1915, and dielectric volume 1910 has no conducting volumes.

In certain embodiments, antenna 1900 may be formed from a dielectric unit without conducting volumes. For example, antenna 1900 may be formed by electroless deposition of copper on first radially interior surface 1930, second radially interior surface 1940, and one or more edges 1960A, 1960B to form a dielectric unit. In certain embodiments, one or more surfaces of dielectric volume 1910 may be masked or treated to control the location of conducting surfaces on a dielectric unit. For example, non-conducting aperture 1920 and one or more feed surfaces may be partially or completely masked such that masked surfaces remain non-conducting after disposing conducting surfaces on dielectric volume 1910.

In certain embodiments, antenna 1900 may not have top hat 1925 or ground plane 1935. In certain embodiments, antenna 1900 may be formed from integrating first radiator 1905 and top hat 1925 or from integrating second radiator 1915 and ground plane 1935. For example, second radiator 1915 and ground plane 1935 may be machined from a single conducting volume and mated to a dielectric unit that includes dielectric volume 1910 and first radiator 1905 electrolessly deposited on first radially interior surface 1930. As another example, first radiator 1905 and top hat 1925 may be stamped from a single sheet of conducting material and epoxied onto first radially interior surface 1930 and one or more edges 1960A of dielectric volume 1910.

In contrast to antenna 200, antenna 500, antenna 800, and antenna 1000, all of which are not symmetric in the Z-dimension, antenna 1900 may be described as having near longitudinal symmetry. As shown in FIG. 19B, antenna 1900 is not entirely symmetric in the Z-dimension due to one or more feed surfaces 1950 that render dielectric volume 1910 asymmetric. But antenna 1900 has certain symmetric or near-symmetric features in the Z-dimension, such as non-conducting aperture 1920, top hat 1925 vis-à-vis ground plain 1935, and first radiator 1905 vis-à-vis second radiator 1915. Near longitudinal symmetry in antenna 1900 may have the advantage of increasing gain and azimuthal uniformity in radiation patterns near the horizon ($\theta=90°$).

The topology of dielectric volume 1910 (and antenna 1900) may have one or more advantages over the topology of dielectric volume 1310 (and antenna 1300) and dielectric volume 1610 (and antenna 1600). For example, antenna 1900 has fewer conducting surfaces (relative to antenna 1300 and antenna 1900) near the feed transition where transmission line 1945 couples to antenna 1900. The topology of dielectric volume 1310 (and antenna 1300) and dielectric volume 1610 (and antenna 1600) may have one or more advantages over the topology of dielectric volume

1910 (and antenna 1900). For example, dielectric volume 1910 has a smaller minimum feature size (relative to antenna 1300 and antenna 1600).

Figure 21:
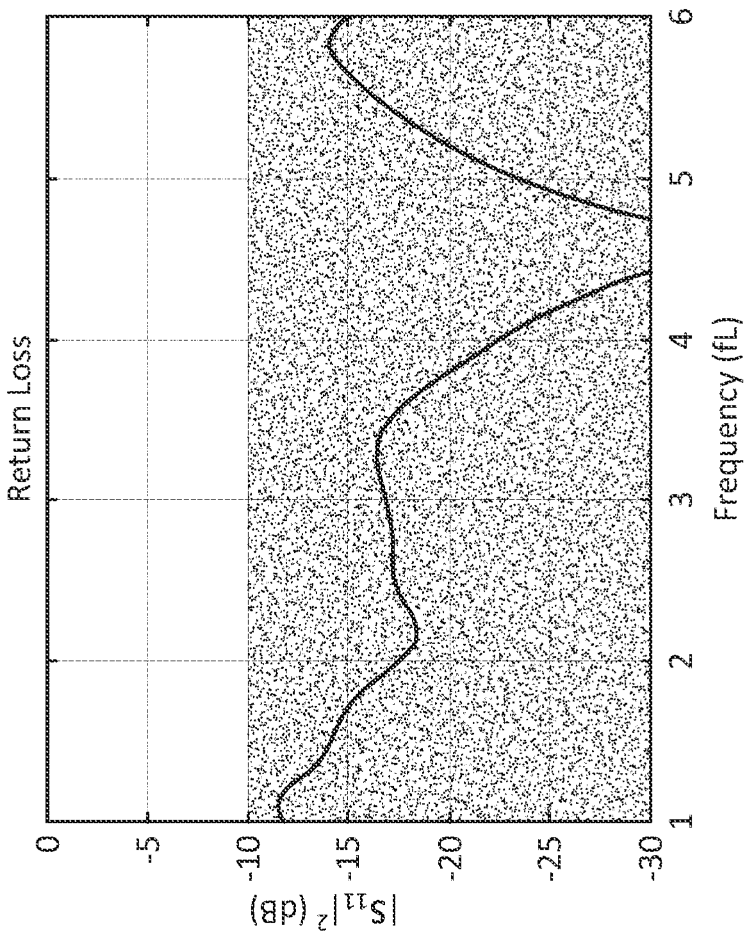
FIG. 21 is a diagram that illustrates the wireless performance of an example antenna in return loss performance, according to certain embodiments.

Collective FIG. 20 and FIG. 21 summarize wireless performance of antenna 1900[11] including radiation pattern and return loss performance—over a 6:1 bandwidth.

[11] The performance shown in collective FIG. 20 and FIG. 21 is for antenna 1900 with a ground plane having the same maximum radius as second radiator 1915. Coupling antenna 1900 to a ground plane exceeding the radius of antenna 1600 may improve return loss at lower frequencies and increase peak gain while maintaining low distortion performance.

Collective FIG. 20 illustrates radiation patterns of antenna 1900 in elevation (ZY or ZX) and azimuth (XY) planes. As shown in the elevation cuts of FIGS. 20A-20B, antenna 1900 maintains a horizon beam including the radiation horizon (θ=90°) over a frequency band of 1-6 fL. In certain embodiments, antenna 1900 may transmit and receive a beam including the horizon across a pattern bandwidth of 6:1. FIGS. 20C-20D illustrate radiation patterns of antenna 1900 in the azimuth plane (XY, θ=90°) from 1-6 fL. Antenna 1900 azimuth plane patterns are substantially uniform in azimuth over a 6:1 pattern bandwidth (from 1-6 fL), with a maximum variation of ±1 dB at 6 fL.

Antenna 1900 return loss in FIG. 21 exceeds 10 dB across a 6:1 efficiency bandwidth (1-6 fL). Although not shown in FIG. 21, antenna 1900 return loss exceeds 6 dB across a 6:1 efficiency bandwidth, regardless of the size of the external ground plane antenna 1900 is placed over. Ground plane size does not substantively affect return loss performance above 2 fL (i.e., return loss above 2 fL remains at 10 dB or greater for all ground sizes). Accordingly, antenna 1900 is placement insensitive above 2 fL, including from 2-6 fL. In certain embodiments, ground plane shaping or edge or surface treatment (e.g., with metasurfaces or integrated filters) to remove surface waves or edge diffraction may achieve 10 dB return loss for antenna 1900 across a 6:1 bandwidth over any ground plane size.

As shown in Table 11, the fidelity of wireless signals transmitted or received by antenna 1600 in the frequency band of 1-6 fL exceeds 80%. In certain embodiments, antenna 1900 may instantaneously transmit and receive wireless signals across a single instantaneous bandwidth of up to 6:1. In certain embodiments, antenna 1900 may transmit and receive wireless signals across a 6:1 bandwidth, wherein the 6:1 bandwidth comprises a plurality of instantaneous frequency bands, each instantaneous frequency band having a bandwidth that meets or exceeds a lowest operating frequency.

TABLE 11

Antenna 1900 Fidelity in a Horizon Beam (θ = 90°)

| Frequency Band | Fidelity Factor |
|---|---|
| 1-2 fL | 96% |
| 1-3 fL | 87% |
| 1-4 fL | 92% |
| 1-5 fL | 86% |
| 1-6 fL | 83% |
| 2-3 fL | 95% |
| 2-4 fL | 98% |
| 2-5 fL | 89% |
| 2-6 fL | 89% |
| 3-4 fL | 99% |
| 3-5 fL | 96% |
| 3-6 fL | 93% |
| 4-5 fL | 99% |
| 4-6 fL | 96% |
| 5-6 fL | 97% |

Figure 22:
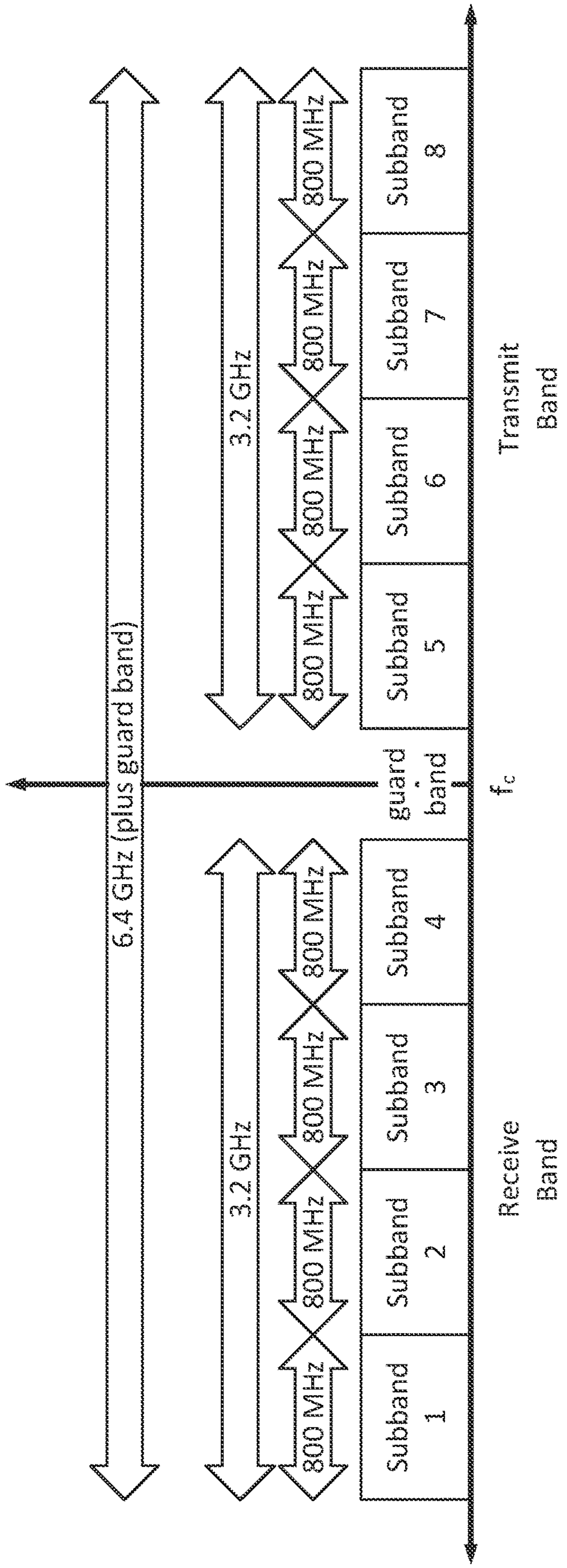
FIG. 22 is a diagram that illustrates an example spectrum allocation for one or more wireless signals transmitted and received by antennas disclosed herein, according to certain embodiments.

FIG. 22 illustrates an example spectrum allocation for one or more wireless signals transmitted and received by antennas disclosed herein. As shown in FIG. 22, a spectrum allocation may have a center frequency $f_c$ and a guard band separating transmit and receive bands. A receive band spanning up to 3.2 GHz may include one or more subbands (e.g., subbands 1-4). A transmit band spanning up to 3.2 GHz may include one or more subbands (e.g., subbands 5-8).

Figure 24:
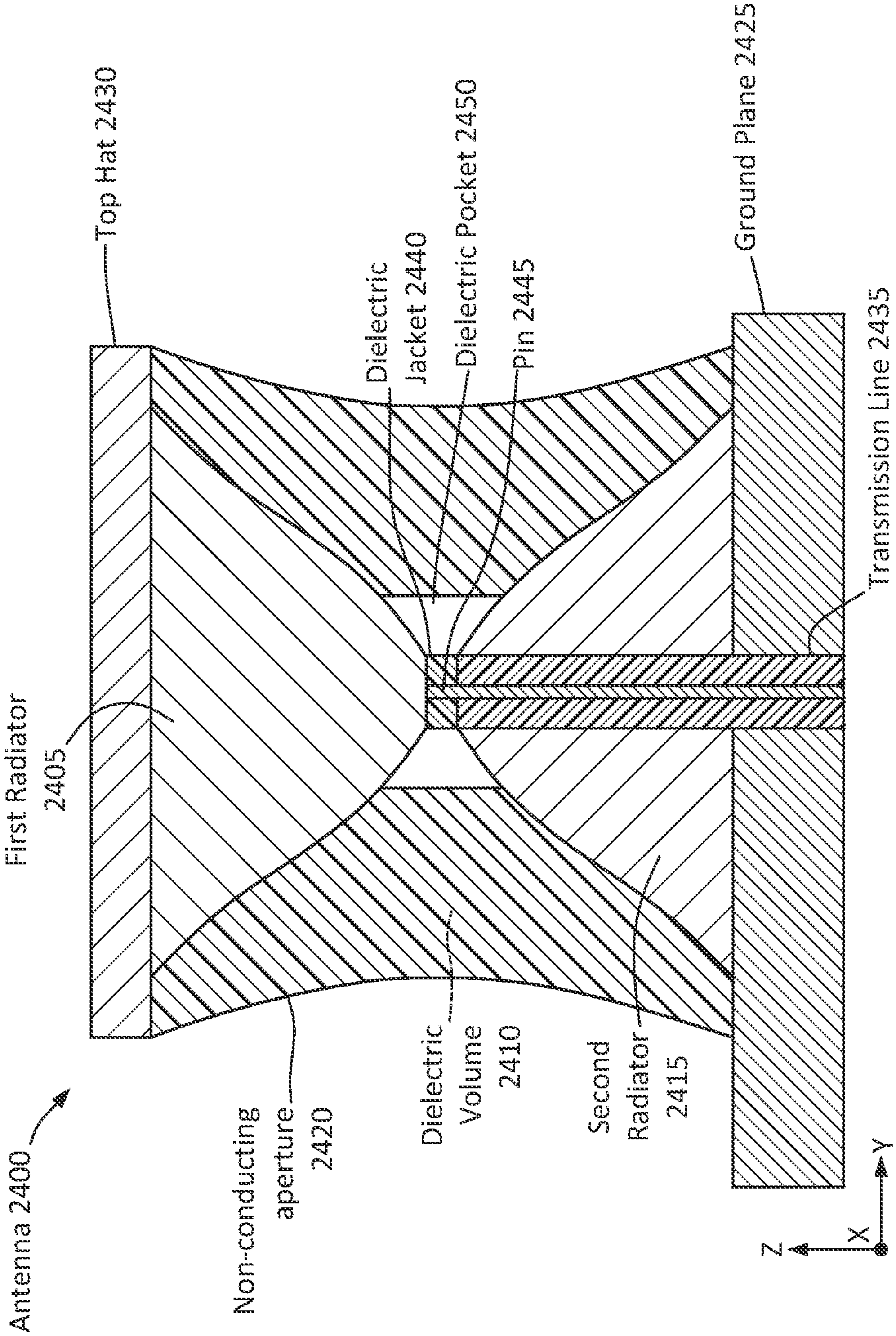
FIG. 24 is a diagram that illustrates the geometry and features of an example antenna, according to certain embodiments.

In certain embodiments an antenna (e.g., antenna 200, antenna 500, antenna 800, antenna 1000, antenna 1300, antenna 1600, antenna 1900, antenna 2400 of FIG. 24, or antenna 2700 of collective FIG. 27) may be configured to transmit and receive wireless signals over a plurality of IBWs, each comprising up to 3.2 GHz. In certain embodiments, an antenna may be configured to transmit and receive wireless signals over a plurality of IBWs, each comprising at least 3.2 GHz. Alternatively or additionally, an antenna may be configured to transmit and receive wireless signals over an IBW up to 6.4 GHz. In certain embodiments, an antenna may be configured to transmit and receive wireless signals over a plurality of IBWs, each comprising at least 6.4 GHz.

In certain embodiments, an antenna may be coupled to a transmit channel and a receive channel. An antenna may transmit to free space wireless signals received from a transmit channel. An antenna may transmit to a receive channel wireless signals received from free space. As shown in FIG. 22, in certain embodiments, the transmit channel may be configured to instantaneously transmit a communication in a transmit frequency band having an IBW of up to 3.2 GHz. In certain embodiments, the transmit channel may be configured to instantaneously transmit a communication in a transmit frequency band having an IBW of at least 3.2 GHZ. As shown in FIG. 22, a receive channel may be configured to instantaneously receive a communication in a receive frequency band having an IBW of up to 3.2 GHz. In certain embodiments, a receive channel may be configured to instantaneously receive a second communication in a receive frequency band having an IBW of at least 3.2 GHZ. As shown in FIG. 22, the transmit frequency band and receive frequency band may not overlap in frequency.

Figure 23:
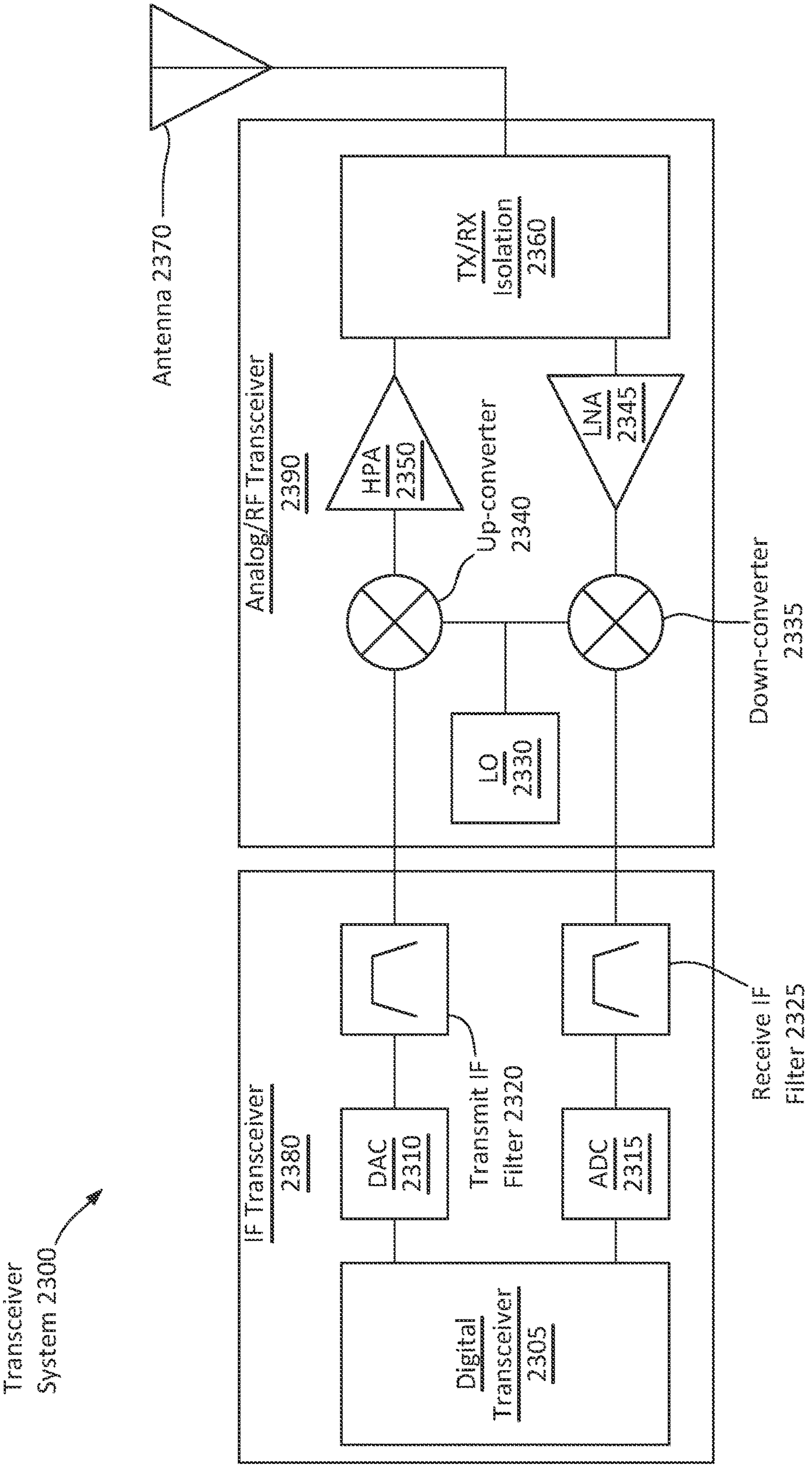
FIG. 23 is a diagram that illustrates an example transceiver system, according to certain embodiments.

FIG. 23 illustrates an example transceiver system that may be used with antenna embodiments disclosed herein. A person of skill in the art will understand that filtering, amplification, frequency conversion, and switching stages may be added or omitted without loss of generality.

Transceiver system 2300 may include IF transceiver 2380 and analog/RF transceiver 2390. Transceiver system 2300 may be connected to one or more antennas 2370. IF transceiver 2380 may generate, transmit, and receive IF (intermediate frequency, or baseband) signals to and from analog/RF transceiver 2390. IF transceiver 2380 may include digital transceiver 2305, DAC 2310 (digital-analog converter), ADC 2315 (analog-digital converter), transmit IF filter 2320, and receive IF filter 2325. Analog/RF transceiver 2390 may transmit and receive analog/RF signals between IF transceiver 2380 and antenna 2370. Analog/RF transceiver may include LO 2330 (local oscillator), down-converter 2335, up-converter 2340, LNA 2345 (low-noise amplifier), HPA 2350 (high power amplifier), and TX/RX isolation 2360. Transceiver system 2300 may include a transmit channel, from digital transceiver 2305 through DAC 2310, transmit IF filter 2320, up-converter 2340, and HPA 2350 to antenna 2370. Transceiver system 2300 may include a receive channel, from antenna 2370 through LNA 2345, down-converter 2335, receive IF filter 2325, and ADC 2315 to digital transceiver 2305. In certain embodiments, circuits, devices, or functions, such as those illustrated in FIG. 23, may be added to or omitted from the transmit channel or receive channel. In certain embodiments, transceiver 2300 may include only the transmit circuits and functions required for a transmit channel or only receive circuits and functions required for a receive channel.

Digital transceiver 2305 may be any suitable digital system for the generation, transmission, and reception of digital IF or baseband signals. In certain embodiments, digital transceiver 2305 may be implemented as a microprocessor, a field-programmable gate array (FPGA), or an application-specific integrated circuit (ASIC). In certain embodiments, digital transceiver 2305 may generate, transmit, or receive a white gaussian signal. In certain embodiments, digital transceiver 2305 may generate, transmit, or receive a spread spectrum signal. In certain embodiments, digital transceiver 2305 may generate, transmit, or receive a featureless signal. In certain embodiments for direct-digital conversion, digital transceiver 2305 may generate, transmit, or receive RF signals without upconversion or downconversion in analog/RF transceiver 2390.

DAC 2310 may be any suitable digital-to-analog converter for converting digital signals to analog or RF signals. DAC 2310 may convert digital signals to analog or RF signals across multiple channels (e.g., subbands 5-8 of FIG. 22). In certain embodiments, DAC 2310 may include multiplexing of multiple channels into a single channel. In certain embodiments, DAC 2310 may include a discrete DAC. In certain embodiments, DAC 2310 may be integrated into digital transceiver 2305. For example, DAC 2310 may include a digital-to-analog converter implemented on an FPGA. In certain embodiments, DAC 2310 may be configured for converting digital signals to analog or RF signals over a wide bandwidth (e.g., a 6:1, 8:1, or 10:1 bandwidth as disclosed herein) with high fidelity.

ADC 2315 may be any suitable analog-to-digital converter for converting analog or RF signals to digital signals. ADC 2315 may convert digital signals to analog or RF signals across multiple channels (e.g., subbands 1-4 of FIG. 22). In certain embodiments, ADC 2315 may include multiplexing of multiple channels into a single channel. In certain embodiments, ADC 2315 may be integrated into digital transceiver 2305. For example, ADC 2315 may include an analog-to-digital converter implemented on an FPGA. In certain embodiments, ADC 2315 may be configured for converting analog or RF signals to digital signals over a wide bandwidth (e.g., a 6:1, 8:1, or 10:1 bandwidth as disclosed herein) with high fidelity.

Transmit IF filter 2320 may be any suitable filter for filtering and conditioning IF or passband signals for upconversion to RF. Receive IF filter 2325 may be any suitable filter for filtering and conditioning IF or passband signals downconverted from RF.

LO 2330 may be any local oscillator suitable for generating a stable carrier signal. LO 2330 may include a crystal oscillator, a variable-frequency oscillator, a temperature-controlled oscillator, a frequency synthesizer, or similar devices for obtaining a stable carrier.

Down-converter 2335 may be any suitable circuit for downconverting RF signals to IF or baseband signals. For example, down-converter 2335 may include a mixer that downconverts from an RF frequency band to an IF or baseband by mixing with a carrier (LO) frequency. In certain embodiments, down-converter 2335 may include filtering or matching circuits.

Up-converter 2340 may be any suitable circuit for upconverting IF or passband signals to RF signals. For example, up-converter 2340 may include a mixer that upconverts from an IF or baseband frequency band to an RF band by mixing with a carrier (LO) frequency. In certain embodiments, up-converter 2340 may include filtering or matching circuits.

In certain embodiments, down-converter 2335 or up-converter 2340 may include one or more frequency multipliers or frequency dividers. For example, up-converter 2340 may up-convert an IF signal to an RF signal by passing harmonics of the IF signal.

LNA 2345 may be any suitable low-noise amplifier for amplifying low power signals without degradation of signal-to-noise (SNR) ratio. In certain embodiments, LNA 2345 may be configured for amplifying wideband wireless signals at any frequency bands or bandwidths disclosed herein (e.g., signals up to 6.4 GHz or signals over a 6:1 bandwidth). For example, LNA 2345 may be configured for amplifying a received signal from 1-6 GHz with low noise figure, low distortion, gain flatness, high IP3, wide dynamic range, over a wide temperature range. In certain embodiments, LNA 2345 may be a cascade of amplifiers or may be distributed throughout the receive chain. In certain embodiments, LNA 2345 may include filtering or matching circuits.

HPA 2350 may be any suitable high power amplifier for amplifying high power RF signals. In certain embodiments, HPA 2350 may be configured for amplifying wideband wireless signals at any frequency bands or bandwidths disclosed herein (e.g., signals up to 6.4 GHz or signals over a 6:1 bandwidth). For example, HPA 2350 may be configured for amplifying a transmit signal from 1-6 GHz with high output power, gain flatness, wide dynamic range, and high linearity, over a wide temperature range. In certain embodiments, HPA 2350 may be a cascade of amplifiers or may be distributed throughout the transmit chain. In certain embodiments, HPA 2350 may include filtering or matching circuits.

TX/RX isolation 2360 may be any suitable circuit or device for isolating transmit (TX) and receive (RX) channels. TX/RX isolation 2360 may include one or more filters, power dividers, duplexers, diplexers, circulators, limiters, or RF switches. In certain embodiments, a combination of TX/RX isolation 2360 and spectrum allocation may isolate transmit and receive channels. For example, a diplexer implemented in TX/RX isolation 2360 may separate a transmit signal at a transmit band from a receive signal at a receive band that is lower in frequency than the transmit band. In certain embodiments, a combination of TX/RX isolation 2360 and signal spreading may isolate transmit and receive channels. For example, a circulator implemented in TX/RX isolation 2360 may provide 20 dB of isolation between transmit and receive channels, and signal spreading may provide up to an additional 50 dB of transmit signal rejection on the receive channel.

Antenna 2370 may be any antenna configured for the instantaneous transmission and reception of wideband wireless signals, as disclosed herein. Antenna 2370 may be one or more of antenna 200, antenna 500, antenna 800, antenna 1000, antenna 1300, antenna 1600, antenna 1900, antenna 2400, antenna 2700, or any combination thereof. In certain embodiments, antenna 2370 may be an array of antenna elements. In certain embodiments, a plurality of transceiver systems 2300 may be connected to a plurality of antennas 2370 to form a multi-channel antenna array.

In certain embodiments, DAC 2310 and ADC 2315 may synthesize IF or baseband signals each having IBWs of up to 3.2 GHZ. As shown in FIG. 23, the transmit chain upconverts an IF signal to an RF bandwidth and the receive chain downconverts an IF signal from an RF bandwidth, for transmission or reception via antenna 2370. In certain embodiments, transmit IF filters 2320 and receive IF filter 2325 (each lowpass or bandpass) may filter and condition the IF signal before upconversion or after downconversion. In certain embodiments, a transmit signal of up to 3.2 GHZ may be transmitted through antenna 2370 over a wireless channel without upconversion (e.g., removing upconverter 2340 in FIG. 23). In certain embodiments, a receive signal of up to 3.2 GHZ may be received through the antenna over a wireless channel without downconversion (e.g., removing downconverter 2335 in FIG. 23).

In certain embodiments, LO 2330 may provide a spreading code for mixing into a transmit or receive communication during upconversion or downconversion, respectively. In certain embodiments, transmit and receive channels may have separate LOs, such that a transmit spreading code and a receive spreading code are different codes. In certain embodiments, transmit and receive channels may share a single LO 2330, and digital transceiver 2305 may spread transmit or receive signals. In certain embodiments, only one channel, transmit or receive, may transmit or receive a signal containing a spreading code.

In certain embodiments, the transmit frequency band and the receive frequency band may not overlap in frequency. In certain embodiments, the transmit channel and receive channel may be isolated based on the transmit band not overlapping the receive band. This may provide one or more advantages, such as omitting or reducing circuitry in TX/RX isolation 2360 (e.g., a duplexer, diplexer, circulator, or switch), as shown in FIG. 23, increasing transmit power, or increasing receiver sensitivity and interference rejection. In certain embodiments, the transmit frequency band may be higher in frequency than the receive frequency band. The receive channel may be configured for direct-digital downconversion of a received communication. The transmit channel may be configured for RF upconversion of a transmitted communication. In certain embodiments, the receive frequency band is higher in frequency than the transmit frequency band. The transmit channel may be configured for direct-digital upconversion of a transmitted communication. The receive channel may be configured for RF downconversion of a received communication.

In certain embodiments, the transmit channel and the receive channel may be configured for half-duplex communication. This may advantageously provide for configuring two wireless stations (e.g., two radios communicating over a wireless channel) both for direct-digital downconversion (receive) or both for direct-digital upconversion (transmit), simplifying transceiver architecture, and limiting local oscillator leakage (LO).

In certain embodiments the transmit and receive channels may be configured for spread spectrum communication. A transmitted communication may contain a first spreading code. A received communication may contain a second spreading code. In certain embodiments, the transmit channel and receive channel may be isolated based on the first spreading code and second spreading code being different codes. In certain embodiments, the first spreading code and second spreading code may be uncorrelated during acquisition and synchronization. In certain embodiments, the transmit band and receive band may be transmitted and received in the same band or overlapping bands based on isolating the transmit channel and the receive channel with signal spreading.

Figure 25C:
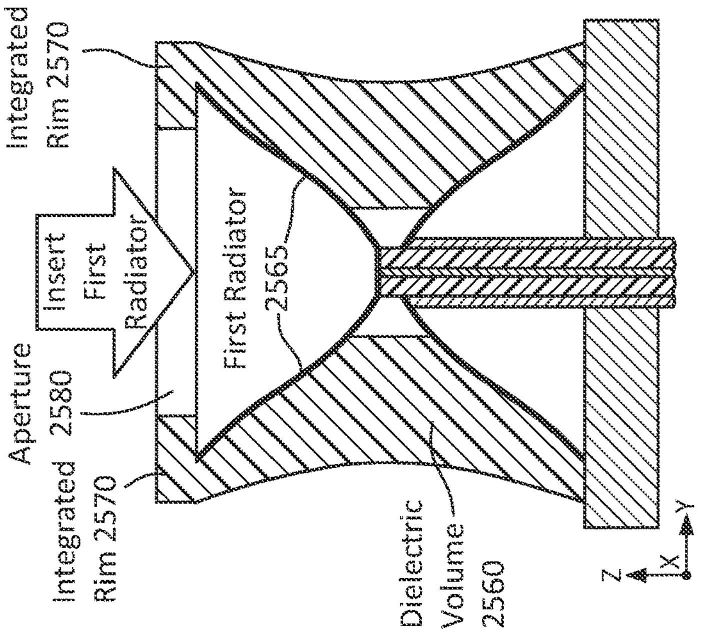
FIGS. 25A-25C are diagrams that illustrate example top-hat topologies in an antenna, according to certain embodiments.
Figure 25B:
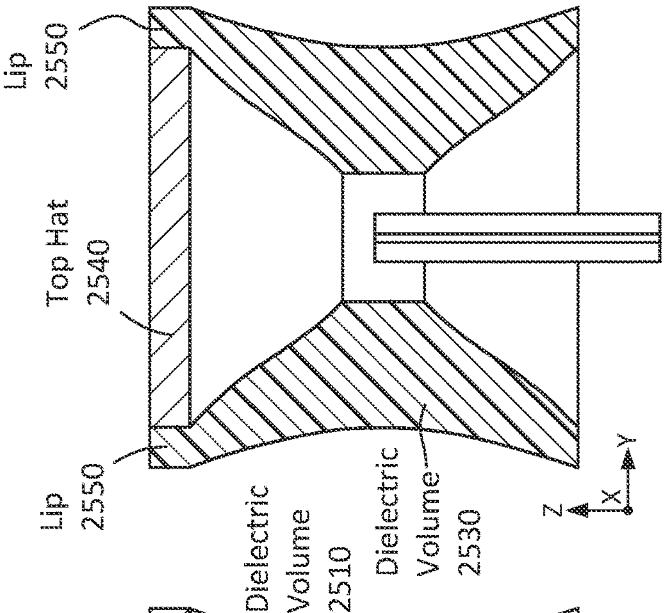
Figure 25A:
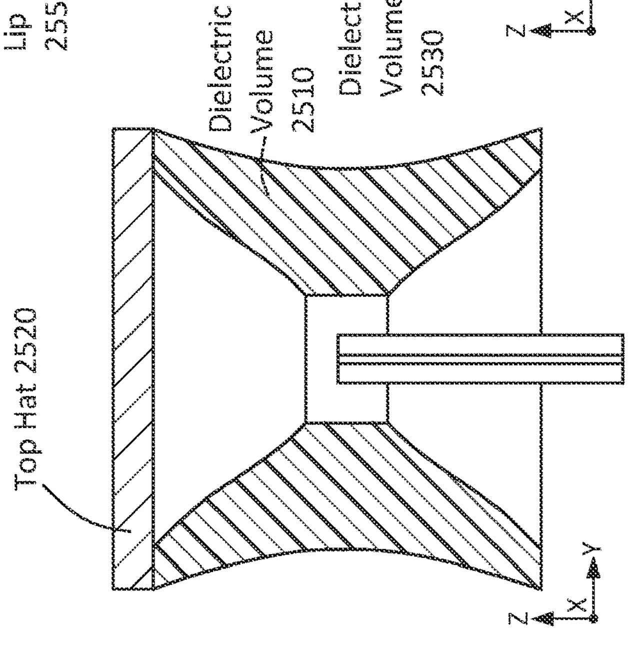

FIG. 24 and collective FIG. 25 illustrate various structures, components, elements, configurations, features, interfaces, methods, operations, and parameters for a top-hat antenna. Top-hat embodiments discussed with respect to FIGS. 24 and FIGS. 25A-25C may also be implemented in other antenna embodiments disclosed herein little to no effect on antenna size or performance.

FIG. 24 illustrates the geometry and features of antenna 2400 in a sectional view. The sectional view of FIG. 24 is taken through the center of antenna 2400. FIG. 24 is a sectional view of antenna 2400 that includes conducting surfaces and volumes of antenna 2400. Although FIG. 24 illustrates sections in a ZY plane, any elevation-plane section through the center of antenna 2400 (i.e., in any elevation plane θ-r) would yield the same views. As shown in FIG. 24, antenna 2400 includes dielectric volume 2410, non-conducting aperture 2420, top hat 2430, dielectric jacket 2440, dielectric pocket 2450, first radiator 2405, second radiator 2415, ground plane 2425, transmission line 2435, and pin 2445. Although not illustrated in FIG. 24, an axis of radial symmetry (Z-axis) runs through the center of antenna 2400 and an azimuthal plane (XY plane) coincides with the longitudinal maximum of ground plane 2425. As shown in FIG. 24, the maximum radius of antenna 2400 does not exceed $\lambda_L/10$ and the maximum height of antenna 2400 does not exceed $\lambda_L/6$.

Dielectric volume 2410, as shown in FIG. 24, may have multiple surfaces, including non-conducting aperture 2420, a first radially interior surface for mating with a first radiator, a second radially interior surface for mating with a second radiator, and one or more edges at the longitudinal maximum and minimum of dielectric volume 2410. Dielectric volume 2410 (and antenna 2400) is azimuthally uniform (without variation in φ) such that taking a section in any elevation plane (θ-r plane) yields the view in FIG. 24. Rotating the sectional view in FIG. 24 about an axis of radial symmetry yields a three-dimensional dielectric volume 2410 having multiple surfaces, with each surface in a three-dimensional view corresponding to a curve in the sectional view of FIG. 24. Dielectric volume 2410 may be radially symmetric or azimuthally uniform about an axis of radial symmetry. Dielectric volume 2410 terminates at its radial interior in a first radially interior surface, a second radially interior surface, and dielectric pocket 2450. Dielectric volume 2410 terminates at its radial exterior in non-conducting aperture 2420. Dielectric volume 2410 terminates at its longitudinal maximum in one or more edges. Dielectric volume 2410 also terminates at its longitudinal minimum in one or more edges.

Dielectric volume 2410 may have the same or similar structure, components, elements, configurations, features, interfaces, parameters, or functions in an antenna as dielectric volume 1310, dielectric volume 1610, or dielectric volume 1910, compatible with the topology illustrated in FIG. 24. Dielectric volume 2410 may be formed according to the same or similar processes, methods, operations, steps, parameters, and principles as dielectric volume 110, dielectric volume 1310, dielectric volume 1610, or dielectric volume 1910. Dielectric volume 2410 may be formed from the same or similar materials or composition of materials as dielectric volume 110, dielectric volume 1310, dielectric 1610, or dielectric volume 1910.

Non-conducting aperture 2420, located on the radial exterior of dielectric volume 2410, determines the radial maximum of dielectric volume 2410. As shown in FIG. 24, non-conducting aperture 2420 extends longitudinally between two edges of dielectric volume 2410. Dielectric volume 2410 terminates in free space at non-conducting aperture 2420. In certain embodiments, non-conducting aperture 2420 includes convex, concave, or both convex and concave surfaces. Although not shown in FIG. 24, in certain embodiments the radial minimum of non-conducting aperture 2420 may exceed the radial maximum of a first radiator, a second radiator, or both. In certain embodiments, the longitudinal maximum of non-conducting aperture 2420 may correspond to the longitudinal minimum of a top hat.

Top hat 2430, as shown in FIG. 24, is located at the longitudinal maximum of dielectric volume 2410. In certain embodiments, top hat 2430 extends from the axis of radial symmetry at the center of antenna 2400 to the maximum radius of dielectric volume 2410. In certain embodiments, top hat 2430 may extend radially past the maximum radius of dielectric volume 2410. In certain embodiments, the maximum radius of dielectric volume 2410 may exceed the maximum radius of top hat 2430. Top hat 2430 may be sufficiently thin that top hat 2430 does not affect the height of antenna 2400. For example, the height of antenna 2400 may not exceed $\lambda_L/6$ both with and without top hat 2430.

Top hat 2430 may be formed from the same or similar materials or composition of materials as any dielectric volume disclosed herein. In certain embodiments, top hat 2430 may be composed of conducting materials. For example, top hat 2430 may be formed by stamping from a thin sheet of conducting material such as copper or aluminum. In certain embodiments, top hat 2430 may be composed of a combination of dielectric and conducting materials. For example, top hat 2430 may be composed of a dielectric disk with copper plating on the surface at its longitudinal minimum.

In certain embodiments, top hat 2430 may mate to a first radiator. For example, top hat 2430 may be epoxied to a first radiator. In certain embodiments, top hat 2430 may secure a first radiator. For example, top hat 2430 may be fastened to dielectric volume 2410 and prevent longitudinal or radial movement of a first radiator. In certain embodiments, top hat 2430 may mate to or be secured by dielectric volume 2410. For example, top hat 2430 may be epoxied to one or more edges at the longitudinal maximum of dielectric volume 2410. As another example, top hat 2430 may be fastened to dielectric volume 2410 with nylon screws.

Dielectric jacket 2440, as shown in FIG. 24, extends longitudinally between the longitudinal maximum of a second radiator to the longitudinal minimum of a first radiator. As shown in FIG. 24, dielectric jacket 2440 mates to the radial exterior of pin 2445 and extends radially to an outer conductor of a transmission line. In certain embodiments, dielectric jacket 2440 may extend radially past the outer conductor of a transmission line. In certain embodiments, dielectric jacket 2440 may be a stand-alone component. For example, dielectric jacket 2440 may be a ring- or donut-shaped dielectric inserted between a first radiator and second radiator during assembly of antenna 2400. In certain embodiments, dielectric jacket 2440 may be an extension of a dielectric in a transmission line. In certain embodiments, dielectric jacket 2440 may be integrated into dielectric pocket 2450. For example, dielectric pocket 2450 may be additively manufactured such that the radial minimum of dielectric pocket 2450 extends to the radial maximum of pin 2455. In certain embodiments, dielectric jacket 2440 may be omitted from antenna 2400. Including dielectric jacket 2440 in antenna 2400 may have one or more advantages, including securing pin 2455, precisely controlling separation between a first radiator and second radiator, and improving power handling.

Dielectric pocket 2450, as shown in FIG. 24, extends radially from the maximum radius of dielectric jacket 2440 to the minimum radius of dielectric volume 2410. In certain embodiments, dielectric pocket 2450 may be composed of free space or air. In certain embodiments, dielectric pocket 2450 may be composed of dielectric material. Dielectric pocket 2450 may be formed from the same or similar materials or composition of materials as any dielectric volume disclosed herein. In certain embodiments, dielectric pocket 2450 may have a different dielectric constant than dielectric jacket 2440 and dielectric volume 2410. In certain embodiments, the dielectric constant of dielectric pocket 2450 may exceed the effective dielectric constant of dielectric volume 2410. In certain embodiments, the dielectric constant of dielectric volume 2410 may exceed the effective dielectric constant of dielectric pocket 2450. In certain embodiments, the dielectric constant of dielectric pocket 2450 may fall between the dielectric constants of dielectric jacket 2440 and dielectric volume 2410. In certain embodiments, inserting dielectric pocket 2450 between dielectric jacket 2440 and dielectric volume 2410 may have one or more advantages, including improving fidelity of transmission and reception of wideband signals through antenna 2400, facilitating matching antenna 2400, fabricating dielectric volume 2410 as a homogenous volume, and reducing antenna 2400 weight.

First radiator 2405, as shown in FIG. 24, mates to the radial interior of dielectric volume 2410 and presents a conducting surface at a first radially interior surface of dielectric volume 2410. First radiator 2405 may also present a conducting surface at one or more edges between a first radially interior surface and non-conducting aperture 2420. First radiator 2405 may also present a conducting surface at a pin extending from a transmission line coupled to antenna 2400. In FIG. 24, first radiator 2405 is illustrated as a solid conducting volume (e.g., machined from a block of aluminum or copper). First radiator 2405 may have the same or similar structure, components, elements, configurations, features, interfaces, parameters, or functions in an antenna as any other first radiator disclosed herein, compatible with the topology of other components in antenna 2400 illustrated in FIG. 24. First radiator 2405 may be formed according to the same or similar methods, operations, steps, parameters, and principles as any other first radiator disclosed herein, compatible with the antenna 2400 topology illustrated in FIG. 24.

First radiator 2405 may extend longitudinally from dielectric jacket 2440 to the longitudinal maximum of dielectric volume 2410. In certain embodiments, first radiator 2405 may extend from an inner conductor of a transmission line (e.g., a pin extending from the transmission line) to the longitudinal maximum of dielectric volume 2410. First radiator 2405 may be azimuthally uniform or radially symmetric. In certain embodiments, first radiator 2405 may be symmetric. First radiator 2405 may extend radially from an inner conductor of a transmission line to one or more edges of dielectric volume 2410. In certain embodiments, first radiator 2405 may extend to the maximum radius of dielectric volume 2410 (e.g., to non-conducting aperture 2420). In certain embodiments, first radiator 2405 may include convex, concave, or both convex and concave surfaces.

In certain embodiments, first radiator 2405 may be mated to a first radially interior surface during fabrication of an antenna. For example, first radiator 2405 may be machined from a conductive material and epoxied to a first radially interior surface of dielectric volume 2410. As another example, first radiator 2405 may be formed by electroless deposition of a conductor on a dielectric base, inserted into a void to the radial interior of a first radially interior surface of dielectric volume 2410, and secured by dielectric volume 2410 and top hat 2430. In embodiments without dielectric pocket 2450, first radiator 2405 may be formed directly on a first radially interior surface. For example, first radiator 2405 may be formed by spraying a conductive ink or dispersion onto a first radially interior surface.

In certain embodiments, first radiator 2405 may be electrically coupled to a transmission line. For example, first radiator 2405 may be soldered, welded, or bonded to a pin extending from the center conductor of a transmission line. As another example, a pin extending from the center conductor of a coaxial connector may press fit into first radiator 2405.

In certain embodiments, first radiator 2405 may be mated to or electrically coupled to top hat 2430. For example, first radiator 2405 may be secured into dielectric volume 2410 by a top hat 2430 fastened to dielectric volume 2410. As another example, first radiator 2405 may be conductively epoxied at its maximum longitudinal dimension to a conducting top hat 2430 that prevents current flow on the radial interior of first radiator 2405.

In certain embodiments, the maximum radial dimension of first radiator 2405 may exceed the minimum radial dimension of non-conducting aperture 2420. Reducing the minimum radial dimension of non-conducting aperture 2420 may thin dielectric volume 2410 and provide the advantage of reducing antenna 2400 weight or increasing the operating bandwidth of antenna 2400. In certain embodiments, the minimum radial dimension of non-conducting aperture 2420 may exceed the maximum radial dimension of first radiator 2405 (e.g., as shown in FIG. 24) or may exceed the maximum radial dimension of first radiator 2405 and any edge on dielectric volume 2410. Increasing the thickness of dielectric volume 2410 may have the advantage of reducing the lowest operating frequency of antenna 2400, improving antenna 2400 return loss near the lowest operating frequency, or controlling radiation pattern gain or azimuthal uniformity at certain frequencies.

In certain embodiments, first radiator 2405 may interface to dielectric pocket 2450. In certain embodiments, dielectric pocket 2450 may be part of a void to the radial interior of dielectric volume 2410, and inserting first radiator 2405 into the void (along with a second radiator) may define dielectric pocket 2450. In certain embodiments, dielectric pocket 2450 may be composed of dielectric material such that first radiator 2405 is assembled into antenna 2400 after dielectric pocket 2450 has been inserted into the radial interior of dielectric volume 2410. In certain embodiments, dielectric pocket 2450 may include an adhesive or be composed of adhesive for adhering first radiator 2405 into antenna 2400.

Second radiator 2415, as shown in FIG. 24, mates to the radial interior of dielectric volume 2410 and presents a conducting surface at a second radially interior surface of dielectric volume 2410. Second radiator 2415 may also present a conducting surface at one or more edges between a second radially interior surface and non-conducting aperture 2420. In FIG. 24, second radiator 2415 is illustrated as a solid conducting volume (e.g., machined from a block of aluminum or copper) with a cylindrical hole for mating to a transmission line. Second radiator 2415 may have the same or similar structure, components, elements, configurations, features, interfaces, parameters, or functions in an antenna as any other second radiator disclosed herein, compatible with the topology of other components in antenna 2400 illustrated in FIG. 24. Second radiator 2415 may be formed according to the same or similar methods, operations, steps, parameters, and principles any other first radiator disclosed herein, compatible with the antenna 2400 topology illustrated in FIG. 24. Second radiator 2415 may be formed according to the same or similar methods, operations, steps, parameters, and principles as first radiator 2405, and may be assembled or integrated into antenna 2400 according to the same or similar methods, operations, steps, parameters, and principles as first radiator 2405.

Second radiator 2415 may extend longitudinally and radially from an outer conductor of a transmission line to one or more edges or to non-conducting aperture 2420. In certain embodiments, second radiator 2415 may extend longitudinally from a dielectric jacket 2440 to the longitudinal minimum of dielectric volume 2410. Second radiator 2415 may extend radially from an outer conductor of a transmission line to one or more edges of dielectric volume 2410. In certain embodiments, second radiator 2415 may extend to the maximum radius of dielectric volume 2410. In certain embodiments, second radiator 2415 includes convex, concave, or both convex and concave surfaces. Second radiator 2415 may be azimuthally uniform or radially symmetric. In certain embodiments, second radiator 2415 may be symmetric.

In certain embodiments, second radiator 2415 may be electrically coupled to a transmission line. For example, second radiator 2415 may be soldered, welded, or bonded to an outer conductor of a transmission line. As another example, a conducting surface of second radiator 2415 may serve as the outer conductor of a transmission line (e.g., as shown in FIG. 24, a conducting surface of second radiator 2415 may mate to a dielectric "candlestick" extending longitudinally from a coaxial connector). Coupling second radiator 2415 to a transmission line excites RF currents on second radiator 2415 over a wide bandwidth.

In certain embodiments, second radiator 2415 may be mated to or electrically coupled to a ground plane. For example, second radiator 2415 may be secured into dielectric volume 2410 by a ground plane fastened to dielectric volume 2410. As another example, second radiator 2415 may be conductively epoxied at its minimum longitudinal dimension to a conducting ground plane that prevents current flow on the radial interior of second radiator 2415.

In certain embodiments, the maximum radial dimension of second radiator 2415 may exceed the minimum radial dimension of non-conducting aperture 2420. In certain embodiments, the minimum radial dimension of non-conducting aperture 2420 may exceed the maximum radial dimension of second radiator 2415 and any edge on dielectric volume 2410.

In certain embodiments, second radiator 2415 may interface to dielectric pocket 2450. In certain embodiments, dielectric pocket 2450 may be part of a void to the radial interior of dielectric volume 2410, and inserting second radiator 2415 into the void (along with first radiator 2405) may define dielectric pocket 2450. In certain embodiments, dielectric pocket 2450 may be composed of dielectric material. For example, second radiator 2415 may be assembled into antenna 2400 after dielectric pocket 2450 has been inserted into the radial interior of dielectric volume 2410. As another example, second radiator 2415 may be epoxied to dielectric volume 2410 or ground plane 2425 and may provide structure to support dielectric pocket 2450 during assembly of antenna 2400. In certain embodiments, dielectric pocket 2450 may include an adhesive or be composed of adhesive for adhering second radiator 2415 into antenna 2400.

As shown in FIG. 24, ground plane 2425 is a conducting surface that extends radially past the radial maximum of antenna 2400 and shields transceiver circuitry or other devices from antenna 2400. As seen by comparison of FIG. 13B, FIG. 16B, FIG. 19B, and FIG. 24, ground plane 2425 in antenna 2400 has substantially the same structure and function as ground plane 1335 in antenna 1300, ground plane 1635 in antenna 1600, or ground plane 1935 in antenna 1900. Ground plane 2425 may have the same or similar structure, components, elements, configurations, features, interfaces, parameters, or functions in an antenna as ground plane 1335, ground plane 1635, or ground plane 1935. For example, ground plane 2425 may extend radially from an outer conductor of a transmission line to the radial maximum of antenna 2400. Ground plane 2425 may be formed according to the same or similar methods, operations, steps, parameters, and principles as ground plane 1335, ground plane 1635, or ground plane 2425.

Transmission line 2435 may be any suitable transmission line for transmission and reception of RF energy. Transmission line 2435 may have the same or similar structure, components, elements, configurations, features, interfaces, parameters, or functions as transmission line 1345, transmission line 1645, or transmission line 1945, compatible with the antenna 2400 topology illustrated in FIG. 24. A dielectric jacket of transmission line 2435 may extend longitudinally past second radiator 2415 and terminate at first radiator 2405. In certain embodiments, a pin of transmission line 2435, longitudinally coextensive with a dielectric jacket, may extend longitudinally past second radiator 1915 and terminate at first radiator 1905.

Pin 2445, centered on the axis of radial symmetry, may extend longitudinally from transmission line 2435 to first radiator 2405. In certain embodiments, a radial exterior of pin 2445 may mate to dielectric jacket 2440. In certain embodiments, pin 2445 electrically couples first radiator 2405 to transmission line 2445. First radiator 2405 may be soldered, welded, or bonded to pin 2445. As another example, pin 2445 may press fit into first radiator 2405. In certain embodiments, pin 2445 may extend longitudinally past dielectric jacket 2440 into or through first radiator 2405. For example, although not shown in FIG. 24, pin 2445 may extend longitudinally through first radiator 2405 and be soldered to the radial interior of first radiator 2405 such that the solder joint is accessible in a void to the radial interior of first radiator 2405.

As shown in FIG. 24, antenna 2400 has two features absent from FIGS. 13, 16, and 19: top hat 2430 and dielectric pocket 2450. Top hat 2430 and dielectric pocket 2450 may be implemented jointly or separately. Dielectric pocket 2450 may expand the scope of achievable wireless performance—reducing distortion, facilitating impedance match, or both. Top hat 2430 may secure first radiator 2405 without substantively impacting wireless performance.

Antenna 2400 may have the same or similar structure, components, elements, configurations, features, interfaces, parameters, or functions as other embodiments disclosed herein, consistent with the antenna 2400 topology illustrated in FIG. 24. Antenna 2400 may be formed according to the same or similar methods, operations, steps, parameters, and principles as other antennas disclosed herein.

FIGS. 25A-25C illustrate sectional views of example top-hat topologies in an antenna. Antenna 2400, including top hat 2430, may be implemented according to any of FIGS. 25A-25C. Similarly, the top-hat topologies of FIGS. 25A-25C may be implemented with other antenna embodiments disclosed herein without substantively impacting wireless performance or antenna size.

FIG. 25A illustrates a first topology for mating a top hat to a dielectric volume. Top hat 2520 may be formed as a separate component from dielectric volume 2510. As shown in FIG. 25A, top hat 2520 may be secured to dielectric volume 2510 longitudinally, through or at an edge at the longitudinal maximum of dielectric volume 2510. For example, top hat 2520 may be secured to dielectric volume 2510 by nylon screws, oriented longitudinally (coaxial with Z) and passing through an edge at the longitudinal maximum of dielectric volume 2510. As another example, top hat 2520 may be epoxied to an edge at the longitudinal maximum of dielectric volume 2510. Top hat 2520 may be mated to dielectric volume 2510 according to a number of methods, including bonding, sintering, fusing, fastening, or similar methods. Top hat 2520 may have the same or similar structures, features, or functions as top hat 2430.

FIG. 25B illustrates a second topology for mating a top hat to a dielectric volume. Top hat 2540 may be formed as a separate component from dielectric volume 2530. Lip 2550 may be integrated into dielectric volume 2530. In certain embodiments, dielectric volume 2530 (specifically, lip 2550) may extend longitudinally past a first radiator. As shown in FIG. 25B, top hat 2540 may be secured to dielectric volume 2530 radially, through or at lip 2550 near the longitudinal maximum of dielectric volume 2530. For example, top hat 2540 may be secured to dielectric volume 2530 by nylon screws, oriented radially (coaxial with X or Y) and passing through lip 2550 near the longitudinal maximum of dielectric volume 2530. As another example, top hat 2540 may be epoxied to lip 2550. Top hat 2540 may be mated to dielectric volume 2530 according to a number of methods, including bonding, sintering, fusing, fastening, or similar methods. Top hat 2540 may have the same or similar structures, features, or functions as top hat 2430. Securing a top hat to a dielectric volume at a lip integrated into the dielectric volume may have one or more advantages, including maintaining antenna symmetry, increasing antenna or top-hat strength against shear stresses (in XY planes), and inserting fasteners outside of a non-conducting aperture to avoid distortion of or interference with RF energy.

Certain embodiments may combine features of both FIG. 25A and FIG. 25B. For example, a top hat may be fastened to a dielectric volume, having one or more lips, both longitudinally and radially. A radially symmetric dielectric volume may have plurality of lips (e.g., four lips each covering 60° in azimuth), and a top hat may be radially symmetric, such that portions of the top hat have a maximum radius identical to the maximum radius of a first radiator and other portions of the top hat have a maximum radius identical to the maximum radius of the dielectric volume. The top hat may be fastened radially to the plurality of lips at top-hat portions radially coextensive with a first radiator and longitudinally to the dielectric volume at top-hat portions radially coextensive with the dielectric volume.

In certain embodiments, securing a top hat to a dielectric volume secures a first radiator. In certain embodiments, the top hat may also be secured to a first radiator. For example, a top hat may be bonded to a first radiator and fastened to the dielectric volume. In certain embodiments, a conducting top hat may be fastened to a first radiator with conducting screws. In certain embodiments, the top hat may be secured to only the dielectric volume.

In certain embodiments, a top hat may prevent longitudinal movement of a first radiator. In certain embodiments, a dielectric volume may prevent radial movement of a first radiator, either solely or in combination with a top hat. In certain embodiments, the dielectric volume prevents longitudinal movement (along with a ground plane) or radial movement of a second radiator. Securing radiators without bonding films, epoxy, fasteners, or other methods that interfere with or require modification of a first conducting surface or second conducting surface enables advantageous RF performance, reducing distortion and increasing bandwidth.

FIG. 25C illustrates a third topology for securing a first radiator. As shown in FIG. 25C, dielectric volume 2560 may include an integrated rim 2570. Aperture 2580 may be located to the radial interior of integrated rim 2570. Integrated rim 2570 extends radially inward such that the maximum radius of first radiator 2565 exceeds the minimum radius of integrated rim 2570. As shown in FIG. 25C, first radiator 2565 may be inserted longitudinally through aperture 2580, at the longitudinal maximum of dielectric volume 2560, into dielectric volume 2560 below the integrated rim 2570. In certain embodiments, dielectric volume 2560 may flex near the integrated rim 2570 to permit insertion of first radiator 2565. In certain embodiments, both dielectric volume 2560 and first radiator 2565 may flex to facilitate insertion. In certain embodiments, dielectric volume 2560 may flex based on the stiffness of the dielectric volume material or features in dielectric volume first radiator 2565, such as voids or thinning to enable flexion. Once first radiator 2565 has been inserted into dielectric volume 2560, integrated rim 2570 captivates and secures first radiator 2565. Integrated rim 2570 may extend radially inward as far as permitted by flexion of dielectric volume 2560 compatible with insertion of first radiator 2565. In certain embodiments, a top hat may be placed in aperture 2580 at the longitudinal maximum of dielectric volume 2560 and secured according to any of the methods described herein for securing a top hat to a dielectric volume or first radiator.

Figure 26A:
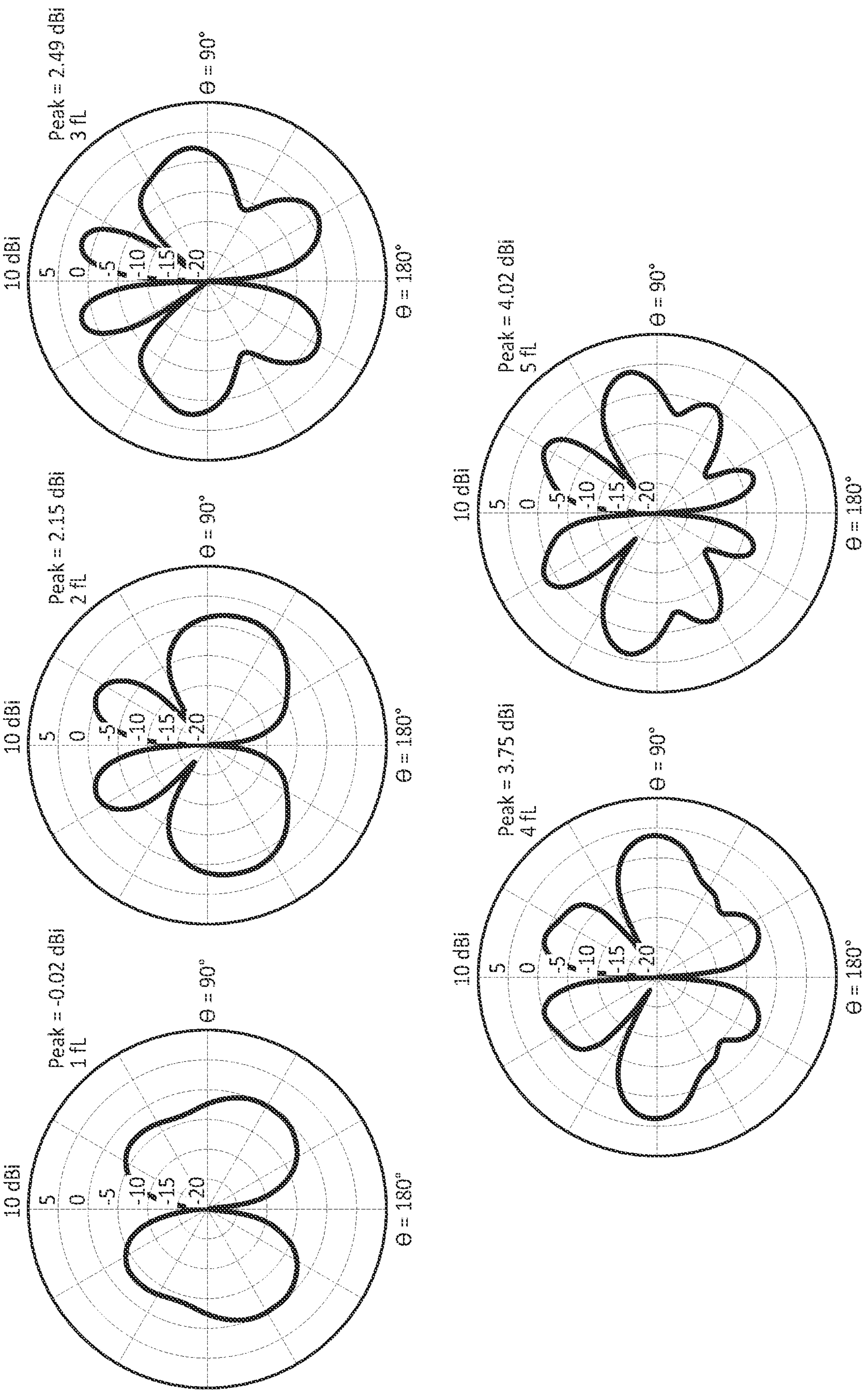
FIGS. 26A-26B are diagrams that illustrate the wireless performance of an example antenna in radiation patterns, according to certain embodiments.
Figure 26B:
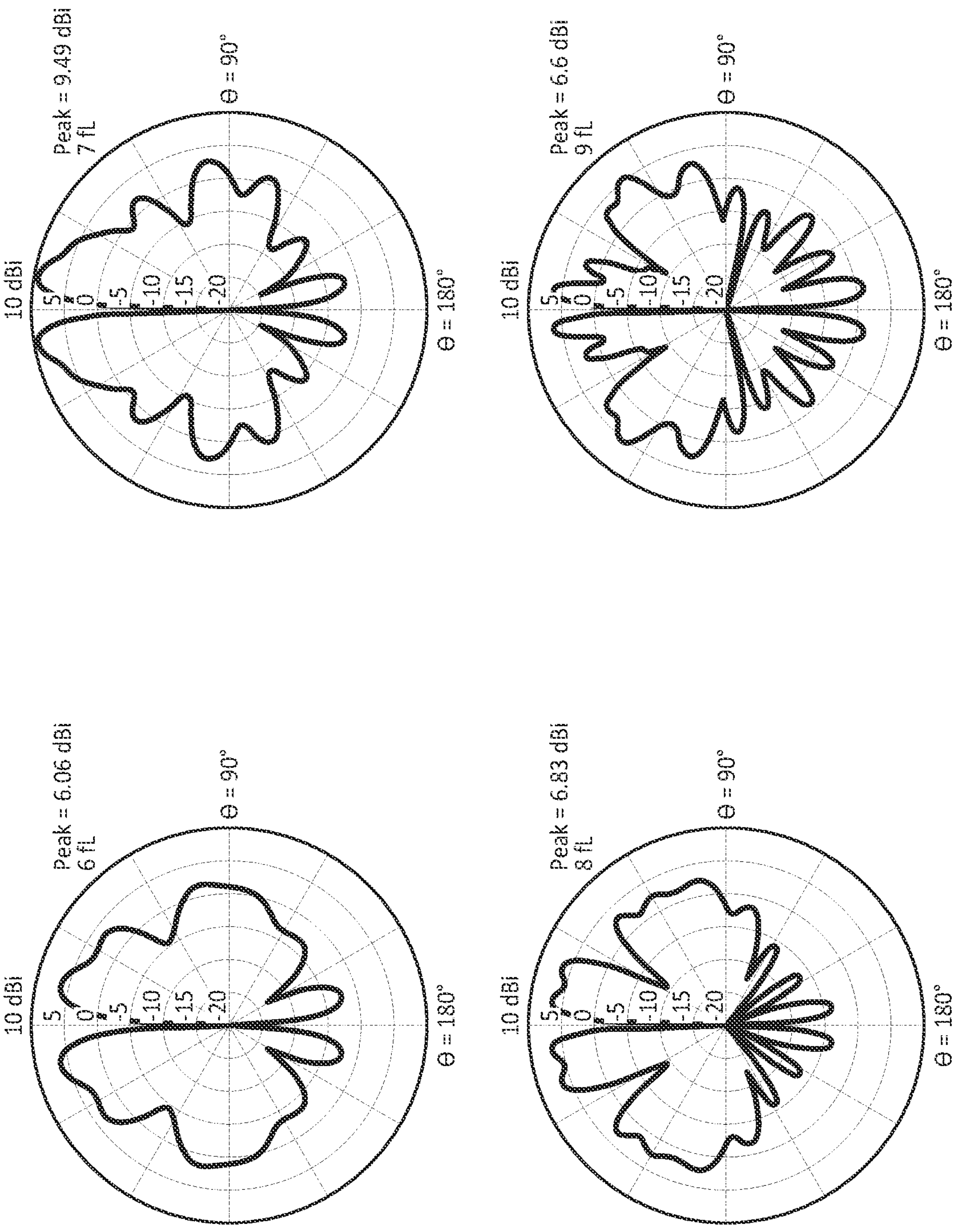

Collective FIG. 26 illustrates radiation patterns of antenna 2400[12] in elevation (ZY or ZX) and azimuth (XY) planes from 1-9 fL. As shown in the elevation cuts of FIGS. 26A-26B, antenna 2400 maintains a horizon beam including the radiation horizon (θ=90°) over a frequency band of 1-6 fL. In certain embodiments, antenna 2400 may transmit and receive a beam including the horizon across a pattern bandwidth of 6:1. Although not shown in FIG. 26, radiation patterns of antenna 2400 in the azimuth plane (XY, θ=90°) are substantially uniform in azimuth over a 6:1 pattern bandwidth (from 1-6 fL). Antenna 2400 may maintain substantial gain uniformity in azimuth to the same degree as antenna 1300, antenna 1600, or antenna 1900.

[12] The performance shown in FIG. 26 is for antenna 2400 with a ground plane having the same maximum radius as second radiator 2415. Coupling antenna 2400 to a ground plane exceeding the radius of antenna 2400 may improve return loss at lower frequencies and increase peak gain while maintaining low distortion performance.

Antenna 2400 return loss exceeds 6 dB from 1-6 fL (a 6:1 bandwidth). In certain embodiments, top-hat antenna return loss may exceed 10 dB from 1.2-6 fL (a 5:1 bandwidth), without impacting fidelity, with a slightly larger maximum antenna diameter not to exceed $\lambda_L/4$. Antenna 2400 obtains a fidelity factor of 85% over 1-9 fL, a 9:1 instantancous bandwidth. In certain embodiments, antenna 2400 may instantaneously transmit and receive wireless signals across a single instantaneous bandwidth of 9:1. Antenna 2400 may also transmit and receive wireless signals across a 9:1 bandwidth, wherein the 9:1 bandwidth comprises a plurality of instantaneous frequency bands, the bandwidth of each of the plurality of instantaneous frequency bands comprising a multiple of a lowest operating frequency.

Antenna embodiments having a top hat (top-hat antennas) may be combined with other embodiments disclosed herein with minimal effect on wireless performance. For example, antenna 2400 may obtain fidelity identical to the fidelity obtained by antenna 1600 in Table 10, as the top hat has minimal effect on wireless performance due to its location outside the primary radiating aperture, and antenna 2400 has all the features of antenna 1600 (i.e., a second antenna topology containing all the design features of a first antenna topology may achieve the wireless performance of the first antenna topology). Certain embodiments of top-hat antennas may also obtain the return loss of antenna 1600. Similarly, certain embodiments of top-hat antennas implementing features of antenna 1300 may obtain the return loss of antenna 1300 and the fidelities of antenna 1300 in Table 9. And certain embodiments of top-hat antennas implementing features of antenna 1900 may obtain the return loss of antenna 1900 and the fidelities of antenna 1900 in Table 11. The wireless performance of antenna 2400 or other top-hat antenna embodiments may be achieved according to any top-hat configuration illustrated in FIGS. 25A-25C, as the top hat and any lip or integrated rim have minimal effect on RF performance.

Figure 27B:
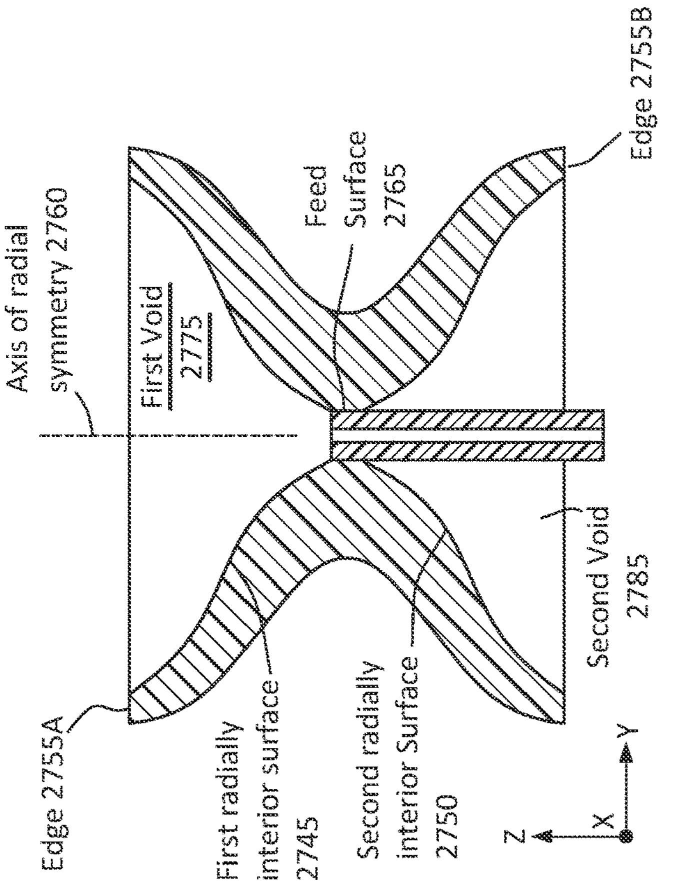
FIGS. 27A-27B are diagrams that illustrate the geometry and features of an example antenna, according to certain embodiments.
Figure 27A:
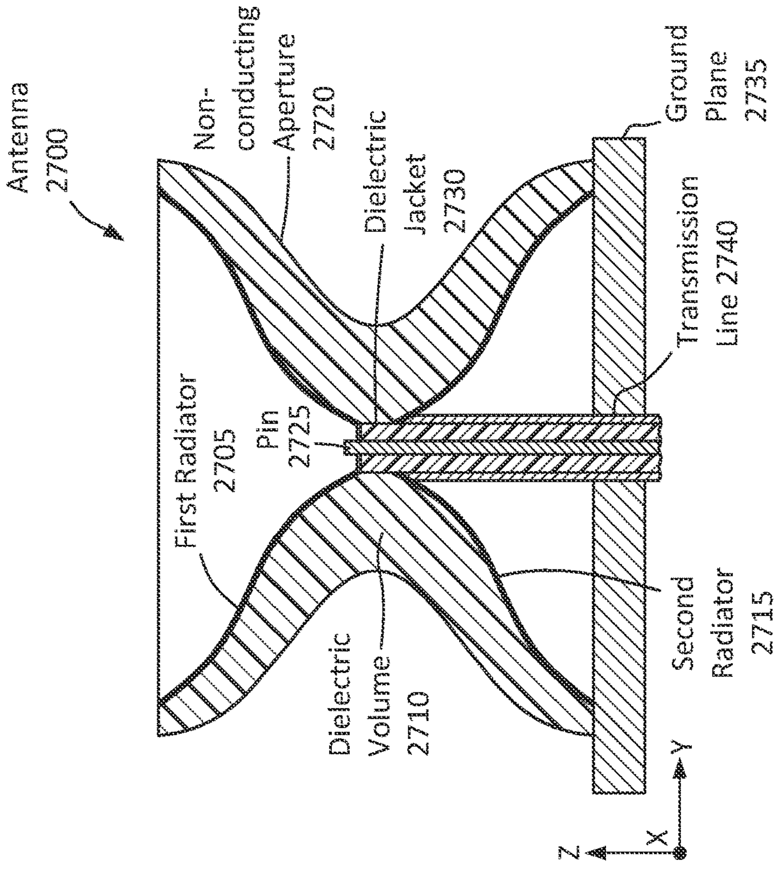

FIGS. 27A-27B illustrate the geometry and features of antenna 2700 in sectional views. FIG. 27B is a section of antenna 27 without conducting surfaces or volumes. Antenna 2700 is an antenna of reduced size, applying the principles disclosed herein to obtain low distortion transmission and reception over an ultrawide bandwidth. The maximum radius of antenna 2700 does not exceed $\lambda_L/10$, and antenna 2700 height does not exceed $\lambda_L/6$.

Antenna 2700 may include dielectric volume 2710, first radiator 2705, and second radiator 2715. Dielectric volume 2710 may include non-conducting aperture 2720, first radially interior surface 2745, second radially interior surface 2750, one or more edges 2755, and one or more feed surfaces 2765. Antenna 2700 may be electrically coupled to transmission line 2740, via pin 2725, and ground plane 2735. First void 2775 and second void 2785 to the radial interior of dielectric volume 2710 may permit insertion of first radiator 2705 and second radiator 2715 to present conducting surfaces at first radially interior surface 2745 and second radially interior surface 2750. Antenna 2700 may have the same or similar structure, components, elements, configurations, features, interfaces, or parameters as other antenna embodiments disclosed herein, consistent with the antenna topology illustrated in FIG. 27. Antenna 2700 (including dielectric volume 2710) may be formed according to the same or similar methods, operations, steps, parameters, and principles as other antenna embodiments disclosed herein. Dielectric volume 2710 and antenna 2700 may be formed from the same or similar materials or composition of materials as any other dielectric volume or antenna disclosed herein.

Figure 28A:
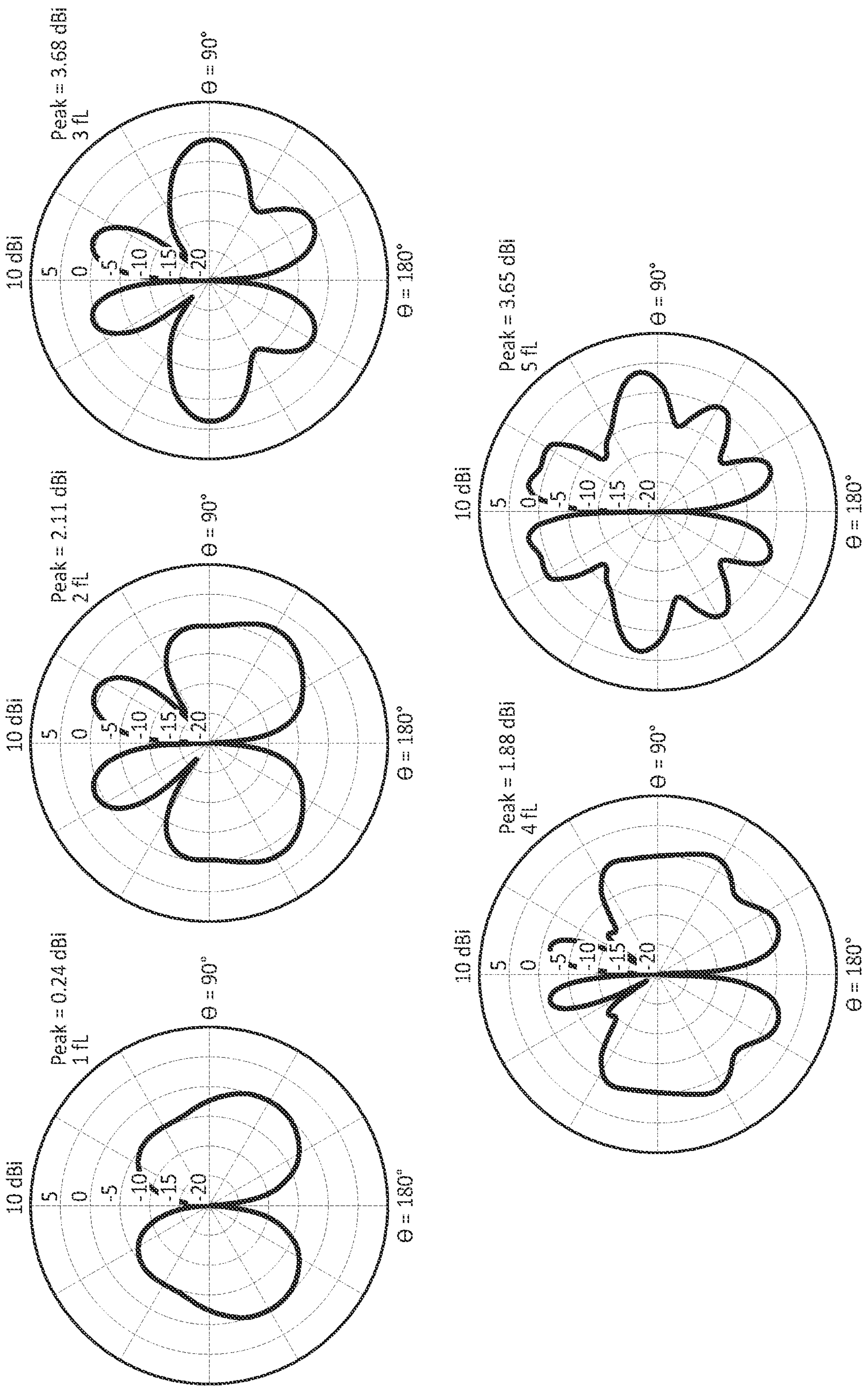
FIGS. 28A-28B are diagrams that illustrate the wireless performance of an example antenna in radiation patterns, according to certain embodiments.
Figure 28B:
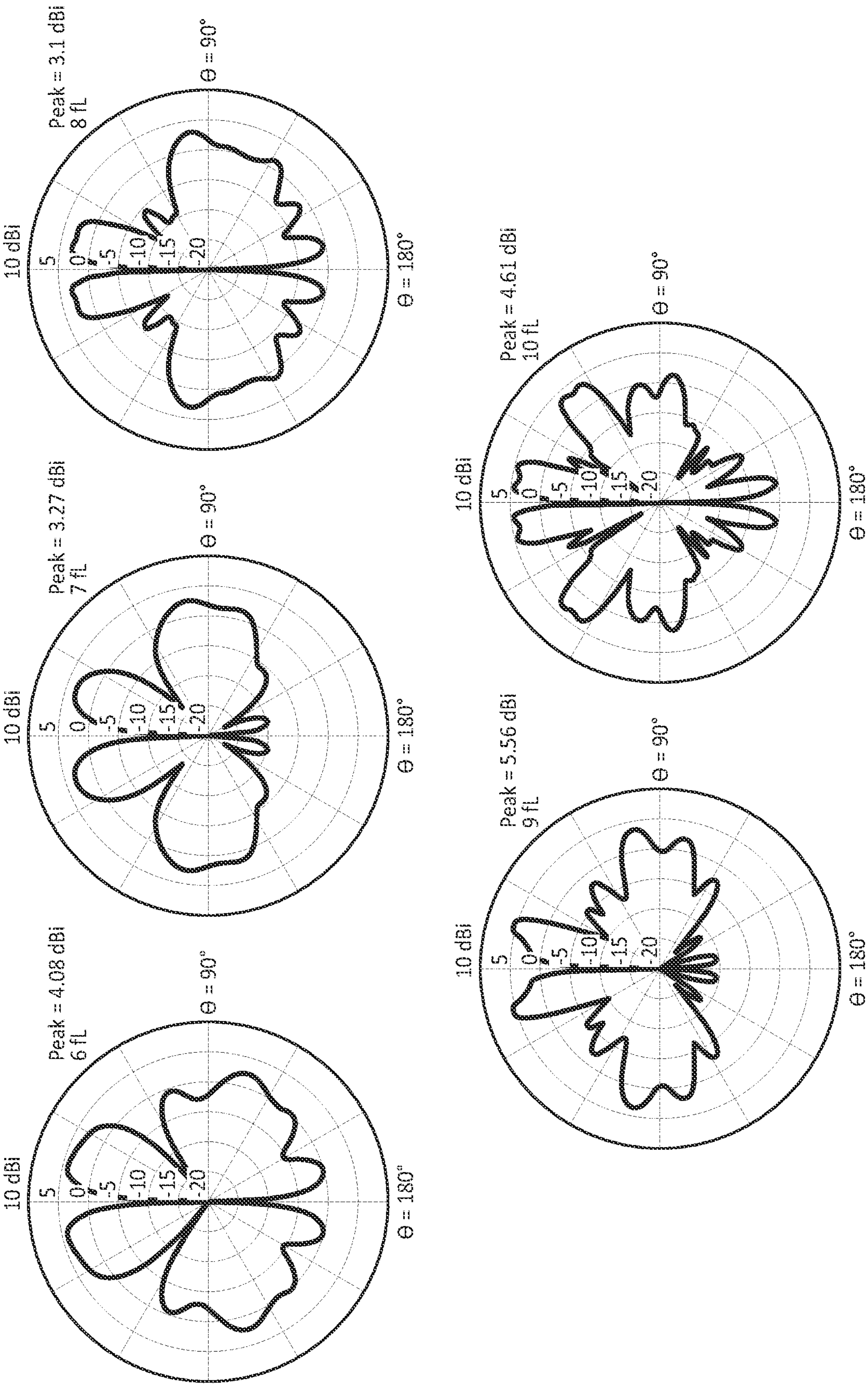

Collective FIG. 28 illustrates radiation patterns of antenna 2700[13] in elevation (ZY or ZX) and azimuth (XY) planes from 1-10 fL. As shown in FIGS. 28A-28B, antenna 2700 maintains a horizon beam over an 8:1 pattern bandwidth.

[13] The performance shown in FIG. 28 is for antenna 2700 with a ground plane having the same maximum radius as second radiator 2715. As noted for other embodiments, coupling antenna 2700 to a ground plane exceeding the radius of antenna 2700 may improve return loss at lower frequencies and increase peak gain while maintaining low distortion performance.

Antenna 2700 return loss exceeds 6 dB from 1-10 fL (a 10:1 bandwidth). In certain embodiments, antenna 2700 return loss exceeds 10 dB from 2.2-11 fL (a 5:1 bandwidth). Antenna 2700 obtains a fidelity factor of 82% over 1-10 fL, a 10:1 instantaneous bandwidth, and a fidelity factor of 86% over 2-10 fL, a 5:1 instantaneous bandwidth. In certain embodiments, antenna 2700 may instantaneously transmit and receive wireless signals across a single instantaneous bandwidth of up to 10:1. Antenna 2700 may also transmit and receive wireless signals across a 10:1 bandwidth, wherein the 10:1 bandwidth comprises a plurality of instantaneous frequency bands, the bandwidth of each of the plurality of instantaneous frequency bands comprising a multiple of a lowest operating frequency.

In certain embodiments, a first radiator in an antenna may have a cone angle. The cone angle of a first radiator (or, similarly, of a first conducting surface on the first radiator) may be determined as the arctangent of the ratio of maximum radius of the first radiator to the height of the first radiator (the difference between the maximum and minimum longitudinal dimensions of the first radiator). The cone angle of a first radiator may be determined as an angle from the axis of radial symmetry. In certain embodiments, a cone angle of a first radiator may fall within 50-70 degrees. In certain embodiments, a cone angle of a first radiator may fall within 11-22 degrees. In certain embodiments, a cone angle of a first radiator may fall within 15-27 degrees. In certain embodiments, a cone angle of a first radiator may fall within 12-30 degrees.

In antenna embodiments having a second radiator, second radiator cone angle (or second conducting surface cone angle) may be similarly determined from the ratio of the maximum second conductor radius to the second conductor height. In certain embodiments, a first radiator and a second radiator may have the same cone angle. In certain embodiments, a cone angle of a second radiator may fall within 50-70 degrees. In certain embodiments, a cone angle of a second radiator may fall within 11-22 degrees. In certain embodiments, a cone angle of a second radiator may fall within 15-27 degrees. In certain embodiments, a cone angle of a second radiator may fall within 12-30 degrees.

In certain embodiments, a first radiator and a second radiator may have different cone angles. Cone angles of first or second radiators in certain antenna embodiments may also be estimated based on the ratio of maximum antenna radius to antenna height.

Figure 29:
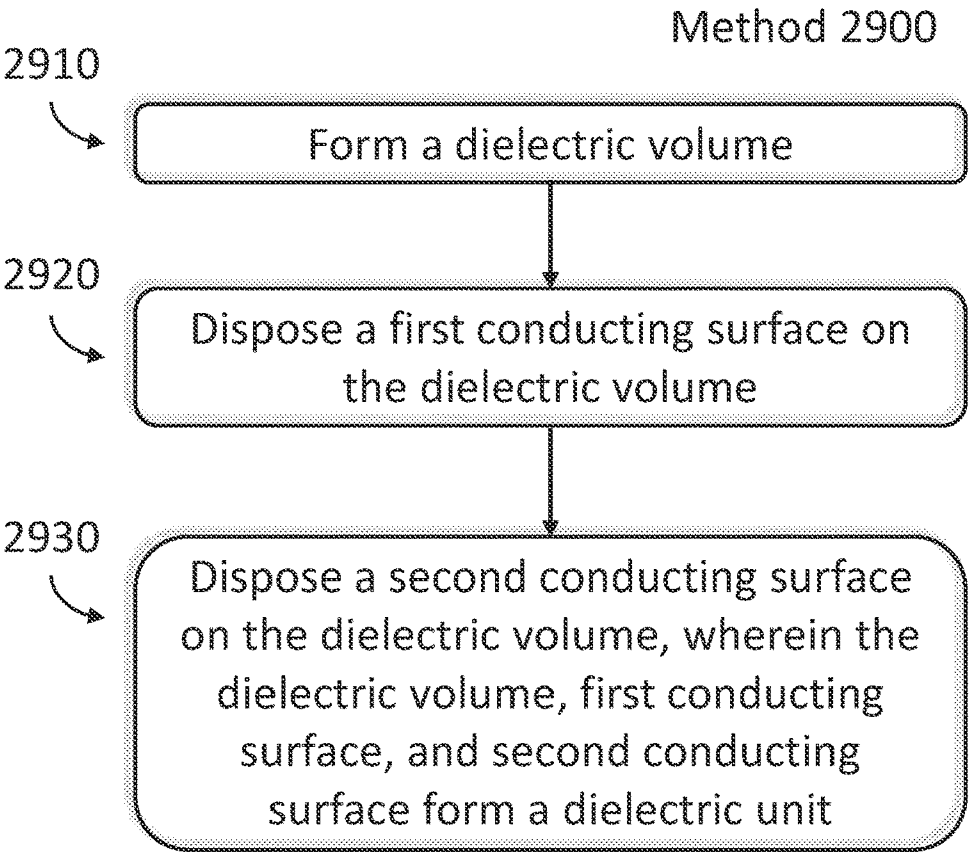
FIG. 29 is a flow diagram of an example method for forming a dielectric unit, according to certain embodiments.

FIG. 29 is a flow diagram of an example method 2900 for forming a dielectric unit according to certain embodiments. Method 2900 begins in step 2910 by forming a dielectric volume. A dielectric volume may be formed according to any methods, operations, steps, parameters, and principles disclosed herein. For example, a dielectric volume may be formed by additive manufacturing, machining, injection molding, or similar processes. For example, a dielectric volume may be formed from Ultem® materials in a fused-deposition modeling (FDM) process. As another example, a dielectric volume may be formed in a stereolithography (SLA) process from ABS. As yet another example, a dielectric volume may be formed by machining Teflon.

In step 2920, disposing a first conducting surface on the dielectric volume may form a first radiator, partially or completely. In certain embodiments, a first conducting surface may be disposed on a first radially interior surface of a dielectric volume. In certain embodiments, disposing a first conducting surface on a first radially interior surface of a dielectric volume may form a first radiator ready for coupling to a transmission line without additional steps. In certain embodiments, additional steps may be required, after disposing a first conducting surface on the dielectric volume, to prepare a first radiator for coupling to a transmission line. For example, disposing a first conducting surface on the dielectric volume may partially form a first radiator, and the first radiator may be formed completely by coupling the first conducting surface to a conducting washer at the longitudinal minimum of the first radiator.

In step 2930, disposing a second conducting surface on the dielectric volume may form a second radiator, partially or completely. In certain embodiments, a second conducting surface may be disposed on a second radially interior surface of a dielectric volume. In certain embodiments, disposing a second conducting surface on a second radially interior surface of a dielectric volume may form a second radiator ready for coupling to a transmission line without additional steps. In certain embodiments, additional steps may be required, after disposing a second conducting surface on the dielectric volume, to prepare a second radiator for coupling to a transmission line. For example, disposing a second conducting surface on the dielectric volume may partially form a second radiator, and the second radiator may be formed completely by coupling the second conducting surface to a stamped conducting sheet at the second radially interior surface.

In certain embodiments, the dielectric volume, first conducting surface, and second conducting surface form a dielectric unit. In certain embodiments, the dielectric surface may be formed without conducting volumes by disposing a first conducting surface and second conducting surface on a dielectric volume.

Figure 30:
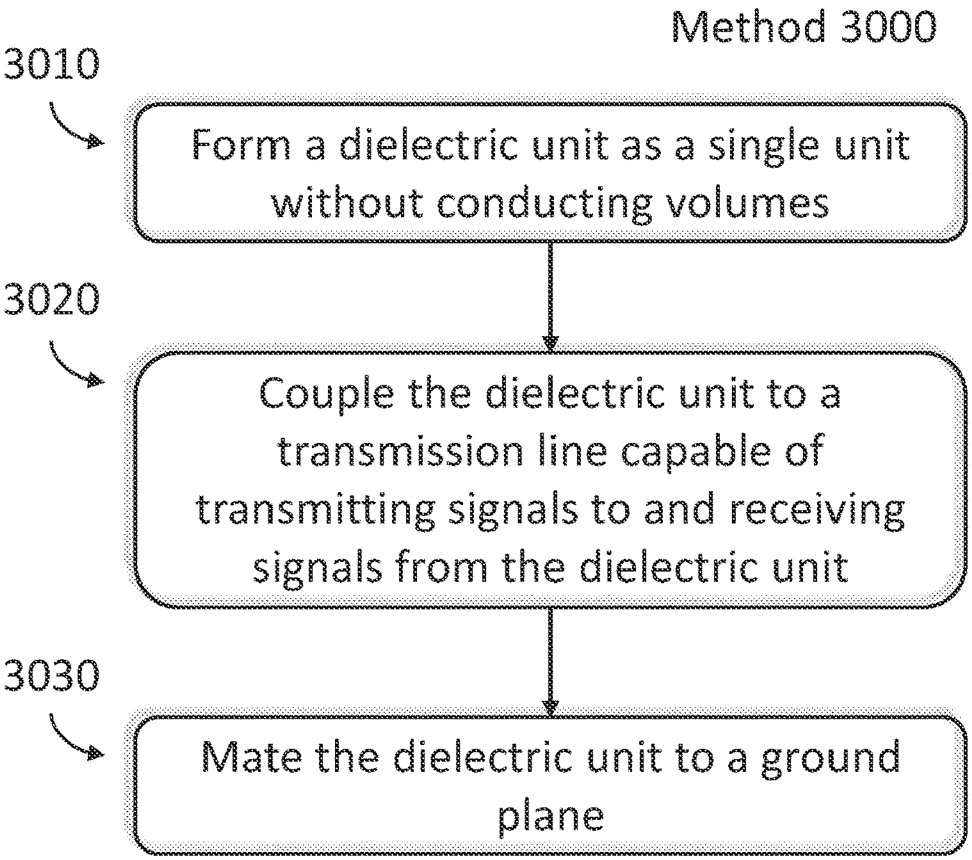
FIG. 30 is a flow diagram of an example method for coupling a dielectric unit to a transmission line and ground plane, according to certain embodiments.

FIG. 30 is a flow diagram of an example method 3000 for coupling a dielectric unit to a transmission line and ground plane according to certain embodiments. Method 3000 begins in step 3010 by forming a dielectric unit. A dielectric unit may be formed according to methods, operations, steps, parameters, and principles disclosed herein. In certain embodiments, a dielectric unit may be formed as a single unit without conducting volumes. For example, a dielectric unit may be formed according to method 2900.

In step 3020, the dielectric unit may be coupled to a transmission line. In certain embodiments, a dielectric unit may be soldered, welded, press fit, or bonded to an inner and outer conductor of a transmission line. In certain embodiments, a first radiator may be coupled to an inner conductor of a transmission line. For example, a first radiator may be soldered to a center pin extending from a coaxial transmission line longitudinally through the first radiator. In certain embodiments, a second radiator may be coupled to an outer conductor of a transmission line. For example, an outer conductor of a coaxial connector (e.g., a flanged connector) may be fastened to a second radiator with conducting screws.

In step 3030, the dielectric unit may be mated to a ground plane. In certain embodiments, a dielectric unit may be soldered, welded, press fit, or bonded to a ground plane. In certain embodiments, a second radiator may be coupled to a ground plane. In certain embodiments, an inner ground surface may be coupled to a ground plane. In certain embodiments, a second radiator or internal ground may be integrated into a ground plane such that mating a dielectric unit to a second radiator or to an internal ground mates the dielectric unit to a ground plane.

Figure 31:
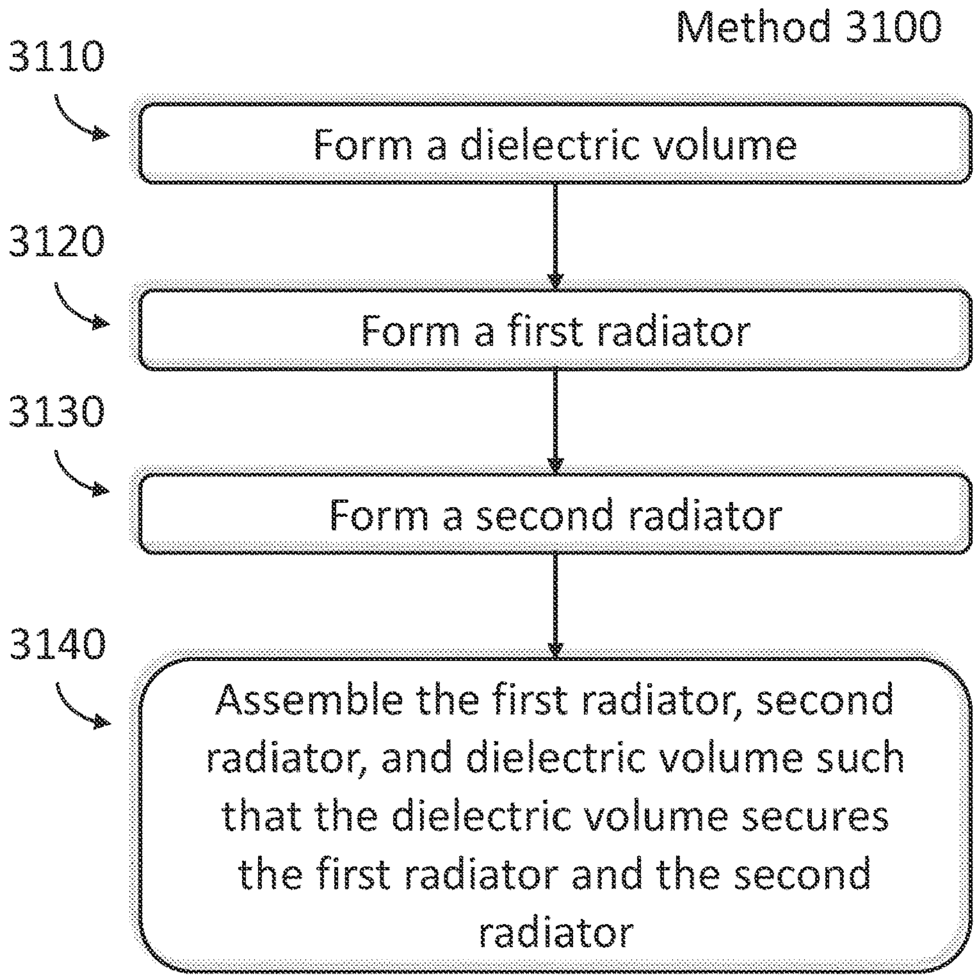
FIG. 31 is a flow diagram of an example method for forming an antenna including a dielectric volume, a first radiator, and a second radiator, according to certain embodiments.

FIG. 31 is a flow diagram of an example method 3100 for forming an antenna including a dielectric volume, a first radiator, and a second radiator according to certain embodiments. Method 3100 begins in step 3110 by forming a dielectric volume. A dielectric volume may be formed according to any methods, operations, steps, parameters, and principles disclosed herein, including those steps disclosed in method 2900.

In step 3120, a first radiator may be formed according to methods, operations, steps, parameters, and principles disclosed herein. In certain embodiments, a first radiator may be formed as a conducting volume. For example, a first radiator may be additively manufactured to form an aluminum volume. As another example, a first radiator may be machined from a copper volume. In certain embodiments, a first radiator may be formed without conducting volumes. For example, a first radiator may be formed by disposing a conducting surface on a first dielectric base. As another example, a first radiator may be formed by stamping, pressing, or rolling a thin copper or aluminum sheet.

In step 3130, a second radiator may be formed according to methods, operations, steps, parameters, and principles disclosed herein. In certain embodiments, a second radiator may be formed as a conducting volume. For example, a second radiator may be additively manufactured to form an aluminum volume. As another example, a second radiator may be machined from a copper volume. In certain embodiments, a second radiator may be formed without conducting volumes. For example, a second radiator may be formed by disposing a conducting surface on a second dielectric base. As another example, a second radiator may be formed by stamping, pressing, or rolling a thin copper or aluminum sheet.

In step 3140, the first radiator, second radiator, and dielectric volume may be assembled into an antenna. In certain embodiments, a first radiator may be assembled with a dielectric volume before assembly of a second radiator. For example, a second radiator integrated into a ground plane may be assembled into an antenna in a later step due to the size of the ground plane. In certain embodiments, a second radiator may be assembled with a dielectric volume before assembly of a first radiator. For example, a second radiator may be bonded to a dielectric volume and coupled to a transmission line such that a pin extending from the transmission line serves as a fiducial for assembly of a first radiator with the dielectric volume and second radiator. In certain embodiments, the order of assembling a first radiator and second radiator may be determined by assembly of other components in an antenna, such as a top hat, a dielectric jacket, or a dielectric pocket (e.g., top hat 2430, dielectric jacket 2440, or dielectric pocket 2450).

In certain embodiments, a dielectric volume may secure a first radiator and a second radiator. For example, a dielectric volume may secure a first radiator with an integrated rim in the dielectric volume, as illustrated in FIG. 25C. As another example, a dielectric volume may secure a second radiator by mating the dielectric volume to a ground plane. As another example, a first radiator and a second radiator may be secured by mating to a dielectric volume. For example, a first radiator and a second radiator may be fastened, adhered, or bonded to a dielectric volume.

In certain embodiments, an antenna assembled from a first radiator, a second radiator, and a dielectric volume may be coupled to a transmission line or a ground plane according to methods, operations, steps, parameters, and principles disclosed herein (e.g., one or more steps of method 3000). In certain embodiments, an antenna may be coupled to a transmission line or a ground plane during assembly of a first radiator, a second radiator, and a dielectric volume. For example, a second radiator may be coupled to a transmission line prior to assembly of a first radiator with the dielectric volume. In certain embodiments, an antenna may be coupled to a transmission line or a ground plane after assembly of a first radiator, a second radiator, and a dielectric volume. For example, a fully assembled antenna may be coupled to a ground plane by conducting fasteners mating the ground plane to a second radiator.

Figure 32:
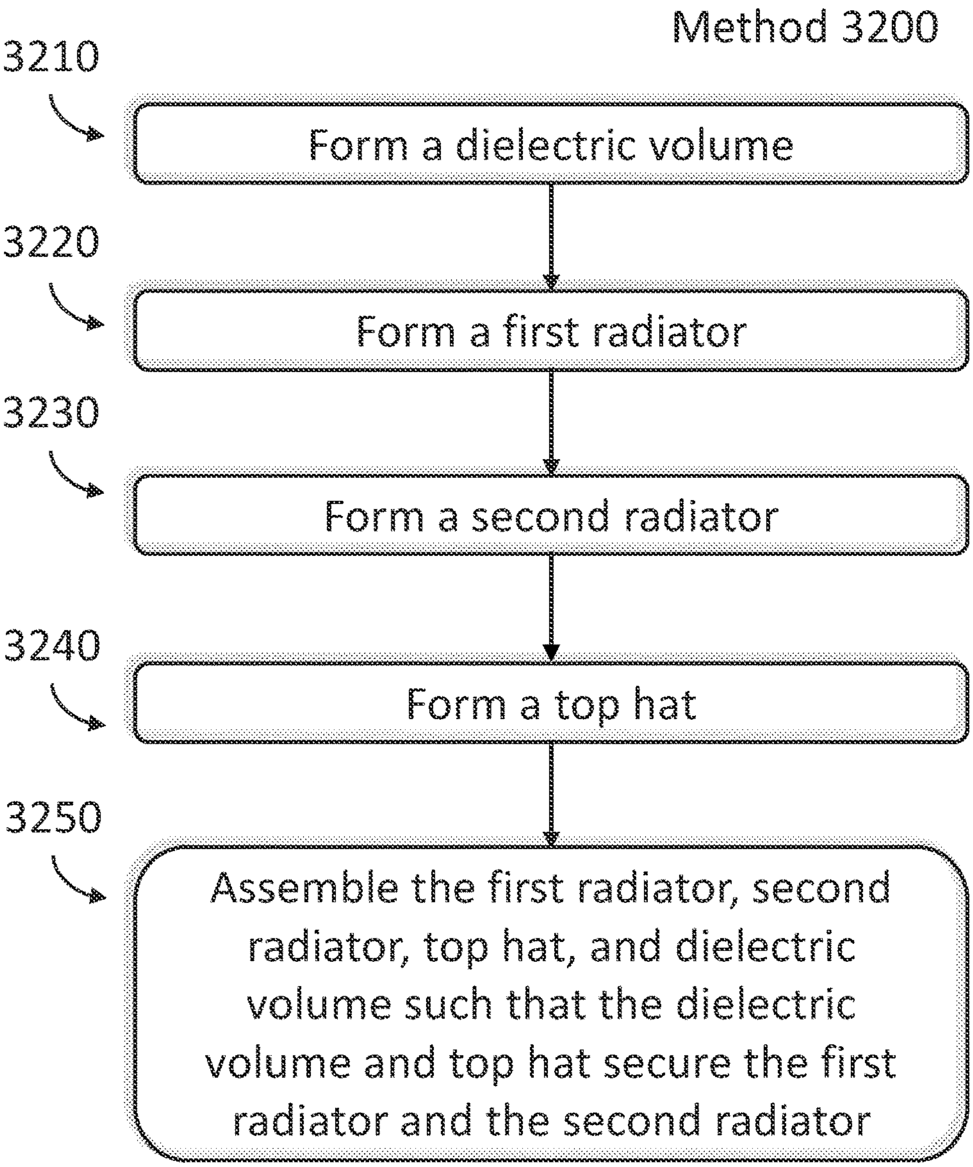
FIG. 32 is a flow diagram of an example method for forming an antenna including a dielectric volume, a first radiator, a second radiator, and a top hat, according to certain embodiments.

FIG. 32 is a flow diagram of an example method 3200 for forming an antenna including a dielectric volume, a first radiator, a second radiator, and a top hat according to certain embodiments. Method 3200 begins in step 3210 by forming a dielectric volume.

In step 3220, a first radiator may be formed according to methods, operations, steps, parameters, and principles disclosed herein (e.g., one or more steps of method 3100).

In step 3230, a second radiator may be formed according to methods, operations, steps, parameters, and principles disclosed herein (e.g., one or more steps of method 3200).

In step 3240, a top hat may be formed according to methods, operations, steps, parameters, and principles disclosed herein (e.g., one or more methods or steps disclosed with respect to antenna 2400 and the top-hat topologies of FIGS. 25A-25C).

In step 3250, the first radiator, second radiator, top hat, and dielectric volume may be assembled into an antenna. An antenna may be assembled according to methods, operations, steps, parameters, and principles disclosed herein. In certain embodiments, a first radiator may be assembled with a dielectric volume before assembly of a second radiator or a top hat. For example, a second radiator integrated into a ground plane may be assembled into an antenna in a later step due to the size of the ground plane. In certain embodiments, a second radiator may be assembled with a dielectric volume before assembly of a first radiator or a top hat. For example, a second radiator may be bonded to a dielectric volume and coupled to a transmission line such that a pin extending from the transmission line serves as a fiducial for assembly of a first radiator with the dielectric volume and second radiator. In certain embodiments, the order of assembling a first radiator, a second radiator, and a top hat may be determined by assembly of other components in an antenna, such as a dielectric jacket or a dielectric pocket (e.g., dielectric jacket 2440 or dielectric pocket 2450).

In certain embodiments, a dielectric volume and a top hat may secure a first radiator and a second radiator. For example, a top hat fastened to a dielectric volume may secure a first radiator longitudinally and the dielectric volume may secure the first radiator radially. As another example, a dielectric volume may secure a second radiator by mating the dielectric volume to a ground plane. As another example, a first radiator may be secured by mating to a top hat. For example, a first radiator may be fastened, adhered, or bonded to a top hat.

In certain embodiments, an antenna assembled from a first radiator, a second radiator, a top hat, and a dielectric volume may be coupled to a transmission line or a ground plane according to methods, operations, steps, parameters, and principles disclosed herein (e.g., one or more steps of method 3000). In certain embodiments, an antenna may be coupled to a transmission line or a ground plane during assembly of a first radiator, a second radiator, a top hat, and a dielectric volume. For example, a second radiator may be coupled to a transmission line prior to assembly of a first radiator and top hat with the dielectric volume. In certain embodiments, an antenna may be coupled to a transmission line or a ground plane after assembly of a first radiator, a second radiator, a top hat, and a dielectric volume. For example, a fully assembled antenna may be coupled to a ground plane by conducting fasteners mating the ground plane to a second radiator.

In certain embodiments, antenna features, dimensions, or components, as detailed herein, may be determined based on the type of signal that the antenna is configured to transmit and receive. In certain embodiments, the positions of a first conducting surface, second conducting surface, or non-conducting aperture are based on a signal type of a wireless signal transmitted or received by the antenna. In certain embodiments, the positions of a first conducting surface, second conducting surface, or non-conducting aperture are determined relative to the axis of radial symmetry.

In certain embodiments, the signal type consists of additive white gaussian noise. In certain embodiments the signal type comprises a chirped spread spectrum signal. In certain embodiments the signal type comprises a direct-sequence spread spectrum signal. In certain embodiments, the signal type comprises a featureless spread spectrum signal.

In certain embodiments, an antenna may be configured to transmit and receive wireless signals in a beam that is substantially uniform in azimuth and includes the radiation horizon, based on the wireless signal type. In certain embodiments, the antenna may be configured to instantaneously transmit and receive wireless signals across an IBW of up to 6:1, based on signal type. Alternatively or additionally, the antenna may be configured to instantaneously transmit and receive wireless signals across an IBW of up to 8:1 or 10:1, based on signal type. In certain embodiments, the antenna may be configured to instantaneously transmit and receive wireless signals in a conical beam centered on an axis of radial symmetry, based on signal type. In certain embodiments, an antenna may be configured to transmit and receive wireless signals in a beam that is substantially uniform in azimuth and includes the radiation horizon, or in a conical beam centered on the axis of radial symmetry, across an IBW of up to 6:1, 8:1, or 10:1, regardless of the wireless signal type.

Herein, "or" is inclusive and not exclusive, unless expressly indicated otherwise or indicated otherwise by context. Therefore, "A or B" means "A, B, or both" unless expressly indicated otherwise or indicated otherwise by context. Also, "and" is both joint and several unless expressly indicated otherwise or indicated otherwise by context. Therefore, "A and B" means "A and B, jointly or severally," unless expressly indicated otherwise or indicated otherwise by context.

This disclosure is not limited to the exemplary embodiments disclosed herein. Wireless performance characteristics naturally result from the structures, methods, parameters, and principles disclosed herein. This disclosure encompasses all changes, modifications, substitutions, variations, combinations, and alterations to exemplary embodiments disclosed herein that a POSITA would understand. This disclosure describes and illustrates certain embodiments herein as including particular features, components, elements, dimensions, functions, operations, or steps, but any of the exemplary embodiments may include any combination, variation, or permutation of any features, components, elements, dimensions, functions, operations, or steps disclosed herein that a POSITA would understand.

Reference to an apparatus or system, or a component thereof, being adapted to, arranged to, capable of, configured to, enabled to, operable to, or operative to perform a particular function, operation, or step includes that apparatus, system, or component, whether or not that function, operation, or step is activated, as long as that apparatus, system, or component is so adapted, arranged, capable, configured, enabled, operable, or operative.

Such other components not described herein can include, but are not limited to, for example, similar components that are developed after development of the presently disclosed subject matter. It should also be noted that, as used herein, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Also, the use of terms herein such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

What is claimed is:

1. An antenna, comprising:

a radially symmetric dielectric unit, comprising:

- a first conducting surface, having both convex and concave surfaces, on a first radially interior surface of the dielectric unit;
- a second conducting surface, extending radially outward from an axis of radial symmetry, wherein the second conducting surface is oblique to the axis of radial symmetry; and
- a non-conducting aperture on a radial exterior of the dielectric unit, wherein the first conducting surface and the second conducting surface define a dielectric volume extending radially toward and terminating in the non-conducting aperture.

2. The antenna of claim 1, wherein the dielectric unit is configured to instantaneously transmit and receive wireless signals across a single instantaneous bandwidth of 10:1.

3. The antenna of claim 1, wherein the dielectric unit is configured to transmit and receive wireless signals across an efficiency bandwidth of 10:1.

4. The antenna of claim 1, wherein the dielectric unit is configured to transmit and receive wireless signals across a 10:1 bandwidth, wherein the 10:1 bandwidth comprises a plurality of instantaneous frequency bands, the bandwidth of each of the plurality of instantaneous frequency bands comprising a multiple of a lowest operating frequency.

5. The antenna of claim 1, wherein a maximum radius of the dielectric unit does not exceed one-tenth of a lowest operating wavelength at which a return loss of the antenna meets or exceeds 6 dB.

6. The antenna of claim 1, wherein a maximum height of the dielectric unit does not exceed one-sixth of a lowest operating wavelength at which a return loss of the antenna meets or exceeds 6 dB.

7. The antenna of claim 1, wherein the first conducting surface and the second conducting surface are disposed on the dielectric volume to form the dielectric unit as a single unit without conducting volumes.

8. The antenna of claim 1, wherein the first conducting surface has a cone angle of 50-70 degrees from the axis of radial symmetry.

9. The antenna of claim 1, wherein the dielectric unit is configured to impede direct current flow between the first conducting surface and the second conducting surface.

10. The antenna of claim 1, further comprising:
- a radially symmetric transmission line capable of transmitting signals to and receiving signals from the dielectric unit.

11. A method, comprising:
- forming a radially symmetric dielectric unit, comprising:
  - a first radially interior surface, having both convex and concave surfaces;
  - a second radially interior surface, extending radially outward from an axis of radial symmetry, wherein the second radially interior surface is oblique to the axis of radial symmetry; and
  - a non-conducting aperture on a radial exterior of the dielectric unit, wherein a first dielectric surface and a second dielectric surface define a dielectric volume extending radially toward and terminating in the non-conducting aperture;
- disposing a first conducting surface on the first dielectric surface; and
- disposing a second conducting surface on the second dielectric surface, wherein the dielectric volume, first conducting surface, and second conducting surface form a dielectric unit.

12. The method of claim 11, wherein the dielectric unit is configured to instantaneously transmit and receive wireless signals across a single instantaneous bandwidth of 10:1.

13. The method of claim 11, wherein the dielectric unit is configured to transmit and receive wireless signals across an efficiency bandwidth of 10:1.

14. The method of claim 11, wherein the dielectric unit is configured to transmit and receive wireless signals across a 10:1 bandwidth, wherein the 10:1 bandwidth comprises a plurality of instantaneous frequency bands, the bandwidth of each of the plurality of instantaneous frequency bands comprising a multiple of a lowest operating frequency.

15. The method of claim 11, wherein a maximum radius of the dielectric unit does not exceed one-tenth of a lowest operating wavelength.

16. The method of claim 11, wherein a maximum height of the dielectric unit does not exceed one-sixth of a lowest operating wavelength.

17. The method of claim 11, further comprising:
- mating the dielectric unit to a ground plane defining an azimuthal plane.

18. The method of claim 11, wherein the first conducting surface has a cone angle within 50-70 degrees from the axis of radial symmetry.

19. The method of claim 11, further comprising:
- receiving signals from the dielectric unit with a radially symmetric transmission line.

20. A method, comprising:
- forming a radially symmetric dielectric volume, comprising:
  - a first radially interior surface, having both convex and concave surfaces, on the first radially interior surface of the dielectric volume;
  - a second radially interior surface, extending radially outward from an axis of radial symmetry, wherein the second radially interior surface is oblique to the axis of radial symmetry; and
  - a non-conducting aperture on a radial exterior of the dielectric volume, wherein the dielectric volume is configured for instantaneous transmission and reception of wireless signals across a single instantaneous bandwidth of 10:1.

21. The method of claim 20, further comprising:
- disposing a first conducting surface on the first radially interior surface; and
- disposing a second conducting surface on the second radially interior surface, wherein the dielectric volume, first conducting surface, and second conducting surface form a dielectric unit as a single unit without conducting volumes.

* * * * *